United States Patent
Ziegler et al.

(10) Patent No.: US 8,774,966 B2
(45) Date of Patent: Jul. 8, 2014

(54) AUTONOMOUS SURFACE CLEANING ROBOT FOR WET AND DRY CLEANING

(75) Inventors: Andrew Ziegler, Arlington, MA (US); Duane Gilbert, Goffstown, NH (US); Christopher John Morse, Malden, MA (US); Scott Pratt, Cary, NC (US); Paul Sandin, Brookline, NH (US); Nancy Dussault, Weymouth, MA (US); Andrew Jones, Roslindale, MA (US)

(73) Assignee: iRobot Corporation, Bedford, MA (US)

( * ) Notice: Subject to any disclaimer, the term of this patent is extended or adjusted under 35 U.S.C. 154(b) by 0 days.

(21) Appl. No.: 13/023,444

(22) Filed: Feb. 8, 2011

(65) Prior Publication Data

US 2011/0271469 A1    Nov. 10, 2011

Related U.S. Application Data

(63) Continuation of application No. 11/359,961, filed on Feb. 21, 2006, and a continuation-in-part of application No. 11/207,620, filed on Aug. 19, 2005, now Pat. No. 7,389,156, and a continuation-in-part of application No. 11/207,575, filed on Aug. 19, 2005, and a continuation-in-part of application No. 11/207,574, filed on Aug. 19, 2005, now Pat. No. 7,620,476, and a continuation-in-part of application No. 11/133,796, filed on May 21, 2005, now abandoned, and a continuation-in-part of application No. 11/134,213, filed on May 21, 2005, now abandoned, and a continuation-in-part of application No. 11/134,212, filed on May 21, 2005, now abandoned.

(60) Provisional application No. 60/654,838, filed on Feb. 18, 2005.

(51) Int. Cl.
| | |
|---|---|
| G06F 19/00 | (2011.01) |
| B60B 33/00 | (2006.01) |
| A47L 11/40 | (2006.01) |
| A47L 11/30 | (2006.01) |
| A47L 7/00 | (2006.01) |
| A47L 9/00 | (2006.01) |
| F04D 29/42 | (2006.01) |
| A47L 5/14 | (2006.01) |
| G05D 1/02 | (2006.01) |
| C11D 1/75 | (2006.01) |
| C11D 1/62 | (2006.01) |

(52) U.S. Cl.
CPC .......... *A47L 11/302* (2013.01); *B60B 33/0068* (2013.01); *A47L 11/4083* (2013.01); *C11D 1/75* (2013.01); *G05D 2201/0203* (2013.01); *B60B 33/0028* (2013.01); *B06B 33/0039* (2013.01); *A47L 7/0028* (2013.01); *B60B 33/0049* (2013.01); *A47L 7/0038* (2013.01); *B60B 33/0073* (2013.01); *A47L 9/009* (2013.01); *F04D 29/4233* (2013.01); *B60B 33/001* (2013.01); *B06B 33/0057* (2013.01); *A47L 5/14* (2013.01); *B60B 33/0021* (2013.01); *G05D 1/0227* (2013.01); *A47L 2201/00* (2013.01); *A47L 11/40* (2013.01); *G05D 1/0272* (2013.01); *C11D 1/62* (2013.01); *A47L 2201/04* (2013.01); *G05D 1/0219* (2013.01); *A47L 7/0042* (2013.01); *A47L 11/4016* (2013.01); *G05D 1/0225* (2013.01)
USPC ......................................................... 700/245

(58) Field of Classification Search
None
See application file for complete search history.

(56) References Cited

U.S. PATENT DOCUMENTS

| | | | |
|---|---|---|---|
| 1,755,054 | A | 4/1930 | Darst |
| 1,780,221 | A | 11/1930 | Buchmann |
| 1,970,302 | A | 8/1934 | Gerhardt |
| 2,136,324 | A | 11/1938 | John |
| 2,302,111 | A | 11/1942 | Dow et al. |
| 2,353,621 | A | 7/1944 | Sav et al. |
| 2,770,825 | A | 11/1956 | Pullen |

| Patent | Date | Inventor |
|---|---|---|
| 2,930,055 A | 3/1960 | Fallen et al. |
| 3,119,369 A | 1/1964 | Harland et al. |
| 3,166,138 A | 1/1965 | Dunn |
| 3,333,564 A | 8/1967 | Waters |
| 3,375,375 A | 3/1968 | Robert et al. |
| 3,381,652 A | 5/1968 | Schaefer et al. |
| 3,457,575 A | 7/1969 | Bienek |
| 3,550,714 A | 12/1970 | Bellinger |
| 3,569,727 A | 3/1971 | Aggarwal et al. |
| 3,638,356 A * | 2/1972 | La Branche .......... 446/465 |
| 3,649,981 A | 3/1972 | Woodworth |
| 3,674,316 A | 7/1972 | De Brey |
| 3,678,882 A | 7/1972 | Kinsella |
| 3,690,559 A | 9/1972 | Rudloff |
| 3,744,586 A | 7/1973 | Leinauer |
| 3,756,667 A | 9/1973 | Bombardier et al. |
| 3,809,004 A | 5/1974 | Leonheart |
| 3,816,004 A | 6/1974 | Bignardi |
| 3,845,831 A | 11/1974 | James |
| RE28,268 E | 12/1974 | Autrand |
| 3,851,349 A | 12/1974 | Lowder |
| 3,853,086 A | 12/1974 | Asplund |
| 3,863,285 A | 2/1975 | Hukuba |
| 3,888,181 A | 6/1975 | Kups |
| 3,937,174 A | 2/1976 | Haaga |
| 3,952,361 A | 4/1976 | Wilkins |
| 3,989,311 A | 11/1976 | De Brey |
| 3,989,931 A | 11/1976 | Phillips |
| 4,004,313 A | 1/1977 | Capra |
| 4,012,681 A | 3/1977 | Finger et al. |
| 4,070,170 A | 1/1978 | Leinfelt |
| 4,099,284 A | 7/1978 | Shinozaki et al. |
| 4,119,900 A | 10/1978 | Kremnitz |
| 4,175,589 A | 11/1979 | Nakamura et al. |
| 4,175,892 A | 11/1979 | De Brey |
| 4,196,727 A | 4/1980 | Verkaart et al. |
| 4,198,727 A | 4/1980 | Farmer |
| 4,199,838 A | 4/1980 | Simonsson |
| 4,209,254 A | 6/1980 | Reymond et al. |
| D258,901 S | 4/1981 | Keyworth |
| 4,297,578 A | 10/1981 | Carter |
| 4,305,234 A | 12/1981 | Pichelman |
| 4,306,329 A | 12/1981 | Yokoi |
| 4,309,758 A | 1/1982 | Halsall et al. |
| 4,328,545 A | 5/1982 | Halsall et al. |
| 4,367,403 A | 1/1983 | Miller |
| 4,369,543 A | 1/1983 | Chen et al. |
| 4,401,909 A | 8/1983 | Gorsek |
| 4,416,033 A | 11/1983 | Specht |
| 4,445,245 A | 5/1984 | Lu |
| 4,465,370 A | 8/1984 | Yuasa et al. |
| 4,477,998 A | 10/1984 | You |
| 4,481,692 A | 11/1984 | Kurz |
| 4,482,960 A | 11/1984 | Pryor |
| 4,492,058 A | 1/1985 | Goldfarb et al. |
| 4,513,469 A | 4/1985 | Godfrey et al. |
| D278,732 S | 5/1985 | Ohkado |
| 4,518,437 A | 5/1985 | Sommer |
| 4,534,637 A | 8/1985 | Suzuki et al. |
| 4,556,313 A | 12/1985 | Miller et al. |
| 4,575,211 A | 3/1986 | Matsumura et al. |
| 4,580,311 A | 4/1986 | Kurz |
| 4,601,082 A | 7/1986 | Kurz |
| 4,618,213 A | 10/1986 | Chen |
| 4,620,285 A | 10/1986 | Perdue |
| 4,624,026 A | 11/1986 | Olson et al. |
| 4,626,995 A | 12/1986 | Lofgren et al. |
| 4,628,454 A | 12/1986 | Ito |
| 4,638,445 A | 1/1987 | Mattaboni |
| 4,644,156 A | 2/1987 | Takahashi et al. |
| 4,649,504 A | 3/1987 | Krouglicof et al. |
| 4,652,917 A | 3/1987 | Miller |
| 4,654,492 A | 3/1987 | Koerner et al. |
| 4,654,924 A | 4/1987 | Getz et al. |
| 4,660,969 A | 4/1987 | Sorimachi et al. |
| 4,662,854 A | 5/1987 | Fang |
| 4,674,048 A | 6/1987 | Okumura |
| 4,679,152 A | 7/1987 | Perdue |
| 4,680,827 A | 7/1987 | Hummel |
| 4,696,074 A | 9/1987 | Cavalli et al. |
| D292,223 S | 10/1987 | Trumbull |
| 4,700,301 A | 10/1987 | Dyke |
| 4,700,427 A | 10/1987 | Knepper |
| 4,703,820 A | 11/1987 | Reinaud |
| 4,709,771 A | 12/1987 | Basham et al. |
| 4,709,773 A | 12/1987 | Clement |
| 4,710,020 A | 12/1987 | Maddox et al. |
| 4,712,740 A | 12/1987 | Duncan et al. |
| 4,716,621 A | 1/1988 | Zoni |
| 4,728,801 A | 3/1988 | O'Connor |
| 4,733,343 A | 3/1988 | Yoneda et al. |
| 4,733,430 A | 3/1988 | Westergren |
| 4,733,431 A | 3/1988 | Martin |
| 4,735,136 A | 4/1988 | Lee et al. |
| 4,735,138 A | 4/1988 | Gawler et al. |
| 4,748,336 A | 5/1988 | Fujie et al. |
| 4,748,833 A | 6/1988 | Nagasawa |
| 4,756,049 A | 7/1988 | Uehara |
| 4,767,213 A | 8/1988 | Hummel |
| 4,769,700 A | 9/1988 | Pryor |
| 4,777,416 A | 10/1988 | George, II et al. |
| D298,766 S | 11/1988 | Tanno et al. |
| 4,782,550 A | 11/1988 | Jacobs |
| 4,796,198 A | 1/1989 | Boultinghouse et al. |
| 4,806,751 A | 2/1989 | Abe et al. |
| 4,811,228 A | 3/1989 | Hyyppa |
| 4,813,906 A | 3/1989 | Matsuyama et al. |
| 4,815,157 A | 3/1989 | Tsuchiya |
| 4,817,000 A | 3/1989 | Eberhardt |
| 4,818,875 A | 4/1989 | Weiner |
| 4,829,442 A | 5/1989 | Kadonoff et al. |
| 4,829,626 A | 5/1989 | Harkonen et al. |
| 4,832,098 A | 5/1989 | Palinkas et al. |
| 4,851,661 A | 7/1989 | Everett |
| 4,854,000 A | 8/1989 | Takimoto |
| 4,854,006 A | 8/1989 | Nishimura et al. |
| 4,855,915 A | 8/1989 | Dallaire |
| 4,857,912 A | 8/1989 | Everett et al. |
| 4,858,132 A | 8/1989 | Holmquist |
| 4,867,570 A | 9/1989 | Sorimachi et al. |
| 4,880,474 A | 11/1989 | Koharagi et al. |
| 4,887,415 A | 12/1989 | Martin |
| 4,891,762 A | 1/1990 | Chotiros |
| 4,893,025 A | 1/1990 | Lee |
| 4,901,394 A | 2/1990 | Nakamura et al. |
| 4,905,151 A | 2/1990 | Weiman et al. |
| 4,909,972 A | 3/1990 | Britz |
| 4,912,643 A | 3/1990 | Beirne |
| 4,918,441 A | 4/1990 | Bohman |
| 4,919,224 A | 4/1990 | Shyu et al. |
| 4,919,489 A | 4/1990 | Kopsco |
| 4,920,060 A | 4/1990 | Parrent et al. |
| 4,920,605 A | 5/1990 | Takashima |
| 4,933,864 A | 6/1990 | Evans et al. |
| 4,937,912 A | 7/1990 | Kurz |
| 4,953,253 A | 9/1990 | Fukuda et al. |
| 4,954,962 A | 9/1990 | Evans et al. |
| 4,955,714 A | 9/1990 | Stotler et al. |
| 4,956,891 A | 9/1990 | Wulff |
| 4,961,303 A | 10/1990 | McCarty et al. |
| 4,961,304 A | 10/1990 | Ovsborn et al. |
| 4,962,453 A | 10/1990 | Pong et al. |
| 4,967,862 A | 11/1990 | Pong et al. |
| 4,971,591 A | 11/1990 | Raviv et al. |
| 4,973,912 A | 11/1990 | Kaminski et al. |
| 4,974,283 A | 12/1990 | Holsten et al. |
| 4,977,618 A | 12/1990 | Allen |
| 4,977,639 A | 12/1990 | Takahashi et al. |
| 4,986,663 A | 1/1991 | Cecchi et al. |
| 5,001,635 A | 3/1991 | Yasutomi et al. |
| 5,002,145 A | 3/1991 | Waqkaumi et al. |
| 5,012,886 A | 5/1991 | Jonas et al. |
| 5,018,240 A | 5/1991 | Holman |
| 5,020,186 A | 6/1991 | Lessig et al. |
| 5,022,812 A | 6/1991 | Coughlan et al. |
| 5,023,788 A | 6/1991 | Kitazume et al. |
| 5,024,529 A | 6/1991 | Svetkoff et al. |
| D318,500 S | 7/1991 | Malewicki et al. |

| | | | | | |
|---|---|---|---|---|---|
| 5,032,775 A | 7/1991 | Mizuno et al. | 5,410,479 A | 4/1995 | Coker |
| 5,033,151 A | 7/1991 | Kraft et al. | 5,435,405 A | 7/1995 | Schempf et al. |
| 5,033,291 A | 7/1991 | Podoloff et al. | 5,440,216 A | 8/1995 | Kim |
| 5,040,116 A | 8/1991 | Evans et al. | 5,442,358 A | 8/1995 | Keeler et al. |
| 5,045,769 A | 9/1991 | Everett | 5,444,965 A | 8/1995 | Colens |
| 5,049,802 A | 9/1991 | Mintus et al. | 5,446,356 A | 8/1995 | Kim |
| 5,051,906 A | 9/1991 | Evans et al. | 5,446,445 A | 8/1995 | Bloomfield et al. |
| 5,062,819 A | 11/1991 | Mallory | 5,451,135 A | 9/1995 | Schempf et al. |
| 5,070,567 A | 12/1991 | Holland | 5,454,129 A | 10/1995 | Kell |
| 5,084,934 A | 2/1992 | Lessig et al. | 5,455,982 A | 10/1995 | Armstrong et al. |
| 5,086,535 A | 2/1992 | Grossmeyer et al. | 5,465,525 A | 11/1995 | Mifune et al. |
| 5,090,321 A | 2/1992 | Abouav | 5,465,619 A | 11/1995 | Sotack et al. |
| 5,093,955 A | 3/1992 | Blehert et al. | 5,467,273 A | 11/1995 | Faibish et al. |
| 5,094,311 A | 3/1992 | Akeel | 5,471,560 A | 11/1995 | Allard et al. |
| 5,098,262 A | 3/1992 | Wecker et al. | 5,491,670 A | 2/1996 | Weber |
| 5,105,502 A | 4/1992 | Takashima | 5,497,529 A | 3/1996 | Boesi |
| 5,105,550 A | 4/1992 | Shenoha | 5,498,948 A | 3/1996 | Bruni et al. |
| 5,109,566 A | 5/1992 | Kobayashi et al. | 5,502,638 A | 3/1996 | Takenaka |
| 5,115,538 A | 5/1992 | Cochran et al. | 5,505,072 A | 4/1996 | Oreper |
| 5,127,128 A | 7/1992 | Lee et al. | 5,507,067 A | 4/1996 | Hoekstra et al. |
| 5,136,675 A | 8/1992 | Hodson | 5,510,893 A | 4/1996 | Suzuki |
| 5,136,750 A | 8/1992 | Takashima et al. | 5,511,147 A | 4/1996 | Abdel |
| 5,142,985 A | 9/1992 | Stearns et al. | 5,515,572 A | 5/1996 | Hoekstra et al. |
| 5,144,471 A | 9/1992 | Takanashi et al. | 5,534,762 A | 7/1996 | Kim |
| 5,144,714 A | 9/1992 | Mori et al. | 5,535,476 A | 7/1996 | Kresse et al. |
| 5,144,715 A | 9/1992 | Matsuyo et al. | 5,537,017 A | 7/1996 | Feiten et al. |
| 5,152,028 A | 10/1992 | Hirano | 5,537,711 A | 7/1996 | Tseng |
| 5,152,202 A | 10/1992 | Strauss | 5,539,953 A | 7/1996 | Kurz |
| 5,155,684 A | 10/1992 | Burke et al. | 5,542,146 A | 8/1996 | Hoekstra et al. |
| 5,163,202 A | 11/1992 | Kawakami et al. | 5,542,148 A | 8/1996 | Young |
| 5,163,320 A | 11/1992 | Goshima et al. | 5,546,631 A | 8/1996 | Chambon |
| 5,164,579 A | 11/1992 | Pryor et al. | 5,548,511 A | 8/1996 | Bancroft |
| 5,165,064 A | 11/1992 | Mattaboni | 5,551,525 A | 9/1996 | Pack et al. |
| 5,170,352 A | 12/1992 | McTamaney et al. | 5,553,349 A | 9/1996 | Kilstrom et al. |
| 5,173,881 A | 12/1992 | Sindle | 5,555,587 A | 9/1996 | Guha |
| 5,182,833 A | 2/1993 | Yamaguchi et al. | 5,560,077 A | 10/1996 | Crotchett |
| 5,202,742 A | 4/1993 | Frank et al. | 5,568,589 A | 10/1996 | Hwang |
| 5,204,814 A | 4/1993 | Noonan et al. | D375,592 S | 11/1996 | Ljunggren |
| 5,206,500 A | 4/1993 | Decker et al. | 5,608,306 A | 3/1997 | Rybeck et al. |
| 5,208,521 A | 5/1993 | Aoyama | 5,608,894 A | 3/1997 | Kawakami et al. |
| 5,216,777 A | 6/1993 | Moro et al. | 5,608,944 A | 3/1997 | Gordon |
| 5,222,786 A | 6/1993 | Sovis et al. | 5,610,488 A | 3/1997 | Miyazawa |
| 5,227,985 A | 7/1993 | DeMenthon | 5,611,106 A | 3/1997 | Wulff |
| 5,233,682 A | 8/1993 | Abe et al. | 5,611,108 A | 3/1997 | Knowlton et al. |
| 5,239,720 A | 8/1993 | Wood et al. | 5,613,261 A | 3/1997 | Kawakami et al. |
| 5,251,358 A | 10/1993 | Moro et al. | 5,613,269 A | 3/1997 | Miwa |
| 5,261,139 A | 11/1993 | Lewis | 5,621,291 A | 4/1997 | Lee |
| 5,276,618 A | 1/1994 | Everett | 5,622,236 A | 4/1997 | Azumi et al. |
| 5,276,939 A | 1/1994 | Uenishi | 5,634,237 A | 6/1997 | Paranjpe |
| 5,277,064 A | 1/1994 | Knigga et al. | 5,634,239 A | 6/1997 | Tuvin et al. |
| 5,279,672 A | 1/1994 | Belker, Jr. et al. | 5,636,402 A | 6/1997 | Kubo et al. |
| 5,284,452 A | 2/1994 | Corona | 5,642,299 A | 6/1997 | Hardin et al. |
| 5,284,522 A | 2/1994 | Kobayashi et al. | 5,646,494 A | 7/1997 | Han |
| 5,293,955 A | 3/1994 | Lee | 5,647,554 A | 7/1997 | Ikegami et al. |
| D345,707 S | 4/1994 | Alister | 5,650,702 A | 7/1997 | Azumi |
| 5,303,448 A | 4/1994 | Hennessey et al. | 5,652,489 A | 7/1997 | Kawakami |
| 5,307,273 A | 4/1994 | Oh et al. | 5,682,313 A | 10/1997 | Edlund et al. |
| 5,309,592 A | 5/1994 | Hiratsuka | 5,682,839 A | 11/1997 | Grimsley et al. |
| 5,310,379 A | 5/1994 | Hippely et al. | 5,696,675 A | 12/1997 | Nakamura et al. |
| 5,315,227 A | 5/1994 | Pierson et al. | 5,698,861 A | 12/1997 | Oh |
| 5,319,827 A | 6/1994 | Yang | 5,709,007 A | 1/1998 | Chiang |
| 5,319,828 A | 6/1994 | Waldhauser et al. | 5,710,506 A | 1/1998 | Broell et al. |
| 5,321,614 A | 6/1994 | Ashworth | 5,714,119 A | 2/1998 | Kawagoe et al. |
| 5,323,483 A | 6/1994 | Baeg | 5,717,169 A | 2/1998 | Liang et al. |
| 5,324,948 A | 6/1994 | Dudar et al. | 5,717,484 A | 2/1998 | Hamaguchi et al. |
| 5,331,713 A | 7/1994 | Tipton | 5,720,077 A | 2/1998 | Nakamura et al. |
| 5,341,186 A | 8/1994 | Kato | 5,732,401 A | 3/1998 | Conway |
| 5,341,540 A | 8/1994 | Soupert et al. | 5,735,017 A | 4/1998 | Barnes et al. |
| 5,341,549 A | 8/1994 | Wirtz et al. | 5,735,959 A | 4/1998 | Kubo et al. |
| 5,345,649 A | 9/1994 | Whitlow | 5,742,975 A | 4/1998 | Knowlton et al. |
| 5,353,224 A | 10/1994 | Lee et al. | 5,745,235 A | 4/1998 | Vercammen et al. |
| 5,363,305 A | 11/1994 | Cox et al. | 5,752,871 A | 5/1998 | Tsuzuki |
| 5,363,935 A | 11/1994 | Schempf et al. | 5,756,904 A | 5/1998 | Oreper et al. |
| 5,369,347 A | 11/1994 | Yoo | 5,761,762 A | 6/1998 | Kubo et al. |
| 5,369,838 A | 12/1994 | Wood et al. | 5,764,888 A | 6/1998 | Bolan et al. |
| 5,386,862 A | 2/1995 | Glover et al. | 5,767,437 A | 6/1998 | Rogers |
| 5,399,951 A | 3/1995 | Lavallee et al. | 5,767,960 A | 6/1998 | Orman |
| 5,400,244 A | 3/1995 | Watanabe et al. | 5,777,596 A | 7/1998 | Herbert |
| 5,404,612 A | 4/1995 | Ishikawa | 5,778,486 A | 7/1998 | Kim |

| | | | | | | |
|---|---|---|---|---|---|---|
| 5,781,697 | A | 7/1998 | Jeong | 6,041,471 | A | 3/2000 | Charky et al. |
| 5,781,960 | A | 7/1998 | Kilstrom et al. | 6,041,472 | A | 3/2000 | Kasen et al. |
| 5,784,755 | A | 7/1998 | Karr et al. | 6,046,800 | A | 4/2000 | Ohtomo et al. |
| 5,786,602 | A | 7/1998 | Pryor et al. | 6,049,620 | A | 4/2000 | Dickinson et al. |
| 5,787,545 | A | 8/1998 | Colens | 6,050,648 | A | 4/2000 | Keleny |
| 5,793,900 | A | 8/1998 | Nourbakhsh et al. | 6,052,821 | A | 4/2000 | Chouly et al. |
| 5,794,297 | A | 8/1998 | Muta | 6,055,042 | A | 4/2000 | Sarangapani |
| 5,802,665 | A | 9/1998 | Knowlton et al. | 6,055,702 | A | 5/2000 | Imamura et al. |
| 5,812,267 | A | 9/1998 | Everett, Jr. et al. | 6,061,868 | A | 5/2000 | Moritsch et al. |
| 5,814,808 | A | 9/1998 | Takada et al. | 6,065,182 | A | 5/2000 | Wright et al. |
| 5,815,880 | A | 10/1998 | Nakanishi | 6,070,290 | A | 6/2000 | Schwarze et al. |
| 5,815,884 | A | 10/1998 | Imamura et al. | 6,073,432 | A | 6/2000 | Schaedler |
| 5,819,008 | A | 10/1998 | Asama et al. | 6,076,025 | A | 6/2000 | Ueno et al. |
| 5,819,360 | A | 10/1998 | Fujii et al. | 6,076,026 | A | 6/2000 | Jambhekar et al. |
| 5,819,936 | A | 10/1998 | Saveliev et al. | 6,076,226 | A | 6/2000 | Reed |
| 5,820,821 | A | 10/1998 | Kawagoe et al. | 6,076,227 | A | 6/2000 | Schallig et al. |
| 5,821,730 | A | 10/1998 | Drapkin | 6,081,257 | A | 6/2000 | Zeller |
| 5,825,981 | A | 10/1998 | Matsuda | 6,088,020 | A | 7/2000 | Mor |
| 5,828,770 | A | 10/1998 | Leis et al. | 6,094,775 | A | 8/2000 | Behmer |
| 5,831,597 | A | 11/1998 | West et al. | 6,099,091 | A | 8/2000 | Campbell |
| 5,836,045 | A | 11/1998 | Anthony et al. | 6,101,671 | A | 8/2000 | Wright et al. |
| 5,839,156 | A | 11/1998 | Park et al. | 6,108,031 | A | 8/2000 | King et al. |
| 5,839,532 | A | 11/1998 | Yoshiji et al. | 6,108,067 | A | 8/2000 | Okamoto |
| 5,841,259 | A | 11/1998 | Kim et al. | 6,108,076 | A | 8/2000 | Hanseder |
| 5,867,800 | A | 2/1999 | Leif | 6,108,269 | A | 8/2000 | Kabel |
| 5,869,910 | A | 2/1999 | Colens | 6,108,597 | A | 8/2000 | Kirchner et al. |
| 5,894,621 | A | 4/1999 | Kubo | 6,108,859 | A | 8/2000 | Burgoon |
| 5,896,611 | A | 4/1999 | Haaga | 6,112,143 | A | 8/2000 | Allen et al. |
| 5,903,124 | A | 5/1999 | Kawakami | 6,112,996 | A | 9/2000 | Matsuo |
| 5,905,209 | A | 5/1999 | Oreper | 6,119,057 | A | 9/2000 | Kawagoe |
| 5,907,886 | A | 6/1999 | Buscher | 6,122,798 | A | 9/2000 | Kobayashi et al. |
| 5,910,700 | A | 6/1999 | Crotzer | 6,124,694 | A | 9/2000 | Bancroft et al. |
| 5,911,260 | A | 6/1999 | Suzuki | 6,125,498 | A | 10/2000 | Roberts et al. |
| 5,916,008 | A | 6/1999 | Wong | 6,131,237 | A | 10/2000 | Kasper et al. |
| 5,924,167 | A | 7/1999 | Wright et al. | 6,138,063 | A | 10/2000 | Himeda |
| 5,926,909 | A | 7/1999 | McGee | 6,142,252 | A | 11/2000 | Kinto et al. |
| 5,933,102 | A | 8/1999 | Miller et al. | 6,146,041 | A | 11/2000 | Chen et al. |
| 5,933,913 | A | 8/1999 | Wright et al. | 6,146,278 | A | 11/2000 | Kobayashi |
| 5,935,179 | A | 8/1999 | Kleiner et al. | 6,154,279 | A | 11/2000 | Thayer |
| 5,935,333 | A | 8/1999 | Davis | 6,154,694 | A | 11/2000 | Aoki et al. |
| 5,940,346 | A | 8/1999 | Sadowsky et al. | 6,167,332 | A | 12/2000 | Kurtzberg et al. |
| 5,940,927 | A * | 8/1999 | Haegermarck et al. ......... 15/319 | 6,167,587 | B1 | 1/2001 | Kasper et al. |
| 5,940,930 | A | 8/1999 | Oh et al. | 6,192,548 | B1 | 2/2001 | Huffman |
| 5,942,869 | A | 8/1999 | Katou et al. | 6,192,549 | B1 | 2/2001 | Kasen et al. |
| 5,943,730 | A | 8/1999 | Boomqaarden | 6,202,243 | B1 | 3/2001 | Beaufoy et al. |
| 5,943,733 | A | 8/1999 | Tagliaferri et al. | 6,216,307 | B1 | 4/2001 | Kaleta et al. |
| 5,943,933 | A | 8/1999 | Evans et al. | 6,220,865 | B1 | 4/2001 | Macri et al. |
| 5,947,225 | A | 9/1999 | Kawakami et al. | 6,226,830 | B1 | 5/2001 | Hendriks et al. |
| 5,950,408 | A | 9/1999 | Schaedler | 6,227,946 | B1 * | 5/2001 | Gonzalez-Martin et al. ... 451/54 |
| 5,959,423 | A | 9/1999 | Nakanishi et al. | 6,230,362 | B1 | 5/2001 | Kasper et al. |
| 5,959,424 | A * | 9/1999 | Elkmann et al. ......... 318/568.12 | 6,237,741 | B1 | 5/2001 | Guidetti |
| 5,968,281 | A | 10/1999 | Wright et al. | 6,240,342 | B1 | 5/2001 | Fiegert et al. |
| 5,974,348 | A | 10/1999 | Rocks | 6,243,913 | B1 | 6/2001 | Frank et al. |
| 5,974,365 | A | 10/1999 | Mitchell | 6,255,793 | B1 | 7/2001 | Peless et al. |
| 5,983,448 | A | 11/1999 | Wright et al. | 6,259,979 | B1 | 7/2001 | Holmquist |
| 5,984,880 | A | 11/1999 | Lander et al. | 6,261,379 | B1 | 7/2001 | Conrad et al. |
| 5,987,383 | A | 11/1999 | Keller et al. | 6,263,539 | B1 | 7/2001 | Baig |
| 5,989,700 | A | 11/1999 | Krivopal | 6,263,989 | B1 | 7/2001 | Won |
| 5,991,951 | A | 11/1999 | Kubo et al. | 6,272,936 | B1 | 8/2001 | Oreper et al. |
| 5,995,883 | A | 11/1999 | Nishikado | 6,276,478 | B1 | 8/2001 | Hopkins et al. |
| 5,995,884 | A | 11/1999 | Allen et al. | 6,278,918 | B1 | 8/2001 | Dickson et al. |
| 5,996,167 | A | 12/1999 | Close | 6,279,196 | B2 | 8/2001 | Kasen et al. |
| 5,998,953 | A | 12/1999 | Nakamura et al. | 6,282,526 | B1 | 8/2001 | Ganesh |
| 5,998,971 | A | 12/1999 | Corbridge | 6,283,034 | B1 | 9/2001 | Miles |
| 6,000,088 | A | 12/1999 | Wright et al. | 6,285,778 | B1 | 9/2001 | Nakajima et al. |
| 6,009,358 | A | 12/1999 | Angott et al. | 6,285,930 | B1 | 9/2001 | Dickson et al. |
| 6,012,618 | A | 1/2000 | Matsuo et al. | 6,286,181 | B1 | 9/2001 | Kasper et al. |
| 6,021,545 | A | 2/2000 | Delgado et al. | 6,300,737 | B1 | 10/2001 | Bergvall et al. |
| 6,023,813 | A | 2/2000 | Thatcher et al. | 6,321,337 | B1 | 11/2001 | Reshef et al. |
| 6,023,814 | A | 2/2000 | Imamura | 6,321,515 | B1 | 11/2001 | Colens |
| 6,025,687 | A | 2/2000 | Himeda et al. | 6,323,570 | B1 | 11/2001 | Nishimura et al. |
| 6,026,539 | A | 2/2000 | Mouw et al. | 6,324,714 | B1 | 12/2001 | Walz et al. |
| 6,030,464 | A | 2/2000 | Azevedo | 6,327,741 | B1 | 12/2001 | Reed |
| 6,030,465 | A | 2/2000 | Marcussen et al. | 6,332,400 | B1 | 12/2001 | Meyer |
| 6,032,327 | A | 3/2000 | Oka et al. | 6,339,735 | B1 | 1/2002 | Peless et al. |
| 6,032,542 | A | 3/2000 | Warnick et al. | 6,362,875 | B1 | 3/2002 | Burkley |
| 6,036,572 | A | 3/2000 | Sze | 6,370,453 | B2 | 4/2002 | Sommer |
| 6,038,501 | A | 3/2000 | Kawakami | 6,374,155 | B1 | 4/2002 | Wallach et al. |
| 6,040,669 | A | 3/2000 | Hog | 6,374,157 | B1 | 4/2002 | Takamura |

| | | |
|---|---|---|
| 6,381,802 B2 | 5/2002 | Park |
| 6,385,515 B1 | 5/2002 | Dickson et al. |
| 6,388,013 B1 | 5/2002 | Saraf et al. |
| 6,389,329 B1 | 5/2002 | Colens |
| 6,397,429 B1 | 6/2002 | Legatt et al. |
| 6,400,048 B1 | 6/2002 | Nishimura et al. |
| 6,401,294 B2 | 6/2002 | Kasper |
| 6,408,226 B1 | 6/2002 | Byrne et al. |
| 6,412,141 B2 | 7/2002 | Kasper et al. |
| 6,415,203 B1 | 7/2002 | Inoue et al. |
| 6,418,586 B2 | 7/2002 | Fulghum |
| 6,421,870 B1 | 7/2002 | Basham et al. |
| 6,427,285 B1 | 8/2002 | Leggatt et al. |
| 6,430,471 B1 | 8/2002 | Kintou et al. |
| 6,431,296 B1 | 8/2002 | Won |
| 6,437,227 B1 | 8/2002 | Theimer |
| 6,437,465 B1 | 8/2002 | Nishimura et al. |
| 6,438,456 B1 | 8/2002 | Feddema et al. |
| 6,438,793 B1 | 8/2002 | Miner et al. |
| 6,442,476 B1 | 8/2002 | Poropat |
| 6,442,789 B1 | 9/2002 | Legatt et al. |
| 6,443,509 B1 | 9/2002 | Levin et al. |
| 6,444,003 B1 | 9/2002 | Sutcliffe |
| 6,446,302 B1 | 9/2002 | Kasper et al. |
| 6,454,036 B1 | 9/2002 | Airey et al. |
| D464,091 S | 10/2002 | Christianson |
| 6,457,206 B1 | 10/2002 | Judson |
| 6,459,955 B1 | 10/2002 | Bartsch et al. |
| 6,463,368 B1 | 10/2002 | Feiten et al. |
| 6,465,982 B1 | 10/2002 | Bergvall et al. |
| 6,473,167 B1 | 10/2002 | Odell |
| 6,480,762 B1 | 11/2002 | Uchikubo et al. |
| 6,481,515 B1 * | 11/2002 | Kirkpatrick et al. ......... 180/65.1 |
| 6,490,539 B1 | 12/2002 | Dickson et al. |
| 6,491,127 B1 | 12/2002 | Holmberg et al. |
| 6,493,612 B1 | 12/2002 | Bisset et al. |
| 6,493,613 B2 | 12/2002 | Peless et al. |
| 6,496,754 B2 | 12/2002 | Song et al. |
| 6,496,755 B2 | 12/2002 | Wallach et al. |
| 6,502,657 B2 | 1/2003 | Kerrebrock et al. |
| 6,504,610 B1 | 1/2003 | Bauer et al. |
| 6,507,773 B2 | 1/2003 | Parker et al. |
| 6,519,808 B2 | 2/2003 | Legatt et al. |
| 6,525,509 B1 | 2/2003 | Petersson et al. |
| D471,243 S | 3/2003 | Cioffi et al. |
| 6,530,102 B1 | 3/2003 | Pierce et al. |
| 6,530,117 B2 | 3/2003 | Peterson |
| 6,532,404 B2 | 3/2003 | Colens |
| 6,535,793 B2 | 3/2003 | Allard |
| 6,540,424 B1 | 4/2003 | Hall et al. |
| 6,540,607 B2 | 4/2003 | Mokris et al. |
| 6,548,982 B1 | 4/2003 | Papanikolopoulos et al. |
| 6,553,612 B1 | 4/2003 | Dyson et al. |
| 6,556,722 B1 | 4/2003 | Russell et al. |
| 6,556,892 B2 | 4/2003 | Kuroki et al. |
| 6,557,104 B2 | 4/2003 | Vu et al. |
| D474,312 S | 5/2003 | Stephens et al. |
| 6,563,130 B2 | 5/2003 | Dworkowski et al. |
| 6,571,415 B2 | 6/2003 | Gerber et al. |
| 6,571,422 B1 | 6/2003 | Gordon et al. |
| 6,572,711 B2 | 6/2003 | Sclafani et al. |
| 6,574,536 B1 | 6/2003 | Kawagoe et al. |
| 6,580,246 B2 | 6/2003 | Jacobs |
| 6,584,376 B1 | 6/2003 | Kommer |
| 6,586,908 B2 | 7/2003 | Petersson et al. |
| 6,587,573 B1 | 7/2003 | Stam et al. |
| 6,590,222 B1 | 7/2003 | Bisset et al. |
| 6,594,551 B2 | 7/2003 | McKinney, Jr. et al. |
| 6,594,844 B2 | 7/2003 | Jones |
| D478,884 S | 8/2003 | Slipy et al. |
| 6,601,265 B1 * | 8/2003 | Burlington ...................... 15/319 |
| 6,604,021 B2 | 8/2003 | Imai et al. |
| 6,604,022 B2 | 8/2003 | Parker et al. |
| 6,605,156 B1 | 8/2003 | Clark et al. |
| 6,609,269 B2 | 8/2003 | Kasper |
| 6,611,120 B2 | 8/2003 | Song et al. |
| 6,611,734 B2 | 8/2003 | Parker et al. |
| 6,611,738 B2 | 8/2003 | Ruffner |
| 6,615,108 B1 | 9/2003 | Peless et al. |
| 6,615,434 B1 | 9/2003 | Davis et al. |
| 6,615,885 B1 | 9/2003 | Ohm |
| 6,622,465 B2 | 9/2003 | Jerome et al. |
| 6,624,744 B1 | 9/2003 | Wilson et al. |
| 6,625,843 B2 | 9/2003 | Kim et al. |
| 6,629,028 B2 | 9/2003 | Paromtchik et al. |
| 6,633,150 B1 * | 10/2003 | Wallach et al. .......... 318/568.12 |
| 6,637,546 B1 | 10/2003 | Wang |
| 6,639,659 B2 | 10/2003 | Granger |
| 6,658,325 B2 | 12/2003 | Zweig |
| 6,658,354 B2 | 12/2003 | Lin |
| 6,658,692 B2 | 12/2003 | Lenkiewicz et al. |
| 6,658,693 B1 | 12/2003 | Reed, Jr. |
| 6,661,239 B1 | 12/2003 | Ozick |
| 6,662,889 B2 | 12/2003 | De Fazio et al. |
| 6,668,951 B2 | 12/2003 | Won |
| 6,670,817 B2 | 12/2003 | Fournier et al. |
| 6,671,592 B1 | 12/2003 | Bisset et al. |
| 6,671,925 B2 | 1/2004 | Field et al. |
| 6,687,571 B1 | 2/2004 | Byrne et al. |
| 6,690,134 B1 | 2/2004 | Jones et al. |
| 6,690,993 B2 | 2/2004 | Foulke et al. |
| 6,697,147 B2 | 2/2004 | Ko et al. |
| 6,705,332 B2 | 3/2004 | Field et al. |
| 6,711,280 B2 | 3/2004 | Stafsudd et al. |
| 6,732,826 B2 | 5/2004 | Song et al. |
| 6,735,811 B2 | 5/2004 | Field et al. |
| 6,735,812 B2 | 5/2004 | Hekman et al. |
| 6,737,591 B1 | 5/2004 | Lapstun et al. |
| 6,741,054 B2 | 5/2004 | Koselka et al. |
| 6,741,364 B2 | 5/2004 | Lange et al. |
| 6,748,297 B2 | 6/2004 | Song et al. |
| 6,756,703 B2 | 6/2004 | Chang |
| 6,760,647 B2 | 7/2004 | Nourbakhsh et al. |
| 6,764,373 B1 | 7/2004 | Osawa et al. |
| 6,769,004 B2 | 7/2004 | Barrett |
| 6,774,596 B1 | 8/2004 | Bisset |
| 6,779,380 B1 | 8/2004 | Nieuwkamp |
| 6,781,338 B2 | 8/2004 | Jones et al. |
| 6,809,490 B2 | 10/2004 | Jones et al. |
| 6,810,305 B2 | 10/2004 | Kirkpatrick, Jr. |
| 6,810,350 B2 | 10/2004 | Blakley |
| 6,830,120 B1 | 12/2004 | Yashima et al. |
| 6,832,407 B2 | 12/2004 | Salem et al. |
| 6,836,701 B2 | 12/2004 | McKee |
| 6,841,963 B2 | 1/2005 | Song et al. |
| 6,845,297 B2 | 1/2005 | Allard |
| 6,848,146 B2 | 2/2005 | Wright et al. |
| 6,854,148 B1 | 2/2005 | Rief et al. |
| 6,856,811 B2 | 2/2005 | Burdue et al. |
| 6,859,010 B2 | 2/2005 | Jeon et al. |
| 6,859,682 B2 | 2/2005 | Naka et al. |
| 6,860,206 B1 | 3/2005 | Rudakevych et al. |
| 6,865,447 B2 | 3/2005 | Lau et al. |
| 6,870,792 B2 | 3/2005 | Chiappetta |
| 6,871,115 B2 | 3/2005 | Huang et al. |
| 6,883,201 B2 | 4/2005 | Jones et al. |
| 6,886,651 B1 | 5/2005 | Slocum et al. |
| 6,888,333 B2 | 5/2005 | Laby |
| 6,901,624 B2 | 6/2005 | Mori et al. |
| 6,906,702 B1 | 6/2005 | Tanaka et al. |
| 6,914,403 B2 | 7/2005 | Tsurumi |
| 6,917,854 B2 | 7/2005 | Bayer |
| 6,925,679 B2 | 8/2005 | Wallach et al. |
| 6,929,548 B2 | 8/2005 | Wang |
| D510,066 S | 9/2005 | Hickey et al. |
| 6,938,298 B2 | 9/2005 | Aasen et al. |
| 6,940,291 B1 | 9/2005 | Ozick |
| 6,941,199 B1 | 9/2005 | Bottomley et al. |
| 6,956,348 B2 | 10/2005 | Landry et al. |
| 6,957,712 B2 | 10/2005 | Song et al. |
| 6,960,986 B2 | 11/2005 | Asama et al. |
| 6,965,209 B2 | 11/2005 | Jones et al. |
| 6,965,211 B2 | 11/2005 | Tsurumi |
| 6,968,592 B2 | 11/2005 | Takeuchi et al. |
| 6,971,140 B2 | 12/2005 | Kim |
| 6,975,246 B1 | 12/2005 | Trudeau |
| 6,980,229 B1 | 12/2005 | Ebersole |
| 6,985,556 B2 | 1/2006 | Shanmugavel et al. |

| | | | | | | |
|---|---|---|---|---|---|---|
| 6,993,954 B1 | 2/2006 | George et al. | 7,611,583 B2 | 11/2009 | Buckley et al. | |
| 6,999,850 B2 | 2/2006 | McDonald et al. | 7,617,557 B2 | 11/2009 | Reindle | |
| 7,013,527 B2 | 3/2006 | Thomas et al. | 7,620,476 B2 | 11/2009 | Morse et al. | |
| 7,024,278 B2 | 4/2006 | Chiappetta et al. | 7,636,982 B2 | 12/2009 | Jones et al. | |
| 7,024,280 B2 | 4/2006 | Parker et al. | 7,647,144 B2 | 1/2010 | Haegermarck | |
| 7,027,893 B2 | 4/2006 | Perry et al. | 7,650,666 B2 | 1/2010 | Jang | |
| 7,030,768 B2 | 4/2006 | Wanie | 7,660,650 B2 | 2/2010 | Kawagoe et al. | |
| 7,031,805 B2 | 4/2006 | Lee et al. | 7,663,333 B2 | 2/2010 | Jones et al. | |
| 7,032,469 B2 | 4/2006 | Bailey | 7,693,605 B2 | 4/2010 | Park | |
| 7,040,869 B2 | 5/2006 | Beenker | 7,706,917 B1 | 4/2010 | Chiappetta et al. | |
| 7,051,399 B2 | 5/2006 | Field et al. | 7,761,954 B2 | 7/2010 | Ziegler et al. | |
| 7,053,578 B2 | 5/2006 | Diehl et al. | 7,765,635 B2 | 8/2010 | Park | |
| 7,054,716 B2 | 5/2006 | McKee et al. | 7,784,147 B2 | 8/2010 | Burkholder et al. | |
| 7,055,210 B2 | 6/2006 | Keppler et al. | 7,801,645 B2 | 9/2010 | Taylor et al. | |
| 7,057,120 B2 | 6/2006 | Ma et al. | 7,805,220 B2 | 9/2010 | Taylor et al. | |
| 7,057,643 B2 | 6/2006 | Iida et al. | 7,809,944 B2 | 10/2010 | Kawamoto | |
| 7,059,012 B2 | 6/2006 | Song et al. | 7,832,048 B2 | 11/2010 | Harwig et al. | |
| 7,065,430 B2 | 6/2006 | Naka et al. | 7,849,555 B2 | 12/2010 | Hahm et al. | |
| 7,066,291 B2 | 6/2006 | Martins et al. | 7,853,645 B2 | 12/2010 | Brown et al. | |
| 7,069,124 B1 | 6/2006 | Whittaker et al. | 7,920,941 B2 | 4/2011 | Park et al. | |
| 7,079,923 B2 | 7/2006 | Abramson et al. | 7,937,800 B2 | 5/2011 | Yan | |
| 7,085,623 B2 | 8/2006 | Siegers | 7,957,836 B2 | 6/2011 | Myeong et al. | |
| 7,085,624 B2 | 8/2006 | Aldred et al. | 8,392,021 B2 | 3/2013 | Konandreas et al. | |
| 7,113,847 B2 | 9/2006 | Chmura et al. | 2001/0004719 A1 | 6/2001 | Sommer | |
| 7,133,746 B2 | 11/2006 | Abramson et al. | 2001/0013434 A1* | 8/2001 | Hopkins | 180/7.1 |
| 7,142,198 B2 | 11/2006 | Lee | 2001/0013929 A1 | 8/2001 | Torsten | |
| 7,148,458 B2 | 12/2006 | Schell et al. | 2001/0020200 A1 | 9/2001 | Das et al. | |
| 7,155,308 B2 | 12/2006 | Jones | 2001/0025183 A1 | 9/2001 | Shahidi | |
| 7,167,775 B2 | 1/2007 | Abramson et al. | 2001/0037163 A1 | 11/2001 | Allard | |
| 7,171,285 B2 | 1/2007 | Kim et al. | 2001/0043509 A1 | 11/2001 | Green et al. | |
| 7,173,391 B2 | 2/2007 | Jones et al. | 2001/0045883 A1 | 11/2001 | Holdaway et al. | |
| 7,174,238 B1 | 2/2007 | Zweig | 2001/0047231 A1 | 11/2001 | Peless et al. | |
| 7,188,000 B2 | 3/2007 | Chiappetta et al. | 2001/0047895 A1 | 12/2001 | De Fazio et al. | |
| 7,193,384 B1 | 3/2007 | Norman et al. | 2002/0011367 A1 | 1/2002 | Kolesnik | |
| 7,196,487 B2 | 3/2007 | Jones et al. | 2002/0011813 A1 | 1/2002 | Koselka et al. | |
| 7,201,786 B2 | 4/2007 | Wegelin et al. | 2002/0016649 A1 | 2/2002 | Jones | |
| 7,206,677 B2 | 4/2007 | Hulden | 2002/0021219 A1 | 2/2002 | Edwards | |
| 7,211,980 B1 | 5/2007 | Bruemmer et al. | 2002/0027652 A1 | 3/2002 | Paromtchik et al. | |
| 7,225,500 B2 | 6/2007 | Diehl et al. | 2002/0036779 A1 | 3/2002 | Kiyoi et al. | |
| 7,246,405 B2 | 7/2007 | Yan | 2002/0081937 A1 | 6/2002 | Yamada et al. | |
| 7,248,951 B2 | 7/2007 | Hulden | 2002/0095239 A1 | 7/2002 | Wallach et al. | |
| 7,275,280 B2 | 10/2007 | Haegermarck et al. | 2002/0097400 A1 | 7/2002 | Jung et al. | |
| 7,283,892 B1 | 10/2007 | Boillot et al. | 2002/0104963 A1 | 8/2002 | Mancevski | |
| 7,288,912 B2 | 10/2007 | Landry et al. | 2002/0108209 A1 | 8/2002 | Peterson | |
| 7,318,248 B1 | 1/2008 | Yan | 2002/0112742 A1 | 8/2002 | Bredo et al. | |
| 7,320,149 B1 | 1/2008 | Huffman et al. | 2002/0113973 A1 | 8/2002 | Ge | |
| 7,321,807 B2 | 1/2008 | Laski | 2002/0116089 A1 | 8/2002 | Kirkpatrick | |
| 7,324,870 B2 | 1/2008 | Lee | 2002/0120364 A1 | 8/2002 | Colens | |
| 7,328,196 B2 | 2/2008 | Peters | 2002/0124343 A1 | 9/2002 | Reed | |
| 7,332,890 B2 | 2/2008 | Cohen et al. | 2002/0153185 A1 | 10/2002 | Song et al. | |
| 7,346,428 B1* | 3/2008 | Huffman et al. ............... 700/245 | 2002/0156556 A1 | 10/2002 | Ruffner | |
| 7,352,153 B2 | 4/2008 | Yan | 2002/0159051 A1 | 10/2002 | Guo | |
| 7,359,766 B2 | 4/2008 | Jeon et al. | 2002/0166193 A1 | 11/2002 | Kasper | |
| 7,360,277 B2 | 4/2008 | Moshenrose et al. | 2002/0169521 A1 | 11/2002 | Goodman et al. | |
| 7,363,108 B2 | 4/2008 | Noda et al. | 2002/0173877 A1 | 11/2002 | Zweig | |
| 7,388,343 B2 | 6/2008 | Jones et al. | 2002/0189871 A1 | 12/2002 | Won | |
| 7,388,879 B2 | 6/2008 | Sabe et al. | 2003/0009259 A1 | 1/2003 | Hattori et al. | |
| 7,389,156 B2 | 6/2008 | Zieglet et al. | 2003/0015232 A1 | 1/2003 | Nguyen | |
| 7,389,166 B2 | 6/2008 | Harwig et al. | 2003/0019071 A1 | 1/2003 | Field et al. | |
| 7,408,157 B2 | 8/2008 | Yan | 2003/0023356 A1 | 1/2003 | Keable | |
| 7,418,762 B2 | 9/2008 | Arai et al. | 2003/0024986 A1 | 2/2003 | Mazz et al. | |
| 7,430,455 B2 | 9/2008 | Casey et al. | 2003/0025472 A1 | 2/2003 | Jones et al. | |
| 7,430,462 B2 | 9/2008 | Chiu et al. | 2003/0028286 A1 | 2/2003 | Glenn et al. | |
| 7,441,298 B2 | 10/2008 | Svendsen et al. | 2003/0030399 A1 | 2/2003 | Jacobs | |
| 7,444,206 B2 | 10/2008 | Abramson et al. | 2003/0058262 A1 | 3/2003 | Sato et al. | |
| 7,448,113 B2 | 11/2008 | Jones et al. | 2003/0060928 A1 | 3/2003 | Abramson et al. | |
| 7,459,871 B2 | 12/2008 | Landry et al. | 2003/0067451 A1 | 4/2003 | Tagg et al. | |
| 7,467,026 B2 | 12/2008 | Sakagami et al. | 2003/0097875 A1 | 5/2003 | Lentz et al. | |
| 7,474,941 B2 | 1/2009 | Kim et al. | 2003/0108395 A1* | 6/2003 | Douglas et al. ................. 408/76 |
| 7,503,096 B2 | 3/2009 | Lin | 2003/0120389 A1 | 6/2003 | Abramson et al. | |
| 7,515,991 B2 | 4/2009 | Egawa et al. | 2003/0124312 A1 | 7/2003 | Autumn | |
| 7,539,557 B2 | 5/2009 | Yamauchi | 2003/0126352 A1 | 7/2003 | Barrett | |
| 7,555,363 B2 | 6/2009 | Augenbraun et al. | 2003/0137268 A1 | 7/2003 | Papanikolopoulos et al. | |
| 7,557,703 B2 | 7/2009 | Yamada et al. | 2003/0146384 A1 | 8/2003 | Logsdon et al. | |
| 7,568,259 B2 | 8/2009 | Yan | 2003/0159232 A1 | 8/2003 | Hekman et al. | |
| 7,571,511 B2 | 8/2009 | Jones et al. | 2003/0168081 A1 | 9/2003 | Lee et al. | |
| 7,578,020 B2 | 8/2009 | Jaworski et al. | 2003/0175138 A1 | 9/2003 | Beenker | |
| 7,600,521 B2 | 10/2009 | Woo | 2003/0192144 A1* | 10/2003 | Song et al. ..................... 15/346 |
| 7,603,744 B2 | 10/2009 | Reindle | 2003/0193657 A1 | 10/2003 | Uomori et al. | |

| | | | | | |
|---|---|---|---|---|---|
| 2003/0216834 A1 | 11/2003 | Allard | 2005/0154795 A1 | 7/2005 | Kuz et al. |
| 2003/0221114 A1 | 11/2003 | Hino et al. | 2005/0156562 A1 | 7/2005 | Cohen et al. |
| 2003/0229421 A1 | 12/2003 | Chmura et al. | 2005/0165508 A1 | 7/2005 | Kanda et al. |
| 2003/0229474 A1 | 12/2003 | Suzuki et al. | 2005/0166354 A1 | 8/2005 | Uehigashi |
| 2003/0233171 A1 | 12/2003 | Heiligensetzer | 2005/0166355 A1 | 8/2005 | Tani |
| 2003/0233177 A1 | 12/2003 | Johnson et al. | 2005/0172445 A1 | 8/2005 | Diehl et al. |
| 2003/0233870 A1 | 12/2003 | Mancevski | 2005/0183229 A1 | 8/2005 | Uehigashi |
| 2003/0233930 A1 | 12/2003 | Ozick | 2005/0183230 A1 | 8/2005 | Uehigashi |
| 2004/0016077 A1 | 1/2004 | Song et al. | 2005/0187678 A1 | 8/2005 | Myeong et al. |
| 2004/0020000 A1 | 2/2004 | Jones | 2005/0192707 A1 | 9/2005 | Park et al. |
| 2004/0030448 A1 | 2/2004 | Solomon | 2005/0204717 A1 | 9/2005 | Colens |
| 2004/0030449 A1 | 2/2004 | Solomon | 2005/0209736 A1 | 9/2005 | Kawagoe |
| 2004/0030450 A1 | 2/2004 | Solomon | 2005/0211880 A1 | 9/2005 | Schell et al. |
| 2004/0030451 A1 | 2/2004 | Solomon | 2005/0212929 A1 | 9/2005 | Schell et al. |
| 2004/0030570 A1 | 2/2004 | Solomon | 2005/0213082 A1 | 9/2005 | DiBernardo et al. |
| 2004/0030571 A1 | 2/2004 | Solomon | 2005/0213109 A1 | 9/2005 | Schell et al. |
| 2004/0031113 A1 | 2/2004 | Wosewick et al. | 2005/0217042 A1 | 10/2005 | Reindle |
| 2004/0049877 A1 | 3/2004 | Jones et al. | 2005/0218852 A1 | 10/2005 | Landry et al. |
| 2004/0049878 A1 | 3/2004 | Thomas et al. | 2005/0222933 A1 | 10/2005 | Wesby |
| 2004/0055163 A1 | 3/2004 | McCambridge et al. | 2005/0229340 A1 | 10/2005 | Sawalski et al. |
| 2004/0068351 A1 | 4/2004 | Solomon | 2005/0229355 A1 | 10/2005 | Crouch et al. |
| 2004/0068415 A1 | 4/2004 | Solomon | 2005/0235451 A1 | 10/2005 | Yan |
| 2004/0068416 A1 | 4/2004 | Solomon | 2005/0251292 A1 | 11/2005 | Casey et al. |
| 2004/0074038 A1 | 4/2004 | Im et al. | 2005/0255425 A1 | 11/2005 | Pierson |
| 2004/0074044 A1 | 4/2004 | Diehl et al. | 2005/0258154 A1 | 11/2005 | Blankenship et al. |
| 2004/0076324 A1 | 4/2004 | Burl et al. | 2005/0273967 A1 | 12/2005 | Taylor et al. |
| 2004/0083570 A1 | 5/2004 | Song et al. | 2005/0288819 A1 | 12/2005 | de |
| 2004/0085037 A1 | 5/2004 | Jones et al. | 2006/0000050 A1 | 1/2006 | Cipolla et al. |
| 2004/0088079 A1 | 5/2004 | Lavarec et al. | 2006/0009879 A1 | 1/2006 | Lynch et al. |
| 2004/0093122 A1 | 5/2004 | Galibraith | 2006/0010638 A1 | 1/2006 | Shimizu et al. |
| 2004/0098167 A1 | 5/2004 | Yi et al. | 2006/0020369 A1 | 1/2006 | Taylor et al. |
| 2004/0111184 A1 | 6/2004 | Chiappetta et al. | 2006/0020370 A1 | 1/2006 | Abramson |
| 2004/0111821 A1 | 6/2004 | Lenkiewicz et al. | 2006/0021168 A1 | 2/2006 | Nishikawa |
| 2004/0113777 A1 | 6/2004 | Matsuhira et al. | 2006/0025134 A1 | 2/2006 | Cho et al. |
| 2004/0117064 A1 | 6/2004 | McDonald | 2006/0037170 A1 | 2/2006 | Shimizu |
| 2004/0117846 A1 | 6/2004 | Karaoguz et al. | 2006/0042042 A1 | 3/2006 | Mertes et al. |
| 2004/0118998 A1 | 6/2004 | Wingett et al. | 2006/0044546 A1 | 3/2006 | Lewin et al. |
| 2004/0128028 A1 | 7/2004 | Miyamoto et al. | 2006/0060216 A1 | 3/2006 | Woo |
| 2004/0133316 A1 | 7/2004 | Dean | 2006/0061657 A1 | 3/2006 | Rew et al. |
| 2004/0134336 A1 | 7/2004 | Solomon | 2006/0064828 A1 | 3/2006 | Stein et al. |
| 2004/0134337 A1 | 7/2004 | Solomon | 2006/0087273 A1 | 4/2006 | Ko et al. |
| 2004/0143919 A1 | 7/2004 | Wilder | 2006/0089765 A1 | 4/2006 | Pack et al. |
| 2004/0148419 A1 | 7/2004 | Chen et al. | 2006/0100741 A1 | 5/2006 | Jung |
| 2004/0148731 A1 | 8/2004 | Damman et al. | 2006/0107894 A1 | 5/2006 | Buckley et al. |
| 2004/0153212 A1 | 8/2004 | Profio et al. | 2006/0119839 A1 | 6/2006 | Bertin et al. |
| 2004/0156541 A1 | 8/2004 | Jeon et al. | 2006/0143295 A1 | 6/2006 | Costa et al. |
| 2004/0158357 A1 | 8/2004 | Lee et al. | 2006/0146776 A1 | 7/2006 | Kim |
| 2004/0181706 A1 | 9/2004 | Chen et al. | 2006/0150361 A1 | 7/2006 | Aldred et al. |
| 2004/0187249 A1 | 9/2004 | Jones et al. | 2006/0184293 A1 | 8/2006 | Konandreas et al. |
| 2004/0187457 A1 | 9/2004 | Colens | 2006/0185690 A1 | 8/2006 | Song et al. |
| 2004/0196451 A1 | 10/2004 | Aoyama | 2006/0190133 A1 | 8/2006 | Konandreas et al. |
| 2004/0200505 A1 | 10/2004 | Taylor et al. | 2006/0190146 A1 * | 8/2006 | Morse et al. .................... 701/23 |
| 2004/0204792 A1 | 10/2004 | Taylor et al. | 2006/0196003 A1 | 9/2006 | Song et al. |
| 2004/0207355 A1 | 10/2004 | Jones et al. | 2006/0200281 A1 | 9/2006 | Ziegler et al. |
| 2004/0210345 A1 | 10/2004 | Noda et al. | 2006/0220900 A1 | 10/2006 | Ceskutti et al. |
| 2004/0210347 A1 | 10/2004 | Sawada et al. | 2006/0259194 A1 | 11/2006 | Chiu |
| 2004/0211444 A1 | 10/2004 | Taylor et al. | 2006/0278161 A1 | 12/2006 | Burkholder et al. |
| 2004/0221790 A1 | 11/2004 | Sinclair et al. | 2006/0288519 A1 | 12/2006 | Jaworski et al. |
| 2004/0236468 A1 | 11/2004 | Taylor et al. | 2006/0293787 A1 | 12/2006 | Kanda et al. |
| 2004/0244138 A1 | 12/2004 | Taylor et al. | 2007/0006404 A1 | 1/2007 | Cheng et al. |
| 2004/0255425 A1 | 12/2004 | Arai et al. | 2007/0016328 A1 | 1/2007 | Ziegler et al. |
| 2005/0000543 A1 | 1/2005 | Taylor et al. | 2007/0017061 A1 | 1/2007 | Yan |
| 2005/0010330 A1 | 1/2005 | Abramson et al. | 2007/0028574 A1 | 2/2007 | Yan |
| 2005/0010331 A1 | 1/2005 | Taylor et al. | 2007/0032904 A1 | 2/2007 | Kawagoe |
| 2005/0015915 A1 | 1/2005 | Thomas et al. | 2007/0042716 A1 | 2/2007 | Goodall et al. |
| 2005/0021181 A1 | 1/2005 | Kim et al. | 2007/0043459 A1 | 2/2007 | Abbott et al. |
| 2005/0028316 A1 | 2/2005 | Thomas et al. | 2007/0061041 A1 | 3/2007 | Zweig |
| 2005/0029029 A1 * | 2/2005 | Thorne ..................... 180/167 | 2007/0114975 A1 | 5/2007 | Cohen et al. |
| 2005/0053912 A1 | 3/2005 | Roth et al. | 2007/0142964 A1 | 6/2007 | Abramson |
| 2005/0055796 A1 | 3/2005 | Wright et al. | 2007/0150096 A1 | 6/2007 | Yeh et al. |
| 2005/0067994 A1 | 3/2005 | Jones et al. | 2007/0156286 A1 | 7/2007 | Yamauchi |
| 2005/0081782 A1 | 4/2005 | Buckley et al. | 2007/0157415 A1 | 7/2007 | Lee et al. |
| 2005/0085947 A1 | 4/2005 | Aldred et al. | 2007/0157420 A1 | 7/2007 | Lee et al. |
| 2005/0091782 A1 | 5/2005 | Gordon et al. | 2007/0179670 A1 | 8/2007 | Chiappetta et al. |
| 2005/0091786 A1 | 5/2005 | Wright et al. | 2007/0226949 A1 | 10/2007 | Hahm et al. |
| 2005/0137749 A1 | 6/2005 | Jeon et al. | 2007/0234492 A1 | 10/2007 | Svendsen et al. |
| 2005/0144751 A1 | 7/2005 | Kegg et al. | 2007/0244610 A1 | 10/2007 | Ozick et al. |
| 2005/0150074 A1 | 7/2005 | Diehl et al. | 2007/0250212 A1 | 10/2007 | Halloran et al. |
| 2005/0150519 A1 | 7/2005 | Keppler et al. | 2007/0261193 A1 | 11/2007 | Gordon et al. |

| | | | | | | |
|---|---|---|---|---|---|---|
| 2007/0266508 | A1 | 11/2007 | Jones et al. | GB | 2225221 A | 5/1990 |
| 2008/0007203 | A1 | 1/2008 | Cohen et al. | GB | 2267360 | 12/1993 |
| 2008/0039974 | A1 | 2/2008 | Sandin et al. | GB | 2 283 838 | 5/1995 |
| 2008/0052846 | A1 | 3/2008 | Kapoor et al. | GB | 2284957 A | 6/1995 |
| 2008/0091304 | A1 | 4/2008 | Ozick et al. | GB | 2300082 A | 10/1996 |
| 2008/0109126 | A1 | 5/2008 | Sandin et al. | GB | 2 344 747 | 6/2000 |
| 2008/0134458 | A1 | 6/2008 | Ziegler et al. | GB | 2404330 A | 2/2005 |
| 2008/0140255 | A1 | 6/2008 | Ziegler et al. | GB | 2417354 A | 2/2006 |
| 2008/0155768 | A1 | 7/2008 | Ziegler et al. | JP | 53021869 | 2/1978 |
| 2008/0184518 | A1 | 8/2008 | Taylor | JP | 53110257 A2 | 9/1978 |
| 2008/0276407 | A1 | 11/2008 | Schnittman et al. | JP | 57014726 A2 | 1/1982 |
| 2008/0281470 | A1 | 11/2008 | Gilbert et al. | JP | 57064217 | 4/1982 |
| 2008/0282494 | A1 | 11/2008 | Won et al. | JP | 59005315 | 2/1984 |
| 2008/0294288 | A1 | 11/2008 | Yamauchi | JP | 59033511 A2 | 2/1984 |
| 2008/0302586 | A1 | 12/2008 | Yan | JP | 59094005 | 5/1984 |
| 2008/0307590 | A1 | 12/2008 | Jones et al. | JP | 59099308 | 6/1984 |
| 2009/0007366 | A1 | 1/2009 | Svendsen et al. | JP | 59112311 | 6/1984 |
| 2009/0038089 | A1 | 2/2009 | Landry et al. | JP | 59120124 | 7/1984 |
| 2009/0049640 | A1 | 2/2009 | Lee et al. | JP | 59131668 | 9/1984 |
| 2009/0055022 | A1 | 2/2009 | Casey et al. | JP | 59164973 | 9/1984 |
| 2009/0102296 | A1 | 4/2009 | Greene et al. | JP | 59184917 A | 10/1984 |
| 2009/0292393 | A1 | 11/2009 | Casey et al. | JP | 2283343 A2 | 11/1984 |
| 2010/0006028 | A1 | 1/2010 | Buckley et al. | JP | 59212924 | 12/1984 |
| 2010/0011529 | A1 | 1/2010 | Won et al. | JP | 59226909 | 12/1984 |
| 2010/0049365 | A1 | 2/2010 | Jones et al. | JP | 60049213 | 5/1985 |
| 2010/0063628 | A1 | 3/2010 | Landry et al. | JP | 60211510 A | 10/1985 |
| 2010/0107355 | A1 | 5/2010 | Won et al. | JP | 60259895 | 12/1985 |
| 2010/0257690 | A1 | 10/2010 | Jones et al. | JP | 61023221 A2 | 1/1986 |
| 2010/0257691 | A1 | 10/2010 | Jones et al. | JP | 61097712 A | 5/1986 |
| 2010/0263158 | A1 | 10/2010 | Jones et al. | JP | 61-160366 | 7/1986 |
| 2010/0268384 | A1 | 10/2010 | Jones et al. | JP | 62070709 | 4/1987 |
| 2010/0312429 | A1 | 12/2010 | Jones et al. | JP | 62074018 A | 4/1987 |
| | | | | JP | 62-120510 | 6/1987 |
| | | | | JP | 62-154008 | 7/1987 |
| | FOREIGN PATENT DOCUMENTS | | | JP | 62164431 | 7/1987 |
| | | | | JP | 62263507 A | 11/1987 |
| AU | 2003275566 A1 | | 6/2004 | JP | 62263508 A | 11/1987 |
| DE | 2128842 C3 | | 12/1980 | JP | 62189057 U | 12/1987 |
| DE | 3317376 C2 | | 12/1987 | JP | 63079623 A | 4/1988 |
| DE | 3536907 C2 | | 2/1989 | JP | 63-183032 | 7/1988 |
| DE | 3404202 C2 | | 12/1992 | JP | 63158032 | 7/1988 |
| DE | 199311014 U1 | | 10/1993 | JP | 63-203483 | 8/1988 |
| DE | 4338841 A1 | | 5/1995 | JP | 63-241610 | 10/1988 |
| DE | 19849978 | | 2/2001 | JP | 1-118752 | 8/1989 |
| DE | 10242257 A1 | | 4/2003 | JP | 2-6312 | 1/1990 |
| DE | 102004038074 | | 6/2005 | JP | 2006312 U1 | 1/1990 |
| DE | 10357636 A1 | | 7/2005 | JP | 03 051023 | 3/1991 |
| DE | 102004041021 B3 | | 8/2005 | JP | 3051023 A2 | 3/1991 |
| DE | 102005046813 A1 | | 4/2007 | JP | 4019586 | 1/1992 |
| DK | 338988 A | | 12/1988 | JP | 04074285 | 3/1992 |
| EP | 0265542 A1 | | 5/1988 | JP | 4084921 A | 3/1992 |
| EP | 0281085 A2 | | 9/1988 | JP | 5023269 A | 2/1993 |
| EP | 0286328 | | 10/1988 | JP | 5042076 A | 2/1993 |
| EP | 0294101 A2 | | 12/1988 | JP | 5046246 | 2/1993 |
| EP | 0352045 | | 1/1990 | JP | 5091604 A2 | 4/1993 |
| EP | 0389459 | | 9/1990 | JP | 5150827 A | 6/1993 |
| EP | 0433697 A2 | | 6/1991 | JP | 5150829 | 6/1993 |
| EP | 0437024 A1 | | 7/1991 | JP | 05257527 A | 10/1993 |
| EP | 0554978 A2 | | 8/1993 | JP | 5257533 | 10/1993 |
| EP | 0 615 719 | | 9/1994 | JP | 05285861 A | 11/1993 |
| EP | 0 792 726 | | 9/1997 | JP | 05046239 Y2 | 12/1993 |
| EP | 0930040 A2 | | 7/1999 | JP | 6-3251 | 1/1994 |
| EP | 0845237 B1 | | 4/2000 | JP | 06-038912 | 2/1994 |
| EP | 0861629 B1 | | 9/2001 | JP | 6293095 A | 10/1994 |
| EP | 1228734 A2 | | 8/2002 | JP | 06-327598 | 11/1994 |
| EP | 1 331 537 | | 7/2003 | JP | 6105781 B | 12/1994 |
| EP | 1 380 245 | | 1/2004 | JP | 7059702 A2 | 3/1995 |
| EP | 1380245 A1 | | 1/2004 | JP | 07-129239 | 5/1995 |
| EP | 1380246 A2 | | 1/2004 | JP | 7222705 A2 | 8/1995 |
| EP | 1018315 B1 | | 11/2004 | JP | 7-281752 | 10/1995 |
| EP | 1 557 730 | | 7/2005 | JP | 7270518 A | 10/1995 |
| EP | 1553472 A1 | | 7/2005 | JP | 7281742 A2 | 10/1995 |
| EP | 1557730 A1 | | 7/2005 | JP | 7-295636 | 11/1995 |
| EP | 1642522 A2 | | 4/2006 | JP | 7311041 A2 | 11/1995 |
| ES | 2238196 A | | 8/2005 | JP | 7313417 A | 12/1995 |
| FR | 722 755 | | 3/1932 | JP | 7319542 A2 | 12/1995 |
| FR | 2601443 A1 | | 1/1988 | JP | 8-16776 | 1/1996 |
| FR | 2 828 589 | | 8/2001 | JP | 8000393 B2 | 1/1996 |
| GB | 702426 | | 1/1954 | JP | 8016241 A2 | 1/1996 |
| GB | 2213047 A | | 8/1989 | | | |

| | | | | | | |
|---|---|---|---|---|---|---|
| JP | 8016776 B2 | 2/1996 | | JP | 2001121455 | 5/2001 |
| JP | 8063229 A2 | 3/1996 | | JP | 3197758 B2 | 8/2001 |
| JP | 8083125 A2 | 3/1996 | | JP | 3201903 B2 | 8/2001 |
| JP | 08-089451 | 4/1996 | | JP | 2001216482 A | 8/2001 |
| JP | 8089449 A | 4/1996 | | JP | 2001-258807 | 9/2001 |
| JP | 2520732 B2 | 5/1996 | | JP | 2001265437 | 9/2001 |
| JP | 8123548 A | 5/1996 | | JP | 2001-275908 | 10/2001 |
| JP | 08-152916 | 6/1996 | | JP | 2001289939 | 10/2001 |
| JP | 8152916 A2 | 6/1996 | | JP | 2001306170 A | 11/2001 |
| JP | 2555263 | 8/1996 | | JP | 2001-525567 | 12/2001 |
| JP | 8256960 A2 | 10/1996 | | JP | 2002-78650 | 3/2002 |
| JP | 8263137 A | 10/1996 | | JP | 2002-204768 | 7/2002 |
| JP | 8286741 A2 | 11/1996 | | JP | 2002204769 A | 7/2002 |
| JP | 8286744 A2 | 11/1996 | | JP | 2002247510 | 8/2002 |
| JP | 8322774 A2 | 12/1996 | | JP | 2002-532178 | 10/2002 |
| JP | 8335112 A | 12/1996 | | JP | 3356170 | 10/2002 |
| JP | 9-43901 | 2/1997 | | JP | 2002-323925 | 11/2002 |
| JP | 9044240 A | 2/1997 | | JP | 3375843 | 11/2002 |
| JP | 9066855 A | 3/1997 | | JP | 2002333920 | 11/2002 |
| JP | 9145309 A | 6/1997 | | JP | 2002-355206 | 12/2002 |
| JP | 9160644 A2 | 6/1997 | | JP | 2002-360471 | 12/2002 |
| JP | 8-393 | 7/1997 | | JP | 2002-360482 | 12/2002 |
| JP | 9-179625 | 7/1997 | | JP | 2002-369778 | 12/2002 |
| JP | 9179625 A2 | 7/1997 | | JP | 2002366227 | 12/2002 |
| JP | 9179685 A2 | 7/1997 | | JP | 2002369778 A2 | 12/2002 |
| JP | 09185410 | 7/1997 | | JP | 2003-005296 | 1/2003 |
| JP | 9192069 A2 | 7/1997 | | JP | 2003-10076 | 1/2003 |
| JP | 9204223 A2 | 8/1997 | | JP | 2003010076 | 1/2003 |
| JP | 9206258 A2 | 8/1997 | | JP | 2003010088 | 1/2003 |
| JP | 09233712 A | 9/1997 | | JP | 2003015740 | 1/2003 |
| JP | 09251318 | 9/1997 | | JP | 2003028528 A | 1/2003 |
| JP | 9265319 A | 10/1997 | | JP | 2003-5296 | 2/2003 |
| JP | 9269807 A | 10/1997 | | JP | 2003-036116 | 2/2003 |
| JP | 9269807 A | 10/1997 | | JP | 2003-38401 | 2/2003 |
| JP | 9269810 A | 10/1997 | | JP | 2003-38402 | 2/2003 |
| JP | 9269810 A | 10/1997 | | JP | 2003-052596 | 2/2003 |
| JP | 9319431 A | 12/1997 | | JP | 2003-505127 | 2/2003 |
| JP | 9319431 A2 | 12/1997 | | JP | 2003047579 | 2/2003 |
| JP | 9319432 A | 12/1997 | | JP | 2003-061882 | 3/2003 |
| JP | 9319434 A | 12/1997 | | JP | 2003061882 | 3/2003 |
| JP | 9325812 A | 12/1997 | | JP | 2003084994 | 3/2003 |
| JP | 10055215 A | 2/1998 | | JP | 2003167628 | 6/2003 |
| JP | 10117973 A | 5/1998 | | JP | 2003180586 | 7/2003 |
| JP | 10117973 A2 | 5/1998 | | JP | 2003180587 A | 7/2003 |
| JP | 10118963 A | 5/1998 | | JP | 2003186539 A | 7/2003 |
| JP | 10214114 A2 | 8/1998 | | JP | 2003190064 A2 | 7/2003 |
| JP | 10228316 | 8/1998 | | JP | 2003241836 A | 8/2003 |
| JP | 10240342 A2 | 9/1998 | | JP | 2003262520 | 9/2003 |
| JP | 10260727 A2 | 9/1998 | | JP | 2003285288 | 10/2003 |
| JP | 10295595 A | 11/1998 | | JP | 2003304992 | 10/2003 |
| JP | 10-314088 | 12/1998 | | JP | 2003304992 A | 10/2003 |
| JP | 11015941 A | 1/1999 | | JP | 2003-310489 | 11/2003 |
| JP | 11065655 A2 | 3/1999 | | JP | 2003310509 | 11/2003 |
| JP | 11085269 A2 | 3/1999 | | JP | 2003330543 A | 11/2003 |
| JP | 11102219 A2 | 4/1999 | | JP | 2004123040 | 4/2004 |
| JP | 11102220 A | 4/1999 | | JP | 2004148021 | 5/2004 |
| JP | 1178765 A | 7/1999 | | JP | 2004160102 | 6/2004 |
| JP | 5054620 A2 | 7/1999 | | JP | 2004166968 A | 6/2004 |
| JP | 11174145 A | 7/1999 | | JP | 2004174228 | 6/2004 |
| JP | 11175149 A | 7/1999 | | JP | 2004198330 A | 7/2004 |
| JP | 11178764 A | 7/1999 | | JP | 2005-040578 | 2/2005 |
| JP | 11-508810 | 8/1999 | | JP | 2005352707 | 2/2005 |
| JP | 11212642 A2 | 8/1999 | | JP | 2005118354 A | 5/2005 |
| JP | 11213157 A | 8/1999 | | JP | 2005135400 | 5/2005 |
| JP | 11-510935 | 9/1999 | | JP | 2005211360 A | 8/2005 |
| JP | 11282532 A | 10/1999 | | JP | 2005224265 A | 8/2005 |
| JP | 11282533 A | 10/1999 | | JP | 2005230032 A | 9/2005 |
| JP | 11295412 A | 10/1999 | | JP | 2005245916 | 9/2005 |
| JP | 11346964 A2 | 12/1999 | | JP | 2005346700 A2 | 12/2005 |
| JP | 2000047728 | 2/2000 | | JP | 2006043071 | 2/2006 |
| JP | 2000056006 | 2/2000 | | JP | 2006155274 | 6/2006 |
| JP | 2000056831 | 2/2000 | | JP | 2006164223 A | 6/2006 |
| JP | 2000066722 | 3/2000 | | JP | 2006227673 A | 8/2006 |
| JP | 2000075925 | 3/2000 | | JP | 2006247467 | 9/2006 |
| JP | 10240343 A2 | 5/2000 | | JP | 2006260161 | 9/2006 |
| JP | 11-162454 | 12/2000 | | JP | 2006293662 | 10/2006 |
| JP | 2000353014 A2 | 12/2000 | | JP | 2006296697 | 11/2006 |
| JP | 200122443 | 1/2001 | | JP | 2007034866 | 2/2007 |
| JP | 2001087182 | 4/2001 | | JP | 2007213180 | 8/2007 |

| | | |
|---|---|---|
| JP | 2009015611 | 1/2009 |
| JP | 2010198552 | 9/2010 |
| WO | WO 95/26512 | 10/1995 |
| WO | WO 95/30887 | 11/1995 |
| WO | 9617258 A3 | 2/1997 |
| WO | WO 97/15224 | 5/1997 |
| WO | WO 97/40734 | 11/1997 |
| WO | WO 97/41451 | 11/1997 |
| WO | WO 98/53456 | 11/1998 |
| WO | 9905580 A2 | 2/1999 |
| WO | WO 99/16078 | 4/1999 |
| WO | WO 99/28800 | 6/1999 |
| WO | WO 99/38056 | 7/1999 |
| WO | WO 99/38237 | 7/1999 |
| WO | WO 99/43250 | 9/1999 |
| WO | WO 99/59042 | 11/1999 |
| WO | WO 00/04430 | 1/2000 |
| WO | 0038028 A1 | 6/2000 |
| WO | WO 00/36962 | 6/2000 |
| WO | WO 00/38026 | 6/2000 |
| WO | WO 00/38029 | 6/2000 |
| WO | WO0038028 A1 | 6/2000 |
| WO | WO 00/78410 | 12/2000 |
| WO | WO 01/06904 | 2/2001 |
| WO | WO01/06905 | 2/2001 |
| WO | WO 01/91623 | 6/2001 |
| WO | 0180703 A1 | 11/2001 |
| WO | WO 02/39864 | 5/2002 |
| WO | WO 02/39868 | 5/2002 |
| WO | WO 02/058527 | 8/2002 |
| WO | WO02/062194 | 8/2002 |
| WO | 02067752 A1 | 9/2002 |
| WO | 02069775 A2 | 9/2002 |
| WO | 02075350 A1 | 9/2002 |
| WO | WO 02/067744 | 9/2002 |
| WO | WO 02/067745 | 9/2002 |
| WO | WO02/071175 | 9/2002 |
| WO | WO 02/074150 | 9/2002 |
| WO | WO 02/075356 | 9/2002 |
| WO | WO 02/075469 | 9/2002 |
| WO | WO 02/075470 | 9/2002 |
| WO | WO02069775 A2 | 9/2002 |
| WO | WO02071175 | 9/2002 |
| WO | 02081074 A1 | 10/2002 |
| WO | WO 02/101477 | 12/2002 |
| WO | 03015220 A1 | 2/2003 |
| WO | 03024292 A2 | 3/2003 |
| WO | WO 03/026474 | 4/2003 |
| WO | WO 03/040546 | 5/2003 |
| WO | WO 03/040845 | 5/2003 |
| WO | WO 03/040846 | 5/2003 |
| WO | 03062850 A2 | 7/2003 |
| WO | 03062852 A1 | 7/2003 |
| WO | WO2004/004533 | 1/2004 |
| WO | WO2004/006034 | 1/2004 |
| WO | WO 2004/006034 | 1/2004 |
| WO | WO2004/004533 | 4/2004 |
| WO | WO2004043215 A1 | 5/2004 |
| WO | WO2004/058028 | 7/2004 |
| WO | WO2004/059409 | 7/2004 |
| WO | WO2004058028 | 7/2004 |
| WO | WO2004058028 A2 | 7/2004 |
| WO | WO2004059409 A1 | 7/2004 |
| WO | 2004219185 | 8/2004 |
| WO | 2005006935 A1 | 1/2005 |
| WO | WO2005006935 A1 | 1/2005 |
| WO | WO2005036292 A1 | 4/2005 |
| WO | WO2005/055795 | 6/2005 |
| WO | WO 2005/055795 | 6/2005 |
| WO | WO2005055795 A1 | 6/2005 |
| WO | WO2005055796 | 6/2005 |
| WO | 2005076545 A1 | 8/2005 |
| WO | 2005077243 A1 | 8/2005 |
| WO | WO2005/077244 | 8/2005 |
| WO | 2005081074 A1 | 9/2005 |
| WO | WO2005082223 A1 | 9/2005 |
| WO | WO2005083541 A1 | 9/2005 |
| WO | 2005098475 A1 | 10/2005 |
| WO | 2005098476 A1 | 10/2005 |
| WO | 2006046400 A1 | 5/2006 |
| WO | WO2006/061133 | 6/2006 |
| WO | WO2006/068403 | 6/2006 |
| WO | WO2006061133 A1 | 6/2006 |
| WO | WO2006068403 A1 | 6/2006 |
| WO | 2006073248 A1 | 7/2006 |
| WO | WO2006073248 A1 | 7/2006 |
| WO | 2007036490 A2 | 4/2007 |
| WO | WO2007036490 A2 | 4/2007 |
| WO | 2007065033 A2 | 6/2007 |
| WO | 2007137234 A2 | 11/2007 |

OTHER PUBLICATIONS

Examination report for European Patent Application No. 09175479.6 dated Dec. 30, 2009.
Examination report for Japanese Patent Application No. 2006-551023 dated Dec. 8, 2009.
Examination report for U.S. Appl. No. 11/207,574 dated Jul. 30, 2007.
Examination report for U.S. Appl. No. 11/207,574 dated Jun. 23, 2008.
Examination report for U.S. Appl. No. 11/207,574 dated Oct. 17, 2008.
Examination report for U.S. Appl. No. 11/207,575 dated Jul. 30, 2007.
Examination report for U.S. Appl. No. 11/207,575 dated May 18, 2009.
Examination report for U.S. Appl. No. 11/207,575 dated Jul. 30, 2008.
Examination report for U.S. Appl. No. 11/207,575 dated Mar. 18, 2008.
Examination report for U.S. Appl. No. 11/207,575 dated Sep. 3, 2009.
Examination report for U.S. Appl. No. 11/207,620 dated Oct. 12, 2007.
Examination report for U.S. Appl. No. 11/835,355 dated Dec. 2, 2008.
Examination report for U.S. Appl. No. 11/835,355 dated Sep. 14, 2009.
Examination report for U.S. Appl. No. 11/835,360 dated Jun. 24, 2009.
Examination report for U.S. Appl. No. 11/835,361 dated Feb. 6, 2009.
Examination report for U.S. Appl. No. 11/835,361 dated Oct. 26, 2009.
Luo et al., "Real-time Area-Covering Operations with Obstacle Avoidance for Cleaning Robots," 2002, IEeE, p. 2359-2364.
Tribelhorn et al., "Evaluating the Roomba: A low-cost, ubiquitous platform for robotics research and education," 2007, IEEE, p. 1393-1399.
Examination report for U.S. Appl. No. 11/835,355 dated Jun. 9, 2010.
Examination report for U.S. Appl. No. 11/207,575 dated Mar. 4, 2010.
Examination report for U.S. Appl. No. 11/835,363 dated Jun. 16, 2009.
Examination report for U.S. Appl. No. 11/835,363 dated Aug. 28, 2008.
Examination report for U.S. Appl. No. 11/835,359 dated Oct. 14, 2010.
Sadath M Malik et al. "Virtual Prototyping for Conceptual Design of a Tracked Mobile Robot". Electrical and Computer Engineering, Canadian Conference on, IEEE, PI. May 1, 2006, pp. 2349-2352.
International Search Report and Written Opinion of the International Searching Authority in connection with International Application No. PCT/US2007/080138 dated Jun. 25, 2009. 68 pages.
Denning Roboscrub image (1989).
Florbot GE Plastics Imaqe (1989-1990).
Robotics World Jan. 2001: "A Clean Sweep" (Jan. 2001).
Examination Report for European Patent Application No. 06721029.4 dated Jan. 11, 2008.
International Search Report for International Application No. PCT/US2006/006550, mailed from the International Search Authority on Sep. 18, 2006, 12 pgs.

Search report dated Apr. 11, 2011 for corresponding EP application 10183099.
Search report dated Apr. 11, 2011 for corresponding EP application 10183086.
Search report dated Apr. 13, 2011 for corresponding EP application 10183153.
Prassler et al., "A Short History of Cleaning Robots", Autonomous Robots 9, 211-226, 2000.
Doty, Keith L et al, "Sweep Strategies for a Sensory-Driven, Behavior-Based Vacuum Cleaning Agent" AAAI 1993 Fall Symposium Series Instantiating Real-World Agents Research Triangle Park, Raleigh, NC, Oct 22-24, 1993, pp. 1-6.
eVac Robotic Vacuum S1727 Instruction Manual, Sharper Image Corp, Copyright 2004, 16 pgs.
Facts on the Trilobite webpage: "http://trilobiteelectroluxse/presskit_en/nodel1335asp?print=yes&pressID=" accessed Dec. 12, 2003 (2 pages).
Gat, Erann, Robust Low-computation Sensor-driven Control for Task-Directed Navigation, Proceedings of the 1991 IEEE, International Conference on Robotics and Automation, Sacramento, California, Apr. 1991, pp. 2484-2489.
Kärcher Product Manual Download webpage: "http://wwwkarchercom/bta/downloadenshtml?ACTION=SELECTTEILENR&ID=rc3000&submitButtonName=Select+Product+Manual" and associated pdf file "5959-915enpdf (47 MB) English/English" accessed Jan. 21, 2004 (16 pages).
Karcher RC 3000 Cleaning Robot—user manual Manufacturer: Alfred-Karcher GmbH & Co, Cleaning Systems, Alfred Karcher-Str 28-40, PO Box 160, D-71349 Winnenden, Germany, Dec. 2002.
Kärcher RoboCleaner RC 3000 Product Details webpages: "http://wwwrobocleanerde/english/screen3html" through "... screen6html" accessed Dec. 12, 2003 (4 pages).
Koolvac Robotic Vacuum Cleaner Owner's Manual, Koolatron, Undated, 26 pgs.
Schofield, Monica, "Neither Master nor Slave" A Practical Study in the Development and Employment of Cleaning Robots, Emerging Technologies and Factory Automation, 1999 Proceedings EFA'99 1999 7th IEEE International Conference on Barcelona, Spain Oct. 18-21, 1999, pp. 1427-1434.
NorthStar Low-Cost, Indoor Localization, Evolution robotics, Powering Intelligent Products, 2 pgs.
Put Your Roomba . . . On "Automatic" webpages: "http://www.acomputeredge.com/roomba," accessed Apr. 20, 2005, 5 pgs.
Put Your Roomba . . . On "Automatic" Roomba Timer> Timed Cleaning-Floorvac Robotic Vacuum webpages: http://cgi.ebay.com/ws/eBavISAPI.dll?ViewItem&category=43575198387&rd=t, accessed Apr. 20, 2005, 5 pgs.
Friendly Robotics Robotic Vacuum RV400—The Robot Store website: http://www.therobotstore.com/s.nl/sc.9/category,-109/it.A/id.43/.f, accessed Apr. 20, 2005, 5 pgs.
Zoombot Remote Controlled Vaccum-RV-500 New Roomba 2, website: http://cgi.ebay.com/ws/eBayISAPI.dll?ViewItem&category=43526&item=4373497618&rd=1, accessed Apr. 20, 2005, 7 pgs.
Everday Robots, website: http://www.everydayrobots.com/index.php?option=content&task=view&id=9, accessed Apr. 20, 2005, 7 pgs.
Robot Review Samsung Robot Vacuum (VC-RP30W), website: http://www.onrobo.com/reviews/At_Home/Vacuum_Cleaners/on00vcro30rosam/index.htm, accessed Mar. 18, 2005, 11 pgs.
Robotic Vacuum Cleaner—Blue, website: http://www.sharperimage.com/us/en/catalog/productview.jhtml?sku=S1727BLU, accessed Mar. 18, 2005, 3 pgs.
Hitachi: News release: The home cleaning robot of the autonomous movement type (experimental machine) is developed, website: http://www.i4u.com/japanreleases/hitachirobot.htm., accessed Mar. 18, 2005, 5 pgs.
Karcher USA, RC3000 Robotic Cleaner, website: http://www.karcher-usa.com/showproducts.php?op=view_prod&param1=143&param2=&param3=, accessed Mar. 18, 2005, 6 pgs.
Electrolux designed for the well-lived home, website: http://www.electroluxusa.com/node57.as[?currentURL=node142.asp%3F, acessed Mar. 18, 2005, 5 pgs.

RoboMaid Sweeps Your Floors So You Won't Have To, the Official Site, website: http://www.thereobomaid.com/, acessed Mar. 18, 2005, 2 pgs.
Wired News: Robot Vacs Are in the House, website: http://www.wired.com/news/print/0,1294,59237,00.html, accessed Mar. 18, 2005, 6 pgs.
Invitation to Pay Additional Fees and Partial International Search Report for International Application No. PCT/US2006/006550, mailed from the International Search Authority on Jun. 19, 2006, 7 pgs.
U.S. Appl. No. 60/605,066, filed Aug. 27, 2004, Taylor.
U.S. Appl. No. 60/605,181, filed Aug. 27, 2004, Taylor.
Euroflex Intellegente Monstre Mauele (English only except).
Roboking—not just a vacuum cleaner, a robot!.
Robovacc1999.
SVET Computers—New Technologies—Robot vacuum claeaner.
http://www.popco.net/zboard/view.php?id=tr_review&no=40.
http://www.rakuten.co.jp/matsucame/587179/711512/.
http://www.gizmag.com/go/1282/.
http://www.electrolux-ui.com:8080/2002%5C822%5C833102EN.pdf.
http://www.robocon.co.kr/trilobite/Presentation_Trilobite_Kor_030104.ppt.
http://www.frc.cmu.edu/~hpm/talks/Extras/trilobite.desc.html.
http://www.euroflex.tv/novita_dett.php?id=15.
http://www.consensus.com.au/SoftwareAwards/CSAarchive/CSA2004/CSAart04/FloorBot/FX1%20Product%20Description%2020%20January%202004.pdf.
http://www.robotsandrelax.com/PDFs/RV400Manual.pdf.
www.hitachi.co.jp/rd/pdf/topics/hitac2003_10.pdf.
http://www.hitachi.co.jp/New/cnews/hl_030529_hl_030529.pdf.
http://robotbg.com/news/2003/04/22/lg_announces_the_first_robotic_vacuum_cleaner_of_korea.
www.metapo.com/support/user_manual.pdf.
http://us.aving.net/news/view.php?articleId=23031.
http://www.taipeitimes.com/News/worldbiz/archives/2002/03/26/0000129338.
http://techon.nikkeibp.co.jp/members/01db/200203/1006501/.
http://ascii.jp/elem/000/000/830/330024/.
http://www.itmedia.co.jp/news/0111/16/robofesta_m.html.
http://us.aving.net/news/view.php?articleId=7257.
http://www.toshiba.co.jp/tech/review/2004/09/59_09pdf/a13.pdf.
http://warp.ndl.go.jp/info:ndlip/pid/258151/www.soumu.go.jp/joho_tsusin/policyreports/chousa/netrobot/pdf/030214_1_33_a.pdf.
http://www.sk.rs/1999/10/sknt01.html.
JPO, Notification of Reasons for Rejection corresponding to Japanese Application No. 2011-156589 dated Jun. 15, 2012, 2 pages (English translation, 2 pages).
KIPO, Notice of Preliminary Rejection corresponding to South Korean Application No. 10-2010-7009178 dated Jun. 5, 2012, 5 pages (English translation, 4 pages).
Andersen et al., "Landmark based navigation strategies", SPIE Conference on Mobile Robots XIII, SPIE vol. 3525, pp. 170-181, Jan. 8, 1999.
Ascii, Mar. 25, 2002, http://ascii.jp/elem/000/000/330/330024/ accessed Nov. 1, 2011.
Certified U.S. Appl. No. 60/605,066 as provided to WIPO in PCT/US2005/030422, corresponding to National Stage Entry U.S. Appl. No. 11/574,290, U.S. publication 2008/0184518, filing date Aug. 27, 2004.
Certified U.S. Appl. No. 60/605,181 as provided to WIPO in PCT/US2005/030422, corresponding to National Stage Entry U.S. Appl. No. 11/574,290, U.S. publication 2008/0184518, filing date Aug. 27, 2004.
Derek Kurth, "Range-Only Robot Localization and SLAM with Radio", http://www.ri.cmu.edu/pub_files/pub4/kurth_derek_2004_1/kurth_derek_2004_1.pdf. 60 pages, May 2004, accessed Jul. 27, 2012.
Electrolux Trilobite, Jan. 12, 2001, http://www.electrolux-ui.com:8080/2002%5C822%5C822%5C833102EN.pdf, accessed Jul. 2, 2012, 10 pages.

Gregg et al., "Autonomous Lawn Care Applications," 2006 Florida Conference on Recent Advances in Robotics, Miami, Florida, May 25-26, 2006, Florida International University, 5 pages.

Hitachi 'Feature', http://kadenfan.hitachi.co.jp/robot/feature/feature.html, 1 page, Nov. 19, 2008.

Hitachi, http://www.hitachi.co.jp/New/cnews/hi_030529_hi_030529.pdf, 8 pages, May 29, 2003.

King and Weiman, "Helpmate™ Autonomous Mobile Robots Navigation Systems," SPIE vol. 1388 Mobile Robots, pp. 190-198 (1990).

Li et al. "Robust Statistical Methods for Securing Wireless Localization in Sensor Networks," Information Procesing in Sensor Networks, 2005, Fourth International Symposium on, pp. 91-98, Apr. 2005.

Martishevcky, "The Accuracy of point light target coordinate determination by dissectoral tracking system", SPIE vol. 2591, pp. 25-30, Oct. 23, 2005.

Maschinemarkt Würzburg 105, Nr. 27, pp. 3, 30, Jul. 5, 1999.

Miwako Doi "Using the symbiosis of human and robots from approaching Research and Development Center," Toshiba Corporation, 16 pages, available at http://warp.ndl.go.jp/info:ndljp/pid/258151/www.soumu.go.jp/joho_tsusin/policyreports/chousa/netrobot/pdf/030214_1_33_a.pdf, Feb. 26, 2003.

Roboking—not just a vacuum cleaner, a robot!, Jan. 21, 2004, infocom.uz/2004/01/21/robokingne-prosto-pyilesos-a-robot/, accessed Oct. 10, 2011, 7 pages.

Sebastian Thrun, "Learning Occupancy Grid Maps With Forward Sensor Models," Autonomous Robots 15, 111-127, Sep. 1, 2003.

Written Opinion of the International Searching Authority, PCT/US2004/001504, Aug. 20, 2012, 9 pages.

Borges et al., "Optimal Mobile Robot Pose Estimation Using Geometrical Maps," IEEE Transactions on Robotics and Automation, 18(1): 87-94, Feb. 2002.

Braunstingl et al., "Fuzzy Logic Wall Following of a Mobile Robot Based on the Concept of General Perception," ICAR '95, 7th International Conference on Advanced Robotics, Sant Feliu De Guixols, Spain, pp. 367-376, Sep. 1995.

Bulusu et al., "Self Configuring Localization systems: Design and Experimental Evaluation,"*ACM Transactions on Embedded Computing Systems*, 3(1):24-60, 2003.

Caccia et al., "Bottom-Following for Remotely Operated Vehicles,"5th IFAC Conference, Alaborg, Denmark, pp. 245-250, Aug. 2000.

Corke, "High Performance Visual serving for robots end-point control," SPIE vol. 2056, Intelligent Robots and Computer Vision, 1993, 10 pages.

Cozman et al., "Robot Localization using a Computer Vision Sextant," IEEE International Midwest Conference on Robotics and Automation, pp. 106-111, 1995.

D'Orazio et al., "Model based Vision System for mobile robot position estimation", *SPIE*, vol. 2058 Mobile Robots VIII, pp. 38-49, 1992.

De Bakker et al., "Smart PSD- array for sheet of light range imaging", Proc. Of *SPIE*, vol. 3965, pp. 1-12, May 2000.

Dudek et al., "Localizing a Robot with Minimum Travel" *Proceedings of the sixth annual ACM-SIAM symposium on Discrete Algorithms*, 27(2):583-604, Apr. 1998.

Dulimarta et al., "Mobile Robot Localization in Indoor Environment", *Pattern Recognition*, 30(1):99-111, 1997.

Becker et al., "Reliable Navigation Using Landmarks, " IEEE International Conference on Robotics and Automation, 0-7803-1965-6, pp. 401-406, 1995.

Benayad-Cherif et al., "Mobile Robot Navigation Sensors," SPIE vol. 1831 Mobile Robots, VII, pp. 378-387, 1992.

Facchinetti Claudio et al., "Self-Positioning Robot Navigation Using Ceiling Images Sequences," ACCV '95, 5 pages, Dec. 1995.

Fayman, "Exploiting Process Integration and Composition in the context of Active Vision," IEEE Transactions on Systems, Man, and Cybernetics- Part C: Application and reviews, vol. 29, No. 1, pp. 73-86, Feb. 1999.

Franz et al., "Biomimetric robot navigation", Robotics and Autonomous Systems, vol. 30 pp. 133-153, 2000.

Friendly Robotics, "Friendly Robotics—Friendly Vac, Robotic Vacuum Cleaner," Retrieved from the Internet: URL< www.friendlyrobotics.com/vac.htm > 5 pages, Apr. 2005.

Gionis, "A hand-held optical surface scanner for environmental Modeling and Virtual Reality," Virtual Reality World, 16 pages, 1996.

Goncalves et al., "A Visual Front-End for Simultaneous Localization and Mapping", Proceedings of the 2005 IEEE International Conference on Robotics and Automation, Barcelona, Spain, pp. 44-49, Apr. 2005.

Hoag et al., "Navigation and Guidance in interstellar space," ACTA Astronautica, vol. 2, pp. 513-533, Feb. 1975.

Huntsberger et al., "Campout: A Control Architecture for Tightly Coupled Coordination of Multirobot Systems for Planetary Surface Exploration," *IEEE Transactions on Systems, Man, and Cybernetics—Part A: Systems and Humans*, 33(5):550-559, Sep. 2003.

InMach "Intelligent Machines," Retrieved from the Internet: URL<www.inmach.de/inside.html>. 1 page, Nov. 2008.

McLurkin, "The Ants: A community of Microrobots," Paper submitted for requirements of BSEE at MIT, May 1995, 60 pages.

Haralick et al. "Pose Estimation from Corresponding Point Data", *IEEE Transactions on Systems, Man, and Cybernetics*, 19(6):1426-1446, Nov. 1989.

Hausler, "About the Scaling Behaviour of Optical Range Sensors," Fringe '97, Proceedings of the 3rd International Workshop on Automatic Processing of Fringe Patterns, Bremen, Germany, pp. 147-155, Sep. 1997.

Dyson's Robot Vacuum Cleaner—the DC06, May 2004, Retrieved from the Internet: URL< http://www.gizmag.com/go/1282/>. Accessed Nov. 2011, 3 pages.

Euroflex, Jan. 2006, Retrieved from the Internet: URL< http://www.euroflex.tv/novita_dett.php?id=15, 1 page, accessed Nov. 2011.

Grumet, "Robots Clean House," Popular Mechanics, Nov. 2003, 3 pages.

Karlsson et al, "Core Technologies for service Robotics," IEEE/RSJ International Conference on Intelligent Robots and Systems (IROS 2004), vol. 3, pp. 2979-2984, Sep. 2004.

Knights, et al., "Localization and Identification of Visual Landmarks," *Journal of Computing Sciences in Colleges*, 16(4):312-313, May 2001.

Kolodko et al., "Experimental System for Real-Time Motion Estimation," Proceedings of the 2003 IEEE/ASME International Conference on Advanced Intelligent Mechatronics (AIM 2003), pp. 981-986, 2003.

Krotov et al., "Digital Sextant," Downloaded from the internet at: http://www.cs.cmu.edu/~epk/, 1 page, 1995.

Lapin, "Adaptive position estimation for an automated guided vehicle," SPIE, vol. 1831 Mobile Robots VII, pp. 82-94, 1992.

Lee et al., "Localization Of a Mobile Robot Using the Image of a Moving Object," *IEEE Transaction on Industrial Electronics*, 50(3):612-619, Jun. 2003.

Leonard et al., "Mobile Robot Localization by tracking Geometric Beacons," *IEEE Transaction on Robotics and Automation*, 7(3):376-382, Jun. 1991.

Lin et al., "Mobile Robot Navigation Using Artificial Landmarks," *Journal of robotics System*, 14(2): 93-106, 1997.

Linde, Dissertation-"On Aspects of Indoor Localization," Available at: https://eldorado.tu-dortmund.de/handle/2003/22854, University of Dortmund, 138 pages, Aug. 2006.

Luo et al., "Real-time Area-Covering Operations with Obstacle Avoidance for Cleaning Robots," IEEE, pp. 2359-2364, 2002.

Madsen et al., "Optimal landmark selection for triangulation of robot position," Journal of Robotics and Autonomous Systems, vol. 13 pp. 277-292, 1998.

Matsutek Enterprises Co. Ltd, "Automatic Rechargeable Vacuum Cleaner," http://matsutek.manufacturer.globalsources.com/si/6008801427181/pdtl/Home-vacuum/10 . . . , Apr. 2007, 3 pages.

McGillem,et al. "A Beacon Navigation Method for Autonomous Vehicles," *IEEE Transactions on Vehicular Technology*, 38(3):132-139, Aug. 1989.

MobileMag, "Samsung Unveils High-tech Robot Vacuum Cleaner," Retrieved from the Internet: URL<http://www.mobilemag.com/content/100/102/C2261/>. 4 pages, Mar. 2005.

Moore et al., "A simple Map-bases Localization strategy using range measurements," *SPIE*, vol. 5804 pp. 612-620, 2005.

Munich et al., "ERSP: A Software Platform and Architecture for the Service Robotics Industry," Intelligent Robots and Systems, 2005. (IROS 2005), pp. 460-467, Aug. 2005.

OnRobo "Samsung Unveils Its Multifunction Robot Vacuum," Retrieved from the Internet: URL <www.onrobo.com/enews/0210/samsung_vacuum.shtml>. 3 pages, Mar. 2005.

Penna et al., "Models for Map Building and Navigation", IEEE Transactions on Systems. Man. And Cybernetics., 23(5):1276-1301, Sep./Oct. 1993.

Pirjanian et al., "A decision-theoretic approach to fuzzy behavior coordination", 1999 IEEE International Symposium on Computational Intelligence in Robitics and Automation, 1999. CIRA '99., Monterey, CA, pp. 101-106, Nov. 1999.

Pirjanian et al., "Improving Task Reliability by Fusion of Redundant Homogeneous Modules Using Voting Schemes," Proceedings of the 1997 IEEE International Conference on Robotics and Automation, Albuquerque, NM, pp. 425-430, Apr. 1997.

Pirjanian, "Challenges for Standards for consumer Robotics," IEEE Workshop on Advanced Robotics and its Social impacts, pp. 260-264, Jun. 2005.

Roth-Tabak et al., "Environment Model for mobile Robots Indoor Navigation," *SPIE*, vol. 1388 Mobile Robots, pp. 453-463, 1990.

Sahin et al., "Development of a Visual Object Localization Module for Mobile Robots," 1999 Third European Workshop on Advanced Mobile Robots, (Eurobot '99), pp. 65-72, 1999.

Salomon et al., "Low-Cost Optical Indoor Localization system for Mobile Objects without Image Processing," IEEE Conference on Emerging Technologies and Factory Automation, 2006. (ETFA '06), pp. 629-632, Sep. 2006.

Sato, "Range Imaging Based on Moving Pattern Light and Spatio-Temporal Matched Filter," Proceedings International Conference on Image Processing, vol. 1., Lausanne, Switzerland, pp. 33-36, Sep. 1996.

Schenker et al., "Lightweight rovers for Mars science exploration and sample return," Intelligent Robots and Computer Vision XVI, *SPIE* Proc. 3208, pp. 24-36, 1997.

Shimoga et al., "Touch and Force Reflection for Telepresence Surgery," Engineering in Medicine and Biology Society, 1994. Engineering Advances: New Opportunities for Biomedical Engineers. Proceedings of the 16th Annual International Conference of the IEEE, Baltimore, MD, pp. 1049-1050, 1994.

Sim et al, "Learning Visual Landmarks for Pose Estimation," IEEE International Conference on Robotics and Automation, vol. 3, Detroit, MI, pp. 1972-1978, May 1999.

Sobh et al., "Case Studies in Web-Controlled Devices and Remote Manipulation," Automation Congress, 2002 Proceedings of the 5th Biannual World, pp. 435-440, Dec. 2002.

Tse et al., "Design of a Navigation System for a Household Mobile Robot Using Neural Networks," Department of Manufacturing Engg. & Engg. Management, City University of Hong Kong, pp. 2151-2156, 1998.

UAMA (Asia) Industrial Co., Ltd., "RobotFamily," 2005, 1 page.

Watanabe et al., "Position Estimation of Mobile Robots With Internal and External Sensors Using Uncertainty Evolution Technique," 1990 IEEE International Conference on Robotics and Automation, Cincinnati, OH, pp. 2011-2016, May 1990.

Watts, "Robot, boldly goes where no man can," The Times—pp. 20, Jan. 1985.

Wijk et al., "Triangulation-Based Fusion of Sonar Data with Application in Robot Pose Tracking," *IEEE Transactions on Robotics and Automation*, 16(6):740-752, Dec. 2000.

Yuta et al., "Implementation of an Active Optical Range sensor Using Laser Slit for In-Door Intelligent Mobile Robot," IEE/RSJ International Workshop on Intelligent Robots and Systems (IROS 91) vol. 1, Osaka, Japan, pp. 415-420, Nov. 3-5, 1991.

Zhang et al., "A Novel Mobile Robot Localization Based on Vision," *SPIE* vol. 6279, 6 pages, Jan. 2007.

Yun et al., "Image-Based Absolute Positioning System for Mobile Robot Navigation," IAPR International Workshops SSPR, Hong Kong, pp. 261-269, Aug. 2006.

Yun et al., "Robust Positioning a Mobile Robot with Active Beacon Sensors," *Lecture Notes in Computer Science*, 2006, vol. 4251, pp. 890-897, 2006.

Chae et al., "StarLITE: A new artificial landmark for the navigation of mobile robots," http://www.irc.atr.jp/jk-nrs2005/pdf/Starlite.pdf, 4 pages, 2005.

Chamberlin et al., "Team 1: Robot Locator Beacon System," NASA Goddard SFC, Design Proposal, 15 pages, Feb. 2006.

Champy, "Physical management of IT assets in Data Centers using RFID technologies," RFID 2005 University, Oct. 12-14, 2005, 19 pages.

Chiri, "Joystick Control for Tiny OS Robot," http://www.eecs.berkeley.edu/Programs/ugrad/superb/papers2002/chiri.pdf. 12 pages, Aug. 2002.

Christensen et al. "Theoretical Methods for Planning and Control in Mobile Robotics," 1997 First International Conference on Knowledge-Based Intelligent Electronic Systems, Adelaide, Australia, pp. 81-86, May 1997.

Clerentin et al., "A localization method based on two omnidirectional perception systems cooperation," *Proc of IEEE International Conference on Robotics & Automation*, San Francisco, CA vol. 2, pp. 1219-1224, Apr. 2000.

Desaulniers et al., "An Efficient Algorithm to find a shortest path for a car-like Robot," *IEEE Transactions on robotics and Automation*, 11(6):819-828, Dec. 1995.

Dorfmüller-Ulhaas, "Optical Tracking From User Motion to 3D Interaction," http://www.cg.tuwien.ac.at/research/publications/2002/Dorfmueller-Ulhaas-thesis, 182 pages, 2002.

Dorsch et al., "Laser Triangulation: Fundamental uncertainty in distance measurement," *Applied Optics*, 33(7):1306-1314, Mar. 1994.

Eren et al., "Accuracy in position estimation of mobile robots based on coded infrared signal transmission," Proceedings: Integrating Intelligent Instrumentation and Control, Instrumentation and Measurement Technology Conference, 1995, IMTC/95. pp. 548-551, 1995.

Eren et al., "Operation of Mobile Robots in a Structured Infrared Environment," Proceedings 'Sensing, Processing, Networking', IEEE Instrumentation and Measurement Technology Conference, 1997 (IMTC/97), Ottawa, Canada vol. 1, pp. 20-25, May 1997.

Facchinetti Claudio et al., "Using and Learning Vision-Based Self-Positioning for Autonomous Robot Navigation," ICARCV '94, vol. 3, pp. 1694-1698, 1994.

Fairfield et al., "Mobile Robot Localization with Sparse Landmarks," SPIE vol. 4573, pp. 148-155, 2002.

Favre-Bulle, "Efficient tracking of 3D—Robot Position by Dynamic Triangulation," IEEE Instrumentation and Measurement Technology Conference IMTC 98 Session on Instrumentation and Measurement in Robotics, vol. 1, pp. 446-449, May 1998.

Fuentes et al., "Mobile Robotics 1994," University of Rochester. Computer Science Department, TR 588, 44 pages, Dec. 1994.

Bison et al., "Using a structured beacon for cooperative position estimation," *Robotics and Autonomous Systems*, 29(1):33-40, Oct. 1999.

Fukuda et al., "Navigation System based on Ceiling Landmark Recognition for Autonomous mobile robot," 1995 IEEE/RSJ International Conference on Intelligent Robots and Systems 95. 'Human Robot Interaction and Cooperative Robots', Pittsburgh, PA, pp. 1466/1471, Aug. 1995.

Hamamatsu "SI PIN Diode S5980, S5981 S5870—Multi-element photodiodes for surface mounting," Hamatsu Photonics, 2 pages, Apr. 2004.

Jarosiewicz et al., "Final Report—Lucid," University of Florida, Departmetn of Electrical and Computer Engineering, EEL 5666—Intelligent Machine Design Laboratory, 50 pages, Aug. 1999.

Jensfelt et al., "Active Global Localization for a mobile robot using multiple hypothesis tracking," *IEEE Transactions on Robots and Automation*, 17(5): 748-760, Oct. 2001.

Jeong et al., "An intelligent map-building system for indoor mobile robot using low cost photo sensors,"*SPiE*, vol. 6042, 6 pages, 2005.

Lambrinos et al., "A mobile robot employing insect strategies for navigation," Retrieved from the Internat: URL<http://www8.cs.umu.se/kurser/TDBD17/VT04/d1/Assignment%20Papers/lambrinos-RAS-2000.pdf>. 38 pages, Feb. 1999.

Kleinberg, The Localization Problem for Mobile Robots, Laboratory for Computer Science, Massachusetts Institute of Technology, 1994 IEEE, pp. 521-531, 1994.
Komoriya et al., "Planning of Landmark Measurement for the Navigation of a Mobile Robot," Proceedings of the 1992 IEEE/RSJ International Cofnerence on Intelligent Robots and Systems, Raleigh, NC pp. 1476-1481, Jul. 1992.
Krupa et al., "Autonomous 3-D Positioning of Surgical Instruments in Robotized Laparoscopic Surgery Using Visual Servoin," *IEEE Transactions on Robotics and Automation*, 19(5):842-853, Oct. 2003.
LaValle et al., "Robot Motion Planning in a Changing, Partially Predictable Environment," 1994 IEEE International Symposium on Intelligent Control, Columbus, OH, pp. 261-266, Aug. 1994.
Lee et al., "Development of Indoor Navigation system for Humanoid Robot Using Multi-sensors Integration", ION NTM, San Diego, CA pp. 798-805, Jan. 2007.
Li et al., "Making a Local Map of Indoor Environments by Swiveling a Camera and a Sonar," Proceedings of the 1999 IEEE/RSJ International Conference on Intelligent Robots and Systems, pp. 954-959, 1999.
Lumelsky et al., "An Algorithm for Maze Searching with Azimuth Input", 1994 IEEE International Conference on Robotics and Automation, San Diego, CA vol. 1, pp. 111-116, 1994.
Ma, Thesis—"Documentation On Northstar," California Institute of Technology, 14 pages, May 2006.
McGillem et al., "Infra-red Lacation System for Navigation and Autonomous Vehicles," 1988 IEEE International Conference on Robotics and Automation, vol. 2, pp. 1236-1238, Apr. 1988.
Miro et al., "Towards Vision Based Navigation in Large Indoor Environments," Proceedings of the IEEE/RSJ International Conference on Intelligent Robots and Systems, Beijing, China, pp. 2096-2102, Oct. 2006.
Monteiro et al., "Visual Servoing for Fast Mobile Robot: Adaptive Estimation of Kinematic Parameters," Proceedings of the IECON '93., International Conference on Industrial Electronics, Maui, HI, pp. 1588-1593, Nov. 1993.
Munich et al., "SIFT-ing Through Features with ViPR", IEEE Robotics & Automation Magazine, pp. 72-77, Sep. 2006.
Nam et al., "Real-Time Dynamic Visual Tracking Using PSD Sensors and extended Trapezoidal Motion Planning", Applied Intelligence 10, pp. 53-70, 1999.
Pages et al., "A camera-projector system for robot positioning by visual serving," Proceedings of the 2006 Conference on Computer Vision and Pattern Recognition Workshop (CVPRW06), 8 pages, Jun. 2006.
Pages et al., "Robust decoupled visual servoing based on structured light," 2005 IEEE/RSJ, Int. Conf. on Intelligent Robots and Systems, pp. 2676-2681, 2005.
Park et al., "Dynamic Visual Servo Control of Robot Manipulators using Neutral Networks," *The Korean Institute Telematics and Electronics*, 29-B(10):771-779, Oct. 1992.
Paromtchik et al., "Optical Guidance System for Multiple mobile Robots," Proceedings 2001 ICRA. IEEE International Conference on Robotics and Automation, vol. 3, pp. 2935-2940, May 2001.
Pirjanian et al. "Representation and Execution of Plan Sequences for Multi-Agent Systems," Proceedings of the 2001 IEEE/RSJ International Conference on Intelligent Robots and Systems, Maui, Hawaii, pp. 2117-2123, Oct. 2001.
Pirjanian et al., "Distributed Control for a Modular, Reconfigurable Cliff Robot," Proceedings of the 2002 IEEE International Conference on Robotics & Automation, Washington, D.C. pp. 4083-4088, May 2002.
Pirjanian et al., "Multi-Robot Target Acquisition using Multiple Objective Behavior Coordination," Proceedings of the 2000 IEEE International Conference on Robotics & Automation, San Francisco, CA, pp. 2696-2702, Apr. 2000.

Pirjanian, "Reliable Reaction," Proceedings of the 1996 IEEE/SICE/RSJ International Conference on Multisensor Fusion and Integration for Intelligent Systems, pp. 158-165, 1996.
Rives et al., "Visual servoing based on ellipse features," *SPIE*, vol. 2056 Intelligent Robots and Computer Vision pp. 356-367, 1993.
Ronnback, "On Methods for Assistive Mobile Robots," Retrieved from the Internet: URL<http://www.openthesis.org/documents/methods-assistive-mobile-robots-595019.html>. 218 pages, Jan. 2006.
Stella et al., "Self-Location for Indoor Navigation of Autonomous Vehicles," Part of the SPIE conference on Enhanced and Synthetic Vision SPIE vol. 3364, pp. 298-302, 1998.
Summet, "Tracking Locations of Moving Hand-held Displays Using Projected Light," Pervasive 2005, LNCS 3468, pp. 37-46, 2005.
Svedman et al., "Structure from Stereo Vision using Unsynchronized Cameras for Simultaneous Localization and Mapping," 2005 IEEE/RSJ International Conference on Intelligent Robots and Systems, pp. 2993-2998, 2005.
Takio et al., "Real-Time Position and Pose Tracking Method of Moving Object Using Visual Servo System," 47th IEEE International Symposium on Circuits and Systems, pp. 167-170, 2004.
Teller, "Pervasive pose awareness for people, Objects and Robots," http://www.ai.mit.edu/lab/dangerous-ideas/Spring2003/teller-pose.pdf, 6 pages, Apr. 2003.
Terada et al., "An Acquisition of the Relation between Vision and Action using Self-Organizing Map and Reinforcement Learning," 1998 Second International Conference on Knowledge-Based Intelligent Electronic Systems, Adelaide, Australia, pp. 429-434, Apr. 1998.
Wolf et al., "Robust Vision-Based Localization by Combining an Image-Retrieval System with Monte Carol Localization,", *IEEE Transactions on Robotics*, 21(2):208-216, Apr. 2005.
Wolf et al., "Robust Vision-based Localization for Mobile Robots Using an Image Retrieval System Based on Invariant Features," Proceedings of the 2002 IEEE International Conference on Robotics & Automation, Washington, D.C., pp. 359-365, May 2002.
Wong, "EIED Online>> Robot Business", ED Online ID# 13114, 17 pages, Jul. 2006.
Yamamoto et al., "Optical Sensing for Robot Perception and Localization," 2005 IEEE Workshop on Advanced Robotics and its Social Impacts, pp. 14-17, 2005.
Yata et al., "Wall Following Using Angle Information Measured by a Single Ultrasonic Transducer," Proceedings of the 1998 IEEE, International Conference on Robotics & Automation, Leuven, Belgium, pp. 1590-1596, May 1998.

\* cited by examiner

*Primary Examiner* — Bhavesh V Amin
(74) *Attorney, Agent, or Firm* — Fish & Richardson P.C.

(57) ABSTRACT

An autonomous floor cleaning robot includes a transport drive and control system arranged for autonomous movement of the robot over a floor for performing cleaning operations. The robot chassis carries a first cleaning zone comprising cleaning elements arranged to suction loose particulates up from the cleaning surface and a second cleaning zone comprising cleaning elements arraigned to apply a cleaning fluid onto the surface and to thereafter collect the cleaning fluid up from the surface after it has been used to clean the surface. The robot chassis carries a supply of cleaning fluid and a waste container for storing waste materials collected up from the cleaning surface.

20 Claims, 63 Drawing Sheets

AUTONOMOUS SURFACE CLEANING ROBOT FOR WET AND DRY CLEANING

CROSS-REFERENCE TO RELATED APPLICATIONS

This application is a continuation of and claims priority under 35 U.S.C. §120 to U.S. application Ser. No. 11/359,961, filed Feb. 21, 2006, which claims priority under 35 U.S.C. §119(e) to U.S. Provisional Application Ser. No. 60/654,838, filed Feb. 18, 2005, the entire disclosure of which is herein incorporated by reference in its entirety. U.S. application Ser. No. 11/359,961 is also a continuation-in-part of and claims priority under 35 U.S.C. §120 to U.S. application Ser. No. 11/134,212, filed May 21, 2005, now abandoned, U.S. application Ser. No. 11/134,213, filed May 21, 2005, now abandoned, U.S. application Ser. No. 11/207,575, filed Aug. 19, 2005, and U.S. application Ser. No. 11/207,620, filed Aug. 19, 2005, now U.S. Pat. No. 7,389,156, the entire disclosures of which are herein incorporated by reference in their entireties. U.S. application Ser. No. 11/359,961 is also a continuation-in-part of and claims priority under 35 U.S.C. 120 to U.S. application Ser. No. 11/207,574, filed Aug. 19, 2005, now U.S. Pat. No. 7,620,476 and U.S. application Ser. No. 11/133,796, filed May 21, 2005 now abandoned.

BACKGROUND OF THE INVENTION

The present invention relates to cleaning devices, and more particularly, to an autonomous surface cleaning robot.

DESCRIPTION OF RELATED ART

Autonomous robot floor cleaning devices having a low enough end user price to penetrate the home floor cleaning market are known in the art. For example, and U.S. Pat. No. 6,883,201 by Jones et al. entitled Autonomous Floor Cleaning Robot, the disclosure of which is herein incorporated by reference it its entirety, discloses an autonomous robot. The robot disclosed therein includes a chassis, a battery power subsystem, a motive drive subsystem operative to propel the autonomous floor cleaning robot over a floor surface for cleaning operations, a command and control subsystem operative to control the cleaning operations and the motive subsystem, a rotating brush assembly for sweeping up or collecting loose particulates from the surface, a vacuum subsystem for suctioning up or collecting loose particulates on the surface, and a removable debris receptacle for collecting the particulates and storing the loose particulates on the robot during operation. Models similar to the device disclosed in the '201 patent are commercially marketed by IROBOT CORPORATION under the trade names ROOMBA RED and ROOMBA DISCOVERY. These devices are operable to clean hard floor surfaces, e.g. bare floors, as well as carpeted floors, and to freely move from one surface type to the other unattended and without interrupting the cleaning process.

In particular, the '201 patent describes a first cleaning zone configured to collect loose particulates in a receptacle. The first cleaning zone includes a pair of counter-rotating brushes engaging the surface to be cleaned. The counter-rotating brushes are configured with brush bristles that move at an angular velocity with respect to floor surface as the robot is transported over the surface in a forward transport direction. The angular movement of the brush bristles with respect to the floor surface tends to flick loose particulates laying on the surface into the receptacle which is arranged to receive flicked particulates.

The '201 patent further describes a second cleaning zone configured to collect loose particulates in the receptacle and positioned aft of the first cleaning zone such that the second cleaning zone performs a second cleaning of the surface as the robot is transported over the surface in the forward direction. The second cleaning zone includes a vacuum device configured to suction up any remaining particulates and deposit them into the receptacle.

In other examples, home use autonomous cleaning devices are disclosed in each of U.S. Pat. No. 6,748,297, and U.S. Patent Application Publication No. 2003/0192144, both by Song et al. and both assigned to Samsung Gwangu Electronics Co. The disclosures of the '297 patent and '144 published application are herein incorporated by reference it their entireties. In these examples, autonomous cleaning robots are configured with similar cleaning elements that utilize rotating brushes and a vacuum device to flick and suction up loose particulates and deposit them in a receptacle.

While each of the above examples provide affordable autonomous floor clearing robots for collecting loose particulates, there is heretofore no teaching of an affordable autonomous floor cleaning robot for applying a cleaning fluid onto the floor to wet clean floors in the home. A need exists in the art for such a device and that need is addressed by the present invention, the various functions, features, and benefits thereof described in more detail herein.

Wet floor cleaning in the home has long been done manually using a wet mop or sponge attached to the end of a handle. The mop or sponge is dipped into a container filled with a cleaning fluid, to absorb an amount of the cleaning fluid in the mop or sponge, and then moved over the surface to apply a cleaning fluid onto the surface. The cleaning fluid interacts with contaminants on the surface and may dissolve or otherwise emulsify contaminants into the cleaning fluid. The cleaning fluid is therefore transformed into a waste liquid that includes the cleaning fluid and contaminants held in suspension within the cleaning fluid. Thereafter, the sponge or mop is used to absorb the waste liquid from the surface. While clean water is somewhat effective for use as a cleaning fluid applied to floors, most cleaning is done with a cleaning fluid that is a mixture of clean water and soap or detergent that reacts with contaminants to emulsify the contaminants into the water. In addition, it is known to clean floor surfaces with water and detergent mixed with other agents such as a solvent, a fragrance, a disinfectant, a drying agent, abrasive particulates and the like to increase the effectiveness of the cleaning process.

The sponge or mop may also be used as a scrubbing element for scrubbing the floor surface, and especially in areas where contaminants are particularly difficult to remove from the floor. The scrubbing action serves to agitate the cleaning fluid for mixing with contaminants as well as to apply a friction force for loosening contaminants from the floor surface. Agitation enhances the dissolving and emulsifying action of the cleaning fluid and the friction force helps to break bonds between the surface and contaminants.

One problem with the manual floor cleaning methods of the prior art is that after cleaning an area of the floor surface, the waste liquid must be rinsed from the mop or sponge, and this usually done by dipping the mop or sponge back into the container filled with cleaning fluid. The rinsing step contaminates the cleaning fluid with waste liquid and the cleaning fluid becomes more contaminated each time the mop or sponge is rinsed. As a result, the effectiveness of the cleaning fluid deteriorates as more of the floor surface area is cleaned.

While the traditional manual method is effective for floor cleaning, it is labor intensive and time consuming. Moreover, its cleaning effectiveness decreases as the cleaning fluid becomes contaminated. A need exists in the art for an improved method for wet cleaning a floor surface to provide an affordable wet floor cleaning device for automating wet floor cleaning in the home.

In many large buildings, such as hospitals, large retail stores, cafeterias, and the like, there is a need to wet clean the floors on a daily or nightly basis, and this problem has been addressed by the development of industrial floor cleaning "robots" capable of wet cleaning floors. An example of one industrial wet floor cleaning device is disclosed in U.S. Pat. No. 5,279,672 by Betker et al., and assigned to Windsor Industries Inc. The disclosure of the '672 patent is herein incorporated by reference it its entirety. Betker et al. disclose an autonomous floor cleaning device having a drive assembly providing a motive force to autonomously move the wet cleaning device along a cleaning path.

The use of the word "robot" or "autonomous" to describe the Betker et al. device does not necessarily mean "unattended" or fully autonomous—such devices are operator attended for many reasons. One reason such devices are operator attended is because they weight hundreds of pounds and can cause significant damage in the event of a sensor failure or unanticipated control variable. A more significant reason is because devices as proposed by Betker et al. are not physically configured to escape or navigate among confined areas or obstacles, nor are they capable of being programmed to escape or navigate among confined areas or obstacles. For example, the scrubber disclosed in Betker et al. would often encounter the situation where it has insufficient lateral space to turn in accordance with the necessary controlled radius and navigate around an obstacle, and in such a case "alerts the operator that the situation requires assistance," as expressly disclosed by Betker et al. The Betker et al. device is in some ways semi-autonomous, but despite its rich sensor complement, it does not address fundamental principles of autonomous operation, including physical configuration and flexible response to its environment. The Betker et al. device would likely clean for no more than a few minutes before getting stuck and requiring operator intervention.

The Betker et al. device provides a cleaning fluid dispenser for dispensing cleaning fluid onto the floor; rotating scrub brushes in contact with the floor surface for scrubbing the floor with the cleaning fluid, and a waste liquid recovery system, comprising a squeegee and a vacuum system for recovering the waste liquid from the floor surface. While the device disclosed by Betker et al. is usable to autonomously wet clean large floor areas, it is not suitable for the home market, and further, lacks many features, capabilities, and functionality of the present invention as described further herein. In particular, the industrial autonomous cleaning device disclosed by Betker et al. is too large, costly and complex for use in the home and consumes too much electrical power to provide a practical solution for the home wet floor cleaning market. A fundamental shortcoming of Betker is that it appears to be neither physically capable nor flexibly programmed to respond to a complex environment, and is therefore designed to be frequently "rescued" by its attendant operator. Another is that its cleaning techniques may not be effective in a robot that could be carried or manually moved by a person, e.g., less than 20 kg.

Recently, improvements in conventional manual wet floor cleaning in the home are disclosed in U.S. Pat. No. 5,968,281 by Wright et al., and assigned to Royal Appliance Mfg., entitled Method for Mopping and Drying a Floor. The disclosure of the '281 patent is herein incorporated by reference it its entirety. Disclosed therein is a low cost wet mopping system for manual use in the home market. The wet mopping system disclosed by Wright et al. comprises a manual floor cleaning device having a handle with a cleaning fluid supply container supported on the handle. The device includes a cleaning fluid dispensing nozzle supported on the handle for spraying cleaning fluid onto the floor and a floor scrubber sponge attached to the end of the handle for contact with the floor. The device also includes a mechanical device for wringing waste liquid out of the scrubbing sponge. A squeegee and an associated suction device are supported on the end of the handle and used to collect waste liquid up from the floor surface and deposit the waste liquid into a waste liquid container, supported on the handle separate from the cleaning solution reservoir. The device also includes a battery power source for powering the suction device. While Wright et al. describes a self contained wet cleaning device as well as an improved wet cleaning method that separates waste liquid from cleaning fluid, the device is manually operated and appears to lack robotic functionality (motor drive, autonomous control, etc.) and other benefits and features identified in the present disclosure.

BRIEF SUMMARY OF THE INVENTION

The present invention overcomes the problems cited in the prior by providing, inter alia, low cost autonomous robot capable of wet cleaning floors and affordable for home use. The problems of the prior art are addressed by the present invention which provides an autonomous cleaning robot comprising a chassis and a transport drive system configured to autonomously transport cleaning elements over a cleaning surface. The robot is supported on the cleaning surface by wheels in rolling contact with the cleaning surface and the robot includes controls and drive elements configured to control the robot to generally traverse the cleaning surface in a forward direction defined by a fore-aft axis. The robot is further defined by a transverse axis perpendicular to the fore-aft axis.

In particular, the surface cleaning robot includes two separate cleaning zones with a first cleaning zone configured to collect loose particulates from the surface and with a second cleaning zone configured to apply a cleaning fluid onto the surface, scrub the surface and thereafter collect a waste liquid from the surface. The surface cleaning robot may also include at least two containers or compartments, carried thereby, to store cleaning fluid and waste materials. In certain embodiments, one compartment is positioned at least partially directly above (with respect to gravity) the other, so that movements of fluid from one compartment to another do not significantly shift the center of gravity of the robot.

The robot chassis carries a first cleaning zone A comprising cleaning elements arranged to collect loose particulates from the cleaning surface across a cleaning width. The cleaning elements of the first cleaning zone utilize a jet port disposed on a transverse edge of the robot and configured to blow a jet of air across a cleaning width of the robot towards the opposite transverse edge. A vacuum intake port is disposed on the robot opposed to the jet port to suction up loose particulates blown across the cleaning width by the jet port. The cleaning elements of the first cleaning zone may suction up loose particulates, utilize brushes to sweep the loose particulates into receptacle or otherwise remove the loose particulates from the surface.

The robot chassis may also carries a second cleaning zone B comprising cleaning elements arraigned to apply a cleaning fluid onto the surface. The second cleaning zone also includes cleaning elements configured to collect the cleaning fluid up from the surface after it has been used to clean the surface and may further include elements for scrubbing the cleaning surface and for smearing the cleaning fluid more uniformly over the cleaning surface.

The robot includes a motive drive subsystem controlled by a master control module and powered by a self-contained power module for performing autonomous movement over the cleaning surface. In one aspect, the invention relates to an autonomous cleaning robot having a chassis supported for transport over a cleaning surface, the chassis being defined by a fore-aft axis and a perpendicular transverse axis; a first collecting apparatus attached to the chassis and configured to collect loose particulates from the cleaning surface across a cleaning width, the cleaning width being disposed generally parallel with the transverse axis; a liquid applicator, attached to the chassis and configured to apply a cleaning fluid onto the cleaning surface; and, wherein the arrangement of the first collecting apparatus with respect to the liquid applicator causes the first collecting apparatus to precede the liquid applicator over the cleaning surface when transporting the chassis in a forward direction.

In one embodiment of the above aspect, the autonomous cleaning robot also includes a smearing element attached to the chassis and configured to smear the cleaning fluid applied onto the cleaning surface to more uniformly spread the cleaning fluid over the cleaning surface; wherein the arrangement of the liquid applicator with respect to the smearing element (or spreader brush) causes the liquid applicator to precede the smearing element over the cleaning surface when transporting the chassis in a forward direction. In another embodiment, the robot includes a scrubbing element configured to scrub the cleaning surface; wherein the arrangement of the liquid applicator with respect to the scrubbing element causes the liquid applicator to precede the scrubbing element over the cleaning surface when transporting the chassis in the forward direction. In certain embodiments, the robot also includes a second collecting apparatus configured to collect waste liquid from the cleaning surface, the waste liquid comprising the cleaning fluid applied by the liquid applicator plus any contaminants, removed from the cleaning surface by the clean fluid; wherein the arrangement of the scrubbing element with respect to the second collecting apparatus causes the scrubbing element to precede the second collecting apparatus over the cleaning surface as the chassis is transported in the forward direction.

In certain embodiments of the above aspect, the robot includes a first waste storage container, compartment, or tank attached to the chassis and arranged to receive the loose particulates therein, and/or a second waste storage container attached to the chassis and arranged to receive the waste liquid therein. Some embodiments of the autonomous robot of the above aspect include a cleaning fluid storage container attached to the chassis and configured to store a supply of the cleaning fluid therein and to deliver the cleaning fluid to the liquid applicator. In some embodiments, the cleaning fluid comprises water and/or water mixed with any one of soap, solvent, fragrance, disinfectant, emulsifier, drying agent and abrasive particulates. In some embodiments, the first and second waste containers are configured to be removable from the chassis by a user and to be emptied by the user, and/or said cleaning fluid storage container is configured to be removable from the chassis by a user and to be filled by the user. Certain embodiments include a combined waste storage container, compartment, or tank attached to the chassis and configured to receive the loose particulates from the first collecting apparatus and to receive the waste liquid from the second collecting apparatus therein. In other embodiments the waste storage container is configured to be removable from the chassis by a user and to be emptied by the user. Still other embodiments include a cleaning fluid storage container, attached to the chassis and configured to store a supply of the cleaning fluid therein and to deliver the cleaning fluid to the liquid applicator, and in some cases, said cleaning fluid storage container is configured to be user removable from the chassis and to be filled by the user.

In some embodiments of the above aspect, the autonomous cleaning robot further includes an integrated liquid storage container, attached to the chassis, and formed with two separate container portions, compartments, bladder(s), or tanks comprising; a waste storage container portion configured to receive the loose particulates from the first collecting apparatus and the waste liquid from the second collecting apparatus therein; and, a cleaning fluid storage container, compartment, bladder, or tank portion configured to store a supply of the cleaning fluid therein and to deliver the cleaning fluid to the liquid applicator. In other embodiments, the autonomous cleaning robot of the above aspect includes the integrated liquid storage container configured to be removable from the chassis by a user and for the cleaning fluid storage container to be filled by and for the waste storage container to be emptied by the user. In some embodiments of the above aspect, the robot includes a second collecting apparatus configured to collect waste liquid from the cleaning surface, the waste liquid comprising the cleaning fluid applied by the liquid applicator plus any contaminants, removed from the cleaning surface by the cleaning fluid; and, wherein the arrangement of the liquid applicator with respect to the second collecting apparatus causes the liquid applicator to precede the second collecting apparatus over the cleaning surface as the chassis is transported in the forward direction. Certain embodiments of the above aspect include a smearing element or spreader brush attached to the chassis and configured to smear the cleaning fluid applied onto the cleaning surface to more uniformly spread the cleaning fluid over the cleaning surface; and, wherein the arrangement of the liquid applicator with respect to the smearing element causes the liquid applicator to precede the smearing element or spreader brush over the cleaning surface when transporting the chassis in a forward direction.

In some embodiments, the robot includes a waste storage container, compartment, or tank attached to the chassis and configured to receive the loose particulates from the first collecting apparatus and to receive the waste liquid from the second collecting apparatus therein, and in certain cases, the waste storage container is configured to be removable from the chassis by a user and to be emptied by the user. Some embodiments of the robot include a cleaning fluid storage container, attached to the chassis and configured to store a supply of the cleaning fluid therein and to deliver the cleaning fluid to the liquid applicator, and in some cases, said cleaning fluid storage container is configured to be removable from the chassis by a user and to be filled by the user. In other embodiments, the robot of the above aspect includes an integrated liquid storage container or tank, attached to the chassis, and formed with two separate container portions comprising; a waste storage container portion configured to receive the loose particulates from the first collecting apparatus and to receive the waste liquid from the second collecting apparatus therein; and, a cleaning fluid storage container, compartment, bladder, or tank configured to store a supply of the cleaning fluid therein and to deliver the cleaning fluid to the liquid applicator. In certain embodiments, said integrated liquid storage container or tank is configured to be removable from the chassis by a user and for the cleaning fluid storage container to be filled by and for the waste storage container or tank to be emptied by the user.

Some embodiments of the above aspect include a motive drive subsystem attached to chassis for transporting the chassis over the cleaning surface; a power module attached to the chassis for delivering electrical power to each of a plurality of power consuming subsystems attached to the chassis; and, a master control module attached to the chassis for controlling the motive drive module, the first collecting apparatus, and the liquid applicator, to autonomously transport the robot over the cleaning surface and to autonomously clean the cleaning surface. Some embodiments may also include a sensor module configured to sense conditions external to the robot and to sense conditions internal to the robot and to generate electrical sensor signals in response to sensing said conditions; a signal line for communicating the electrical sensor signals to the master control module; and, a controller incorporated within the master control module for implementing predefined operating modes of the robot in response to said conditions.

Some embodiments include a user control module configured to receive an input command from a user and to generate an electrical input signal in response to the input command; a signal line for communicating the electrical input signal to the master control module; and, a controller incorporated within the master control module for implementing predefined operating modes of the robot in response to the input command. In certain embodiments, the autonomous cleaning robot includes an interface module attached to the chassis and configured to provide an interface between an element external to the robot and at least one element attached to the chassis. In some embodiments, the element external to the robot comprises one of a battery-charging device and a data processor. Some embodiments include an interface module attached to the chassis and configured to provide an interface between an element external to the robot and at least one element attached to the chassis. In some embodiments, the element external to the robot comprises one of a battery-charging device, a data processor, a device for autonomously filling the cleaning fluid storage container with cleaning fluid, and a device for autonomously emptying the waste liquid container.

Certain embodiments of robots of the above aspect include an air jet port, attached to the chassis disposed at a first edge of the cleaning width and configured to blow a jet of air across the cleaning width proximate to the cleaning surface, to thereby force loose particulates on the cleaning surface to move away from the first edge in a direction generally parallel with the transverse axis; an air intake port, attached to the chassis and disposed at a second edge of the cleaning width, opposed from the first edge and proximate to the cleaning surface for suctioning up the loose particulates; a waste storage container configured to receive the loose particulates from the air intake port; and a fan assembly configured to generate a negative pressure within the waste storage container, compartment, or tank. In some embodiments, the fan assembly is further configured to generate a positive air pressure at the air jet port.

In other embodiments the second collecting apparatus includes a squeegee attached to the chassis and formed with a longitudinal ridge disposed proximate to the cleaning surface and extending across the cleaning width for providing a liquid collection volume at a forward edge of the ridge, said longitudinal ridge collecting waste liquid within the liquid collection volume as the chassis is transported in the forward direction; a vacuum chamber partially formed by the squeegee disposed proximate to the longitudinal ridge and extending across the cleaning width; a plurality of suction ports passing through the squeegee for providing a plurality of fluid passages for fluidly connecting the liquid collection volume and the vacuum chamber; and a vacuum for generating a negative air pressure within the vacuum chamber for drawing waste liquid collected within the liquid collection volume into the vacuum chamber. Some additional embodiments also include a waste storage container configured to receive the waste liquid from the vacuum chamber, at least one fluid conduit fluidly connecting the vacuum chamber and the waste storage container, compartment or tank; and a fan assembly configured to generate a negative air pressure within the waste storage container and the vacuum chamber to thereby suction waste liquid up from the cleaning surface and deposit the waste liquid in the waste storage container. Other embodiments of the second collecting apparatus incorporate a squeegee attached to the chassis and formed with a longitudinal ridge disposed proximate to the cleaning surface and extending across the cleaning width for providing a liquid collection volume at a forward edge of the ridge, said longitudinal ridge collecting waste liquid within the liquid collection volume as the chassis is transported in the forward direction; a vacuum chamber partially formed by the squeegee disposed proximate to the longitudinal ridge and extending across the cleaning width; a plurality of suction ports passing through the squeegee for providing a plurality of fluid passages for fluidly connecting the liquid collection volume and the vacuum chamber; and a vacuum for generating a negative air pressure within the vacuum chamber for drawing waste liquid collected within the liquid collection volume into the vacuum chamber.

Still other embodiments of the above aspect include a waste storage tank (or compartment) configured to receive the waste liquid from the vacuum chamber, at least one fluid conduit fluidly connecting the vacuum chamber and the waste storage container or tank; and, a fan assembly configured to generate a negative air pressure within the waste storage container and the vacuum chamber to thereby suction waste liquid from the cleaning surface and deposit the waste liquid in the waste storage container or tank. In some embodiments, the fan assembly is configured to generate a positive air pressure at the air jet port.

In another aspect, the invention relates to an autonomous cleaning robot for transporting cleaning elements over a cleaning surface including a chassis, supported in rolling contact with the cleaning surface for transporting the chassis in a forward direction defined by a fore-aft axis, the chassis being further defined by a transverse axis; a first cleaning zone comprising cleaning elements attached to the chassis and arranged to collect loose particulates from the cleaning surface across a cleaning width, the cleaning width being disposed generally perpendicular with the fore-aft axis; a second cleaning zone comprising cleaning elements attached to the chassis and arranged to apply a cleaning fluid onto the cleaning surface and to collect a waste liquid from the cleaning surface across the cleaning width, said waste liquid comprising the cleaning fluid plus any contaminants removed from the cleaning surface by the cleaning fluid; and a motive drive subsystem controlled by a master control module and powered by a power module, the motive drive subsystem, master control module and power module each being electrically interconnected and attached to the chassis configured to autonomously transporting the robot over the cleaning surface and to clean the cleaning surface. In some embodiments of this aspect, the robot is configured with a circular cross-section having a vertical center axis and wherein said fore-aft axis, said transverse axis and said vertical axis are mutually perpendicular and wherein the motive drive subsystem is configured to rotate the robot about the center vertical axis for changing the orientation of the forward travel direction.

In another aspect, the invention relates to a surface cleaning apparatus having a chassis defined by a fore-aft axis and a perpendicular transverse axis, the chassis being supported for transport over the surface along the fore-aft axis, the chassis including a first collecting apparatus attached thereto and configured to collect loose particulates from the surface over a cleaning width disposed generally parallel with the transverse axis, the first collecting apparatus including an air jet port configured to expel a jet of air across the cleaning width; an air intake port configured to draw air and loose particulates in; wherein the air jet port and the air intake port are disposed at opposing ends of the cleaning width with the air jet port expelling the jet of air generally parallel with the surface and generally directed toward the air intake port. In an embodiment of the above aspect, the first collecting apparatus further includes a channel formed with generally opposed forward and aft edges, extending generally parallel with the transverse axis across the cleaning width, and generally opposed left and right edges, extending generally orthogonal to said forward and aft edges; wherein the air jet port is disposed at one of said left and right edges and the air intake port is disposed at the other of said left and right edges. In other embodiments, the surface cleaning apparatus further includes a first compliant doctor or air flow guide blade disposed across the cleaning width and fixedly attached to a bottom surface of the chassis proximate to said aft edge and extending from said bottom surface to the surface for guiding the jet of air and loose particulates across the cleaning width.

In other embodiments of the above aspect, the surface cleaning apparatus further includes a second compliant doctor or air flow guide blade fixedly attached to said bottom surface and extending from said bottom surface to the surface, for guiding the jet of air and loose particulates into the air intake port. In still other embodiments, the apparatus includes a rotary fan motor having a fixed housing and a rotating shaft extending therefrom; a fan impeller configured to move air when rotated about a rotation axis, said fan impeller being fixedly attached to the rotating shaft for rotation about the rotation axis by the fan motor; a housing for housing the fan impeller in a hollow cavity formed therein and for fixedly supporting the motor fixed housing thereon, the housing being further configured with an air intake port through which air is drawn in to the cavity, and an air exit port through which air is expelled out of the cavity when the impeller is rotated; and a first fluid conduit fluidly connected between the fan air intake port and the air intake port of said first collecting apparatus; therein each of the elements is attached to the chassis. In some embodiments, the apparatus includes a waste storage container attached to the chassis and fluidly interposed within said first fluid conduit between the fan air intake port and the air intake port. In some embodiments, the waste storage container is configured to be removable from the chassis by a user and to be emptied by the user.

Still other embodiments include an air filter element interposed within said first fluid conduit between the waste storage container and the fan air intake port for filtering loose contaminates from air being drawn in through the fan air intake port, and may also include a second fluid conduit fluidly connected between the fan exit port and the air jet port of said first collecting apparatus. In other embodiments, the surface cleaning apparatus further includes a second collecting apparatus attached to the chassis and disposed aft of the first collecting apparatus for collecting liquid from the surface over the cleaning width. In some embodiments, the second collecting zone includes a squeegee fixedly attached to the chassis aft of the first collecting apparatus and extending from a bottom surface of the chassis to the surface across the cleaning width for collecting liquid in a liquid collection volume formed between the squeegee and the surface, the squeegee further forming a vacuum chamber and providing a plurality of suction ports disposed across the cleaning width and fluidly connecting the vacuum chamber and the liquid collection volume; and a vacuum for generating a negative air pressure inside the vacuum chamber to thereby draw liquid into the vacuum chamber through the plurality of suction ports fluidly connected with the collection volume.

Other embodiments of the surface cleaning apparatus of the above aspect include a rotary fan motor having a fixed housing and a rotating shaft extending therefrom; a fan impeller configured to move air when rotated about a rotation axis, said fan impeller being fixedly attached to the rotating shaft for rotation about the rotation axis by the fan motor; a housing for housing the fan impeller in a hollow cavity formed therein and for fixedly supporting the motor fixed housing thereon, the housing being further configured with an air intake port through which air is drawn in to the cavity, and an air exit port through which air is expelled out of the cavity when the impeller is rotated; a first fluid conduit fluidly connected between the fan air intake port and the air intake port of said first collecting apparatus; and a third fluid conduit fluidly connected between the fan air intake port and the vacuum chamber; wherein these elements are attached to the chassis. The surface cleaning apparatus may also include a second fluid conduit fluidly connected between the fan exit port and the air jet port of said first collecting apparatus, and/or a waste storage container or tank attached to the chassis and configured to store the liquid collected from the surface. Still other embodiments utilize a waste storage container attached to the chassis and configured to store the liquid collected from the surface, said waste storage container or tank being fluidly interposed within said third fluid conduit. In some embodiments, the cleaning apparatus includes a waste storage container attached to the chassis and configured to store the liquid collected from the surface, said waste storage container being fluidly interposed within said first and said third fluid conduits. In certain cases, said waste storage container or tank includes a sealed waste container for storing loose particulates collected by the first collecting apparatus and for storing liquid collected by the second collecting apparatus and having at least one access port formed therein for emptying waste from the container; and a plenum incorporated into a top wall of the sealed container such that the plenum is disposed vertically above the sealed waste container during operation of the cleaning apparatus; and wherein the plenum is configured with ports for fluidly interposing within each of said first, said second and said third fluid conduits.

In some embodiments, the waste storage container is configured to be removable from the chassis by a user and to be emptied by the user. Certain other embodiments include a cleaning fluid applicator assembly, attached to the chassis between the first collecting apparatus and the second collecting apparatus for applying a cleaning fluid onto the surface across the cleaning width; and a sealed cleaning fluid storage container or tank for holding a supply of the cleaning fluid therein the storage container including at least one access port formed therein for filling the container with the cleaning fluid. In other embodiments, said sealed waste container and said sealed cleaning fluid container are integrated into a liquid storage container module and wherein the integrated liquid storage container module is configured to be removable from the chassis by a user for filling with cleaning fluid and for emptying waste therefrom. In some embodiments, the surface cleaning apparatus further includes a smearing element attached the chassis aft of the liquid applicator assembly and configured to smear the cleaning fluid across the cleaning width; and a scrubbing element, scrub brush, wiper, or wipe cloth attached to the chassis aft of the smearing element or spreader brush for scrubbing the surface across the cleaning width. In some embodiments, the surface cleaning apparatus further comprises a motive drive subsystem controlled by a master control module and power by a power module, each attached to the chassis, for autonomously transporting the surface cleaning apparatus over the surface. A pad, cloth, or other absorbent wiper extending essentially across the cleaning width may be placed before or after the cleaning head to prepare the surface or absorb wetness behind the cleaning head as appropriate. The entire cleaning head is formed from materials that withstand water and temperature extremes sufficient for the cleaning head to be "dishwasher safe."

In other embodiments, the surface cleaning apparatus further includes a sensor module configured to sense conditions and to generate electrical sensor signals in response to sensing said conditions; a signal line for communicating the electrical sensor signals to the master control module; and a controller incorporated within the master control module for implementing predefined operating modes in response to sensing said conditions. Still other embodiments include a motive drive subsystem controlled by a master control module and power by a power module, each attached to the chassis, for autonomously transporting the surface cleaning apparatus over the surface. Other embodiments of the surface cleaning apparatus further include a sensor module configured to sense conditions and to generate electrical sensor signals in response to sensing said conditions; a signal line for communicating the electrical sensor signals to the master control module; and a controller incorporated within the master control module for implementing predefined operating modes in response to sensing said conditions.

In yet another aspect, the invention relates to a surface cleaning apparatus having an autonomous transport drive subsystem controlled by a master control module, a sensor module for sensing conditions, a power module and cleaning elements all supported on a chassis and powered by the power module for moving the chassis over the surface in accordance with predefined operating modes and in response to conditions sensed by the sensor module, the elements being configured with a cleaning width disposed generally orthogonal to a forward transport direction and wherein the cleaning elements comprise; a first collecting apparatus for collecting loose particulates from the surface across the cleaning width, said first collecting apparatus A being positioned on the chassis to advance over the surface first as the chassis is transported in a forward transport direction; a cleaning fluid applicator for applying cleaning fluid onto the surface across the cleaning width, said cleaning fluid applicator being positioned on the chassis to advance over the surface second as the chassis is transported in a forward transport direction; a smearing element for smearing the cleaning fluid applied onto the surface across the cleaning width, said smearing element or spreader brush being positioned on the chassis to advance over the surface third as the chassis is transported in a forward transport direction; an active scrubbing element for actively scrubbing the surface across the cleaning width, said active scrubbing element being positioned on the chassis to advance over the surface fourth as the chassis is transported in a forward transport direction; a second collecting apparatus for collecting waste liquid from the surface, said second collecting apparatus being positioned on the chassis to advance over the surface fifth as the chassis is transported in a forward transport direction; and, an integrated storage container or tank module comprising a waste storage container for storing loose particulates collected by said first collecting apparatus and waste liquid collected by said second collecting apparatus, a cleaning fluid supply container for storing a supply of the cleaning fluid, and wherein the integrated storage container or tank module is configured to be removed from the chassis by a user, filled with cleaning fluid and emptied of waste and then reinstalled onto the chassis by the user.

In yet an additional aspect, the invention relates to a surface cleaning apparatus having a chassis defined by a fore-aft axis and a perpendicular transverse axis for supporting cleaning elements thereon and for transporting the cleaning elements over the surface along the fore-aft axis and wherein the cleaning elements are disposed to clean across a cleaning width disposed generally orthogonal to the fore-aft axis with a left end and a right end defining opposing edges of the cleaning width; and a liquid applicator comprising at least one nozzle disposed at one of said left end and said right end for ejecting cleaning fluid therefrom, said cleaning fluid being ejected with sufficient volume and pressure to distribute cleaning fluid across the cleaning width. In certain embodiments of the above aspect, the cleaning fluid comprises water and/or any one of soap, solvent, fragrance, disinfectant, emulsifier, drying agent and abrasive particulates.

In some embodiments of the above aspect, the apparatus includes a smearing element attached to the chassis aft of the position of the at least one nozzle and extending from the chassis to the surface across the cleaning width for smearing the cleaning fluid, and may include a scrubbing element attached to the chassis aft of the position of the at least one nozzle and extending from the chassis to the surface across the cleaning width for scrubbing the surface. In some embodiments, the scrubbing element is attached to the chassis aft of the position of the at least one nozzle and extending from the chassis to the surface across the cleaning width for scrubbing the surface. The cleaning apparatus may also include a collecting apparatus attached to the chassis aft of the position of the at least one nozzle and extending from the chassis to the surface across the cleaning width for collecting waste liquid from the surface. In some embodiments, the liquid applicator a first nozzle disposed at the left end for ejecting cleaning fluid therefrom, said cleaning fluid being ejected from the first nozzle with sufficient volume and pressure to distribute cleaning fluid across the cleaning width, a second nozzle disposed at the right end for ejecting cleaning fluid therefrom, said cleaning fluid being ejected from the second nozzle with sufficient volume and pressure to distribute cleaning fluid across the cleaning width; and wherein the first nozzle and the second nozzle are co-located on the fore-aft axis.

In certain embodiments of the above aspect each of the first and second nozzles ejects a discrete burst cleaning fluid in accordance with a burst frequency and wherein the burst frequency of the first nozzle is substantially opposite in phase with respect to the burst frequency of the second nozzle. In some embodiments, the surface cleaning apparatus also includes an autonomous transport drive subsystem, a sensor module for sensing conditions and a power module all supported by the chassis and controlled by a master control module to autonomously move the cleaning elements substantially over the entire surface over the surface in accordance with predefined operating modes and in response to conditions sensed by the sensor module. Still other embodiments utilize an autonomous transport drive subsystem, a sensor module for sensing conditions and a power module all supported by the chassis and controlled by a master control module to autonomously move the cleaning elements substantially over the entire surface over the surface in accordance with predefined operating modes and in response to conditions sensed by the sensor module.

Other embodiments of the above aspect include an autonomous transport drive subsystem, a sensor module for sensing conditions and a power module all supported by the chassis and controlled by a master control module to autonomously move the cleaning elements substantially over the entire surface over the surface in accordance with predefined operating modes and in response to conditions sensed by the sensor module. In some embodiments, the master control module is configured to vary the burst frequency in accordance with a desired rate for applying cleaning fluid onto surface, and in some cases, the master control module is configured to vary the burst frequency to apply cleaning fluid onto the surface at a substantially uniform volume of approximately 2 ml per square foot.

In some embodiments, the surface cleaning apparatus also includes a liquid storage container, carried on the chassis, for storing a supply of the cleaning fluid therein; a diaphragm pump assembly configured with a first a first pump portion for drawing cleaning fluid from the container and for delivering the cleaning fluid to the at least one nozzle; and a mechanical actuator for mechanically actuating the first pump portion. Still other embodiments include an autonomous transport drive subsystem, a sensor module for sensing conditions and a power module all supported by the chassis and controlled by a master control module to autonomously move the cleaning elements substantially over the entire surface over the surface in accordance with predefined operating modes and in response to conditions sensed by the sensor module; a liquid storage container, carried on the chassis, for storing a supply of the cleaning fluid therein; a diaphragm pump assembly having a first a first pump portion for drawing cleaning fluid from the container and for delivering the cleaning fluid to the first nozzle and a second pump portion for drawing cleaning fluid from the container and for delivering the cleaning fluid to the second nozzle; and a mechanical actuator for mechanically actuating the first pump portion and the second pump portion.

In certain embodiments of the above aspect, the diaphragm pump assembly includes a flexible element mounted between a non-flexible upper chamber element and a non-flexible lower chamber element, said flexible element being formed with a first pump chamber and a first actuator nipple attached thereto and a second pump chamber and a second actuator nipple attached thereto; an actuator link pivotally attached to the pump assembly for pivoting between a first actuator position and a second actuator position, the actuator link being fixedly attached to each of said first and said second actuator nipples and wherein movement of the actuator link toward the first actuator position decreases the volume the first pump chamber and increases the volume of the second pump chamber and further wherein movement of the actuator link toward the second actuator position increases the volume the first pump chamber and decreases the volume of the second pump chamber; a cam element configured with a circumferential cam profile and supported to move the actuator link between the first actuator position and the second actuator position; and a cam rotary drive, controlled by the master controller, for rotating the cam element in accordance with a cam rotary drive pattern.

In another aspect, the invention relates to a method for cleaning a surface with a cleaning apparatus, the method including the steps of transporting a chassis over the surface in a forward transport direction defined by a defined by a fore-aft axis, said chassis including cleaning elements supported thereon, and wherein the cleaning elements have a cleaning width disposed generally orthogonal to the fore-aft axis and wherein the cleaning width has a left end and an opposing right end; and ejecting a volume of cleaning fluid from a first nozzle attached to the chassis at one of said left end and said right end, said first nozzle being configured to eject cleaning fluid therefrom, said cleaning fluid being ejected with sufficient volume and pressure to distribute cleaning fluid across the cleaning width. In certain embodiments, the method may also include ejecting a volume of cleaning fluid from a second nozzle attached to the chassis at the other of said left end and said right end and co-located on the fore-aft axis with respect to the first nozzle, said second nozzle being configured to eject cleaning fluid therefrom, said cleaning fluid being ejected with sufficient volume and pressure to distribute cleaning fluid across the cleaning width; and ejecting cleaning fluid from each of the first nozzle and the second nozzle in discrete bursts of cleaning fluid in accordance with a burst frequency and wherein the burst frequency of the first nozzle is substantially opposite in phase with respect to the burst frequency of the second nozzle.

In still other embodiments, the method includes smearing the cleaning fluid across the cleaning width using a smearing element or spreader brush attached to the chassis aft of the colocated position of the first nozzle and the second nozzle, said smearing element extending across the cleaning width. Other embodiments may include scrubbing the surface across the cleaning width using a scrubbing element, scrub brush, wiper, or wipe cloth attached to the chassis aft of the co-located position of the first nozzle and the second nozzle, said scrubbing element extending across the cleaning width. Still other embodiments include collecting waste liquid from the surface across the cleaning width using a collecting apparatus attached to the chassis aft of the co-located position of the first nozzle and the second nozzle, said collecting apparatus extending across the cleaning width. In some embodiments of the method of the above aspect, the chassis further includes an autonomous transport drive subsystem, a sensor module for sensing conditions and a power module all supported thereon and controlled by a master control module and wherein transporting the chassis over the surface further includes controlling the transport drive subsystem in accordance with predefined operating modes and in response to conditions sensed by the sensor module to transport the cleaning elements substantially over the entire surface.

According to one aspect of the present invention, a surface treatment robot includes a robot body having an outer perimeter formed substantially as a shape of constant width, driven forward by at least one circulating member, and a dispensed material compartment that holds material to be dispensed by the robot. A wet cleaning head that employs one or more wet cleaning member(s) to clean along a cleaning width line of the robot with the assistance of dispensed material, the wet cleaning head defining a cleaning width. A waste material compartment holds material picked up by the robot. Each of the dispensed material compartment and waste material compartment being shaped and positioned to place the center of gravity of the dispensed material compartment volume less than ½ of the cleaning width from the center of gravity of the waste material compartment volume.

For example, one embodiment of the robot has a cleaning width of about 30 cm, and each of these centers of gravity is less than 15 cm from the other. The center of gravity of the volume is readily understood as the center of the empty volume; however, it may also be understood as the center of gravity of a body of fluid filling the volume (most fluids discussed herein would approximate the specific gravity of water). Surface treatment includes cleaning and other treatments as discussed herein. The shapes of constant width are also defined herein, noting that not all such shapes are regular, and that one embodiment of the robot is substantially cylindrical. The wet cleaning member includes brushes, sponges, wipers, and the like. A circulating member would include a rotating wheel, a rotating brush, and/or one or more circulating belts or webs. The material need not be wet, although most would be.

Optionally, each of the dispensed material compartment and waste material compartment is shaped and positioned to place the combined center of gravity of the dispensed material compartment volume and the waste material compartment volume less than ½ the cleaning width from a center of the at least one circulating member. The center of a rotating brush would be the midpoint along the axis, the center of a rotating belt would be along the midpoint of the contact area with the surface. Further optionally, each of the dispensed material compartment and waste material compartment are shaped and positioned to place of the center of gravity of the dispensed material compartment volume substantially directly above or below the center of gravity of the waste material compartment volume. "Substantially directly" means, in one instance, above or below one another and vertical normals from each center of gravity are within ¼ of the cleaning width from one another.

According to another aspect of the invention, a surface treatment robot includes a robot body having an outer perimeter formed substantially as a shape of constant width, and at least two circulating drive members that drive the robot body forward and steer the robot body. A dispensed fluid compartment that holds fluid to be dispensed by the robot; and a powered scrubber drives at least one scrubbing element to clean, with the assistance of dispensed fluid, substantially along a line of maximum width of the shape of constant width, the driven scrubbing element extending to substantially within 1 cm of a tangential edge of the robot body. By placing the scrubber along the line of maximum width of a constant width shape such as a cylinder, the edge of the cleaning area can be brought to the edge of the robot, permitting the robot to edge clean within 1 cm of a wall. Placing the wheels along the line of maximum width would prevent this. Again, circulating includes rotating members such as wheels or brushes, but also circulating belts or webs.

If the cleaning head is along the maximum width, the widest cleaning head can be obtained by placing the least two circulating drive members are placed along a line at which the width of the robot is less than the maximum width of the robot. Optionally, the robot also includes a wet vacuum that picks up the dispensed fluid after the scrubbing element has cleaned with the assistance of the dispensed fluid, and a waste fluid compartment that holds fluid picked up by the wet vacuum unit. The waste fluid compartment and dispensed fluid compartment may be integral compartments within a same fluid tank module that is readily removable as a module from the robot body.

According to another aspect of the invention, a surface treatment robot includes robot body having an outer perimeter formed substantially as a shape of constant width, driven forward by at least one rotating member, and a dispensed fluid compartment that holds fluid to be dispensed by the robot. A powered wet cleaning head employs at least one powered wet cleaning member to clean a cleaning width along a cleaning width line of the robot with the assistance of dispensed fluid. A waste material compartment holds waste fluid picked up by the robot. The wet cleaning head has a cleaning width with respect to total robot mass of the robot body, dispensed material compartment when empty, wet cleaning head, and waste material compartment when full of waste fluid picked up by the robot, of more than or equal to three centimeters of cleaning width per kilogram of total robot mass.

An example robot according to the invention has a cleaning width of about 30 cm, and a mass of about 3-5 kg. Such a robot has about 10 cm to about 6 cm of powered cleaning width per kilogram of fully loaded robot, a less efficient version, but still acceptable, could be 3 cm of powered cleaning width per kilogram of robot mass. This cleaning width permits sufficient work to be done per unit time, and the amount of weight is sufficient to provide enough traction for the cleaning width. Moreover, the robot does not become excessively large or inefficient by limiting the amount of weight. This combination provides the best balance of cleaning time versus maneuverability versus manageability.

Optionally, the powered wet cleaning head includes a powered circulating scrubber that scrubs the surface to be cleaned along a cleaning width line of the robot with the assistance of dispensed fluid. Further, the powered wet cleaning head may include a powered wet vacuum that picks up the waste fluid. Each of these contributes to the cleaning width, and may contribute either to drag or to motive force. The weight placed on the cleaning width may be limited to reduce or otherwise limit the amount of drag.

According to yet another aspect of the invention, a surface treatment robot includes a robot body having an outer perimeter formed substantially as a shape of constant width, driven forward by at least one rotating member, and a wet cleaning head that employs at least one circulating wet cleaning member to clean a cleaning width along a cleaning width line of the robot with the assistance of dispensed fluid. A tank that accommodates a fluid compartment stores fluid, and the robot body includes a mount that receives the tank. A fluid connection between the tank and the robot body and a vacuum connection between the tank and the robot body are provided. A coupling mechanically engages the tank to the robot body, the engagement of the coupling simultaneously sealing both the fluid connection and the vacuum connection.

With this construction, the robot may be prepared for use with one coupling, which completes form of the robot, the mechanical integrity of the robot, the vacuum connection (and seal) and fluid connection (and seal).

Optionally, the tank forms at least one quarter of the outer profile of the robot, wherein engagement of the coupling engagement of completes a substantially smooth outer profile of the robot. Alternatively, the tank forms at least one quarter of the outer peripheral surface of the robot including a part of the perimeter of the shape of constant width, and wherein engagement of the coupling engagement of substantially completes the perimeter of the shape of constant width. In either case, the robot is permitted to autonomously turn to escape confined spaces and corners by virtue of the outer profile, and space is efficiently maximized by avoiding the use of double and triple walls to house the tank within the robot body.

In one embodiment, a method for controlling a mobile robot may include spinning a brush in a first direction when the mobile robot moves forward; and deactivating the sweeping brush when the mobile robot moves in a reverse direction. In accordance with another embodiment, a method for controlling a mobile robot may include distributing fluid via a pump when the mobile robot operates in a cleaning mode; and deactivating the pump when the mobile robot is not moving forward. In accordance with yet another embodiment, a method for controlling a mobile robot may include traversing a cleaning surface and distributing cleaning fluid on the cleaning surface during a cleaning cycle; and traversing the cleaning surface without distributing the cleaning fluid on the cleaning surface during a drying cycle. Also, the method may further include transitioning from the cleaning cycle to the drying cycle when a power supply voltage declines; or applying vacuum suction to the cleaning surface when the mobile robot operates in the drying mode. In accordance with another embodiment, a method for sensing fluid in a mobile robot having at least first and second electrodes may include swapping polarity between the first and second electrode; detecting a resistance between the first and second electrodes; and determining whether fluid is present based on the detected resistance between the first and second electrodes.

In another aspect, the invention relates to a liquid cleaner utilized with a robot cleaner, wherein the cleaner includes alkyl polyglucoside (for example, at 1-3% concentration) and tetrapotassium ethylenediamine-tetraacetate (tetrapotassium EDTA) (for example, at 0.5-1.5% concentration).

In another aspect, the invention relates to a tire material including a chloroprene homopolymer stabilized with thiuram disulfide black with a density of 14-16 pounds per cubic foot, or approximately 15 pounds per cubic foot foamed to a cell size of 0.1 mm plus or minus 0.02 mm. In certain embodiments, the tire has a post-foamed hardness of about 69 to 75 Shore 00. In other embodiments of the above aspects, the invention relates to tires, including, for example, those made of neoprene and chloroprene, and other closed cell rubber sponge materials. Tires made of polyvinyl chloride (PVC) and acrylonitrile-butadiene (ABS) (with or without other extractables, hydrocarbons, carbon black, and ash) may also be used.

BRIEF DESCRIPTION OF THE DRAWINGS

The features of the present invention will best be understood from a detailed description of the invention and a preferred embodiment thereof selected for the purposes of illustration and shown in the accompanying drawings in which.

DETAILED DESCRIPTION OF THE EMBODIMENTS

Figure 1:
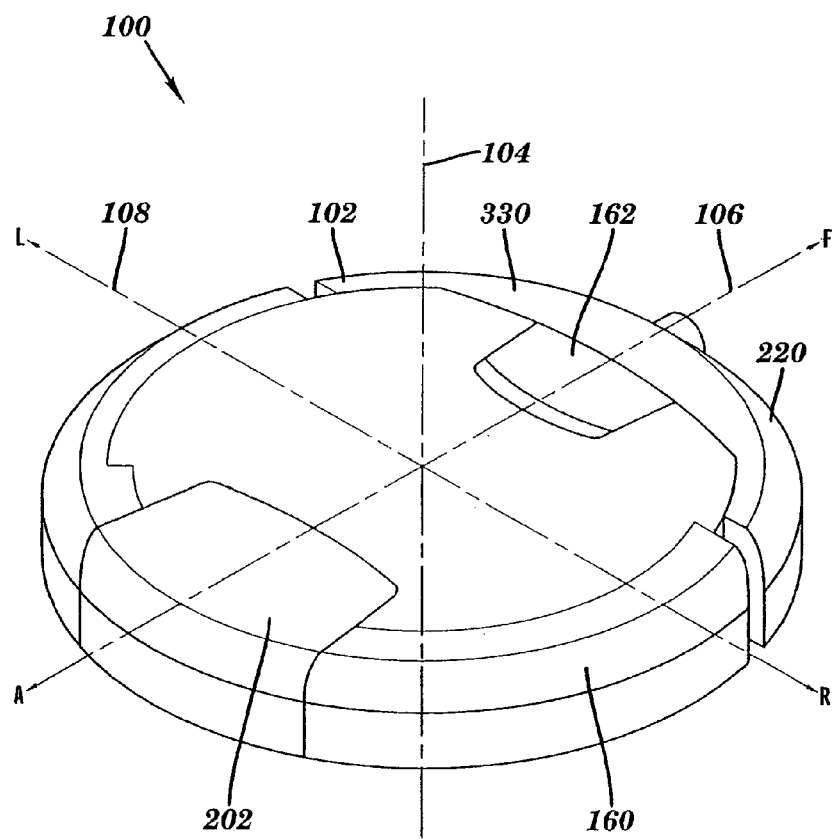
FIG. 1 depicts an isometric view of a top surface of an autonomous cleaning robot according to the present invention.

Referring now to the drawings where like reference numerals identify corresponding or similar elements throughout the several views, FIG. 1 depicts an isometric view showing the external surfaces of an autonomous cleaning robot 100 according to a preferred embodiment of the present invention. The robot 100 is configured with a cylindrical volume having a generally circular cross-section 102 with a top surface and a bottom surface that is substantially parallel and opposed to the top surface. The circular cross-section 102 is defined by three mutually perpendicular axes; a central vertical axis 104, a fore-aft axis 106, and a transverse axis 108. The robot 100 is movably supported with respect to a surface to be cleaned, hereinafter, the cleaning surface. The cleaning surface is substantially horizontal.

The robot 100 is generally supported in rolling contact with the cleaning surface by a plurality of wheels or other rolling elements attached to a chassis 200. In a preferred embodiment, the fore-aft axis 108 defines a transport axis along which the robot is advanced over the cleaning surface. The robot is generally advanced in a forward or fore travel direction, designated F, during cleaning operations. The opposite travel direction, (i.e. opposed by 180°), is designated A for aft. The robot is generally not advanced in the aft direction during cleaning operations but may be advanced in the aft direction to avoid an object or maneuver out of a corner or the like. Cleaning operations may continue or be suspended during aft transport. The transverse axis 108 is further defined by the labels R for right and L for left, as viewed from the top view of FIG. 1. In subsequent figures, the R and L direction remain consistent with the top view, but may be reversed on the printed page. In a preferred embodiment of the present invention, the diameter of the robot circular cross-section 102 is approximately 370 mm (14.57 inches) and the height of the robot 100 above the cleaning surface of approximately 85 mm (3.3 inches). However, the autonomous cleaning robot 100 of the present invention may be built with other cross-sectional diameter and height dimensions, as well as with other cross-sectional shapes, e.g. square, rectangular and triangular, and volumetric shapes, e.g. cube, bar, and pyramidal.

The robot 100 may include a user input control panel, not shown, disposed on an external surface, e.g. the top surface, with one or more user manipulated actuators disposed on the control panel. Actuation of a control panel actuator by a user generates an electrical signal, which is interpreted to initiate a command. The control panel may also include one or more mode status indicators such as visual or audio indicators perceptible by a user. In one example, a user may set the robot onto the cleaning surface and actuate a control panel actuator to start a cleaning operation. In another example, a user may actuate a control panel actuator to stop a cleaning operation.

Figure 21:
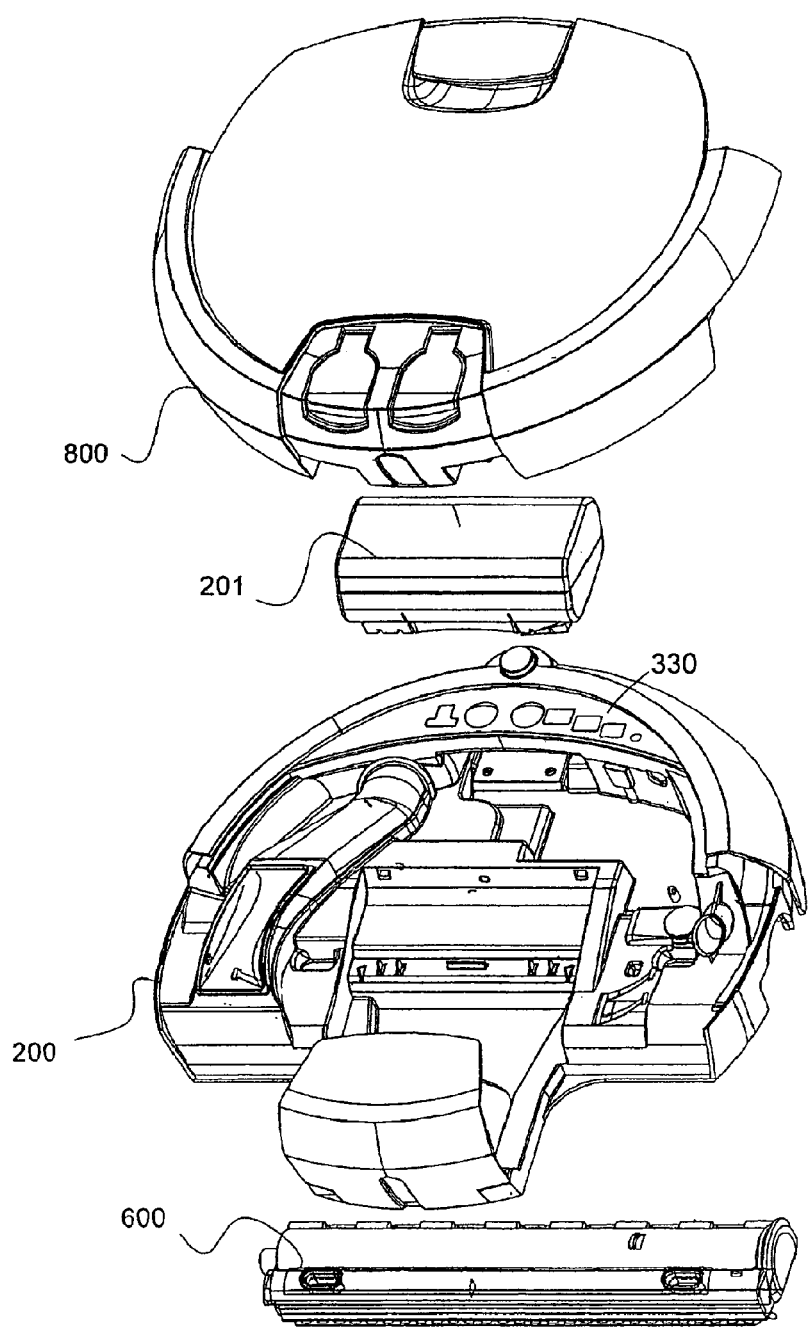
FIG. 21 depicts an exploded view of a robot chassis having robot subsystems attached thereto according to an embodiment of the present invention.

FIG. 21 shows the four main modules substantially as they are normally arranged: a tank 800, a top, a battery 201, a robot body 200, and a cleaning head 600 within the robot body 200. The robot itself supports the battery 201 in a battery socket, and an integrated tank 800 is supported on top of both the robot and the battery 201. The internal lower surface of the tank 800 and the internal upper surface of the robot body 200 are configured to substantially conform with the shape of the battery 201. As discussed herein, the battery 201 may be replaced by levering the tank 800 on its pivot but not necessarily lifting or removing the tank 800. Additionally, as shown in FIG. 21, the cleaning head 600 may be inserted from the right side of the robot in a sliding motion without removing the tank 800 or battery 201, and in this configuration may be removed from the robot body 200 for cleaning in the middle of a cleaning cycle or otherwise. FIG. 21 also shows the control panel 330 for the robot, which is detailed below.

As shown in FIG. 21, the tank 800 has a handle as described herein in detail, which has a detent click lock, slightly lifts from the tank when lifted, and otherwise as described. When the tank 800 is mounted to the body 200, this handle is for the entire robot. When the tank 800 is detached from the robot, this handle is for the tank 800 alone. However, a second handle is formed in the robot body, as shown in FIG. 21, an indentation underneath the control panel 330. Accordingly, when the tanks 800 and the base unit 200 are separated, each has its own handle. When the tanks 800 and base unit 200 are reintegrated, the main handle serves for carrying both. The same handle is both a latch for tank removal when pushed in one direction and an interlock against removal when it is held in the other direction.

Exemplary Cleaning Systems

Figure 2:
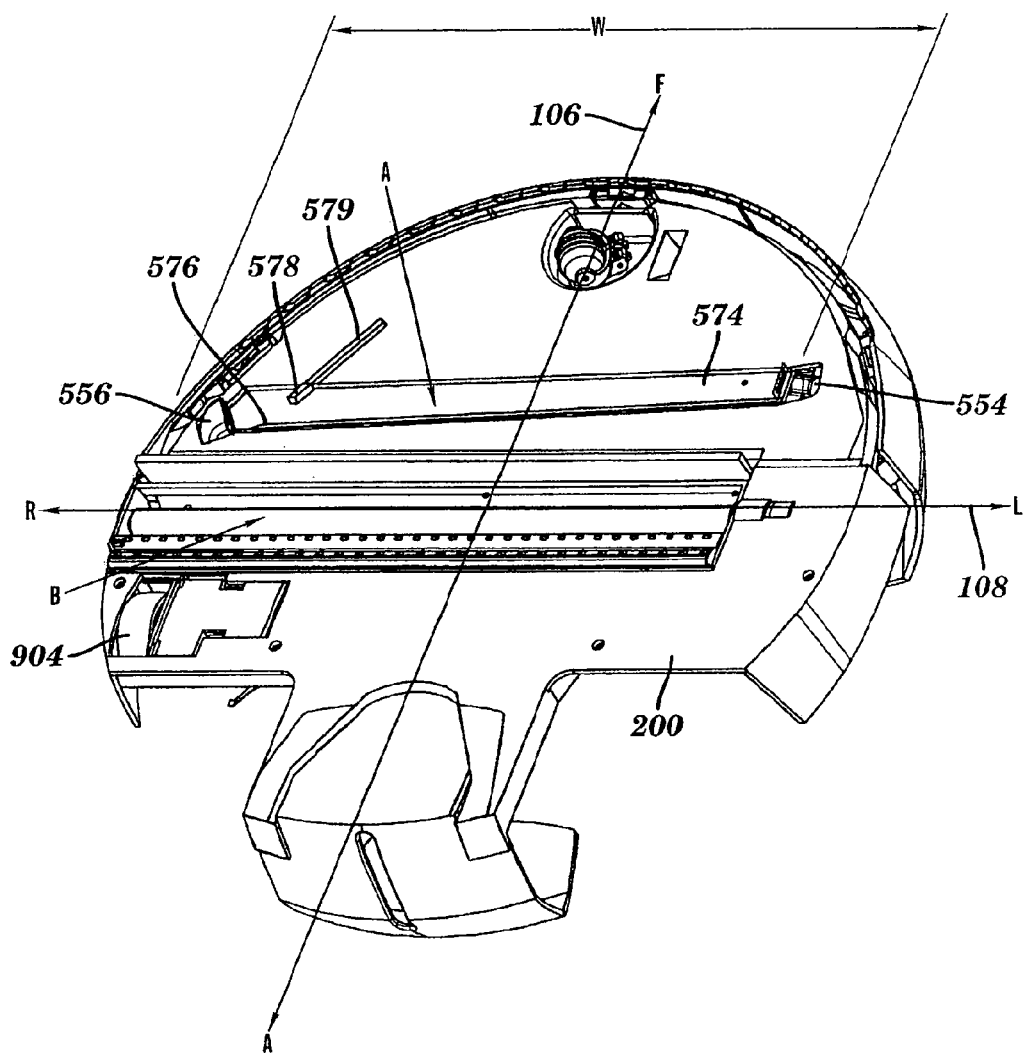
FIG. 2 depicts an isometric view of a bottom surface of a chassis of an autonomous cleaning robot according to the present invention.

Referring now to FIG. 2, the autonomous robot 100 includes a plurality of cleaning modules supported on a chassis 200 for cleaning the substantially horizontal cleaning surface as the robot is transported over the cleaning surface. The cleaning modules extend below the robot chassis 200 to contact or otherwise operate on the cleaning surface during cleaning operations. More specifically, the robot 100 is configured with a first cleaning zone A for collecting loose particulates from the cleaning surface and for storing the loose particulates in a receptacle carried by the robot. The robot 100 is further configured with a second cleaning zone B that at least applies a cleaning fluid onto the cleaning surface. The cleaning fluid may be clean water alone or clean water mixed with other ingredients to enhance cleaning. The application of the cleaning fluid serves to dissolve, emulsify or otherwise react with contaminants on the cleaning surface to separate contaminants therefrom. Contaminants may become suspended or otherwise combined with the cleaning fluid. After the cleaning fluid has been applied onto the surface, it mixes with contaminants and becomes waste material, e.g. a liquid waste material with contaminants suspended or otherwise contained therein.

The underside of the robot 100 is shown in FIG. 2 which depicts a first cleaning zone A disposed forward of the second cleaning zone B with respect to the fore-aft axis 106. Accordingly, the first cleaning zone A precedes the second cleaning zone B over the cleaning surface when the robot 100 travels in the forward direction. The first and second cleaning zones are configured with a cleaning width W that is generally oriented parallel or nearly parallel with the transverse axis 108. The cleaning width W defines the cleaning width or cleaning footprint of the robot. As the robot 100 advances over the cleaning surface in the forward direction, the cleaning width is the width of cleaning surface cleaned by the robot in a single pass. Ideally, the cleaning width extends across the full transverse width of the robot 100 to optimize cleaning efficiency; however, in a practical implementation, the cleaning width is slightly narrower that the robot transverse width due to spatial constraints on the robot chassis 200.

According to the present invention, the robot 100 traverses the cleaning surface in a forward direction over a cleaning path with both cleaning zones operating simultaneously. In a preferred embodiment, the nominal forward velocity of the robot is approximately 4.75 inches per second however; the robot and cleaning devices may be configured to clean at faster and slower forward velocities. In order to cover a room in adequate time, the range of reasonable velocities is approximately 2 to 10 inches per second. The first cleaning zone A precedes the second cleaning zone B over the cleaning surface and collects loose particulates from the cleaning surface across the cleaning width W. The second cleaning zone B applies cleaning fluid onto the cleaning surface across the cleaning width W. The second cleaning zone may also be configured to smear the cleaning fluid applied onto the cleaning surface to smooth the cleaning fluid into a more uniform layer and to mix the cleaning fluid with contaminants on the cleaning surface. The second cleaning zone B may also be configured to scrub the cleaning surface across the cleaning width. The scrubbing action agitates the cleaning fluid to mix it with contaminants. The scrubbing action also applies a shearing force against contaminants to thereby dislodge contaminants from the cleaning surface. The second cleaning zone B may also be configured to collect waste liquid from cleaning surface across the cleaning width. According to the invention, a single pass of the robot over a cleaning path first collects loose particulates up from the cleaning surface across the cleaning width and thereafter applies a cleaning fluid onto the cleaning surface generally across the cleaning width W to interact with contaminants remaining on the cleaning surface and may further apply a scrubbing action to dislodge contaminants from the cleaning surface. A single pass of the robot 100 over a cleaning path may also smear the cleaning fluid more uniformly on the cleaning surface. A single pass of the robot over a cleaning path may also collect waste liquid up from the cleaning surface. The robot may, however, be designed to leave a certain amount of fluid behind on each pass or on some passes (e.g., to provide time for the cleaning liquid to work on dried material or stubborn stains).

In general, the cleaning robot 100 is configured to clean uncarpeted indoor hard floor surface, e.g. floors covered with tiles, wood, vinyl, linoleum, smooth stone or concrete and other manufactured floor covering layers that are not overly abrasive and that do not readily absorb liquid. Other embodiments, however, may be adapted to clean, process, treat, or otherwise traverse abrasive, liquid-absorbing, and other surfaces. In addition, in a preferred embodiment of the present invention, the robot 100 is configured to autonomously transport over the floors of small enclosed furnished rooms such as are typical of residential homes and smaller commercial establishments. The robot 100 is not required to operate over predefined cleaning paths but may move over substantially all of the cleaning surface area under the control of various transport algorithms designed to operate irrespective of the enclosure shape or obstacle distribution. In particular, the robot 100 of the present invention moves over cleaning paths in accordance with preprogrammed procedures implemented in hardware, software, firmware, or combinations thereof to implement a variety of modes, such as three basic operational modes, i.e., movement patterns, that can be categorized as: (1) a "spot-coverage" mode; (2) a "wall/obstacle following" mode; and (3) a "bounce" mode. In addition, the robot 100 is preprogrammed to initiate actions based upon signals received from sensors incorporated therein, where such actions include, but are not limited to, implementing one of the movement patterns above, an emergency stop of the robot 100, or issuing an audible alert. These operational modes of the robot of the present invention are specifically described in U.S. Pat. No. 6,809,490, by Jones et al., entitled, Method and System for Multi-Mode Coverage for an Autonomous Robot, the entire disclosure of which is herein incorporated by reference it its entirety. However, the present disclosure also describes alternative operational modes.

In one embodiment, the robot 100 is configured to clean approximately 150 square feet of cleaning surface in a single cleaning operation. A larger or smaller tank may permit this to range from 100 square feet to 400 square feet. The duration of the cleaning operation is approximately 45 minutes in certain embodiments. The example of 45 minutes is with a single battery. In embodiments with smaller, larger, or 2 or more batteries on board, the cleaning time may range from about 20 minutes to up to about 2 hours. Accordingly, the robot systems are configured (physically, and as programmed) for unattended autonomous cleaning for 45 minutes or more without the need to recharge a power supply, refill the supply of cleaning fluid or empty the waste materials collected by the robot. Although certain embodiments of the robot are designed for a small area rooms, there is no minimum square footage or cleaning time. A robot according to the invention could be configured with a tank of virtually any size.

Figure 3:
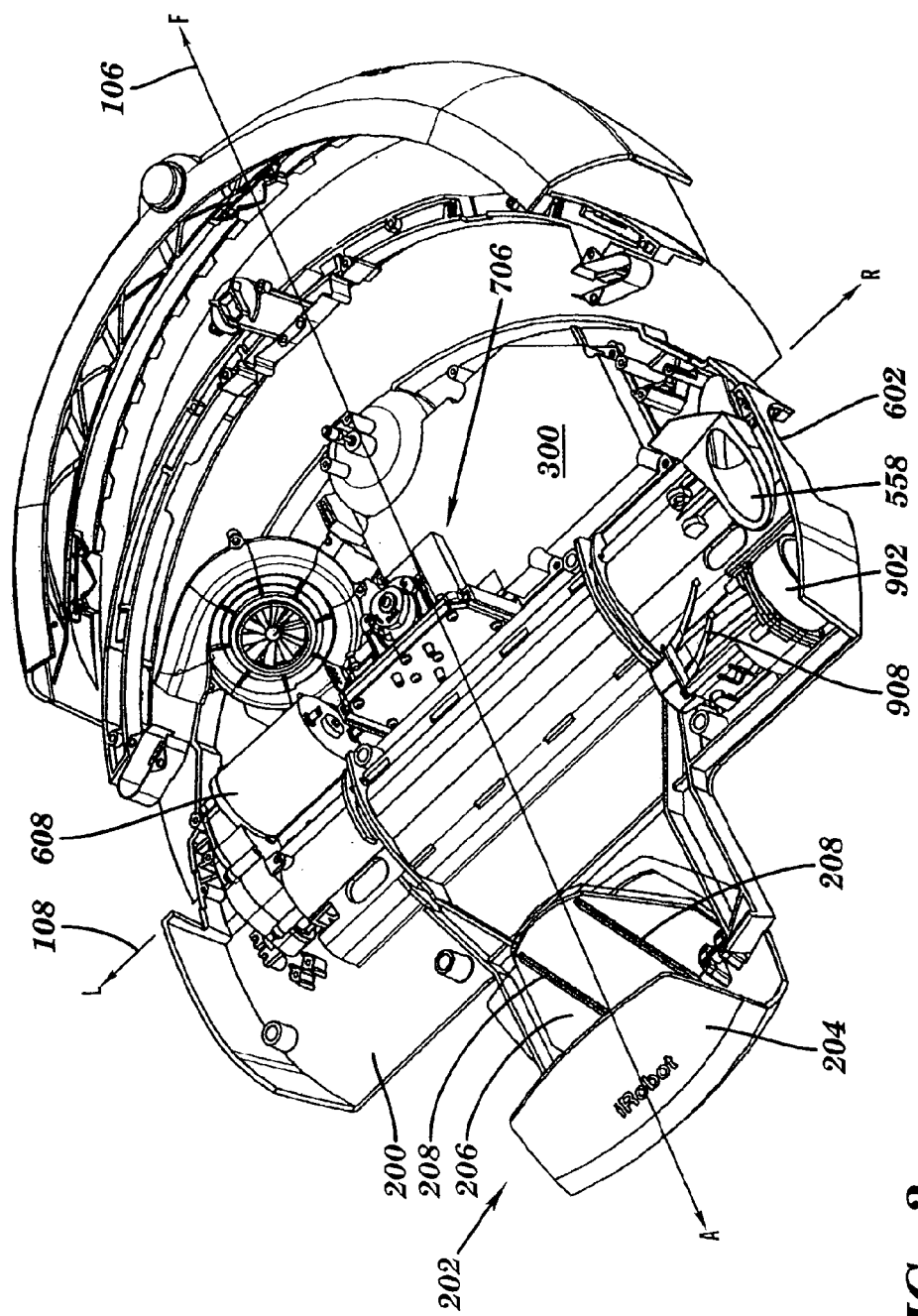
FIG. 3 depicts an exploded view of a robot chassis having robot subsystems attached thereto according to the present invention.
Figure 4:
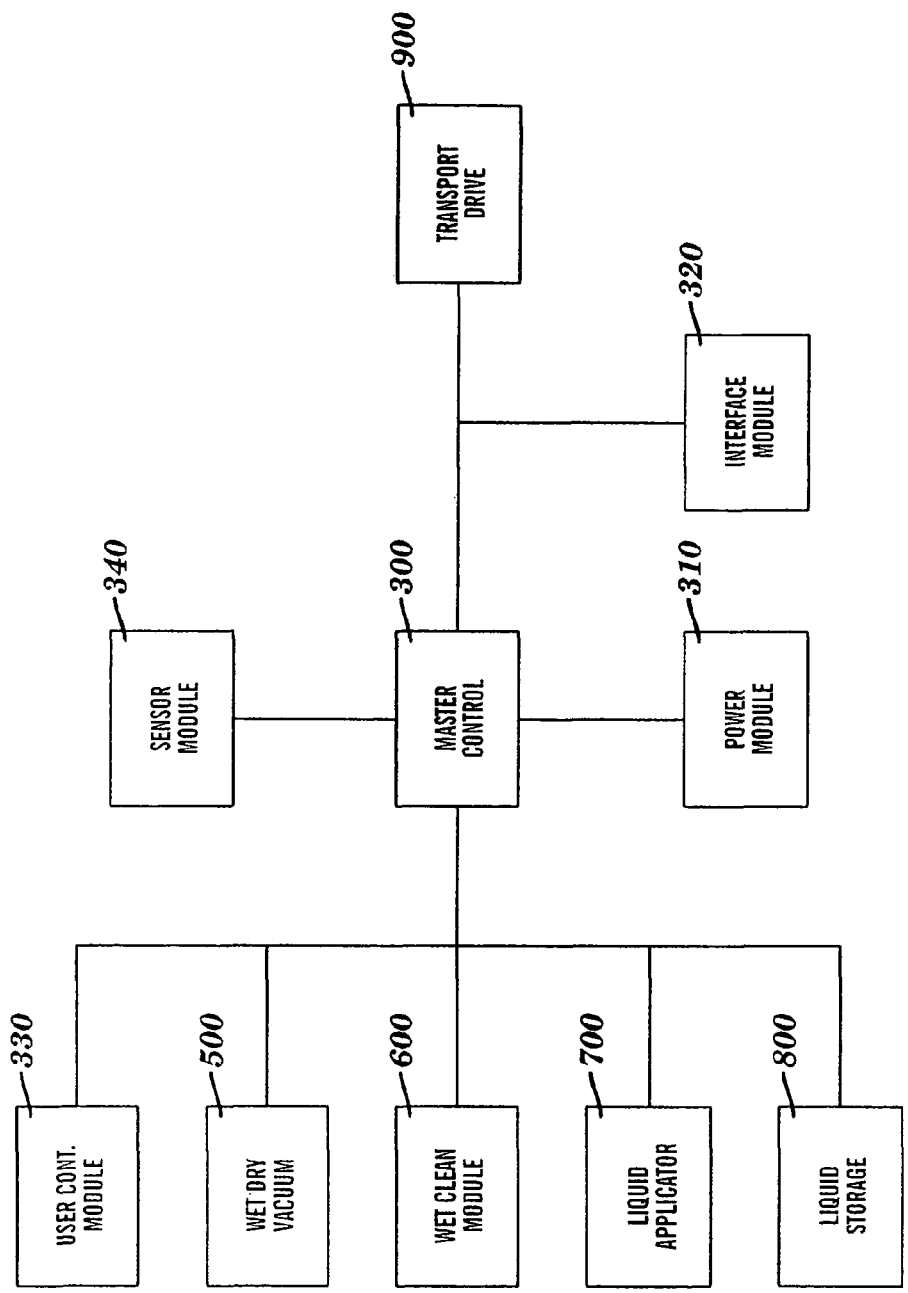
FIG. 4 depicts a schematic block diagram showing the interrelationship of subsystems of an autonomous cleaning robot according to the present invention.

As shown in FIGS. 2 and 3 the robot 100 includes a plurality of subsystems mounted to a robot chassis 200. The major robot subsystems are shown schematically in FIG. 4 which depicts a master control module 300 interconnected for two-way communication with each of a plurality of other robot subsystems. The interconnection of the robot subsystems is provided via network of interconnected wires and or conductive elements, e.g. conductive paths formed on an integrated printed circuit board or the like, as is well known. The master control module 300 at least includes a programmable or preprogrammed digital data processor, e.g. a microprocessor, for performing program steps, algorithms and or mathematical and logical operations as may be required. The master control module 300 also includes a digital data memory in communication with the data processor for storing program steps and other digital data therein. The master control module 300 also includes one or more clock elements for generating timing signals as may be required.

A power module 310 delivers electrical power to all of the major robot subsystems. The power module includes a self-contained power source attached to the robot chassis 200, e.g. a rechargeable battery, such as a nickel metal hydride battery, or the like. In addition, the power source is configured to be recharged by any one of various recharging elements and or recharging modes, or the battery may be replaced by a user when it becomes discharged or unusable. The master control module 300 may also interface with the power module 310 to control the distribution of power, to monitor power use and to initiate power conservation modes as required.

The robot 100 may also include one or more interface modules or elements 320. Each interface module 320 is attached to the robot chassis to provide an interconnecting element or port for interconnecting with one or more external devices. Interconnecting elements and ports are preferably accessible on an external surface of the robot. The master control module 300 may also interface with the interface modules 320 to control the interaction of the robot 100 with an external device. In particular, one interface module element is provided for charging the rechargeable battery via an external power supply or power source such as a conventional AC or DC power outlet. Another interface module element may be configured for one or two way communications over a wireless network and further interface module elements may be configured to interface with one or more mechanical devices to exchange liquids and loose particulates therewith, e.g. for filling a cleaning fluid reservoir or for draining or emptying a waste material container.

Accordingly, the interface module 320 may comprise a plurality of interface ports and connecting elements for interfacing with active external elements for exchanging operating commands, digital data and other electrical signals therewith. The interface module 320 may further interface with one or more mechanical devices for exchanging liquid and or solid materials therewith. The interface module 320 may also interface with an external power supply for charging the robot power module 310. Active external devices for interfacing with the robot 100 may include, but are not limited to, a floor standing docking station, a hand held remote control device, a local or remote computer, a modem, a portable memory device for exchanging code and or data with the robot and a network interface for interfacing the robot 100 with any device connected to the network. In addition, the interface module 320 may include passive elements such as hooks and or latching mechanisms for attaching the robot 100 to a wall for storage or for attaching the robot to a carrying case or the like.

In particular, an active external device according to one aspect of the present invention confines the robot 100 in a cleaning space such as a room by emitting radiation in a virtual wall pattern. The robot 100 is configured to detect the virtual wall pattern and is programmed to treat the virtual wall pattern as a room wall so that the robot does not pass through the virtual wall pattern. This particular aspect of the present invention is specifically described in U.S. Pat. No. 6,690,134 by Jones et al., entitled Method and System for Robot Localization and Confinement, the entire disclosure of which is herein incorporated by reference it its entirety.

Another active external device according to a further aspect of the present invention comprises a robot base station used to interface with the robot. The base station may comprise a fixed unit connected with a household power supply, e.g. and AC power wall outlet and or other household facilities such as a water supply pipe, a waste drain pipe and a network interface. According to invention, the robot 100 and the base station are each configured for autonomous docking and the base station may be further configured to charge the robot power module 310 and to service the robot in other ways. A base station and autonomous robot configured for autonomous docking and for recharging the robot power module is specifically described in U.S. patent application Ser. No. 10/762,219, by Cohen, et al., filed on Jan. 21, 2004, entitled Autonomous Robot Auto-Docking and Energy Management Systems and Methods, the entire disclosure of which is herein incorporated by reference it its entirety.

The autonomous robot 100 includes a self-contained motive transport drive subsystem 900 which is further detailed below. The transport drive 900 includes three wheels extending below the chassis 200 to provide three points of rolling support with respect to the cleaning surface. A nose wheel is attached to the robot chassis 200 at a forward edge thereof, coaxial with the fore-aft axis 106, and a pair of drive wheels attached to the chassis 200 aft of the transverse axis 108 and rotatable about a drive axis that is parallel with the transverse axis 108. Each drive wheel is separately driven and controlled to advance the robot in a desired direction. In addition, each drive wheel is configured to provide sufficient drive friction as the robot operates on a cleaning surface that is wet with cleaning fluid. The nose wheel is configured to self align with the direction of travel. The drive wheels may be controlled to move the robot 100 forward or aft in a straight line or along an arcuate path.

The robot 100 further includes a sensor module 340. The sensor module 340 comprises a plurality of sensors attached to the chassis and or integrated with robot subsystems for sensing external conditions and for sensing internal conditions. In response to sensing various conditions, the sensor module 340 may generate electrical signals and communicate the electrical signals to the control module 300. Individual sensors may perform such functions as detecting walls and other obstacles, detecting drop offs in the cleaning surface, called cliffs, detecting dirt on the floor, detecting low battery power, detecting an empty cleaning fluid container, detecting a full waste container, measuring or detecting drive wheel velocity distance traveled or slippage, detecting nose wheel rotation or cliff drop off, detecting cleaning system problems such rotating brush stalls or vacuum system clogs, detecting inefficient cleaning, cleaning surface type, system status, temperature, and many other conditions. In particular, several aspects of the sensor module 340 of the present invention as well as and its operation, especially as it relates to sensing external elements and conditions are specifically described in U.S. Pat. No. 6,594,844, by Jones, entitled Robot Obstacle Detection System, and U.S. patent application Ser. No. 11/166,986, by Casey et al., filed on Jun. 24, 2005, entitled Obstacle Following Sensor Scheme for a Mobile Robot, the entire disclosures of which are herein incorporated by reference it their entireties.

One difference between the present robot and either the dry vacuum robot or the large industrial cleaner is the proximity of the control and sensor components to the wet cleaning components. In most dry vacuuming robots, none of the sensors or control elements are prone to being wet by water or by more damaging cleaning fluids or solvents, because no wet cleaners are used and no waste fluid is generated. With a large industrial cleaner, the controls and sensors can be placed as far as necessary from the cleaning elements, perhaps a few feet away, and the only sensors that need accommodate wetness are those for sensing fluid levels.

The present invention is contemplated for household use (commercial and industrial use is also contemplated, but these environments may require larger versions of the robot). Accordingly, a household robot should be small and squat, e.g., less than 4 inches from the ground, and around a foot in diameter. Much of the volume is occupied by fluid brushing, spinning, spraying, and blowing devices, and fluid and/or foam penetrates most parts of the robot at one time or another. At most, the control and sensor electronics will be a few inches from the nearest fluid or foam torrent.

Accordingly, the invention contemplates that the entire main control board will be fluid sealed, either in a water resistant or waterproof housing having at least JIS grade 3 (mild spray) water/fluid resistance, but grade 5 (strong spray) and grade 7 (temporary immersion) are also desirable. The main control board should be sealed in a JIS grade 3-7 housing (1) by a screwed-down and gasketed cover over the main housing; (2) by a welded, caulked, sealed, or glued cover secured to the main housing; (3) by being pre-assembled in a water resistant, water-tight, water-proof, or hermetically sealed compartment or module; or (4) by being positioned in a volume suitable for potting or pre-potted in resin or the like.

Many sensor elements have a local small circuit board, sometimes with a local microprocessor and/or A/D converter and the like, and these components are often sensitive to fluids and corrosion. The invention also contemplates that any sensor circuit boards distributed throughout the body of the robot will also be sealed in a JIS grade 3-7 housing in a similar manner. The invention also contemplates that multiple circuit boards, including at least the main circuit board and one remote circuit board several inches from the main board, may be sealed by a single matching housing or cover. For example, all or some of the circuit boards could be arranged in a single plastic or resin module having extensions which reach to local sensor sites, and a distributed cover could be secured over all of the circuit boards. In addition, exposed electrical connections and terminals of sensors, motors, or communication lines can be sealed in a similar manner, with covers, modules, potting, shrink fit, gaskets, or the like. In this manner, substantially the entire electrical system is fluid-sealed and/or isolated from spraying or foaming liquid. Any and all electrical or electronic elements defined herein as a circuit board, PCB, detector, sensor, etc., are candidates for such sealing.

The robot 100 may also include a user control module 330. The user control module 330 provides one or more user input interfaces that generate an electrical signal in response to a user input and communicate the signal to the master control module 300. In one embodiment of the present invention, the user control module, described above, provides a user input interface, however, a user may enter commands via a hand held remote control device, a programmable computer or other programmable device or via voice commands. A user may input user commands to initiate actions such as power on/off, start, stop or to change a cleaning mode, set a cleaning duration, program cleaning parameters such as start time and duration, and or many other user initiated commands. User input commands, functions, and components contemplated for use with the present invention are specifically described in U.S. patent application Ser. No. 11/166,891, by Dubrovsky et al., filed on Jun. 24, 2005, entitled Remote Control Scheduler and Method for Autonomous Robotic Device, the entire disclosure of which is herein incorporated by reference it its entirety. Specific modes of user interaction are also described herein.

Cleaning Zones

Referring now to FIG. 2, a bottom surface of a robot chassis 200 is shown in isometric view. As shown therein, a first cleaning zone A is disposed forward of a second cleaning zone B with respect to the fore-aft axis 106. Accordingly, as the robot 100 is transported in the forward direction the first cleaning zone A precedes the second cleaning zone B over the cleaning surface. Each cleaning zone A and B has a cleaning width W disposed generally parallel with the transverse axis 108. Ideally, the cleaning width of each cleaning zone is substantially identical however, the actual cleaning width of the cleaning zones A and B may be slightly different. According to a preferred embodiment of the present invention, the cleaning width W is primarily defined by the second cleaning zone B which extends from proximate to the right circumferential edge of a bottom surface of the robot chassis 200 substantially parallel with the transverse axis 108 and is approximately 296 mm or 11.7 inches long, i.e., approximately 30 cm or 12 inches long. By locating the cleaning zone B proximate the right circumferential edge, the robot 100 may maneuver its right circumferential edge close to a wall or other obstacle for cleaning the cleaning surface adjacent to the wall or obstacle. Accordingly, the robot movement patterns include algorithms for transporting the right side of the robot 100 adjacent to each wall or obstacle encountered by the robot during a cleaning cycle. The robot 100 is therefore said to have a dominant right side. Of course, the robot 100 could be configured with a dominant left side instead. The first cleaning zone A is positioned forward of the transverse axis 108 and has a slightly narrower cleaning width than the second cleaning zone B, simply because of the circumference shape of the robot 100. However, any cleaning surface area not cleaned by the first cleaning zone A is cleaned by the second cleaning zone B.

First Cleaning Zone or Dry Vacuum Cleaning

The first cleaning zone A is configured to collect loose particulates from the cleaning surface. In a preferred embodiment, an air jet is generated by an air moving system which includes an air jet port 554 disposed on a left edge of the first cleaning zone A. The air jet port 554 expels a continuous jet or stream of pressurized air therefrom. The air jet port 554 is oriented to direct the air jet across the cleaning width from left to right. Opposed to the air jet port 554, an air intake port 556 is disposed on a right edge of the first cleaning zone A. "Air intake port" as used herein may mean "vacuum port," "air inlet," "negative pressure zone," etc. The air moving system generates a negative air pressure zone in the conduits connected to the intake port 556, which creates a negative air pressure zone proximate to the intake port 556. The negative air pressure zone suctions loose particulates and air into the air intake port 556 and the air moving system is further configured to deposit the loose particulates into a waste material container carried by the robot 100. Accordingly, pressurized air expelled from the air jet port 554 moves across the cleaning width within the first cleaning zone A and forces loose particulates on the cleaning surface toward a negative air pressure zone proximate to the air intake port 556. The loose particulates are suctioned up from the cleaning surface through the air intake port 556 and deposited into a waste container carried by the robot 100. The first cleaning zone A is further defined by a nearly rectangular channel formed between the air jet port 554 and the air intake port 556. The channel is defined by opposing forward and aft walls of a rectangular recessed area 574, which is a contoured shape formed in the bottom surface of the robot chassis 200. The forward and aft walls are substantially transverse to the fore-aft axis 106. The channel is further defined by a first compliant "doctor" (air flow guide) blade 576, attached to the robot chassis 200, e.g. along the aft edge of the recessed area 574, and extending from the chassis bottom surface to the cleaning surface.

The doctor air flow guide blade is mounted to make contact or near contact with the cleaning surface. The doctor air flow guide blade 576 is preferably formed from a thin flexible and compliant molded material e.g. a 1-2 mm thick bar shaped element molded from neoprene rubber or the like. The doctor air flow guide blade 576, or at least a portion of the doctor air flow guide blade, may be coated with a low friction material, e.g. a fluoropolymer resin for reducing friction between the doctor air flow guide blade and the cleaning surface. The doctor air flow guide blade 576 may be attached to the robot chassis 200 by an adhesive bond or by other suitable means. Air guide blade 576, toward the rear of the robot, is angled with respect to the direction of travel, by about 95-120 degrees from the direction of travel. The end of the blade 576 nearest the vacuum port 556 is farther toward the rear. Accordingly, debris will tend to move along the angled blade 576 as the robot moves forward. As depicted in FIG. 2, angled guide blade 578 points substantially toward the vacuum intake in such a manner that the vacuum intake also draws air and debris along the forward side of the smaller angled guide blade 578. The small dry vacuum blade is positioned to divert lighter objects, that would otherwise been blown past the suction port, back towards the suction port to be injected. It also directs larger objects back towards this port.

The forward caster wheel, as shown in FIG. 2 near the front of the robot, is generally restricted to 180 degrees of side to side travel. Certain embodiments may, however, benefit from larger ranges of motion. For example, the criteria for certain embodiments of the forward caster is either 360 degrees (free movement), or less than 180 degrees (limited but reversible movement), but is typically 160-170 degrees for commercial embodiments. Certain ranges of motion of the caster wheel may cause the wheel to lock up when in reverse travel.

The channel of the first cleaning zone A provides an increased volume between the cleaning surface and the bottom surface of the robot chassis 200 local to the first cleaning zone A. The increased volume guides airflow between the jet port 554 and the air intake port 556, and the doctor air flow guide blade 576 prevents loose particulates and airflow from escaping the first cleaning zone A in the aft direction. In addition to guiding the air jet and the loose particulates across the cleaning width, the first doctor air flow guide blade 576 may also exert a friction force against contaminants on the cleaning surface to help loosen contaminants from the cleaning surface as the robot moves in the forward direction. The first compliant doctor air flow guide blade 576 is configured to be sufficiently compliant to adapt its profile form conforming to discontinuities in the cleaning surface, such a door jams, moldings, and trim pieces, without hindering the forward travel of the robot 100.

A second compliant doctor air flow guide blade 578 may also be disposed in the first cleaning zone A to further guide the air jet toward the negative pressure zone surrounding the air intake port 554. The second compliant doctor air flow guide blade is similar in construction to the first compliant doctor air flow guide blade 576 and attaches to the bottom surface of the robot chassis 200 to further guide the air and loose particulates moving through the channel. In one example, a second recessed area 579 is formed in the bottom surface of the chassis 200 and the second compliant doctor air flow guide blade 576 protrudes into the first recessed area 574 at an acute angle typically between 30-60° with respect to the traverse axis 108. The second compliant air flow guide blade extends from the forward edge of the recessed area 574 and protrudes into the channel approximately ⅓ to ½ of channel fore-aft dimension.

The first cleaning zone A traverses the cleaning surface along a cleaning path and collects loose particulates along the cleaning width. By collecting the loose particulates prior to the second cleaning zone B passing over the cleaning path, the loose particulates are collected before the second cleaning zone applies cleaning fluid onto the cleaning surface. One advantage of removing the loose particulates with the first cleaning zone is that the loose particulates are removed while they are still dry. Once the loose particulates absorb cleaning fluid applied by the second cleaning zone, they are more difficult to collect. Moreover, the cleaning fluid absorbed by the loose particulates is not available for cleaning the surface so the cleaning efficiency of the second cleaning zone B may be degraded. The first cleaning zone generally saves a user the task of sweeping before mopping, and is generally a pretreatment. However, in an alternative configuration, the first cleaning zone is a dry vacuum that may operate separate and apart from the wet-cleaning functionality of the robot. Still further, in such a case, the first cleaning zone may be provided with a rotating brush or counter-rotating brushes, or may use brushes only rather than a brush and vacuum.

In another embodiment, the first cleaning zone may be configured with other cleaning elements such as counter-rotating brushes extending across the cleaning width to flick loose particulates into a receptacle. In another embodiment, an air moving system may be configured to draw air and loose particulates up from the cleaning surface through an elongated air intake port extending across the cleaning width. In particular, other embodiments usable to provide a first cleaning zone according to the present invention are disclosed in U.S. Pat. No. 6,883,201, by Jones et al. entitled Autonomous Floor-Cleaning Robot, the entire disclosure of which is herein incorporated by reference it its entirety.

Figure 22:
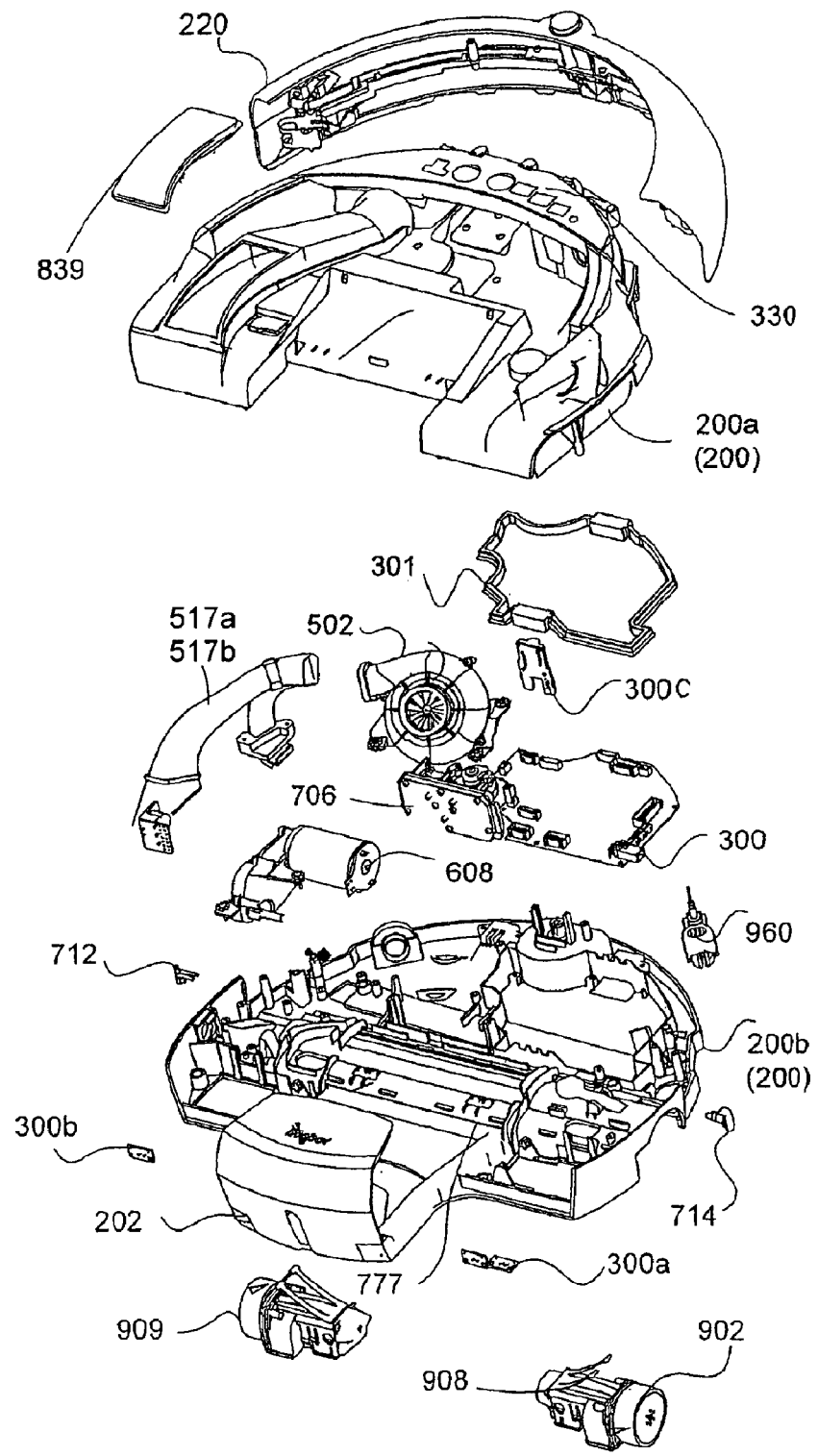
FIG. 22 depicts an exploded view of a robot chassis having robot subsystems attached thereto according to an embodiment of the present invention.

FIG. 22 depicts elements similar to those depicted in FIG. 3. Some alternative terminology is used in the following description. The elements shown in FIG. 22 are the main electrical board 300, a "cam" driven pump 706, the front caster 960, a stasis circuit board 300a bearing IR "stasis" sensors and components (i.e., that detect when the front wheel does not rotate along with the driven wheels, indicating the robot may be stuck), a reed switch PCB 300b, a charging plug PCB 300c for receiving a battery charging cord, a battery contact blade 777 for contact to the battery as it is placed into the robot body, a board gasket/seal 301 that lines the edge of the board 300 and matches up with the cover to waterproof the board 300, a bumper 220, the main chassis 200, the wet cleaning head motor and drivetrain 608 located substantially in line with the wet cleaning head, a left drive train/wheel assembly 909 (showing biasing springs, suspension, integrated planetary or other gear train), a right drive train/wheel assembly 908 (similarly arranged), a bifurcated dry vacuum duct and exhaust duct 517a, 517b, a replaceable filter for the fan assembly (which should have small enough pores and a surface configured to prevent both particulates and most water from entering the fan assembly), a first or left spray nozzle 712, a second or right spray nozzle 714, a nozzle tube for the right spray nozzle, the fan assembly 502, the inner cover of the robot main body, and wire clips for securing the inner cover to the chassis.

The stasis circuit board 300a, the reed switch PCB 300b, and the charging plug 300c are parts that may or should be rendered water resistant or water proof by the structures described herein. These PCBs, as shown in FIG. 22, tend to be located to support the associated sensor and electronic parts.

The dry vacuum may be provided with a main cleaning brush to flick dirt into a small dirt bin. This bin could be mounted forward of the brush or aft (with appropriate modifications to the brush shroud). In addition to covering the floor with a thin sheet of water, which evaporates and increases the relative humidity, the ducting for the vacuum exhaust may be directed to constantly blow air across the water in the dirty or clean tank. The air leaving the dirty or clean tank will tend to have higher relative humidity than the air entering it, further increasing the humidity in the room, and if the cleaning fluid has added fragrance, this may be blown into the room.

Second Cleaning Zone or Wet Cleaning Head

The second cleaning zone B includes a liquid applicator 700 (also or alternatively, spray head and/or spreader) configured to apply a cleaning fluid onto the cleaning surface and the cleaning fluid is preferably applied uniformly across the entire cleaning width. The liquid applicator 700 is attached to the chassis 200 and includes at least one nozzle configured to spray the cleaning fluid onto the cleaning surface. The second cleaning zone B may also include a scrubbing module 600 (also or alternatively, a powered brush) for performing other cleaning tasks across the cleaning width after the cleaning fluid has been applied onto the cleaning surface. The scrubbing module 600 may include a smearing element disposed across the cleaning width for smearing the cleaning fluid to distribute it more uniformly on the cleaning surface. The second cleaning zone B may also include a passive or active scrubbing element, scrub brush, wiper, or wipe cloth configured to scrub the cleaning surface across the cleaning width. The second cleaning zone B may also include a second collecting apparatus (also or alternatively, wet vacuum, directed at either a wet surface or a wet brush) configured to collect waste materials up from the cleaning surface across the cleaning width, and the second collecting apparatus is especially configured for collecting liquid waste materials.

Liquid Applicator Module or Spray Head

Figure 5:
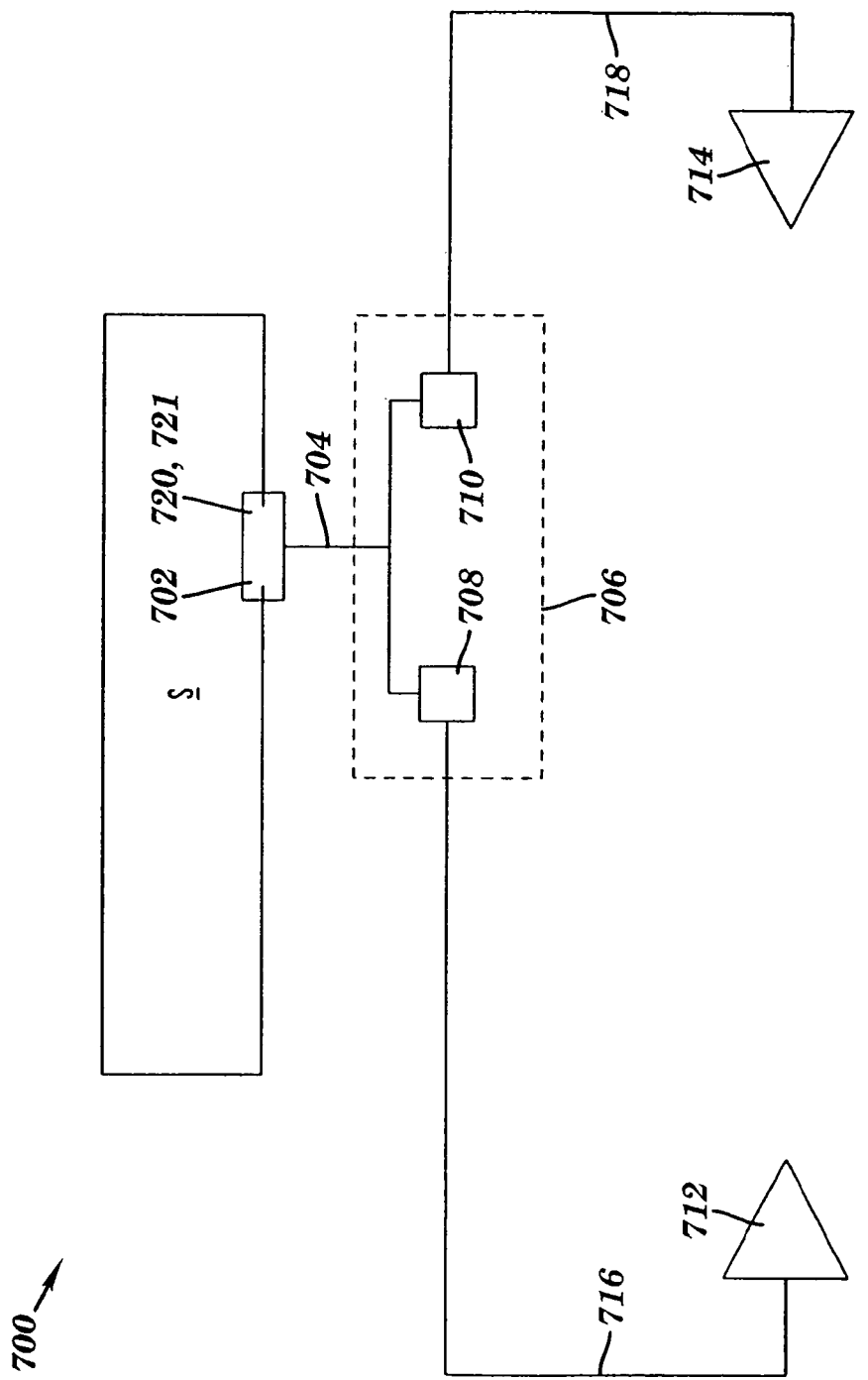
FIG. 5 depicts a schematic representation of a liquid applicator assembly according to the present invention.

The liquid applicator module 700, shown schematically in FIG. 5, is configured to apply a measured volume of cleaning fluid onto the cleaning surface across the cleaning width. "Liquid applicator module" as used herein, may mean "nozzle," "spray head," and/or "spreader brush/wiper." Additionally, the liquid applicator module may spray the floor directly, spray a fluid-bearing brush or roller, or apply fluid by dripping or capillary action to the floor, brush, roller, or pad. The liquid applicator module 700 receives a supply of cleaning fluid from a cleaning fluid supply container S, carried on the chassis 200, and pumps the cleaning fluid through one or more spray nozzles disposed on the chassis 200. The spray nozzles are attached to the robot chassis 200 aft of the first cleaning zone A and each nozzle is oriented to apply cleaning fluid onto the cleaning surface. In a preferred embodiment, a pair of spray nozzle are attached to the robot chassis 200 at distal left and right edges of the cleaning width W. Each nozzle is oriented to spray cleaning fluid toward the opposing end of the cleaning width. Each nozzles is separately pumped to eject a spray pattern and the pumping stroke of each nozzle occurs approximately 180 degrees out phase with respect to the other nozzle so that one of the two nozzles is always applying cleaning fluid.

Referring to FIG. 5, the liquid applicator module 700 includes a cleaning fluid supply container S, which is carried by the chassis 200 (and/or a compartment within an integrated tank) and removable therefrom by a user to refill the container with cleaning fluid (alternatively, the container S is refilled with water, cleaning concentrate being supplied from another compartment or as a solid or powder). The supply container S is configured with a drain or exit aperture 702 formed through a base surface thereof. A fluid conduit 704 receives cleaning fluid from the exit aperture 702 and delivers a supply of cleaning fluid to a pump assembly 706. The pump assembly 706 includes left and right pump portions 708 and 710, driven by a rotating cam, shown in FIG. 7. The left pump portion 708 pumps cleaning fluid to a left spray nozzle 712 via a conduit 716 and the right pump portion 710 pumps cleaning fluid to a right spray nozzle 714 via a conduit 718.

Figure 6:
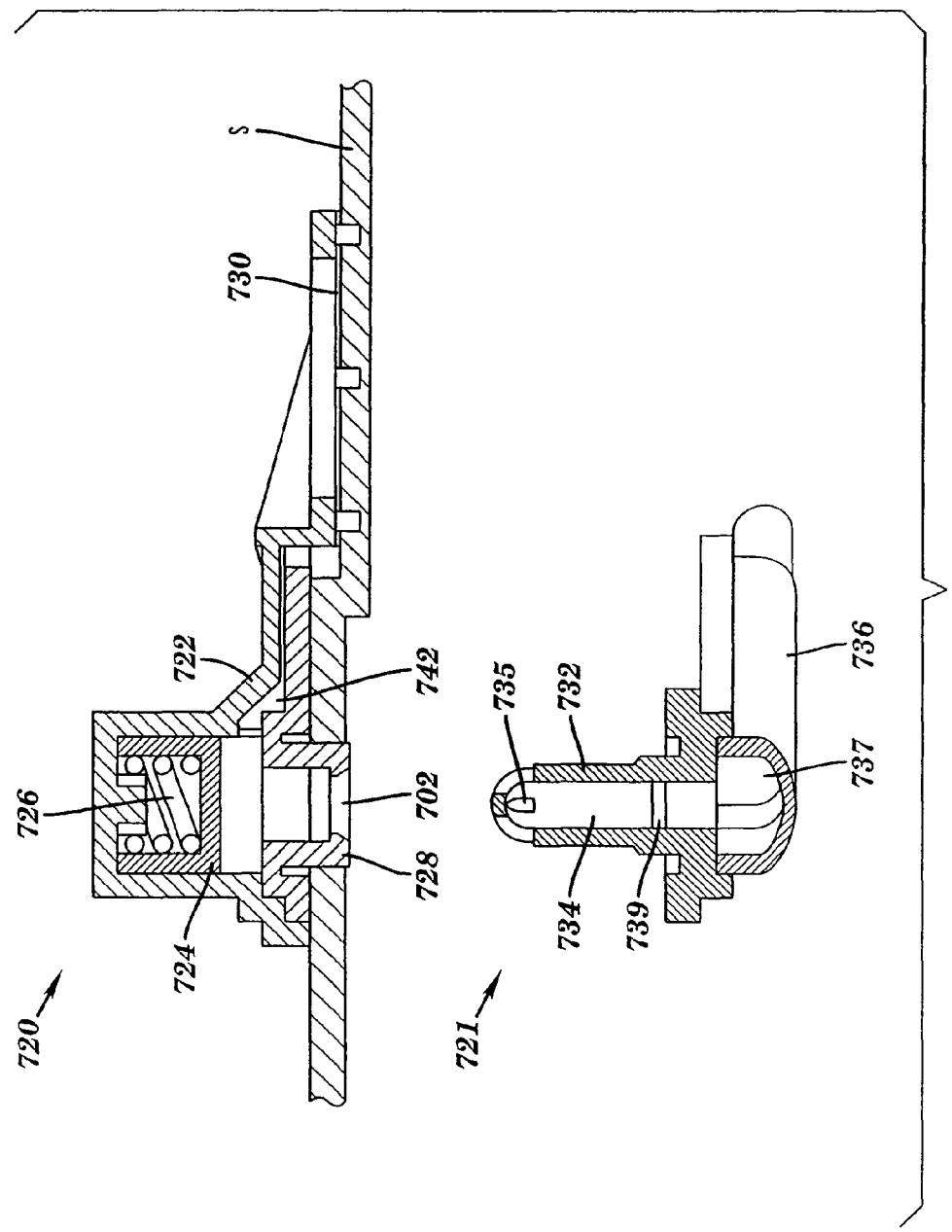
FIG. 6 depicts a schematic section view taken through a stop valve assembly installed within a cleaning fluid supply tank according to the present invention.

A stop valve assembly, shown in section view in FIG. 6, includes a female upper portion 720, installed inside the supply container S, and a male portion 721 attached to the chassis 200. The female portion 720 nominally closes and seals the exit aperture 702. The male portion 721 opens the exit aperture 702 to provide access to the cleaning fluid inside the supply container S. The female portion 720 includes an upper housing 722, a spring biased movable stop 724, a compression spring 726 for biasing the stop 724 to a closed position, and a gasket 728 for sealing the exit aperture 702. The upper housing 722 may also support a filter element 730 inside the supply container S for filtering contaminants from the cleaning fluid before the fluid exits the supply container S.

The stop valve assembly male portion 721 includes a hollow male fitting 732 formed to insert into the exit aperture 702 and penetrate the gasket 728. Insertion of the hollow male fitting 732 into the exit aperture 702 forces the movable stop 724 upward against the compression spring 726 to open the stop valve. The hollow male fitting 732 is formed with a flow tube 734 along it central longitudinal axis and the flow tube 734 includes one or more openings 735 at its uppermost end for receiving cleaning fluid into the flow tube 734. At its lower end, the flow tube 734 is in fluid communication with a hose fitting 736 attached to or integrally formed with the male fitting 732. The hose fitting 736 comprises a tube element having a hollow fluid passage 737 passing therethrough, and attaches to hose or fluid conduit 704 that receives fluid from the hose fitting 736 and delivers the fluid to the pump assembly 706. The flow tube 734 may also include a user removable filter element 739 installed therein for filtering the cleaning fluid as it exits the supply container S.

According to the invention, the stop valve male portion 721 is fixed to the chassis 200 and engages with the female portion 720, which is fixed to the container S. When the container S is installed onto the chassis in its operating position the male portion 721 engages with the female portion 720 to open the exit aperture 702. A supply of cleaning fluid flows from the supply container S to the pump assembly 706 and the flow may be assisted by gravity or suctioned by the pump assembly or both.

The hose fitting 736 is further equipped with a pair of electrically conductive elements, not shown, disposed on the internal surface of the hose fitting fluid flow passage 737 and the pair of conductive elements inside the flow chamber are electrically isolated from each other. A measurement circuit, not shown, creates an electrical potential difference between the pair of electrically conductive elements and when cleaning fluid is present inside the flow passage 737 current flows from one electrode to the other through the cleaning fluid and the measurement circuit senses the current flow. When the container S is empty, the measurement circuit fails to sense the current flow and in response sends a supply container empty signal to the master controller 300. In response to receiving the supply container empty signal, the master controller 300 takes an appropriate action.

Figure 7:
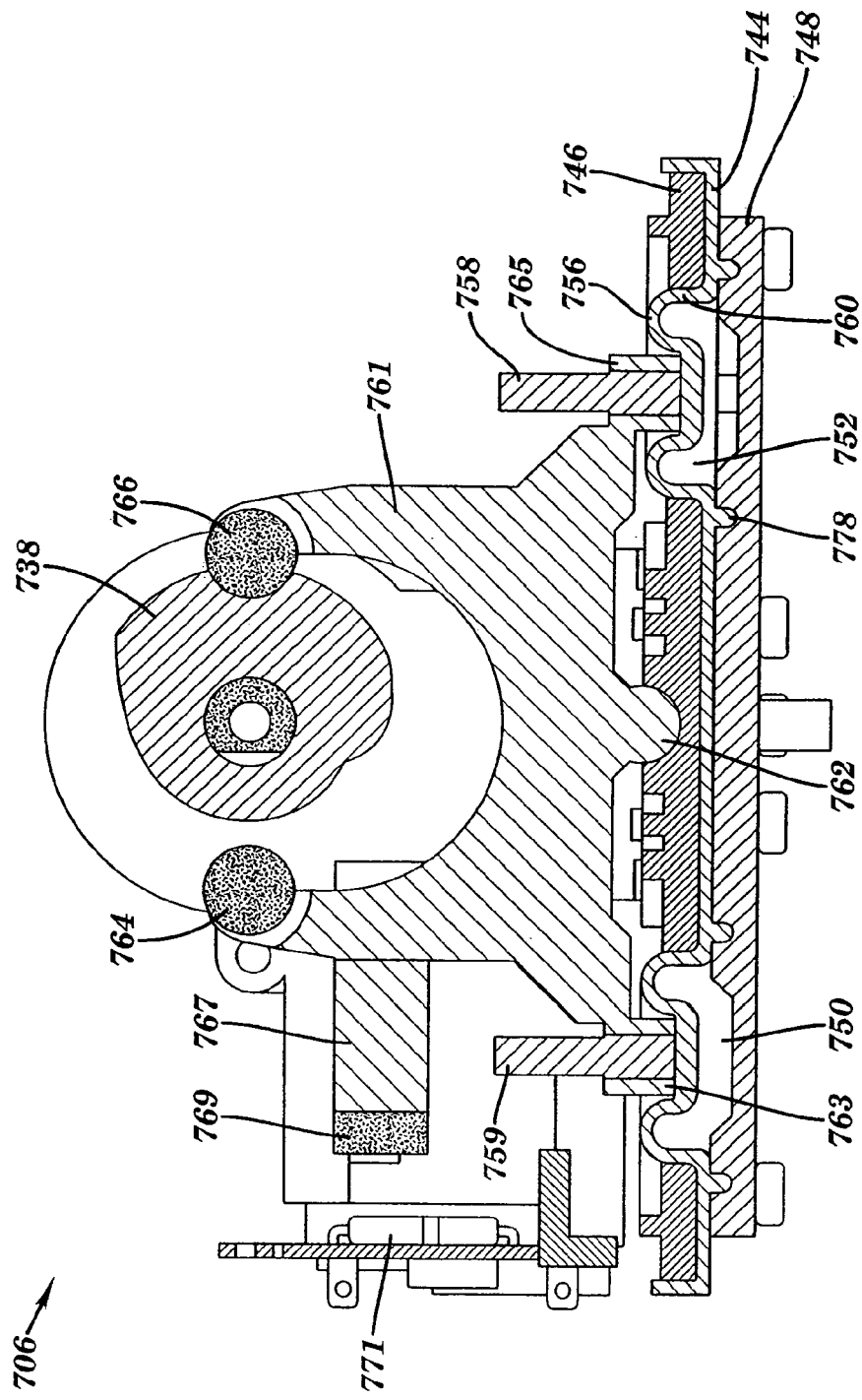
FIG. 7 depicts a schematic section view taken through a pump assembly according to the present invention.

The pump assembly 706 as depicted in FIG. 5 includes a left pump portion 708 and a right pump portion 710. The pump assembly 706 receives a continuous flow of cleaning fluid from the supply container S and alternately delivers cleaning fluid to the left nozzle 712 and the right nozzle 714. FIG. 7 depicts the pump assembly 706 in section view and the pump assembly 706 is shown mounted on the top surface of the chassis 200 in FIG. 3. The pump assembly 706 includes cam element 738 mounted on a motor drive shaft for rotation about a rotation axis. The motor, not shown, is rotates the cam element 738 at a substantially constant angular velocity under the control of the master controller 300. However, the angular velocity of the cam element 738 may be increased or decreased to vary the frequency of pumping of the left and right spay nozzles 712 and 714. In particular, the angular velocity of the cam element 738 controls the mass flow rate of cleaning fluid applied onto the cleanings surface. According to one aspect of the present invention, the angular velocity of the cam element 738 may be adjusted in proportion to the robot forward velocity to apply a uniform volume of cleaning fluid onto the cleaning surface irrespective of robot velocity. Alternately, changes in the angular velocity in the cam element 738 may be used to increase or decrease the mass flow rate of cleaning fluid applied onto the cleanings surface as desired.

The pump assembly 706 includes a rocker element 761 mounted to pivot about a pivot axis 762. The rocker element 761 includes a pair of opposed cam follower elements 764 on the left side and 766 on the right side. Each cam follower 764 and 766 remains in constant contact with a circumferential profile of the cam element 738 as the cam element rotates about its rotation axis. The rocker element 761 further includes a left pump actuator link 763 and a right pump actuator link 765. Each pump actuator link 763 and 765 is fixedly attached to a corresponding left pump chamber actuator nipple 759 and a right pump chamber actuator nipple 758. As will be readily understood, rotation of the cam element 738 forces each of the cam follower elements 764 and 766 to follow the cam circumferential profile and the motion dictated by the cam profile is transferred by the rocker element 761 to each of the left and right actuator nipples 759 and 758. As described below, the motion of the actuator nipples is used to pump cleaning fluid. The cam profile is particularly shaped to cause the rocker element 761 to force the right actuator nipple 758 downward while simultaneously lifting up on the left actuator nipple 759, and this action occurs during the first 180 degrees of cam. Alternately, the second 180 degrees of cam rotation causes the rocker element 761 to force the left actuator nipple 759 downward while simultaneously lifting up on the right actuator nipple 758.

The rocker element 761 further includes a sensor arm 767 supporting a permanent magnet 769 attached at its end. A magnetic field generated by the magnet 769 interacts with an electrical circuit 771 supported proximate to the magnet 769 and the circuit generates signals responsive to changes in the orientation of magnetic field. the signals are used to track the operation of the pump assembly 706.

Figure 8:
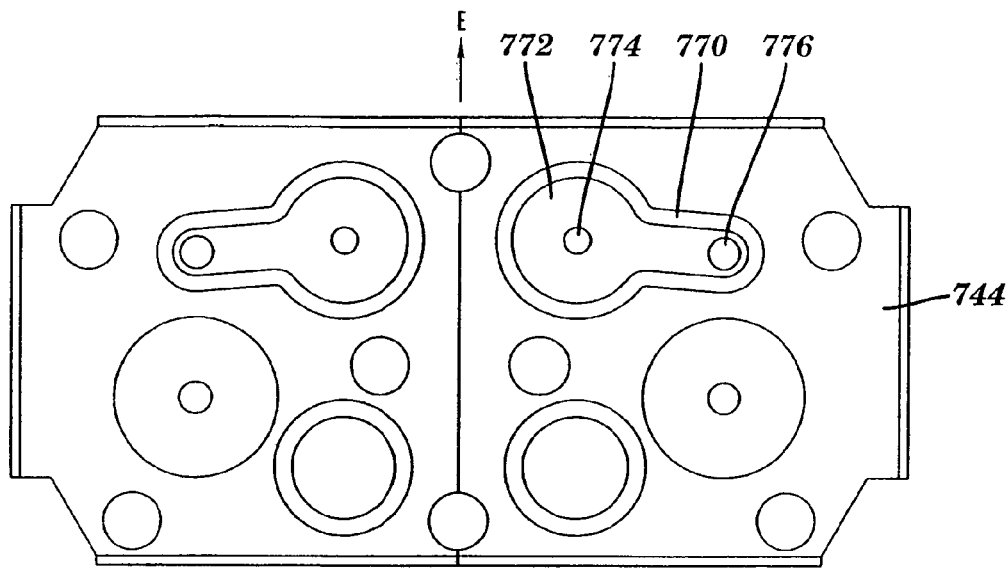
FIG. 8 depicts a schematic top view of a flexible element used as a diaphragm pump according to the present invention.
Figure 9:
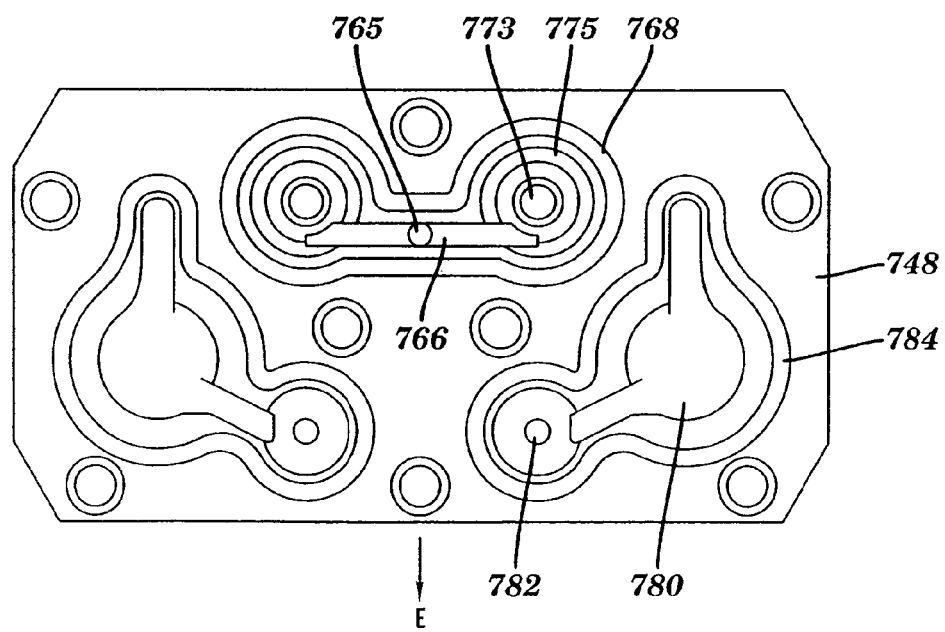
FIG. 9 depicts a schematic top view of a nonflexible chamber element used in the pump assembly according to the present invention.

Referring to FIGS. 7-9, the pump assembly 706 further comprises a flexible membrane 744 mounted between opposing upper and lower nonflexible elements 746 and 748 respectively. Referring to the section view in FIG. 7 the flexible element 744 is captured between an upper nonflexible element 746 and a lower nonflexible element 748. Each of the upper nonflexible element 746, the flexible element 744 and the lower nonflexible element 748 is formed as a substantially rectangular sheet having a generally uniform thickness. However, each element also includes patterns of raised ridges depressed valleys and other surface contours formed on opposing surfaces thereof. FIG. 8 depicts a top view of the flexible element 744 and FIG. 9 depicts a top view of the lower nonflexible element 748. The flexible element 744 is formed from a flexible membrane material such as neoprene rubber or the like and the nonflexible elements 748 and 746 are each formed from a stiff material nonflexible such as moldable hard plastic or the like.

As shown in FIGS. 8 and 9, each of the flexible element 744 and the nonflexible element 748 are symmetrical about a center axis designated E in the figure. In particular, the left sides of each of the elements 746, 744 and 748 combine to form a left pump portion and the rights side of each of the elements 746, 744 and 748 combine to form a right pump portion. The left and right pump portions are substantially identical. When the three elements are assembled together, the raised ridges, depressed valleys and surface contours of each element cooperate with raised ridges depressed valleys and surface contours of the contacting surfaces of other of the elements to create fluid wells and passageways. The wells and passageways may be formed between the upper element 746 and the flexible element 744 or between the lower nonflexible element 748 and the flexible element 744. In general, the flexible element 744 serves as a gasket layer for sealing the wells and passages and its flexibility is used to react to changes in pressure to seal and or open passages in response to local pressure changes as the pump operates. In addition, holes formed through the elements allow fluid to flow in and out of the pump assembly and to flow through the flexible element 744.

Using the right pump portion by way of example, cleaning fluid is drawn into the pump assembly through an aperture 765 formed in the center of the lower nonflexible element 748. The aperture 765 receives cleaning fluid from the fluid supply container via the conduit 704. The incoming fluid fills a passageway 766. Ridges 775 and 768 form a valley between them and a mating raised ridge on the flexible 744 fills the valley between the ridges 775 and 768. This confines the fluid within the passageway 766 and pressure seal the passageway. An aperture 774 passes through the flexible element 744 and is in fluid communication with the passageway 766. When the pump chamber, described below, expands, the expansion decreases the local pressure, which draws fluid into the passageway 776 through the aperture 774.

Fluid drawn through the aperture 774 fills a well 772. The well 772 is formed between the flexible element 744 and the upper nonflexible element 746. A ridge 770 surrounds the well 772 and mates with a feature of the upper flexible element 746 to contain the fluid in the well 772 and to pressure seal the well. The surface of the well 772 is flexible such that when the pressure within the well 772 decreases, the base of the well is lifted to open the aperture 774 and draw fluid through the aperture 774. However, when the pressure within the well 772 increases, due to contraction of the pump chamber, the aperture 774 is forced against a raised stop surface 773 directly aligned with the aperture and the well 772 act as a trap valve. A second aperture 776 passes through the flexible element 744 to allow fluid to pass from the well 772 through the flexible element 744 and into a pump chamber. The pump chamber is formed between the flexible element 744 and the lower nonflexible element 748.

Referring to FIG. 7, a right pump chamber 752 is shown in section view. The chamber 752 includes a dome shaped flexure formed by an annular loop 756. The dome shaped flexure is a surface contour of the flexible element 744. The annular loop 756 passes through a large aperture 760 formed through the upper nonflexible element 746. The volume of the pump chamber is expanded when the pump actuator 765 pulls up on the actuator nipple 758. The volume expansion decreases pressure within the pump chamber and fluid is drawn into the chamber from the well 772. The volume of the pump chamber is decreased when the pump actuator 765 pushes down on the actuator nipple 758. The decrease in volume within the chamber increases pressure and the increased pressure expels fluid out of the pump chamber.

The pump chamber is further defined by a well 780 formed in the lower nonflexible element 748. The well 780 is surrounded by a valley 784 formed in the lower nonflexible element 748, shown in FIG. 9, and a ridge 778 formed on the flexible element 744 mates with the valley 784 to pressure seal the pump chamber. The pump chamber 752 further includes an exit aperture 782 formed through the lower nonflexible element 748 and through which fluid is expelled. The exit aperture 782 delivers fluid to the right nozzle 714 via the conduit 718. The exit aperture 782 is also opposed to a stop surface which acts as a check valve to close the exit aperture 782 when the pump chamber is decreased.

Thus according to the present invention, cleaning fluid is drawn from a cleaning supply container S by action of the pump assembly 706. The pump assembly 706 comprises two separate pump chambers for pumping cleaning fluid to two separate spray nozzles. Each pump chamber is configured to deliver cleaning fluid to a single nozzle in response to a rapid increase in pressure inside the pump chamber. The pressure inside the pump chamber is dictated by the cam profile, which is formed to drive fluid to each nozzle in order to spray a substantially uniform layer of cleaning fluid onto the cleaning surface. In particular, the cam profile is configured to deliver a substantially uniform volume of cleaning fluid per unit length of cleaning width W. In generally, the liquid applicator of the present invention is configured to apply cleaning fluid at a volumetric rate ranging from about 0.2 to 5.0 ml per square foot, and preferably in the range of about 0.6-2.0 ml per square foot. However depending upon the application, the liquid applicator of the present invention may apply any desired volumetric layer onto the surface. In addition, the fluid applicator system of the present invention is usable to apply other liquids onto a floor surface such as wax, paint, disinfectant, chemical coatings, and the like.

As is further described below, a user may remove the supply container S from the robot chassis and fill the supply container with a measured volume of clean water and a corresponding measured volume of a cleaning agent. The water and cleaning agent may be poured into the supply container S through a supply container access aperture 168 which is capped by a removable cap 172, shown in FIG. 17. The supply container S is configured with a liquid volume capacity of approximately 1100 ml (37 fluid ounces) and the desired volumes of cleaning agent and clean water may be poured into the supply tank in a ratio appropriate for a particular cleaning application.

Scrubbing Module, Powered Brush and/or Powered Wiper

Figure 10:
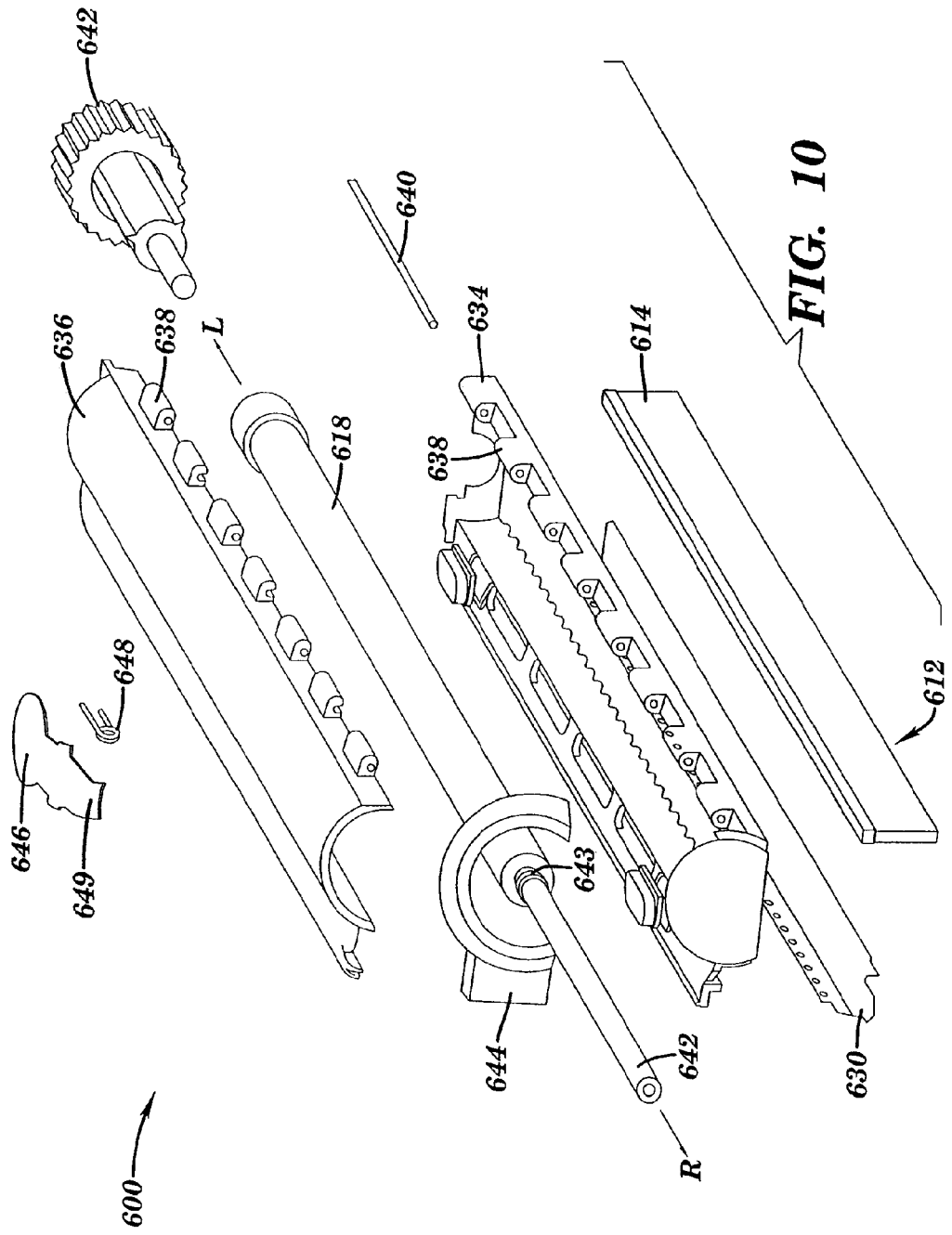
FIG. 10 depicts a schematic exploded isometric view of a scrubbing module according to the present invention.

The scrubbing module 600, according to a preferred embodiment of the present invention, is shown in exploded isometric view in FIG. 10 and in the robot bottom view shown in FIG. 2. The scrubbing module 600 may be configured as a separate subassembly that attaches to the chassis 200 but is removable therefrom, by a user, for cleaning or otherwise servicing the cleaning elements thereof. Other arrangements can be configured without deviating from the present invention. For example, in an alternate configuration, the upper wall of the scrubbing module 600 would be essentially part of/integral with the robot main body, but the scrubbing module would open as shown to permit cleaning of brush, squeegee, and internal cavity (in such a case, "scrubbing module" remains appropriate terminology). A readily removable scrubbing module may be referred to as a "cartridge," e.g., scrubbing cartridge or cleaning head cartridge. The scrubbing module 600 installs and latches into place within a hollow cavity 602, formed on the bottom side of the chassis 200. A profile of the hollow cavity 602 is displayed on the right side of the chassis 200 in FIG. 3. The cleaning elements of the scrubbing module 600 are positioned aft of the liquid applicator module 700 to perform cleaning operations on a wet cleaning surface.

In a preferred embodiment, the scrubbing module 600 includes a passive smearing or spreading element (also, and alternatively, "spreader" or "spreader brush") 612 attached to a forward edge thereof and disposed across the cleaning width. The smearing or spreader brush 612 extends downwardly from the scrubbing module 600 and is configured to make contact or near contact with the cleaning surface across the cleaning width. As the robot 100 is transported in the forward direction the smearing brush 612 moves over the pattern of cleaning fluid applied down by the liquid applicator and smears, or more uniformly spreads the cleaning fluid over the cleaning surface. The smearing or spreader brush 612, shown in FIGS. 2 and 10, comprises a plurality of soft compliant smearing bristles 614 with a first end of each bristle being captured in a holder such as crimped metal channel, or other suitable holding element. A second end of each smearing bristle 614 is free to bend as each bristle makes contact with the cleaning surface. The length and diameter of the smearing or spreader bristles 614, as well as a nominal interference dimension that the smearing bristles makes with respect to the cleaning surface may be varied to adjust bristle stiffness and to thereby affect the smearing action. In a preferred embodiment of the present invention the smearing or spreader 612 comprises nylon bristles with an average bristle diameter in the range of about 0.05-0.2 mm (0.002-0.008 inches). The nominal length of each bristle 614 is approximately 16 mm (0.62 inches) between the holder and the cleaning surface and the bristles 614 are configured with an interference dimension of approximately 0.75 mm (0.03 inches). The smearing brush 612 may also wick up excess cleaning fluid applied to the cleaning surface and distribute the wicked up cleaning fluid to other locations. Of course, other smearing elements or spreader brushes such as flexible compliant blade member a sponge elements or a rolling member in contact with the cleaning surface are also usable. In the case where evenly spaced multiple spray jets or nozzles direct fluid (spraying, dripping, or flowing) in a regularly spaced pattern without a smearing brush, the evenly spaced multiple spray jets function as a "spreader."

The scrubbing module 600 may include a scrubbing element, scrub brush, wiper, or wipe cloth e.g. 604; however, the present invention may be used without a scrubbing element. The scrubbing element contacts the cleaning surface during cleaning operations and agitates the cleaning fluid to mix it with contaminants to emulsify, dissolve or otherwise chemically react with contaminants. The scrubbing element, scrub brush, wiper, or wipe cloth also generates a shearing force as it moves with respect to the cleaning surface and the force helps to break adhesion and other bonds between contaminants and the cleaning surface. In addition, the scrubbing element may be passive element or an active and may contact the cleaning surface directly, may not contact the cleaning surface at all or may be configured to be movable into and out of contact with the cleaning surface.

In one embodiment according to the present invention, a passive scrubbing element, scrub brush, wiper, or wipe cloth is attached to the scrubbing module 600 or other attaching point on the chassis 200 and disposed to contact the cleaning surface across the cleaning width. A force is generated between the passive scrubbing element and the cleaning surface as the robot is transported in the forward direction. The passive scrubbing element, scrub brush, wiper, or wipe cloth may comprise a plurality of scrubbing bristles held in contact with the cleaning surface, a woven or nonwoven material, e.g. a scrubbing pad or sheet material held in contact with the cleaning surface, or a compliant solid element such as a sponge or other compliant porous solid foam element held in contact with the cleaning surface. In particular, a conventional scrubbing brush, sponge, or scrubbing pad used for scrubbing may be fixedly attached to the robot 100 and held in contact with the cleaning surface across the cleaning width aft of the liquid applicator to scrub the cleaning surface as the robot 100 advances over the cleaning surface. In addition, the passive scrubbing element may be configured to be replaceable by a user or to be automatically replenished, e.g. using a supply roll and a take up roll for advancing clean scrubbing material into contact with the cleaning surface.

In another embodiment according to the present invention, one or more active scrubbing elements are movable with respect to the cleaning surface and with respect to the robot chassis. Movement of the active scrubbing elements increases the work done between scrubbing element, scrub brush, wiper, or wipe cloths and the cleaning surface. Each movable scrubbing element is driven for movement with respect to the chassis 200 by a drive module, also attached to the chassis 200. Active scrubbing elements may also comprise a scrubbing pad or sheet material held in contact with the cleaning surface, or a compliant solid element such as a sponge or other compliant porous solid foam element held in contact with the cleaning surface and vibrated by a vibrating backing element. Other active scrubbing elements may also include a plurality of scrubbing bristles, and or any movably supported conventional scrubbing brush, sponge, or scrubbing pad used for scrubbing or an ultra sound emitter may also be used to generate scrubbing action. The relative motion between active scrubbing elements and the chassis may comprise linear and or rotary motion and the active scrubbing elements may be configured to be replaceable or cleanable by a user.

Figure 11:
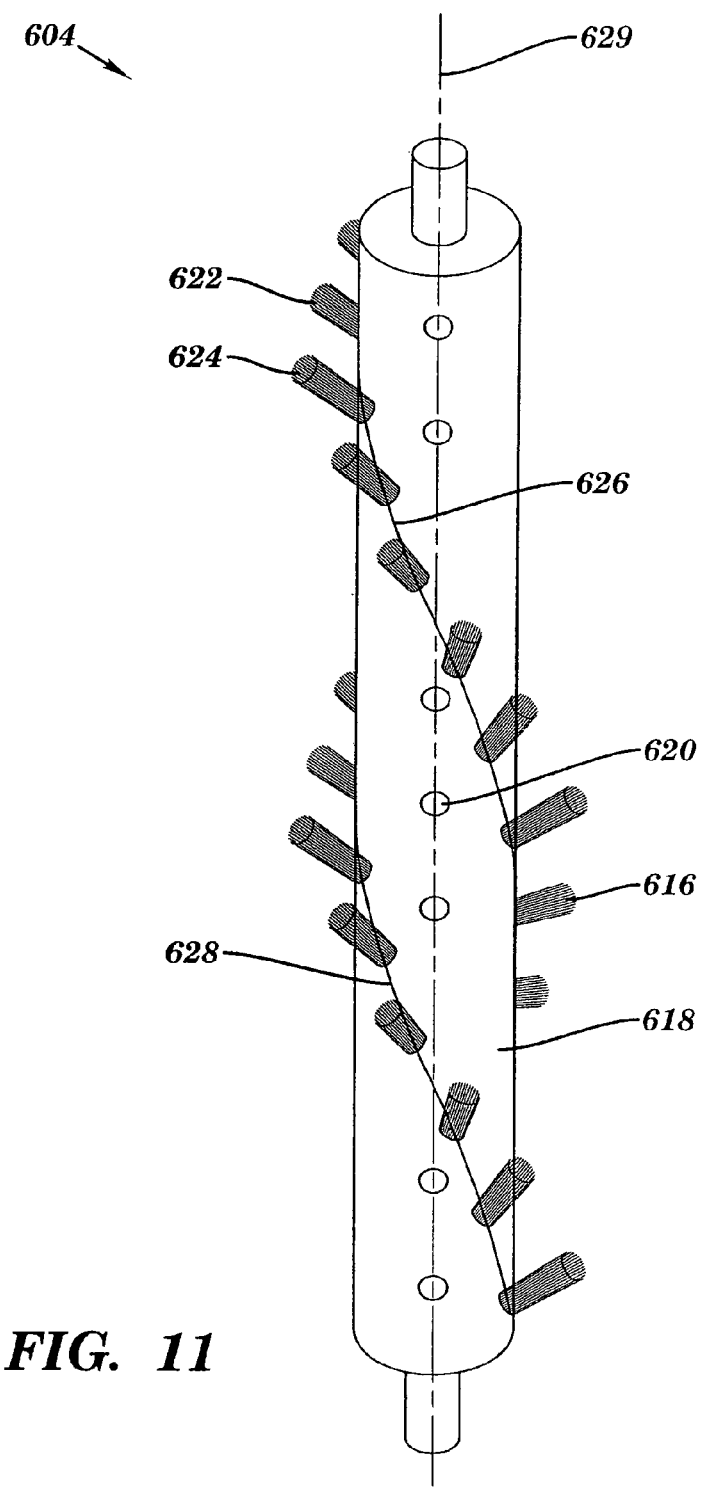
FIG. 11 depicts an isometric rotatable scrubbing brush according to the present invention.

Referring now to FIGS. 10-12 a preferred embodiment of present invention includes an active scrubbing element. The active scrubbing element comprises a rotatable brush assembly 604 disposed across the cleaning width, aft of the liquid applicator nozzles 712, 714, for actively scrubbing the cleaning surface after the cleaning fluid has been applied thereon. The rotatable brush assembly 604 comprises a cylindrical bristle holder element 618 for supporting scrubbing bristles 616 extending radially outward there from. The rotatable brush assembly 604 is supported for rotation about a rotation axis that extends substantially parallel with the cleaning width. The scrubbing bristles 616 are long enough to interfere with the cleaning surface during rotation such that the scrubbing bristles 616 are bent by the contact with the cleaning surface.

Figure 23:
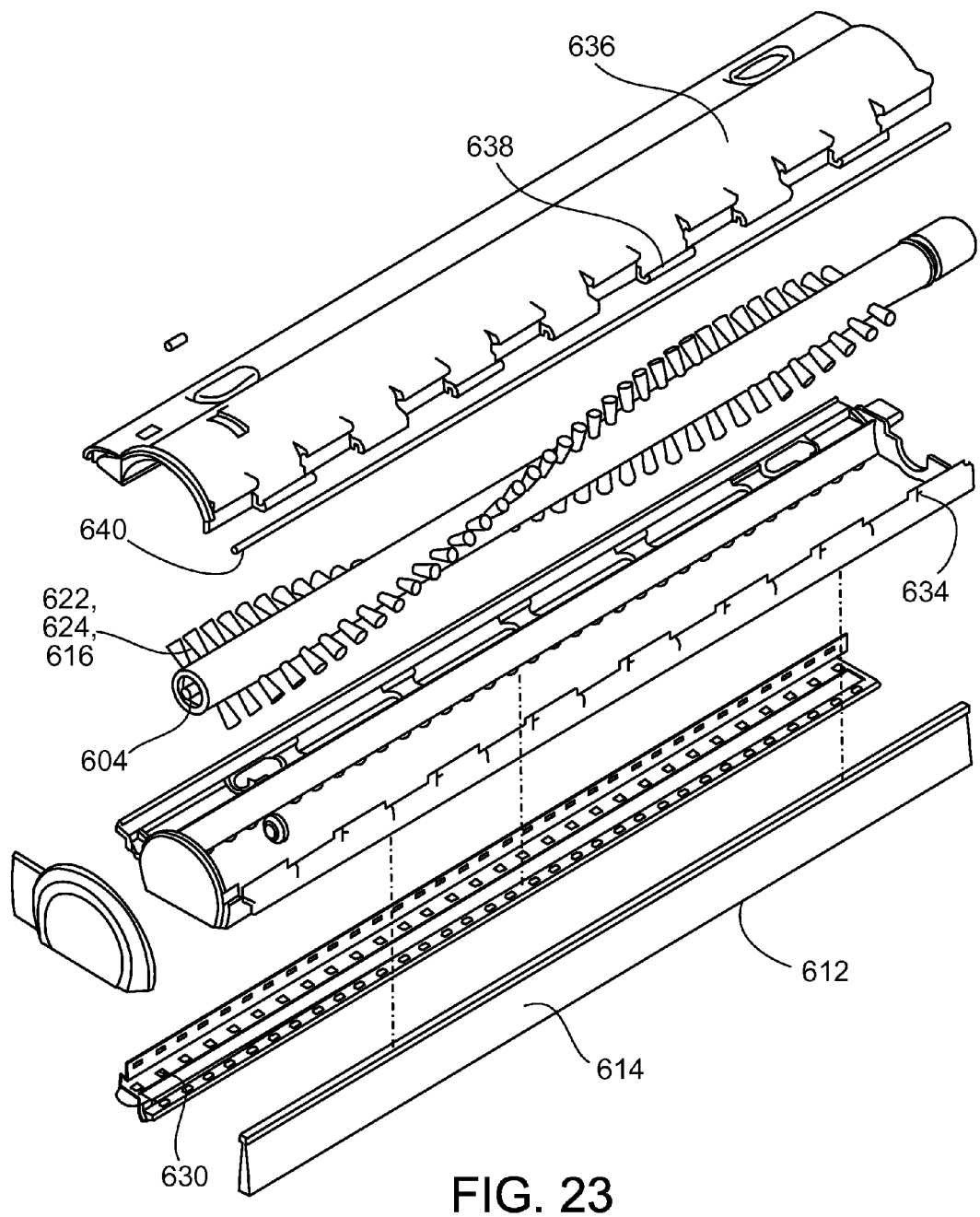
FIG. 23 depicts an exploded isometric view of a cleaning head or scrubbing module in accordance with one embodiment of the present invention.

Scrubbing bristles 616 are installed in the brush assembly in groups or clumps with each clump comprising a plurality of bristles held by a single attaching device or holder. Clumps locations are disposed along a longitudinal length of the bristle holder element 618 in a pattern. The pattern places at least one bristle clump in contact with cleaning surface across the cleaning width during each revolution of the rotatable brush element 604. The rotation of the brush element 604 is clockwise as viewed from the right side such that relative motion between the scrubbing bristles 616 and the cleaning surface tends to flick loose contaminants and waste liquid in the aft direction. In addition, the friction force generated by clockwise rotation of the brush element 604 tends drive the robot in the forward direction thereby adding to the forward driving force of the robot transport drive system. The nominal dimension of each scrubbing bristles 616 extended from the cylindrical holder 618 causes the bristle to interfere with the cleaning surface and there for bend as it makes contact with the surface. The interference dimension is the length of bristle that is in excess of the length required to make contact with the cleaning surface. Each of these dimensions plus the nominal diameter of the scrubbing bristles 616 may be varied to affect bristle stiffness and therefore the resulting scrubbing action. Applicants have found that configuring the scrubbing brush element 604 with nylon bristles having a bend dimension of approximately 16-40 min (0.62-1.6 inches) a bristle diameter of approximately 0.15 mm (0.006 inches) and an interference dimension of approximately 0.75 mm (0.03 inches) provides good scrubbing performance. In another example, stripes of scrubbing material may be disposed along a longitudinal length of the bristle holder element 618 in a pattern attached thereto for rotation therewith. FIG. 23 depicts a second schematic exploded isometric view of a cleaning head or scrubbing module similar to that depicted in FIGS. 10 and 11. In FIG. 23, the arrangement of top cover 638, static brush 614, cartridge body 634, squeegee 630, and spreader brush 604 may be more clearly seen. The top cover 638 and cartridge body 634 are pivotally joined by the metal rod 640; the double-helix brush 604 rests in the cartridge body 634, yet is removable, and the squeegee 630 depicted in FIG. 23 is a one-piece squeegee with channels therethrough for the vacuum to draw fluid.

Squeegee and Wet Vacuum Detail

The scrubbing module 600 may also include a second collecting apparatus (also and alternatively, "wet vacuum") configured to collect waste liquid from the cleaning surface across the cleaning width. The second collecting apparatus is generally positioned aft of the liquid applicator nozzles 712, 714, aft of the smearing brush, and aft of the scrubbing element. Ina preferred embodiment according to the present invention, a scrubbing module 600 is shown in section view in FIG. 12A. The smearing element 612 is shown attached to the scrubbing module at its forward edge and the rotatable scrubbing brush assembly 604 is shown mounted in the center of the scrubbing module. Aft of the scrubbing brush assembly 604, a squeegee 630 contacts the cleaning surface across its entire cleaning width to collect waste liquid as the robot 100 advances in the forward direction. A vacuum system draws air in through ports in the squeegee to suction waste liquid up from the cleaning surface. The vacuum system deposits the waste liquid into a waste storage container carried on the robot chassis 200. The robot may alternatively recirculate all or part of the fluid, i.e., a portion of the waste fluid may be scavenged, or the waste fluid may be returned to a single, clean/waste tank, either filtered or unfiltered.

Figure 12A:
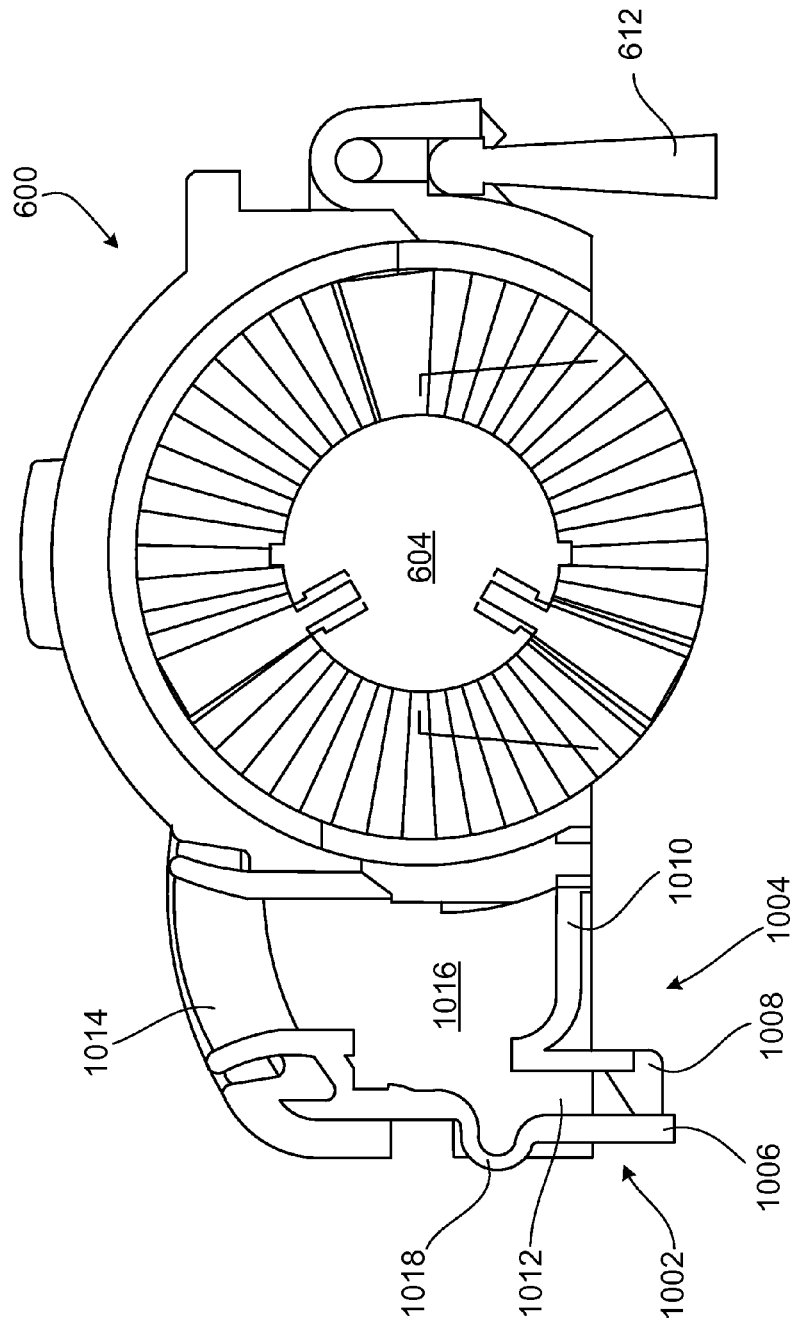
FIG. 12A depicts a schematic section view taken through a second collecting apparatus used for collecting waste liquid according to the present invention.

As detailed in the section view of FIG. 12A, the squeegee 630 comprises a vertical element 1002 and a horizontal element 1004. Each of the elements 1002 and 1004 are formed from a substantially flexible and compliant material such as neoprene or other sponge rubber, silicone or the like. A single piece squeegee construction is also usable. In a preferred embodiment, the vertical element 1002 comprises a more flexible durometer material and is more bendable and compliant than the horizontal element 1004. The vertical squeegee element 1002 contacts the cleaning surface at a lower edge 1006 or along a forward facing surface of the vertical element 1002 when the vertical element is slightly bent toward the rear by interference with the cleaning surface. The lower edge 1006 or forward surface remains in contact with the cleaning surface during robot forward motion and collects waste liquid along the forward surface. The waste liquid pools up along the entire length of the forward surface and lower edge 1006. The horizontal squeegee element 1004 includes spacer elements 1008 extending rearward form its main body 1010 and the spacer elements 1008 defined a suction channel 1012 between the vertical squeegee element 1002 and the horizontal squeegee element 1004. The spacer elements 1008 are discrete elements disposed along the entire cleaning width with open space between adjacent spacer elements 1008 providing a passage for waste liquid to be suctioned through.

A vacuum interface port 1014 is provided in the top wall of the scrubber module 600. The vacuum port 1014 communicates with the robot air moving system and withdraws air through the vacuum port 1014. The scrubber module 600 is configured with a sealed vacuum chamber 1016, which extends from the vacuum port 1014 to the suction channel 1012 and extends along the entire cleaning width. Air drawn from the vacuum chamber 1016 reduces the air pressure at the outlet of the suction channel 1012 and the reduced air pressures draws in waste liquid and air from the cleaning surface. The waste liquid drawing in through the suction channel 1012 enters the chamber 1016 and is suctioned out of the chamber 1016 and eventually deposited into a waste material container by the robot air moving system. Each of the horizontal squeegee element 1010 and the vertical squeegee element 1002 form walls of the vacuum chamber 1016 and the squeegee interfaces with the surrounding scrubbing module elements are configured to pressure seal the chamber 1016. In addition, the spacers 1008 are formed with sufficient stiffness to prevent the suction channel 1012 from closing.

The squeegee vertical element 1002 includes a flexure loop 1018 formed at its mid point. The flexure loop 1018 provides a pivot axis about which the lower end of the squeegee vertical element can pivot when the squeegee lower edge 1006 encounters a bump or other discontinuity in the cleaning surface. This also allows the edge 1006 to flex as the robot changes travel direction. When the squeegee lower edge 1006 is free of the bump or discontinuity it returns to its normal operating position. The waste liquid is further suctioned into the waste liquid storage container, compartment, or tank as described below with respect to FIG. 10.

Figure 12B:
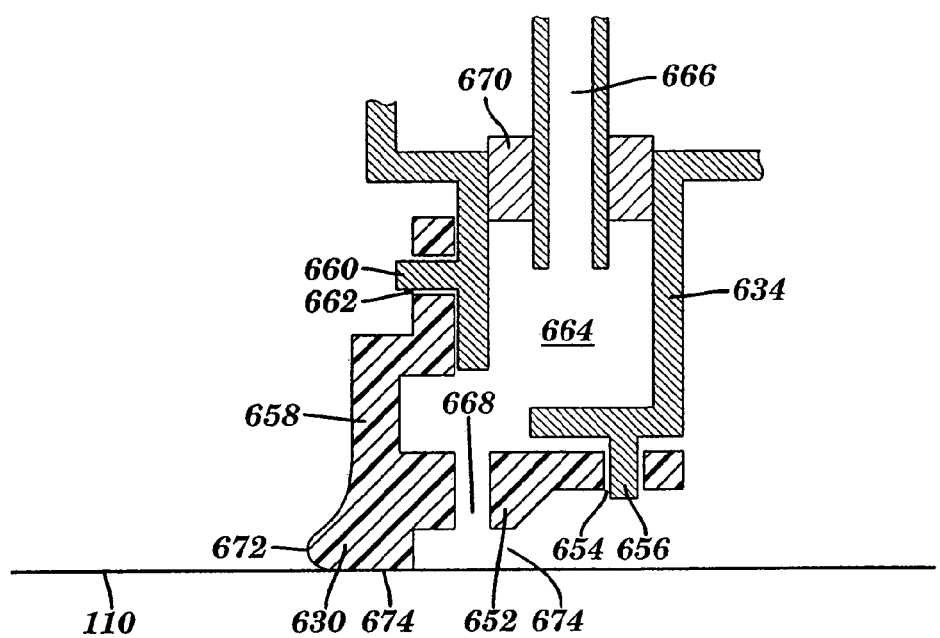
FIG. 12B depicts a schematic section view of an alternative collecting apparatus used for collecting waste liquid according to the present invention.

In an alternative shown in FIG. 12B, the second collecting apparatus comprises a squeegee 630 interconnected with a vacuum system. The squeegee 630 collects waste liquid in a liquid collection volume 676 formed between a longitudinal edge of the squeegee and the cleaning surface as the robot 100 advances in the forward direction. The vacuum system interfaces with the liquid collection volume to suction the waste liquid up from the cleaning surface and deposit the waste liquid in a waste storage tank carried on the robot chassis 200. The squeegee 630 is shown in FIG. 10 and in section view in FIG. 12B.

As shown in FIG. 12B, the squeegee 630 comprises a substantially flexible and compliant element molded from a neoprene rubber, silicone rubber, or the like, attached to the aft end of the scrubbing module 600 and disposed across the cleaning width. The squeegee extends downward from the chassis 200 to make contact or near contact with the cleaning surface. In particular, the squeegee 630 attaches to the aft edge of the scrubber module 600 at a scrubber module lower housing element 634 and extends downwardly to contact or nearly contact the cleaning surface. As shown in FIG. 12B, the squeegee 630 includes a substantially horizontal lower section 652 that extends aft of and downwardly from the lower housing element 634 toward the cleaning surface. A forward edge of the squeegee horizontal lower section 652 includes a plurality of through holes 654, uniformly disposed across the cleaning width. Each of the plurality of through holes 654 interfaces with a corresponding mounting finger 656 formed on the lower housing element 634. The interlaced through holes 652 and mounting fingers 654 locate the forward edge of the squeegee 630 with respect to the lower housing 634 and an adhesive layer applied between the interlaced elements fluid seals the squeegee lower housing interface at the forward edge.

The squeegee 630 in FIG. 12B is further configured with an aft section 658 that attaches to an aft edge of the lower housing element 634 along the cleaning width. A plurality of aft extending mounting fingers 660 are formed on the lower housing element 634 to receive corresponding through holes formed on the squeegee aft section 658. The interlaced through holes 662 and aft mounting fingers 660 locate the squeegee aft section 658 with respect to the lower housing 634 and an adhesive layer applied between the interlaced elements fluid seals the squeegee lower housing interface at the aft edge. Of course, any attaching means can be employed.

As further shown in FIG. 12B, a vacuum chamber 664 is formed by surfaces of the squeegee lower section 652, the squeegee aft section 658 and surfaces of the lower housing element 634. The vacuum chamber 664 extends longitudinally along the squeegee and lower housing interface across the cleaning width and is fluidly connected with a waste liquid storage tank carried by the chassis by one or more fluid conduits 666, described below. In a preferred embodiment of FIG. 12B, two fluid conduits 666 interface with the vacuum chamber 664 at distal ends thereof. Each of the fluid conduits 666 couple to the vacuum chamber 664 via an elastomeric sealing gasket 670. The gasket 670 installs in an aperture of the lower housing 634 and is held therein by an adhesive bond, interference fit or other appropriate holding means. The gasket 670 includes an aperture passing therethrough and is sized to receive the fluid conduit 666 therein. The outside wall of the conduit 666 is tapered to provide a lead in to the gasket 670. The conduit 666 is integral with the waste liquid storage container and makes a liquid gas tight seal with the gasket 670 when fully inserted therein.

The squeegee of FIG. 12B includes a longitudinal ridge 672 formed at an interface between the horizontal lower section 652 and the aft section 658 across the cleaning width. The ridge 672 is supported in contact with, or nearly in contact with, the cleaning surface during normal operation. Forward of the ridge 672 the horizontal lower section 652 is contoured to provide the waste liquid collecting volume 674. A plurality of suction ports 668 extend from the liquid collecting volume 674, through the squeegee horizontal lower section 652 and into the vacuum chamber 664. When negative air pressure is generated within the vacuum chamber 664, waste liquid is drawn up from the liquid collecting volume 674 into the vacuum chamber 664. The waste liquid is further suctioned into the waste liquid storage container or tank as described below.

Figure 42:
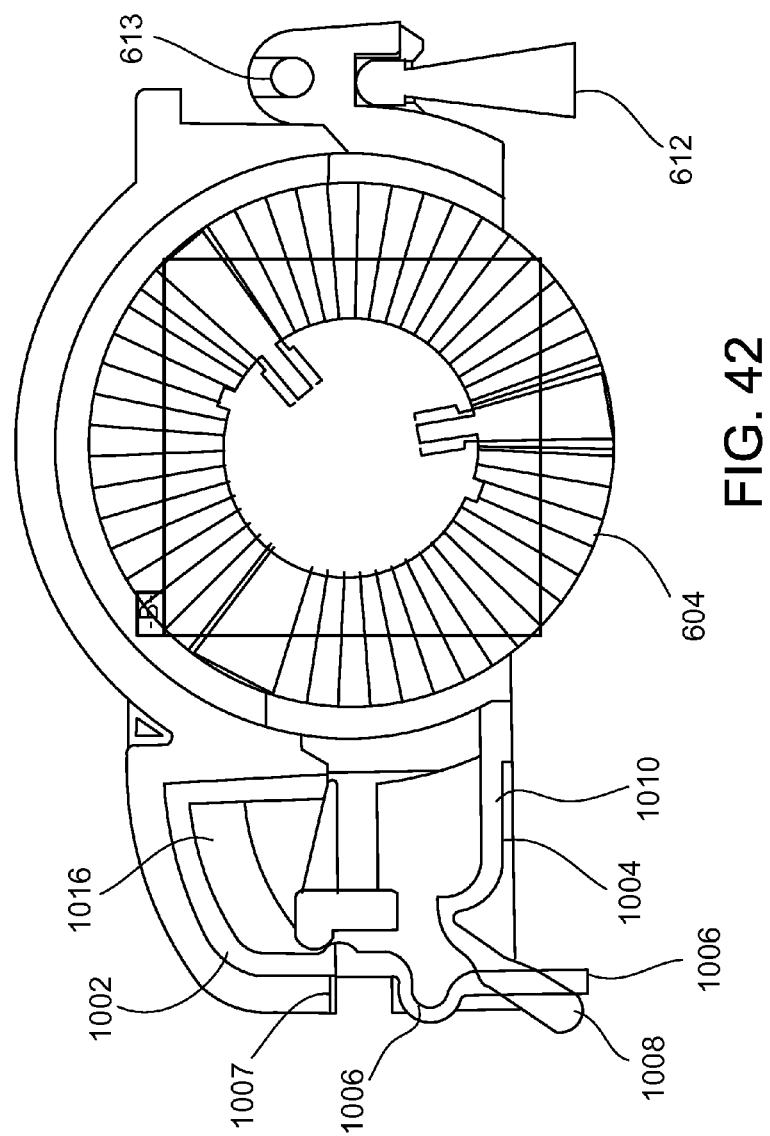
FIG. 42 depicts a side schematic view of a cleaning head and squeegee in accordance with another embodiment of the present invention.
Figure 43:
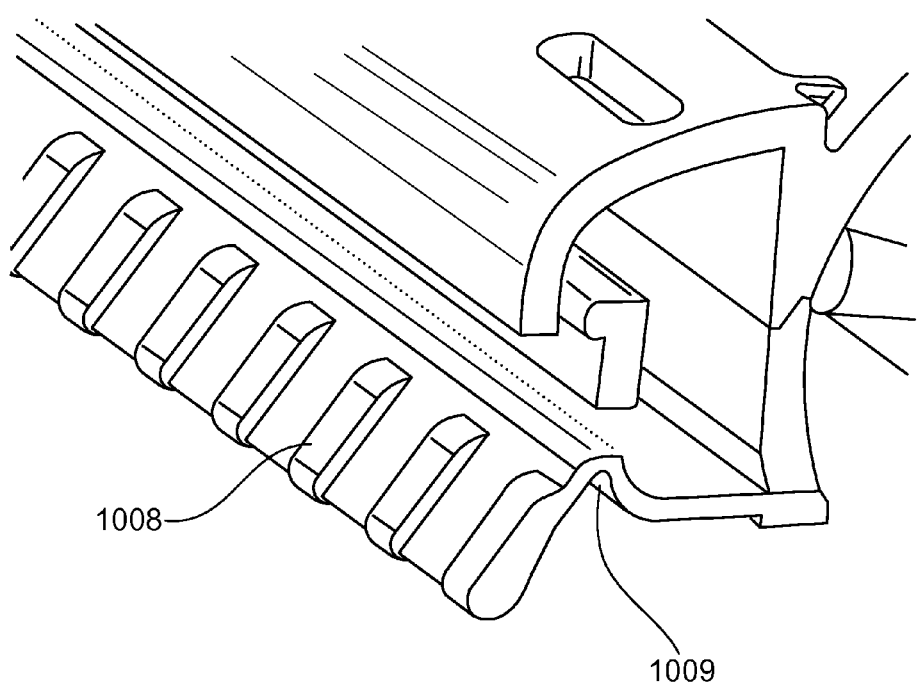
FIG. 43 depicts a perspective view of the cleaning head and squeegee depicted in FIG. 42.
Figure 44:
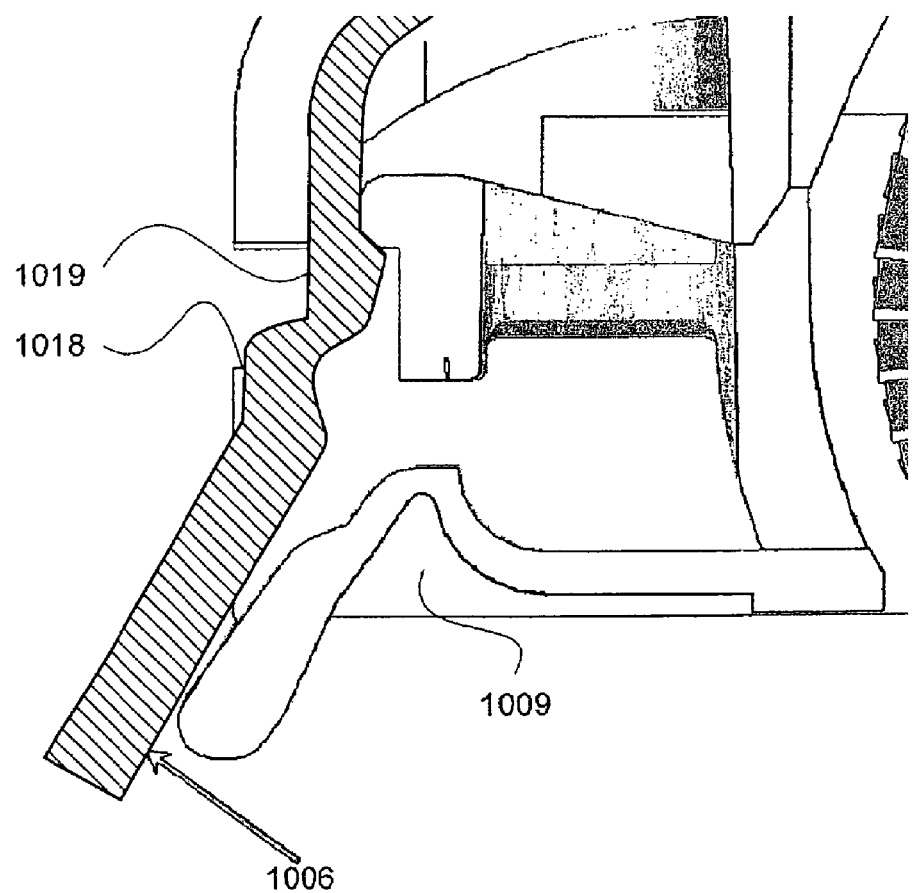
FIG. 44 depicts another side schematic view of the cleaning head and squeegee depicted in FIG. 42.
Figure 45:
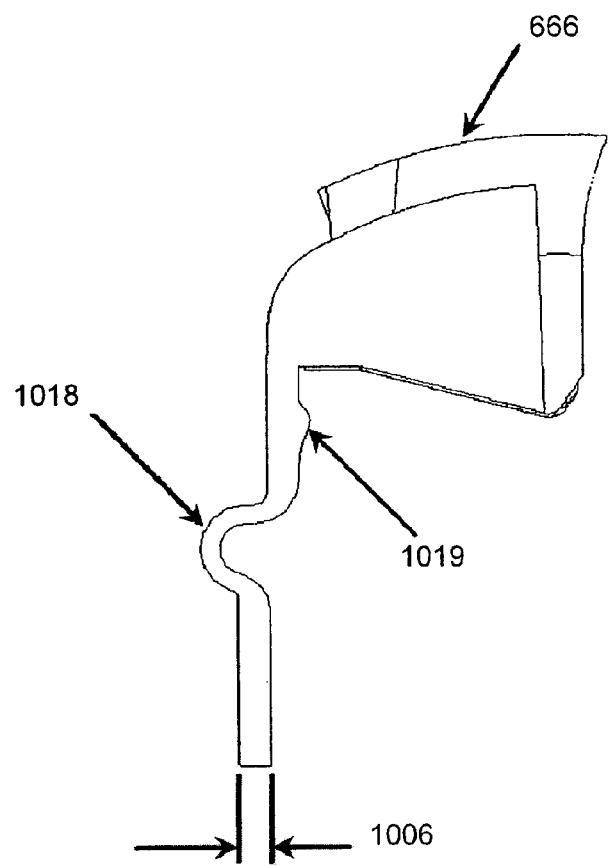
FIG. 45 depicts a third side schematic view of the cleaning head and squeegee depicted in FIG. 42.

A third squeegee configuration is shown in FIGS. 42 through 45. FIG. 42 depicts a side schematic view; FIG. 43 depicts a perspective view, FIG. 44 depicts another side schematic view, and FIG. 45 depicts a third side schematic view. This squeegee is a split squeegee, where a front crenellated panel provides separation to create vacuum channels, and a rear squeegee wiper maintains ground contact and collects fluid for the vacuum. These members are placed on different parts of the cleaning head, and match up when the cleaning head is closed.

As shown in FIG. 42, the cartridge housing or shroud opens about a hinge point 613 (to the right, above the static brush 612). The static brush 612 (e.g., the spreader brush) is mounted in the lower part of the shroud. The spinning brush 604 (e.g., the powered brush or wiper) is supported by the lower part of the shroud as well. The front squeegee 1004 is attached to the shroud bottom. As shown in FIG. 42, the front squeegee 1004 is shown in a position that it would take if it did not contact the rear shroud, i.e., the front squeegee 1004 is either resilient or biased toward the rear squeegee 1006, which is, in this case, a resilient elastomer. When the rear squeegee 1006, which can be over-molded to the shroud top, is closed with the shroud top or cover, the two squeegees settle into the operating position (shown in section in FIG. 44). The rear squeegee 1006, which is resilient, is moved toward the rear, and the front squeegee 1004 is just slightly moved toward the front, sliding slightly along the rear squeegee 1006. The settled position is slightly angled and provides the vacuum channels at just above the floor surface, with sufficient floor contact of the rear squeegee 1006. As shown in FIG. 43, the front squeegee 1004 is formed as a crenellated panel angled from the vertical and extending along the working width, the crenellated panel leading up to a flexure corner 1009 pointing upwards that also extends along the working width, which turns the corner, then curves downward and forward and leads into a horizontal panel for mounting. The crenellations or ribs 1008, visible in FIG. 43, maintain a correct flow path between the leading squeegee 1004 and the trailing squeegee 1006. The flexure angle provides a good range of motion and flexibility, from both fore and aft for the two squeegees working together (as discussed herein, able to overcome obstacles the height of the robot ground clearance).

The rear squeegee 1006, shown in section in FIG. 45, is about 1 mm thick (with other dimensions as discussed herein) and includes a flat panel arranged vertically and extending along the working width, a compliant element as a reverse C-curve flexure loop 1018, thinner than the flat panel and also extending along the working width, and a snap retention feature 1019 (shown retained in FIG. 44). In the operating position, the rear squeegee 1006 bends generally between the snap retention element 1019 and the flat panel 1006, with much of the bending taking place along the height of the C-curve flexure loop 1018. Other structures, such as hinges or different materials, can be used as the compliant element and are considered to fall within this language. The rear squeegee 1006 can be formed, as shown in FIG. 42, to extend all the way to the top and over within the vacuum chamber. If through-holes are formed or made in the top rear squeegee material, the entire rear squeegee can act as both a squeegee and as a seal for the wet vacuum ports at the top of the wet vacuum chamber 1016, as the resilient rear squeegee material closely meets the vacuum ducting as the cleaning head cartridge is matched to the robot. In other circumstances, where the rear squeegee 1006 is formed from a different material than all or some of the upper portion of the rear squeegee 1006, or where the rear squeegee 1006 does not extend all the way to the top or around the vacuum chamber, alternative seals may be provided.

FIG. 44 in general shows the operating position, wherein the rear squeegee 1006 angles back, and both flexure portions are positioned to permit flexure of the squeegee combination. Although the rear squeegee 1006 is formed as a flat panel wall (and alternatives as discussed herein) with a planar bottom, in the operating position as it is angled back by the front squeegee 1004, and a working edge, the edge of the wall and wall bottom, contacts the ground rather than the planar bottom. The contact force, area, angle, flatness and edge profile of this contact is a large contributor to the drag of the cleaning elements, and as discussed herein, is to be maintained at a sufficiently low level of drag to permit traction while still enabling the squeegeeing of water on flat or irregular surfaces.

One squeegee as described is split fore/aft for easy disassembly and cleaning. This allows the user easily to remove the front and rear sections of the squeegee and associated vacuum chamber, allows for easy removal of any blockage or obstruction such as will from time to time be found in the vacuum path. It also allows the user to place the cleaning head in, for example, a dishwasher to more thoroughly clean and sanitize it. However, the squeegee may be alternatively split left/right as well. as the robot spins in place or turns, the squeegee can assume a configuration in which one side is bent backward and one side is bent forward. The point at which the bend switches from backward to forward can act as a more or less solid column under the robot, tending to high center it and interfere with mobility. By providing a split in the center of the squeegee, this tendency can be mitigated or eliminated, increasing mobility.

Referring to FIG. 10, the scrubbing module 600 is formed as a separate subsystem that is removable from the robot chassis. The scrubbing module 600 includes support elements comprising a molded two-part housing formed by the lower housing element 634 and a mating upper housing element 636. The lower and upper housing elements are formed to house the rotatable scrubbing brush assembly 604 therein and to support it for rotation with respect to the chassis. The lower and upper housing elements 634 and 636 are attached together at a forward edge thereof by a hinged attaching arrangement. Each housing element 634 and 636 includes a plurality of interlacing hinge elements 638 for receiving a hinge rod 640 therein to form the hinged connection. Of course, other hinging arrangements can be used. The lower and upper housing elements 634 and 636 form a longitudinal cavity for capturing the rotatable scrubbing brush assembly 604 therein and may be opened by a user when the scrubbing module 600 is removed from the robot 100. The user may then remove the rotatable scrubbing brush assembly 604 from the housing to clean it replace it or to clear a jam.

The rotatable scrubbing brush assembly 604 comprises the cylindrical bristle holder 618, which may be formed as a solid element such as a sold shaft formed of glass-filled ABS plastic or glass-filled nylon. Alternately the bristle holder 618 may comprise a molded shaft with a core support shaft 642 inserted through a longitudinal bore formed through the molded shaft. The core support shaft 642 may be installed by a press fit or other appropriate attaching means for fixedly attaching the bristle holder 618 and the core support shaft 642 together. The core support shaft 642 is provided to stiffen the brush assembly 604 and is therefore formed from a stiff material such as a stainless steel rod with a diameter of approximately 10-15 mm (0.4-0.6 inches). The core support shaft 642 is formed with sufficient stiffness to prevent excessive bending of the cylindrical brush holder. In addition, the core support shaft 642 may be configured to resist corrosion and or abrasion during normal use.

As noted herein a powered brush is employed. The brush itself is easily removable from the cleaning head. This allows for the possibility for swapping in different brushes for special situations without replacing the entire cleaning head. The invention contemplates a set of brushes, each having differing physical structure (e.g., tight bristle spacing, loose, stiff bristle, wipers and bristles, etc.) for wood flooring, grout lines, uneven floors, etc. Different bristle compositions and configurations may be appropriate for different floor surfaces. Each tuft of bristles can be composed of a different number and type of bristles. The size of the tuft and the composition of the bristles impact its cleaning ability, energy consumption, and ability to handle different floor textures, and fluid management. Setting tufts at a lateral angle—allows cleaning beyond the edge of the brush core, and setting tufts at a tangential angle allows bristle tips to more aggressively strike the floor and reach deeper into cracks/grout lines.

The bristle holder 618 is configured with a plurality of bristle receiving holes 620 bored or otherwise formed perpendicular with the rotation axis of the scrubbing brush assembly 604. Bristle receiving holes 620 are filled with clumps of scrubbing bristles 616 which are bonded or otherwise held therein. In one example embodiment, two spiral patterns of receiving holes 620 are populated with bristles 616. A first spiral pattern has a first clump 622 and a second clump 624 and subsequent bristle clumps follow a spiral path pattern 626 around the holder outside diameter. A second spiral pattern 628 starts with a first clump 630 substantially diametrically opposed to the clump 622. Each pattern of bristle clumps is offset along the bristle holder longitudinal axis to contact different points across the cleaning width. However, the patterns are arranged to scrub the entire cleaning width with each full rotation of the bristle holder 618. In addition, the pattern is arranged to fully contact only a small number of bristle clumps with cleaning surface simultaneously, (e.g., two) in order to reduce the bending force exerted upon and the torque required to rotate the scrubbing brush assembly 604. Of course, other scrubbing brush configurations having different bristle patterns, materials and insertion angles are usable. In particular, bristles at the right edge of the scrubbing element may be inserted at an angle and made longer to extend the cleaning action of the scrubbing brush further toward the right edge of the robot for cleaning near the edge of a wall.

Figure 13:
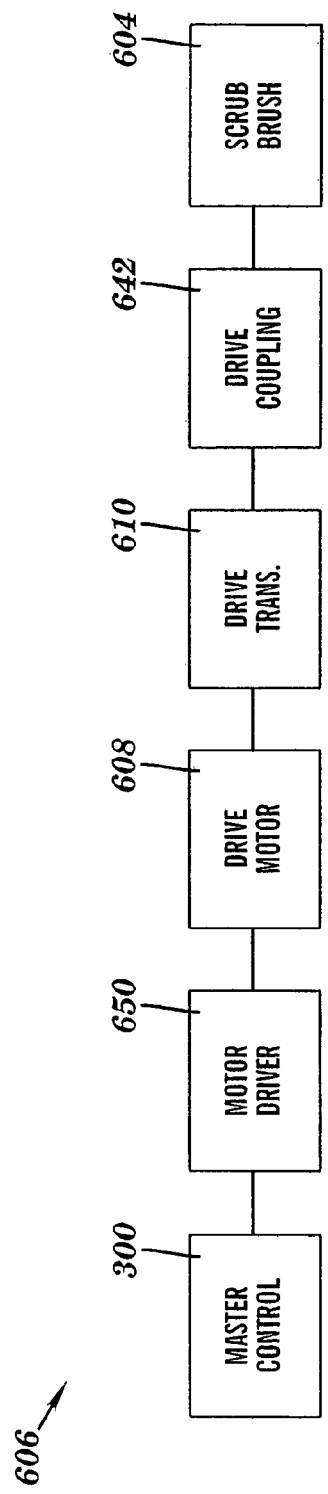
FIG. 13 is a schematic block diagram showing elements of a drive module used to rotate the scrubbing brush according to the present invention.

The scrubbing brush assembly 604 couples with a scrubbing brush rotary drive module 606 which is shown schematically in FIG. 13. The scrubbing brush rotary drive module 606 includes a DC brush rotary drive motor 608, which is driven at a constant angular velocity by a motor driver 650. The motor driver 650 is set to drive the motor 608 at a voltage and DC current level that provides the desired angular velocity of the rotary brush assembly 604, which in one embodiment is about 1500 RPM; values as low as about 500 RPM, and as high as about 3000 RPM are contemplated. The drive motor 608 is coupled to a mechanical drive transmission 610 that increases the drive torque and transfers the rotary drive axis from the drive motor 608, which is positioned on the top side of the chassis 200, to the rotation axis of the scrubbing brush assembly 604, which is positioned on a bottom side of the chassis 200. A drive coupling 642 extends from the mechanical drive transmission 610 and mates with the rotatable scrubbing brush assembly 604 at its left end. The action of sliding the scrubber module 600 into the cavity 602 couples the left end of the rotatable brush assembly 604 with the drive coupling 642. Coupling of the rotatable brush assembly 604 aligns its left end with a desired rotation axis, supports the left end for rotation, and delivers a rotary drive force to the left end. The right end of the brush assembly 604 includes a bushing or other rotational support element 643 for interfacing with bearing surfaces provided on the module housing elements 634, 636.

The scrubber module 600 further includes a molded right end element 644, which encloses the right end of the module to prevent debris and spray from escaping the module. The right end element 644 is finished on its external surfaces to integrate with the style and form of adjacent external surfaces of the robot 100. The lower housing element 634 is configured to provide attaching features for attaching the smearing brush 612 to its forward edge and for attaching the squeegee 630 to its aft edge. A pivotal latching element 646 is shown in FIG. 10 and is used to latch the scrubber module 600 in its operating position when it is correctly installed in the cavity 632. The latch 646 attaches to attaching features provided on the top side of the chassis 200 and is biased into a closed position by a torsion spring 648. A latching claw 649 passes through the chassis 200 and latches onto a hook element formed on the upper housing 636. The structural elements of the wet cleaning module 600 may be molded from a suitable plastic material such as a polycarbonate, ABS, or other materials or combinations of materials. In particular, these include the lower housing 634, the upper housing 636, the right end element 644, and the latch 646.

Air Moving Subsystems or Vacuum & Blower Assembly

Figure 14:
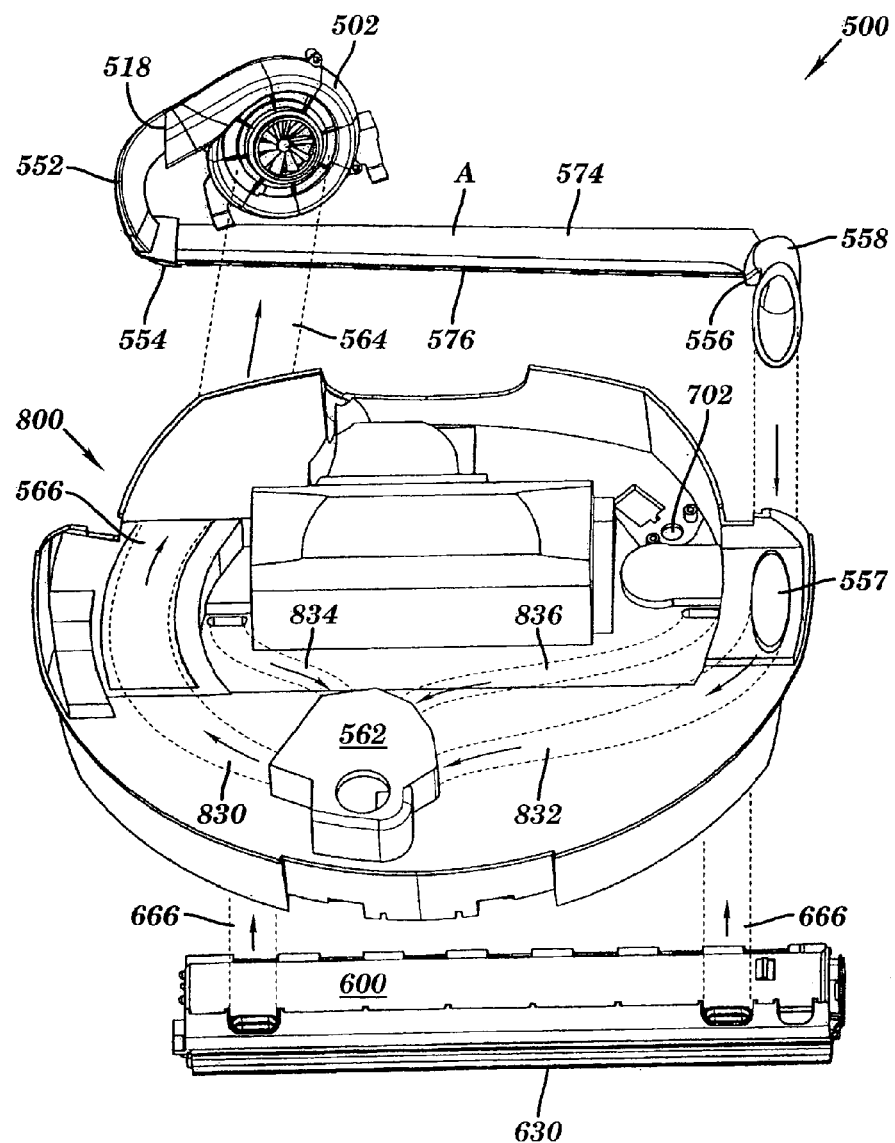
FIG. 14 is a schematic representation of an air moving system according to the present invention.

FIG. 14 depicts a schematic representation of a wet dry vacuum module 500 and its interface with the cleaning elements of the robot 100. The wet dry vacuum module 500 interfaces with the first collecting apparatus to suction up loose particulates from the cleaning surface and with the second collecting apparatus to suction up waste liquid from the cleaning surface. The wet dry vacuum module 500 also interfaces with an integrated liquid storage container 800 attached to the chassis 200 and deposits loose particulates and waste liquid into one or more waste containers housed therein.

Figure 15:
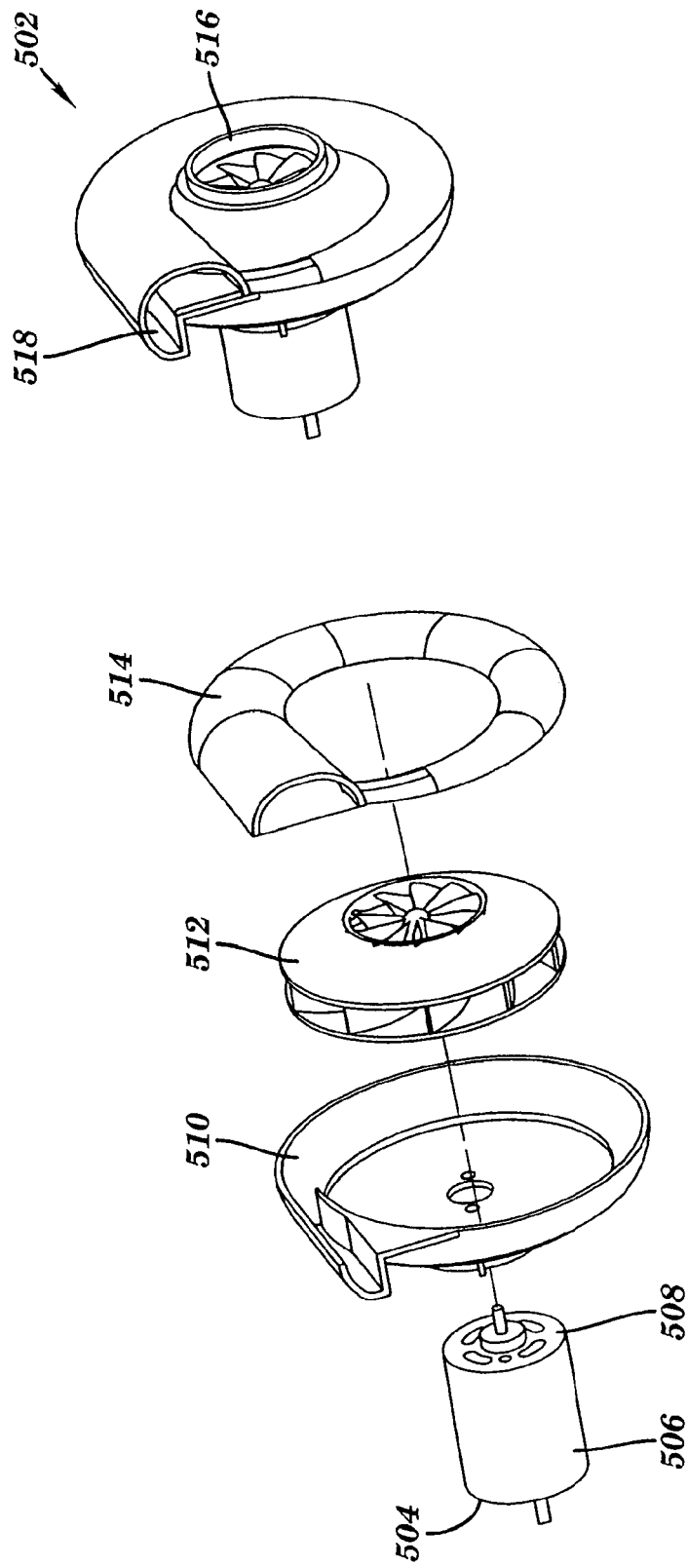
FIG. 15 depicts a schematic exploded isometric view of a fan assembly according to the present invention.

Referring to FIGS. 14 and 15, the wet dry vacuum module 500 comprises a single fan assembly 502; however, two or more fans can be used without deviating from the present invention. The fan assembly 502 includes a rotary fan motor 504, having a fixed housing 506 and a rotating shaft 508 extending therefrom. The fixed motor housing 506 attaches to the fan assembly 502 at an external surface of a rear shroud 510 by threaded fasteners, or the like. The motor shaft 508 extends through the rear shroud 510 and a fan impeller 512 is attached to the motor shaft 508 by a press fit, or by another appropriate attaching means, for causing the impeller 512 to rotate with the motor shaft 508. A front shroud 514 couples with the rear shroud 510 for housing the fan impeller 512 in a hollow cavity formed between the front and rear shrouds. The fan front shroud 514 includes a circular air intake port 516 formed integral therewith and positioned substantially coaxial with a rotation axis of the motor shaft 508 and impeller 512. The front and rear shrouds 510, 514 together form an air exit port 518 at a distal radial edge of the fan assembly 502.

The fan impeller 512 generally comprises a plurality of blade elements arranged about a central rotation axis thereof and is configured to draw air axially inward along its rotation axis and expel the air radially outward when the impeller 718 is rotated. Rotation of the impeller 512 creates a negative air pressure zone, or vacuum, on its input side and a positive air pressure zone at its output side. The fan motor 710 is configured to rotate the impeller 715 at a substantially constant rate of rotational velocity, e.g. 14,000 RPM, which generates a higher air flow rate than conventional fans for vacuum cleaners or wet vacuums. Rates as low as about 1,000 RPM and as high as about 25,000 RPM are contemplated, depending on configuration of the fan. A flywheel may be concentric with the fan impeller 715, especially if the fan is located close to the center of gravity of the robot.

The air flow rate of the fan may range from about 60-100 CFM in free air and about 60 CFM in the robot, with approximately 60% of this flow rate is dedicated to the wet vac portion of the robot. This percentage is adjustable, either manually by the user or during manufacture. Adjustment of the airflow between the wet and dry vac systems would allow the user to configure the user to address particular needs of certain applications. Additionally, a multi-stage fan design could produce a similar air flow rate, but higher static pressure and velocity, which helps to maintain flow. Higher velocity also enables the device to entrain dry particles and lift and pull fluids. The multiple ribs and channels of the squeegee help to create areas of localized high velocity for entraining particles. In one embodiment, total cross sectional area is 180 square mm for each of the wet and dry vacuum (squeegee and suction port).

Figure 24:
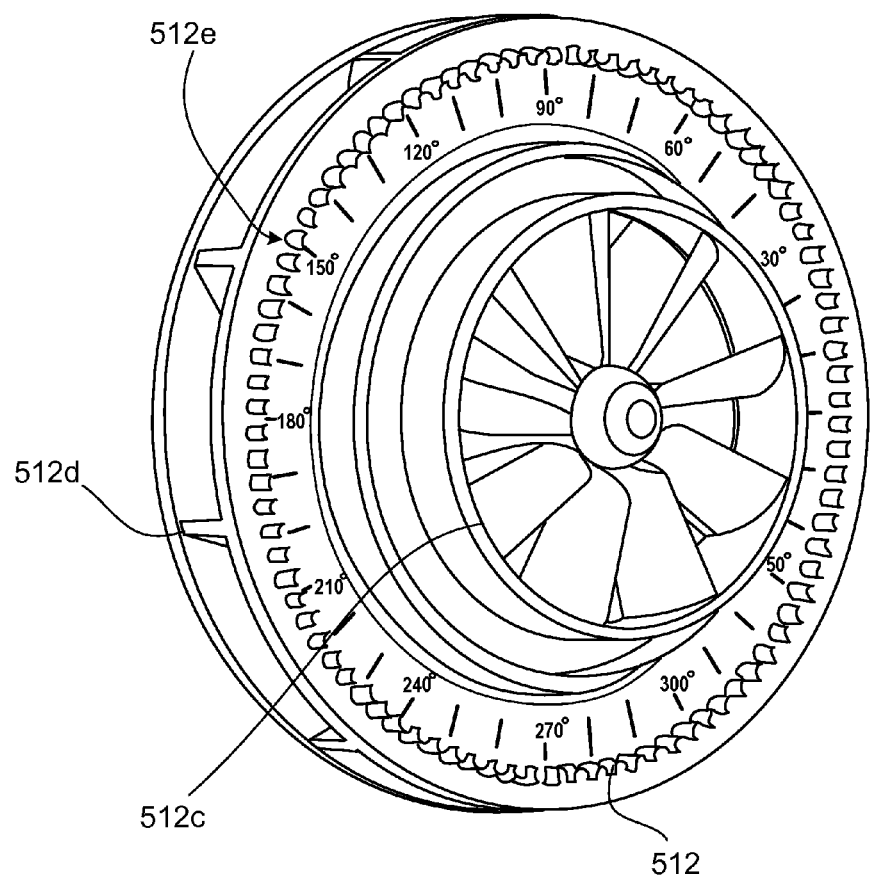
FIG. 24 depicts an isometric view of a fan assembly in accordance with one embodiment of the present invention.
Figure 25:
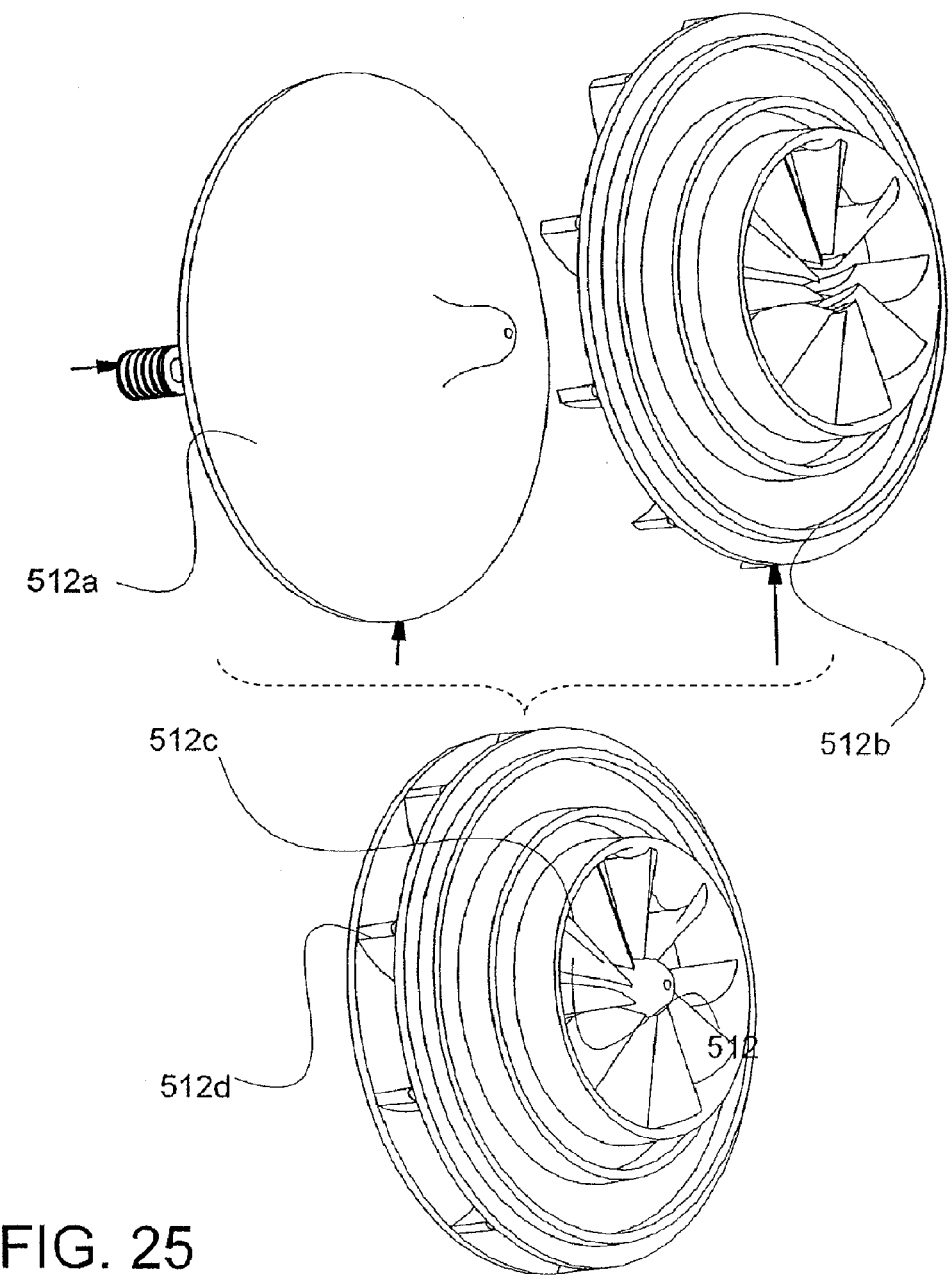
FIG. 25 depicts an exploded isometric view of a fan assembly in accordance with one embodiment of the present invention.
Figure 26:
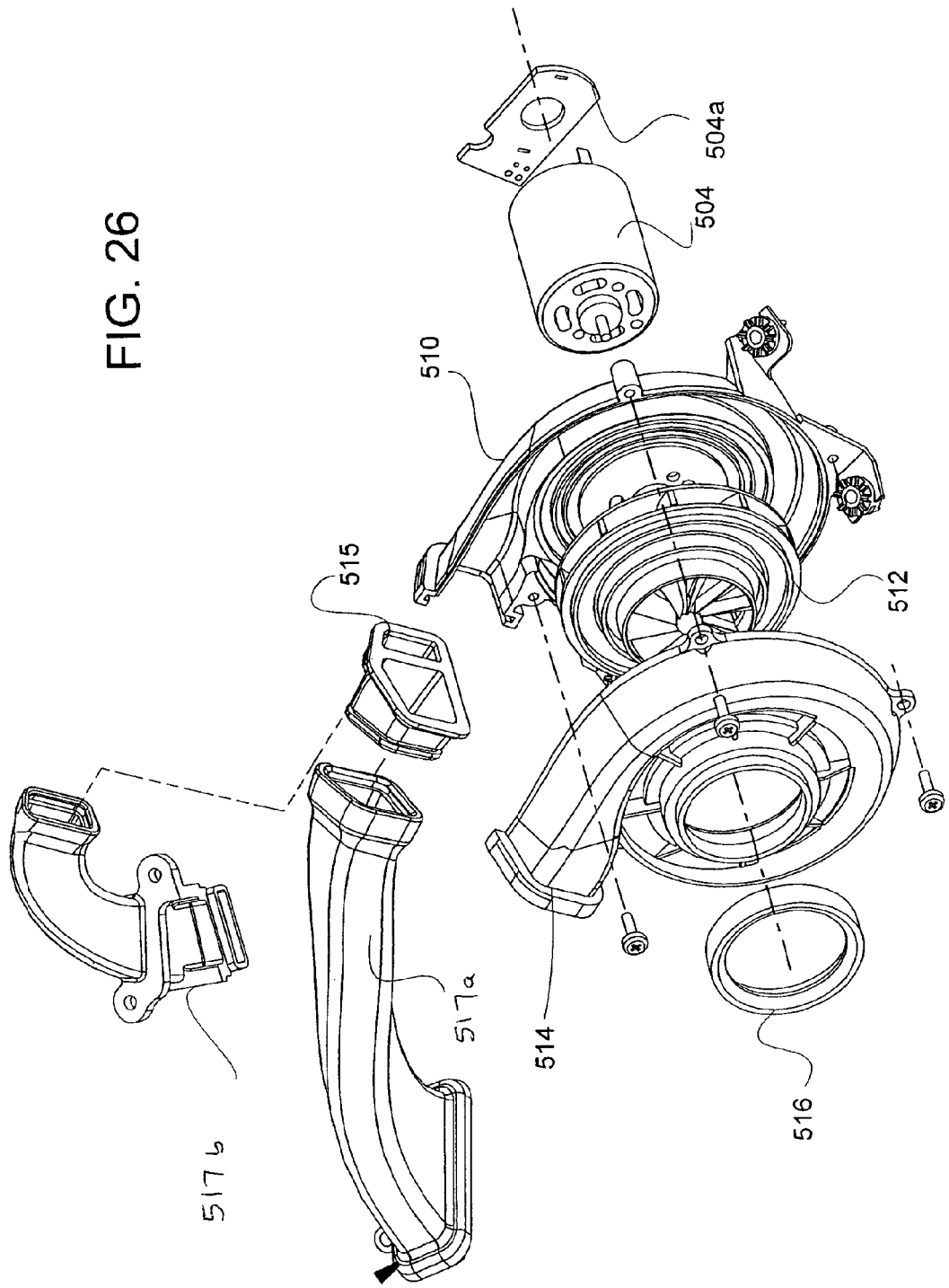
FIG. 26 depicts an exploded isometric view of a fan assembly in accordance with one embodiment of the present invention.

As shown in FIGS. 24 and 25, one example of an impeller 512 is a two stage fan assembled from a base plate 512*a* having a hub or nose formed therein, and a vane assembly 512*b*, having an inducer 512*c* and exducer 512*d* formed therein. As shown in FIG. 24, the inducer 512*c* includes forward curved inlet blades, which increase flow rate and efficiency over fan designs that do not use an inducer. The exducer blades are back swept and contribute to centrifugal flow. Also, as shown in FIG. 24, specifically sized balancing pins 512*e* are positioned at regular degreed intervals about the rim of the vane assembly 512*b*. The pins are used to assist material removal for balancing as a fan assembly designed for sustained 14,000 RPM operation of a plastic fan. Both the base plate 512*b* and vane assembly 512*b* are formed from resin or plastic, and have various irregularities and density variations. After the base plate 512*b* and vane assembly 512*b* are assembled, a balancing machine is used to identify a number of pins at specific positions to remove in order to balance the impeller. As shown in FIGS. 15 and 26, the impeller 512 is arranged within a scroll formed from the front and rear shrouds 512, 514. The scroll is for static pressure recovery and flow collection for use in the "blow" portion of the dry vacuum system. As shown in FIG. 26, a front scroll 514 and a rear scroll 510 are assembled together to hold the impeller 512, a seal 516 sealing the inducer end of the impeller 512. The impeller 512 provides vacuum for the wet and dry vacuum sections, and a part of the output is split off to provide an air jet to the dry vacuum section. A bifurcator 515 splits a smaller portion of the output air flow off using a rear duct 517*b*, while most of the output air flow is exhausted via an exhaust duct and muffler. As shown in FIG. 26, a circuit board 504*a* for the fan motor 504 is placed near the fan motor. This circuit board is one that may be rendered water resistant or waterproofed by the structures discussed herein.

With respect to the blower shown in FIGS. 24-26, the scroll design folds back in on itself to allow a 30 percent larger impeller, without any loss in scroll volume while maintaining the same package size. The inducer is the portion of the fan blade dedicated to inlet flow only. Alternatively or in addition, a passive or active bypass system (e.g., a governor plus vane; or a motorized actuator plus a vane) may be provided to balance the blower outlet to suction port inlet flows for optimum performance over a variety of system conditions. A "moat" (i.e., a channel or wall) is alternatively or addition, in front of impeller to prevent water from entering impeller. The impeller used for air handling moves air through the system at considerable velocity, which can lead to water being pulled out of the dirty tank, through the impeller, and back to the floor. The moat is designed to prevent or limit this occurrence.

As shown in the FIGS., the main exhaust is in line with the cleaning head. In other words, while the cleaning head extends to the edge of the dominant side of the robot, a space of up to ⅕ of the robot is preserved beside the cleaning head on the robot diameter. As noted above, the gear train and/or motor for the cleaning head powered brush or wiper may be placed in this space. Additionally, the main exhaust may be placed in this space. Placing the main exhaust, which is quite strong (being most of the exhaust for the wet and dry vacuums, only a part used to blow debris in the dry vacuum) along the line of the cleaning head prevents applied, brushed, and/or wiped fluid from escaping the perimeter of the robot on the non-dominant side. Additionally, it is a feature of the cleaning head that the cartridge housing is internally dry (not connected to any fluid generating devices, and generally sealed against wetness), such that upon removal of the cleaning head cartridge, the user is presented with dry surfaces for handling the cleaning head. The exhaust also may be placed behind the cleaning head to assist in drying. In such a case, the exhaust could be spread by appropriate ducts and channels.

As shown schematically in FIG. 14, a closed air duct or conduit 552 is connected between the fan housing exit port 518 and the air jet port 554 of the first cleaning zone A and delivers high pressure air to the air jet port 554. At the opposite end of the first cleaning zone A, a closed air duct or conduit 558 connects the air intake port 556 with the integrated liquid storage container module 800 at a container intake aperture 557. Integral with the integrated storage container or tank 800, a conduit 832, detailed below, connects the container intake aperture 557 with a plenum 562. The plenum 562 comprises a union for receiving a plurality of air ducts connected thereto. The plenum 562 is disposed above a waste storage container portion of the integrated liquid storage container or tank module 800. The plenum 562 and waste container portion are configured to deposit loose particulates suctioned up from the cleaning surface by the air intake port 556 into the waste container. The plenum 652 is in fluid communication with the fan intake port 516 via a closed air duct or conduit comprising a conduit 564, not shown, connected between the fan assembly and a container air exit aperture 566. The container air exit aperture 566 is fluidly connected with the plenum 562 by an air conduit 830 that is incorporated within the integrated liquid storage tank module 800. Rotation of the fan impeller 512 generates a negative air pressure or vacuum inside the plenum 560. The negative air pressure generated within the plenum 560 draws air and loose particulates in from the air intake port 556.

As further shown schematically in FIG. 14, a pair of closed air ducts or conduits 666 interface with scrubbing module 600 of the second cleaning zone B. The air conduits 666, shown in section view in FIG. 10 comprise external tubes extending downwardly from the integrated liquid container module 800. The external tubes 666 insert into the scrubber module upper housing gaskets 670.

As shown in FIG. 14, conduits 834 and 836 fluidly connect each external tube 666 to the plenum 652. Negative air pressure generated within the plenum 652 draws air from the vacuum chamber 664 via the conduits 834, 836 and 666 to suction waste liquid from the cleaning surface via the suction ports 668 passing from the vacuum chamber 664 to the waste liquid collecting volume 674. The waste liquid is draw into the plenum 562 and deposited into the waste liquid storage container.

Figure 16:
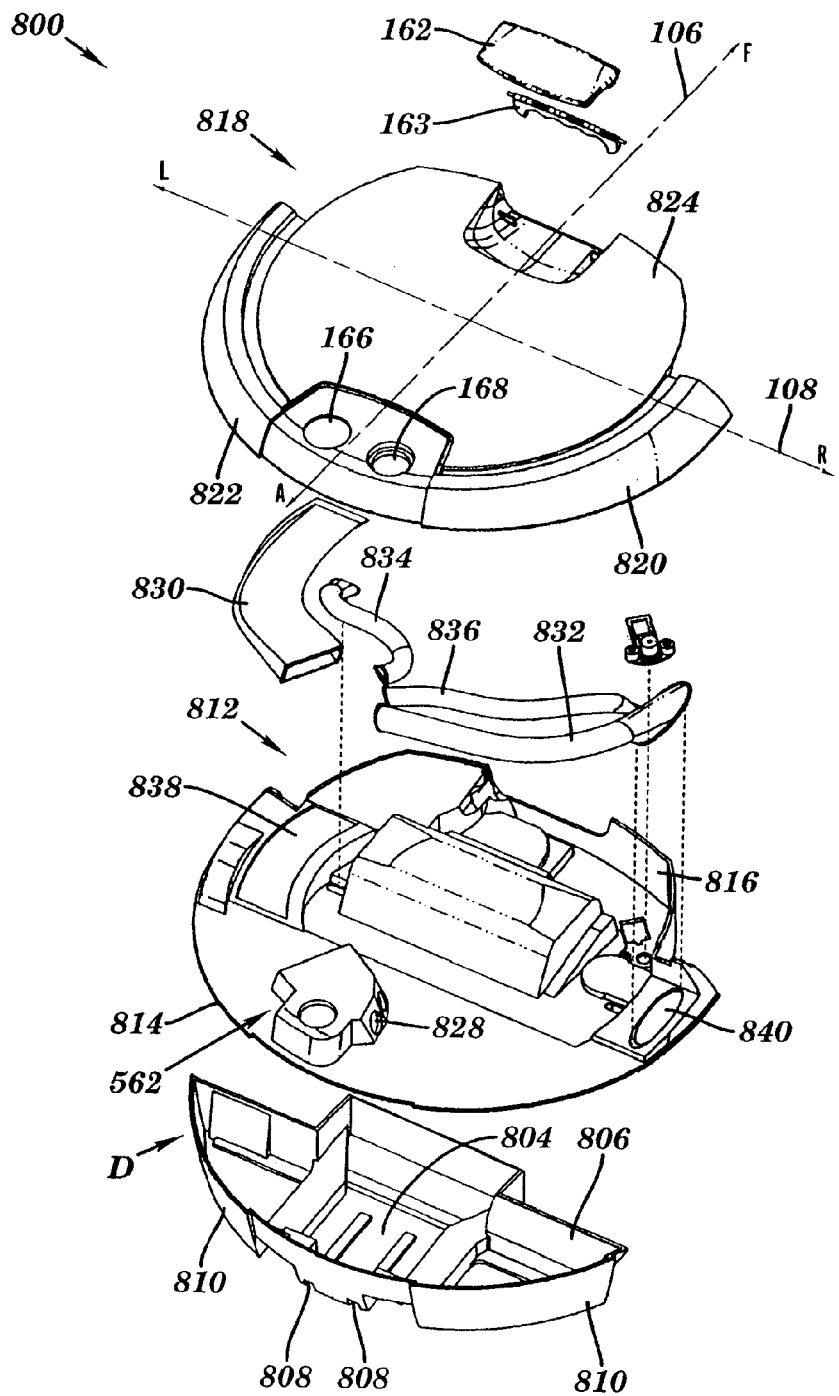
FIG. 16 depicts a schematic exploded isometric view showing elements of an integrated liquid storage module according to the present invention.

Of course other wet dry vacuum configurations are contemplated without deviating from the present invention. In one example, a first fan assembly may be configured to collect loose particulates from the first cleaning zone and deposit the loose particulates in the first waste storage container or tank and a second fan assembly may be configured to collect waste liquid from the second cleaning zone and deposit the waste liquid into a second waste storage container or tank. Integrated Liquid Storage Tank Elements of the integrated liquid storage container module 800 are shown in FIGS. 1, 12, 14, 16 and 17. Referring to FIG. 16, the integrated liquid storage container 800 is formed with at least two liquid storage container or tank portions. One container portion comprises a waste container portion and the second container portion comprises a cleaning fluid storage container or tank portion. In another embodiment of the present invention the two storage containers are formed as an integral unit that is configured to attach to the chassis 200 and to be removable from the chassis by a user to empty the waste container portion and to fill the cleaning fluid container portion. In an alternate embodiment, the integrated storage containers can be filled and emptied autonomously when the robot 100 is docked with a bas station configured for transferring cleaning fluid and waste material to and from the robot 100. The cleaning fluid container portion S comprises a sealed supply tank for holding a supply of the cleaning fluid. The waste container portion W comprises a sealed waste tank for storing loose particulates collected by the first collecting apparatus and for storing waste liquid collected by the second collecting apparatus.

The waste tank D (or compartment D) comprises a first molded plastic element formed with a base surface 804 and an integrally formed perimeter wall 806 disposed generally orthogonal from the base surface 804. The base surface 804 is formed with various contours to conform to the space available on the chassis 200 and to provide a detent area 164 that is used to orient the integrated liquid storage container or tank module 800 on the chassis 200. The detent 164 includes a pair of channels 808 that interface with corresponding alignment rails 208 formed on a hinge element 202, attached to the chassis 200 and described below. The perimeter wall 806 includes finished external surfaces 810 that are colored and formed in accordance with the style and form of other external robot surfaces. The waste tank D may also include a tank level sensor housed therein and be configured to communicate a tank level signal to the master controller 300 when the waste tank D (or compartment D) is full. The level sensor may comprise a pair of conductive electrodes disposed inside the tank and separated from each other. A measurement circuit applies an electrical potential difference between the electrodes from outside the tank. When the tank is empty no current flow between the electrodes. However, when both electrodes are submerged in waste liquid, current flows through the waste liquid from one electrode to the other. Accordingly, the electrodes may be located at positions with the tank for sensing the level of fluid within the tank.

The cleaning fluid storage container or tank S is formed in part by a second molded plastic element 812. The second molded element 812 is generally circular in cross-section and formed with a substantially uniform thickness between opposing top and bottom surfaces. The element 812 mates with the waste container perimeter wall 810 and is bonded or otherwise attached thereto to seal the waste container, compartment, or tank D. The plenum 562 is incorporated into the second molded element 812 and positioned vertically above the waste container, tank D (or compartment D) when the cleaning robot is operating. The plenum 562 may also comprise a separate molded element.

The second molded element 812 is contoured to provide a second container portion for holding a supply of cleaning fluid. The second container portion is formed in part by a downwardly sloping forward section having an integrally formed first perimeter wall 816 disposed in a generally vertically upward direction. The first perimeter wall 816 forms a first portion of an enclosing perimeter wall of the liquid storage container S. The molded element 812 is further contoured to conform to the space available on the chassis 200. The molded element 812 also includes the container air input aperture 840, for interfacing with first cleaning zone air conduit 558. The molded element 812 also includes the container air exit aperture 838, for interfacing with the fan assembly 502 via the conduit 564.

A molded cover assembly 818 attaches to the molded element 812. The cover assembly 818 includes a second portion of the supply tank perimeter wall formed thereon and provides a top wall 824 of the supply tank enclosure. The cover assembly 818 attaches to the first perimeter wall portion 816 and to other surfaces of the molded element 814 and is bonded or otherwise attached thereto to seal the supply container S. The supply container S may include a tank empty sensor housed therein and be configured to communicate a tank empty signal to the master controller 300 when the upper tank is empty.

The cover assembly 818 comprises a molded plastic cover element having finished external surfaces 820, 822 and 824. The finished external surfaces are finished in accordance with the style and form of other external robot surfaces and may therefore be colored and or styled appropriately. The cover assembly 818 includes user access ports 166, 168 to the waste container tank D to the supply container S, respectively. The cover assembly 818 also includes the handle 162 and a handle pivot element 163 attached thereto and operable to unlatch the integrated liquid storage tank 800 from the chassis 200 or to pick up the entire robot 100.

According to the invention, the plenum 562 and each of the air conduits 830, 832, 834 and 836 are inside the cleaning fluid supply container S and the interconnections of each of these elements are liquid and gas sealed to prevent cleaning fluid and waste materials from being mixed together. The plenum 562 is formed vertically above the waste container, compartment, or tank D so that waste liquid waste and loose particulates suctioned into the plenum 562 will drop into the waste tank D (or compartment D) under the force of gravity. The plenum side surfaces 828 include four apertures formed therethrough for interconnecting the plenum 562 with the four closed air conduits interfaced therewith. Each of the four closed air conduits 830, 832, 834 and 836 may comprise a molded plastic tube element formed with ends configured to interface with an appropriate mating aperture.

As shown in FIG. 16, the container air exit aperture 838 is generally rectangular and the conduit 830 connecting the container air exit aperture 838 and the plenum 562 is shaped with a generally rectangular end. This configuration provides a large area exit aperture 838 for receiving an air filter associated therewith. The air filter is attached to the fan intake conduit 564 to filter air drawn in by the fan assembly 502. When the integrated storage tank 800 is removed from the robot, the air filter remains attached to the air conduit 564 and may be cleaned in place or removed for cleaning or replacement as required. The area of the air filter and the container exit aperture 838 are formed large enough to allow the wet dry vacuum system to operate even when up to about 50% or more of the air flow through the filter is blocked by debris trapped therein.

Figure 27:
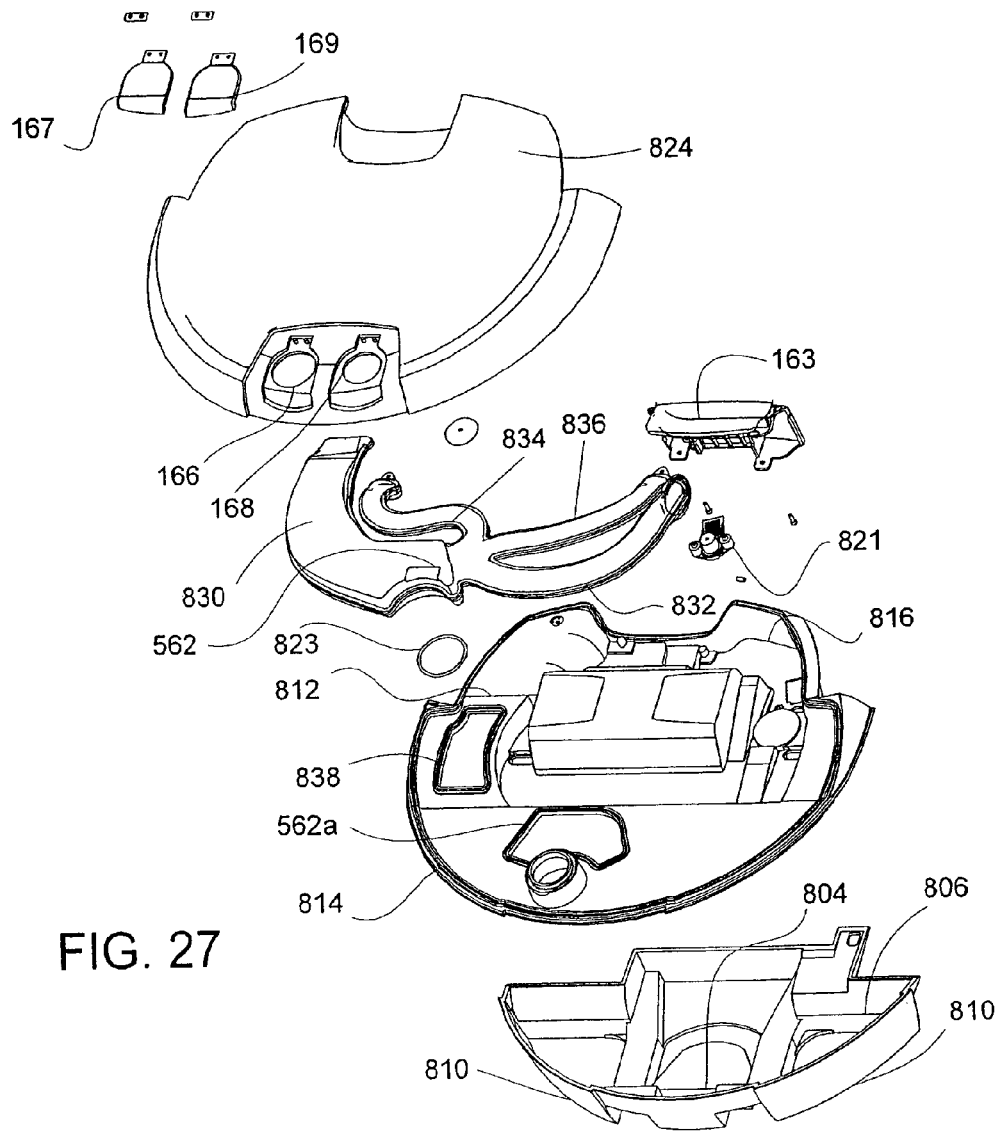
FIG. 27 depicts an exploded view of a robot chassis having an integrated tank according to an embodiment of the present invention.

FIG. 27 depicts a second schematic exploded isometric view showing elements of an integrated tank similar to that of FIG. 16. FIG. 27 depicts many of the same or similar elements as FIG. 3. Some alternative terminology is used in the following description. The elements shown in FIG. 27 are the handle, a manifold including plenum 830 and tubes 832, 834, 836 (in this embodiment, the plenum and air flow conduits are all integral; in other embodiments, the air flow conduits would be replaced with rubber guide tubes), a pump filter, and a magnet reed. FIG. 27 shows a D-shaped flexible rubber tank cap for the clean tank, a similar one for the waste tank (these rubber tank caps include an inner circular seal that conforms to the shape of the tubes leading to the compartments, and a D-shaped outer part that has a matching receiver in the tank lid, as depicted in FIG. 27). When the tank is loaded in the clevis-like holder or pivot clamp, the holder can assist in holding shut both of the D-shaped flexible rubber tank caps. The figure also depicts the tank bottom (which forms the dirty compartment), the tank middle, and the tank top (which forms the clean compartment). As show, the plenum and/or conduits for the dry and/or wet vacuums extend through the clean tank. This would not generally be found in a larger device, as a larger device would have space to arrange vacuum and/or other air flow conduits outside clean or dirty water tanks. Alternatively, only some of the conduits for the vacuum could extend through the clean tank (e.g., the wet only, the dry only, one wet and one dry), or some or all of the conduits could extend through the dirty tank. Alternatively, one or more conduits could extend through both tanks. Still further alternatively, the conduits could be formed in another layer, i.e., be sandwiched between two tank middle plates. FIG. 27 also depicts an O-ring for sealing the tank top to a tube passing from the tank top through the tank middle to the dirty compartment.

Figure 28:
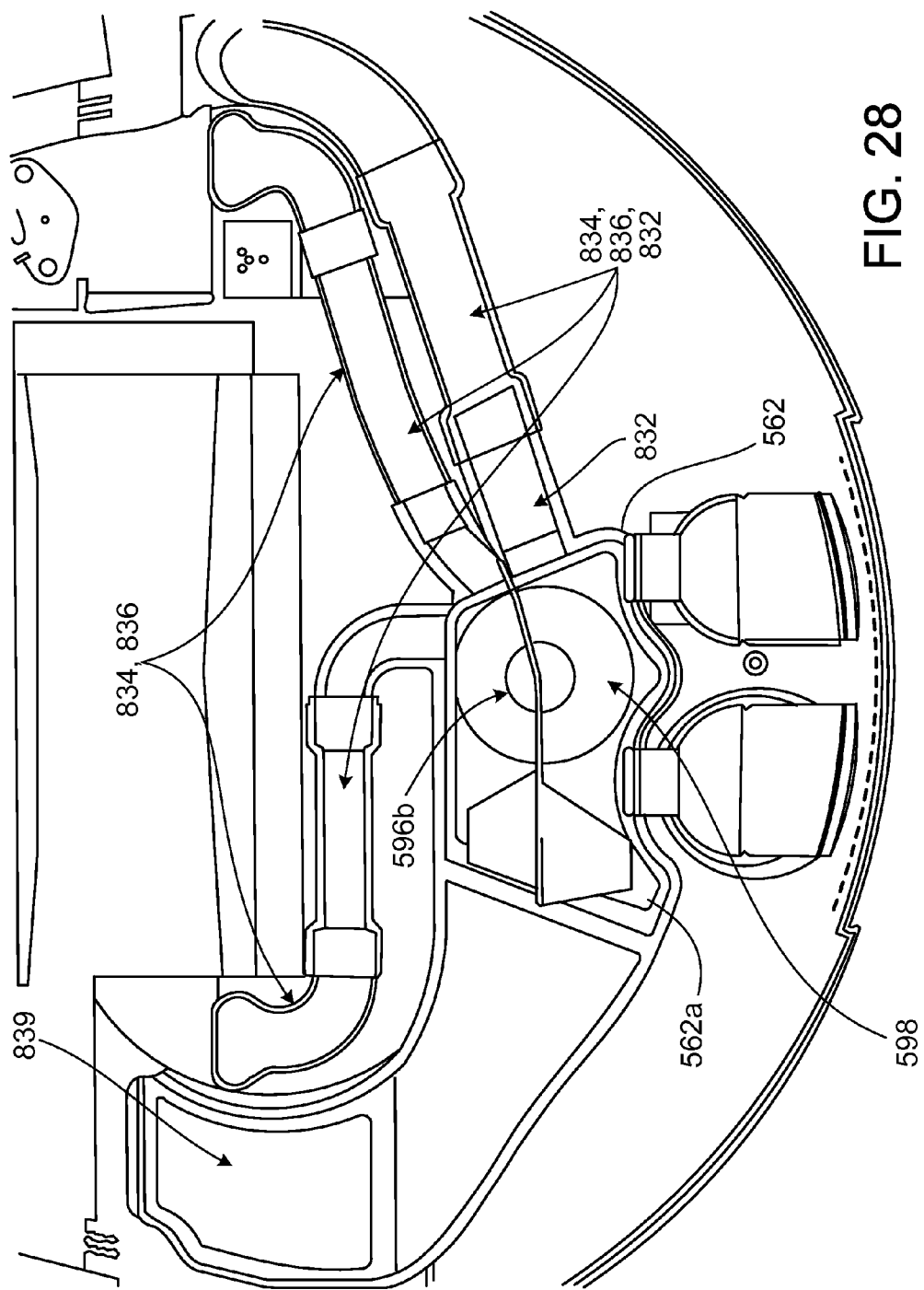
FIG. 28 depicts a plan view of a sealing flap and airfoil within the plenum of the integrated tank depicted in FIG. 27.
Figure 29:
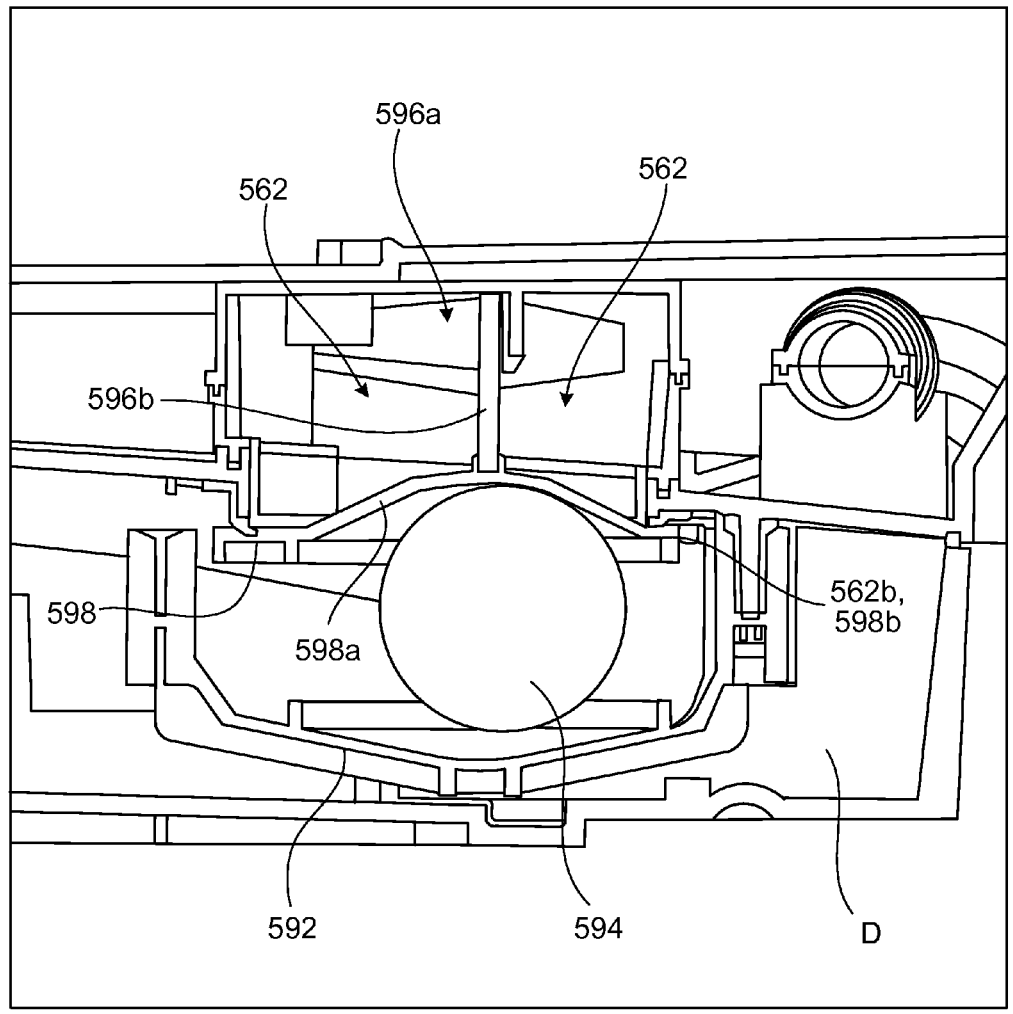
FIG. 29 depicts a side section view of the sealing flap and airfoil within the plenum of the integrated tank depicted in FIG. 28.
Figure 30:
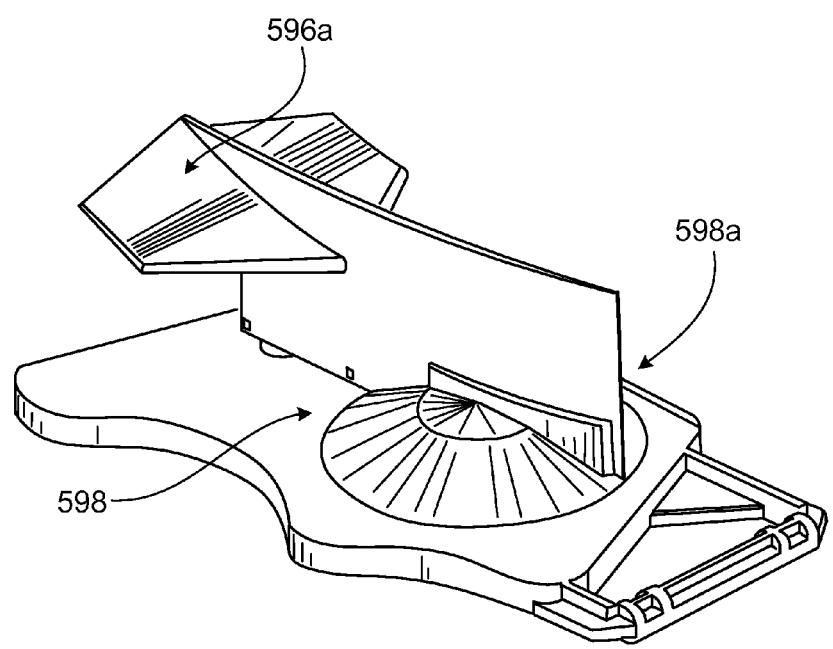
FIG. 30 is an isometric view of the sealing flap, airfoil, and a foam/airflow wall in accordance with one embodiment of the present invention.
Figure 31:
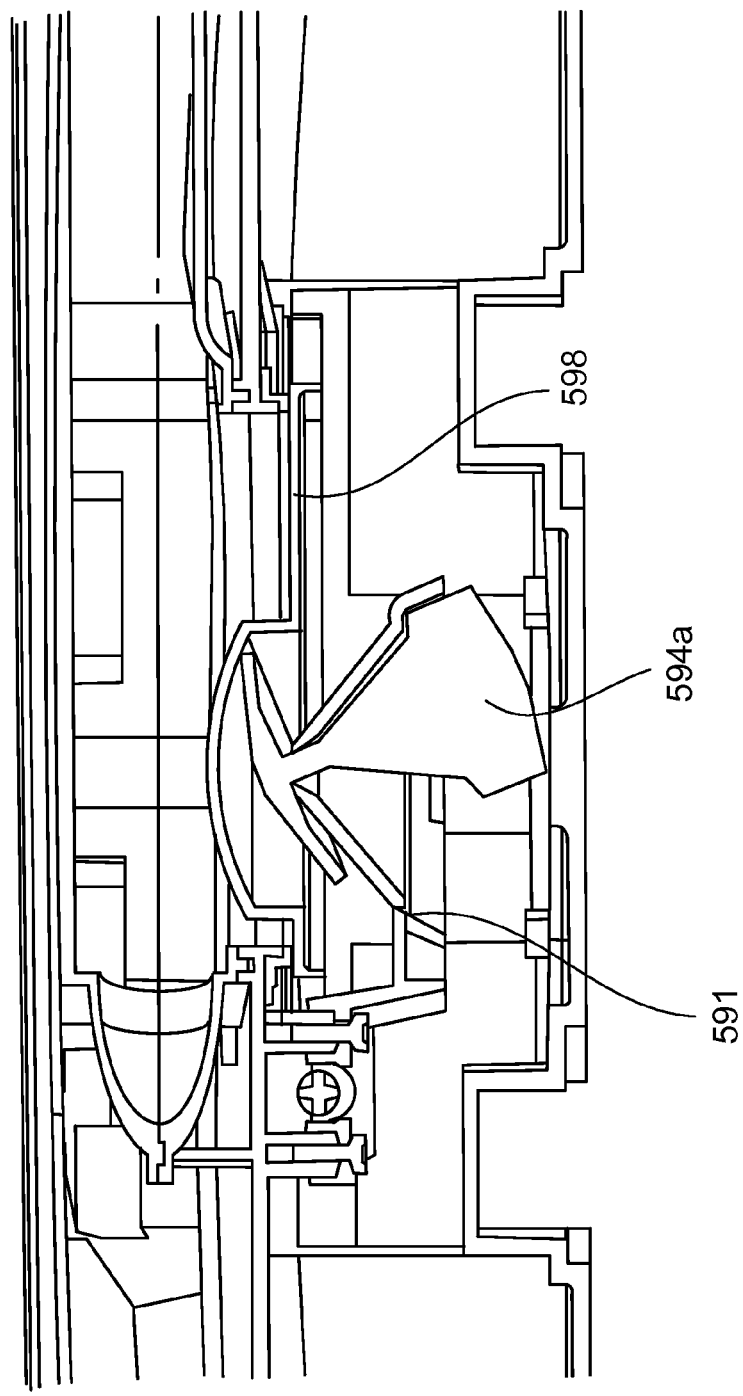
FIG. 31 is a side section view of a sealing flap and pendulum in accordance with one embodiment of the present invention.

FIGS. 28-30 show a sealing flap 598, airfoil, foam/airflow wall, and ball 594 within the integrated tank 592. FIG. 31 is an isometric view of a foam blocking wall within the integrated tank 592.

As shown in FIG. 27, an aperture 562a at the bottom of the plenum (in this embodiment, "bottom" refers to the operating orientation) permits particulates and waste water to drop into the waste tank D. As shown in FIG. 16A, this aperture is relatively large. When the tank or robot is lifted and leaves the operating orientation, collected waste must be retained in the waste tank D to prevent it from entering the fan or escaping the waste tank to wet the user or floor. As shown in FIGS. 28-30, a hinged flap 598 is provided to seal the aperture 562a.

The hinged flap 598 is hinged at one side of the aperture 562a, and opens down. That is, when the robot operates, the flap 598 is to be kept open, to permit waste to enter the waste tank D. However, air flow passing over the flap 598 toward the vacuum side of the fan assembly 502 creates a low pressure region above the flap 598 (Venturi/Bernoulli Effect), which can tend to pull up and close the flap in some operating conditions. An airfoil 596 attached to the flap 598 within the plenum 562 is introduced into this air flow, and the down-force effect of the airfoil 596 dominates the Bernoulli Effect, keeping the flap 598 open whenever significant air flow is present. The airfoil 596 is shaped as a generally horizontal (and, in certain embodiments, upswept) wing 596a mounted atop a vertical fin 596b, resembling a T assembly airplane tail. The airfoil 596 is swept in a direction to create down-force or flap-opening force during robot operation.

As shown in FIGS. 28-30, the hinged flap 598, however, is allowed to open no farther than a ball 594. The ball 594 is provided below the flap 598 to close the flap 598 when the tank or robot are moved from the operating orientation to a non-horizontal, vertical or partially vertical orientation (e.g., when the tank alone or robot is being carried). Alternatively, the ball 594 may prevent the flap 598 from moving more than a predetermined distance away from the aperture. Regardless of the degree of movement of the flap 598, the arrangement of the ball 594 and flap 598 provides for opening and closing the flap 598 at appropriate times. A downwardly open upper cone 598a is formed in the bottom of the hinged flap, and an upwardly open lower cone 592 is formed in the waste tank D. The walls of each cone are less than 45 degrees from horizontal, the walls of the lower cone 592 being shallower than those of the upper cone 598a and less than about 30 degrees from horizontal. In a normal operating orientation, the ball 594 rests in the lower cone 592, and waste drops through the aperture 562a and around the ball 594. When the tank or robot are moved into any orientation other than horizontal, the ball 594 escapes the shallow lower cone 592 and travels along the converging walls of the upper and lower cone, pushing on and closing the flap 598. A matching lip seal 562b-598a around the aperture 562a and flap 598 prevents waste from escaping the waste tank D when the flap 598 is closed by the ball 594.

The vertical fin 596b, however, serves a purpose other than merely supporting the airfoil(s) 596a. The vertical fin 596b forms a vertical wall that extends substantially across the length of the flap 598. This wall begins at or near the entry of the wet vacuum conduit 832 and dry vacuum conduits 834, 836 into the plenum 562, and separates the dry vacuum air stream(s) from the wet vacuum air stream across the length of the flap 598 as noted, as well as substantially across the length of the plenum 562. Accordingly, particulates will generally tend to remain dry while they drop into the waste tank D. The dry side air flow moves at higher speed than the wet side air flow entering the plenum. Keeping foam on the low speed side helps the foam move into the tank.

As shown in FIGS. 28-30, the flap-ball-airfoil arrangement uses gravity and existing air flow to open and close the flap/aperture depending on circumstances, and generally avoids issues of corrosion or collection of sludge, which could adversely affect more complex actuation. The combination constitutes an aperture-closing member (the flap); a member that helps open the flap during operation (the airfoil); and a member that helps close the flap when the robot is moved to a non-operating position (the ball). It may not be necessary to close the flap when the robot is not operating but remains horizontal, as gravity prevents the escape of waste fluid, and there exists some advantage to keeping the flap open to permit fluid in the plenum to drip into the waste tank after air flow stops. In cases where the flap should be closed during non-operation, however, other mechanical means (including airfoils, springs, balls, or weights) could close the flap as soon as air flow stops, e.g., a member that tends to close the flap except during operation could also or alternatively be included. Unpowered, non-electrical actuation of such a mechanism would require no independent power supply, and it is noted that the flap-ball-airfoil combination is simple, robust, and durable. Regardless, electrical and/or fluid-powered actuators still may be used in lieu of or in addition to mechanical devices such as airfoils, balls, springs (including elastomers), and weights.

As shown in FIG. 31, one particular alternative technique for maintaining the flap appropriately open or closed would employ a pendulum or plumb weight arranged to pull open, or permit to open, the flap during operation and to swing to close the flap when the tank or robot is moved to a non-horizontal orientation. The pendulum or plumb weight could either hang freely from a position near the flap bottom, or could be attached to a relatively rigid multi-way arm or "hat" angled from the pendulum "shaft," the pendulum pivoting substantially about the angle, preferably about a multi-way ball, shoulder, or loosely coupled axis that permits the arms to tilt relative to the flap. One support that provides an appropriate axis is a conic shape with a small hole at the point of the cone, the cone opening down, and the shaft of the pendulum being relatively loose in the hole at the point of the cone. If the hat or arms are above the hole, and the weight movable within the cone, the assembly will keep the arms horizontal until the robot or tank is moved away from the horizontal, in which case the pendulum shaft tilts inside the hole and cone, at least one part of the hat or arms then pushing the flap closed. The flap can include a seat for the hat or arms that is internally curved along the hat to permit clearance and free movement as appropriate. The pendulum weight pivots the arms or hat so that the arms or hat are substantially horizontal when the robot or tank is horizontal (pulling open or permitting the relatively compliant flap to open when the robot or tank is horizontal) and at least one arm or part of the hat pushes the flap against the seal when the robot or tank is not horizontal (pushing the relatively compliant flap closed in the vertical or non-horizontal orientation). The pendulum weight should move freely, and can be positioned as far as possible from the flap (proximate the far walls of the tank) to provide a longer moment arm.

Figure 32:
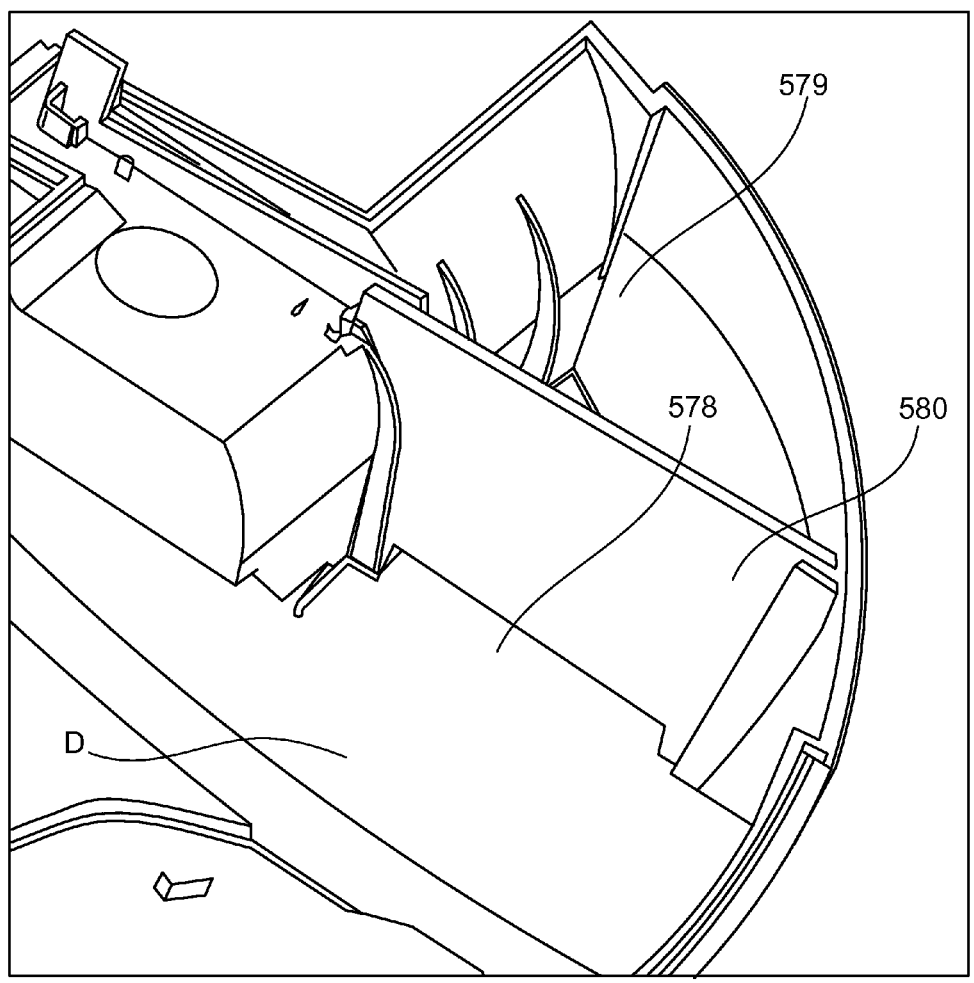
FIG. 32 is an isometric view of a foam blocking wall within the integrated tank in accordance with one embodiment of the present invention

FIG. 32 is an isometric view of a foam blocking wall 580 within the integrated tank D. As noted herein, a waste fluid (WTF) sensor is used at the top of the waste fluid tank. The waste fluid sensor is conductive, and when waste fluid reaches the top of the tank, a current may pass between two wire probes at the top of the compartment, indicating via a visible or audible signal emitted from the robot that the waste compartment is full. During cleaning, however, depending on the cleaning fluid and what has been cleaned, foam may build up in the waste fluid compartment and, as foam can conduct a current, give a false positive reading on the waste fluid full sensor. The foam tends to be generated before, or during entry of waste fluid into the aperture or entrance port to the waste compartment. As shown in FIG. 32, a wall is provided between an isolated section 579 of the waste fluid compartment (in which one or both of the probes are located) and the remainder of the tank D. The wall 580 includes a gap or fluid entrance port 578 at the bottom of the tank D, but otherwise is a complete wall isolating the probe chamber 579, with sufficient air flow allowed to enable water to easily enter the chamber, and subsequently rise therein. Foam can exist in the main chamber D, but does not transfer to the isolated probe chamber 579, which remains generally foam free. Accordingly, the sensor does not generally register the presence of foam in this configuration.

Returning to FIGS. 16 and 28, each of the container apertures 840 and 838 are configured with a gasket, not shown, positioned external to the container aperture. The gaskets provide substantially airtight seals between the container assembly 800 and the conduits 564 and 558. In one embodiment, the gaskets remain affixed to the chassis 200 when the integrated liquid supply container 800 is removed from the chassis 200. The seal is formed when the container assembly 800 is latched in place on the robot chassis. In addition, some of the container apertures may include a flap seal or the like for preventing liquid from exiting the container while it is carried by a user. The flap seal remains attached to the container.

FIG. 28 shows that the air conduits are connected to the plenum with flexible (e.g., elastomer) tubes. These tubes help account for the stack-up of manufacturing tolerances. Alternatively, as discussed herein, the entire set of plenum and conduits may be formed as an, e.g., blow-molded or other unit; or the plenum and conduits may be matching top and bottom injection or other molded units.

Thus according to the present invention, the fan assembly 502 generates a negative pressure of vacuum which evacuates air conduit 564, draws air through the air filter disposed at the end of air conduit 564, evacuates the fan intake conduit 830 and the plenum 562. The vacuum generated in the plenum 562 draws air from each of the conduits connected thereto to suction up loose particulates proximate to the air intake port 556 and to draw waste liquid up from the cleaning surface via the air conduits 834, 836 and 666, and via the vacuum chamber 664 and the suction ports 668. The loose particulates and waste liquid are drawn into the plenum 562 and fall into the waste container, compartment, or tank D.

Referring to FIGS. 1, 3, 16 and 17 the integrated liquid storage container or tank 800 attaches to a top side of the robot chassis 200 by a hinge element 202. The hinge element 202 is pivotally attached to the robot chassis 200 at an aft edge thereof. The liquid storage container 800 is removable from the robot chassis 200 by a user and the user may fill the cleaning fluid supply container S with clean water and a measured volume of cleaning fluid such as soap or detergent. The user may also empty waste from the waste container, compartment, or tank D and flush out the waste container if needed.

To facilitate handling, the integrated liquid storage tank 800 includes a user graspable handle 162 formed integral with the cover assembly 818 at a forward edge of the robot 100. The handle 162 includes a pivot element 163 attached thereto by a hinge arrangement to the cover assembly 818. In one mode of operation, a user may grasp the handle 162 to pick up the entire robot 100 thereby. In a preferred embodiment, the robot 100 weights approximately 3-5 kg, (6.6-11 pounds), when filled with liquids, and can be easily carried by the user in one hand.

In a second mode of operation, the handle 162 is used to remove the integrated tank 800 from the chassis 200. In this mode, the user presses down on an aft edge of the handle 162 to initially pivot the handle downward. The action of the downward pivot releases a latching mechanism, not shown, that attaches a forward edge of the liquid storage container or tank 800 to the robot chassis 200. With the latching mechanism unlatched the user grasps the handle 162 and lifts vertically upwardly. The lifting force pivots the entire container assembly 800 about a pivot axis 204, provided by a hinge element which pivotally attached to the aft edge of the chassis 200. The hinge element 202 supports the aft end of the integrated liquid storage container 800 on the chassis 200 and further lifting of the handle rotates the hinge element 202 to an open position that facilities removal of the container assembly 800 from the chassis 200. In the open position, the forward edge of the liquid storage container 800 is elevated such that further lifting of the handle 162 lifts the liquid storage tank 800 out of engagement with the hinge element 202 and separates it from the robot 100.

Figure 17:
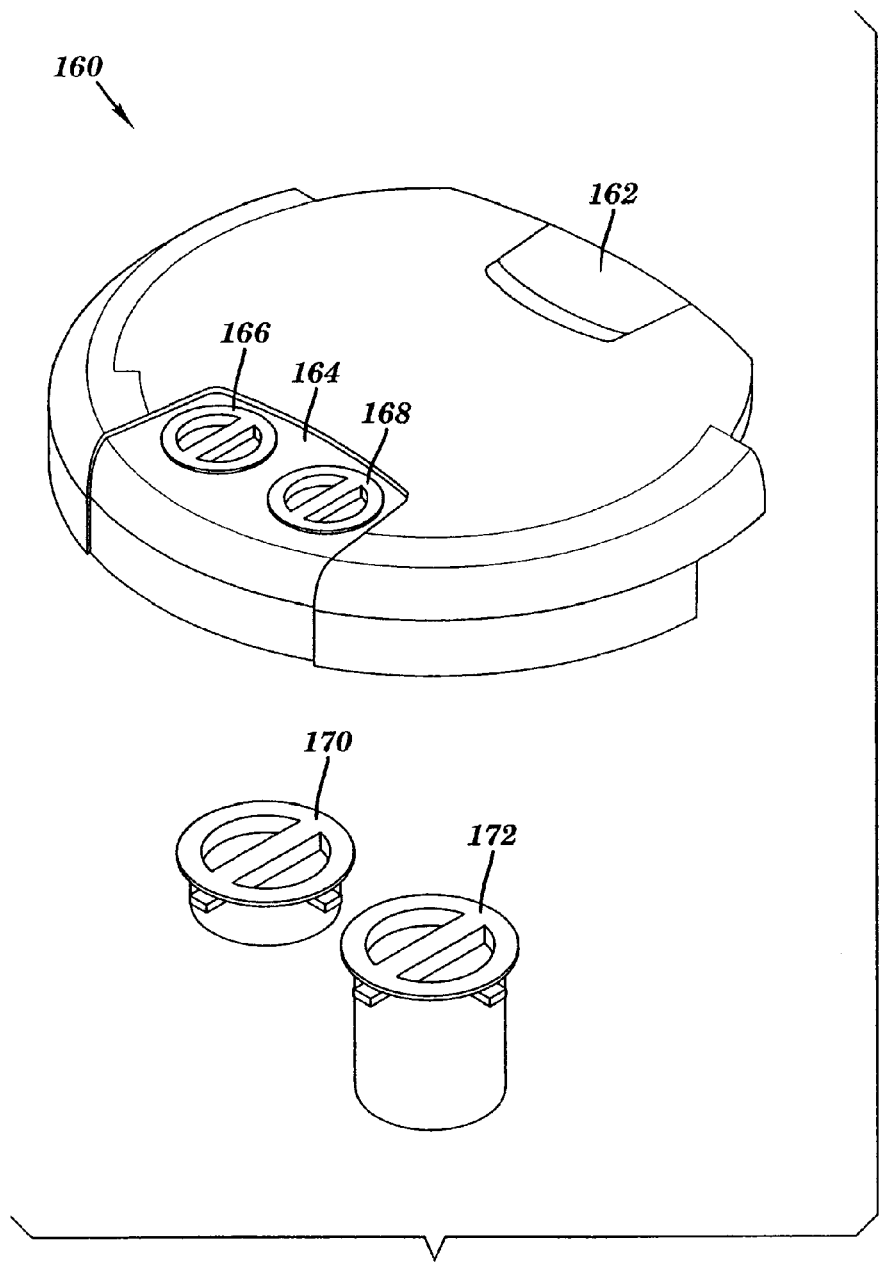
FIG. 17 depicts an external view of the integrated liquid storage module removed from the cleaning robot according to the present invention.

As shown in FIG. 17, the integrated liquid storage container 800 is formed with recessed aft exterior surfaces forming a detent area 164 and the detent area 164 is form matched to a receiving area of the hinge element 202. As shown in FIG. 3, the hinge element receiving area comprises a clevis-like cradle having upper and lower opposed walls 204 and 206 form matched to engage with and orient the storage container or tank detent area 164. The alignment of the detent area 164 and the hinge walls 204 and 206 aligns the integrated storage container 800 with the robot chassis 200 and with the latching mechanism used to attach the container forward edge to the chassis 200. In particular, the lower wall 206 includes alignment rails 208 form-matched to mate with grooves 808 formed on the bottom side of the detent area 164. In FIG. 3, the hinge element 202 is shown pivoted to a fully open position for loading and unloading the storage container or tank 800. The loading and unloading position is rotated approximately 75° from a closed or operating position; however, other loading and unloading orientations are contemplated. In the loading and unloading position, the storage container detent area 164 is easily engaged or disengaged from the clevis-like cradle of the hinge element 202. As shown in FIG. 1, the integrated liquid storage tank 800 and the hinge element 202 are configured to provide finished external surfaces that integrate smoothly and stylishly with other external surfaces of the robot 100. More importantly, as noted above, the integrated liquid storage tank maximizes internal storage volume while permitting the robot to operate autonomously without sharp edges or corners that catch on walls, corridors, obstacles, or room corners.

Two access ports are provided on an upper surface of the liquid storage container or tank 800 in the detent area 164 and these are shown in FIGS. 16 and 17. The access ports are located in the detent area 164 so as to be hidden by the hinge element upper wall 204 when the liquid storage tank assembly 800 is in installed in the robot chassis 200. A left access port 166 provides user access to the waste container, compartment, or tank D through the plenum 562. A right access port 168 provides user access to the cleaning fluid storage container S. The left and right access ports 166, 168 are sealed by user removable tank caps that may be color or form coded to be readily distinguishable.

Transport Drive System 900

In a preferred embodiment, the robot 100 is supported for transport over the cleaning surface by a three-point transport system 900. The transport system 900 comprises a pair of independent rear transport drive wheel modules 902 on the left side, and 904 on the right side, attached to the chassis 200 aft of the cleaning modules. In a preferred embodiment, the rear independent drive wheels 902 and 904 are supported to rotate about a common drive axis 906 that is substantially parallel with the transverse axis 108. However, each drive wheel may be canted with respect to the transverse axis 108 such that each drive wheel has its own drive axis orientation. The drive wheel modules 902 and 904 are independently driven and controlled by the master controller 300 to advance the robot in any desired direction. The left drive module 902 is shown protruding from the underside of the chassis 200 in FIG. 3 and the right drive module 904 is shown mounted to a top surface of the chassis 200 in FIG. 4. In a preferred embodiment, each of the left and right drive modules 902 and 904 is pivotally attached to the chassis 200 and forced into engagement with the cleaning surface by leaf springs 908, shown in FIG. 3. The leaf springs 908 are mounted to bias the each rear drive module to pivot downwardly toward the cleaning surface when the drive wheel goes over a cliff or is otherwise lifted from the cleaning surface. A wheel sensor associated with each drive wheel senses when a wheel pivots down and sends a signal to the master controller 300.

Figure 20:
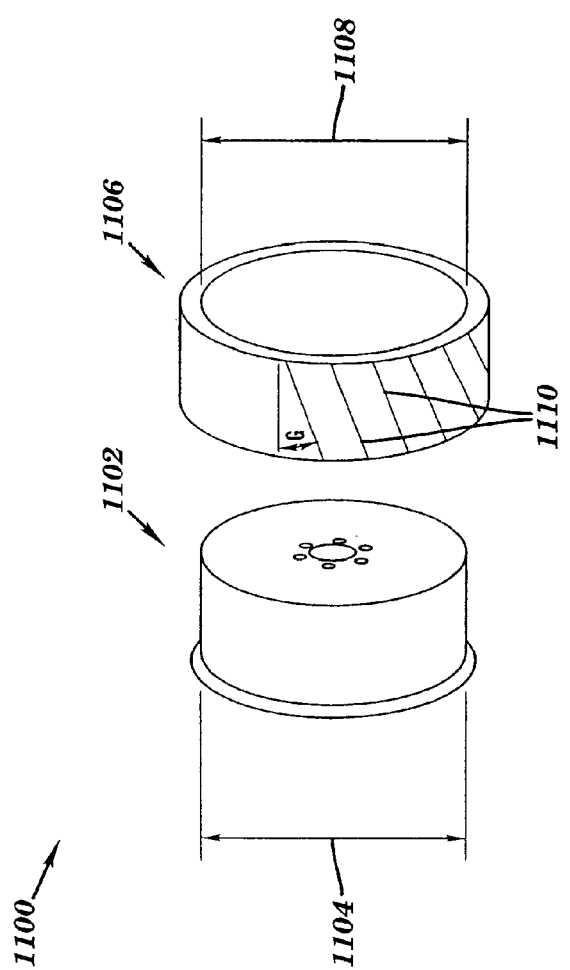
FIG. 20 depicts a schematic exploded view of a drive wheel assembly according to the present invention.

The drive wheels of the present invention are particularly configured for operating on wet soapy surfaces. In particular, as shown in FIG. 20, each drive wheel 1100 comprises a cup shaped wheel element 1102, which attaches to the a drive wheel module, 902 and 904. The drive wheel module includes a drive motor and drive train transmission for driving the drive wheel for transport. The drive wheel module may also include sensor for detecting wheel slip with respect to the cleaning surface.

The cup shaped wheel elements 1102 is formed from a stiff material such as a hard molded plastic to maintain the wheel shape and to provide stiffness. The cup shaped wheel element 1102 provides an outer diameter 1104 sized to receive an annular tire element 1106 thereon. The annular tire element 1106 is configured to provide a non-slip high friction drive surface for contacting the wet cleaning surface and for maintaining traction on the wet soapy surface.

In one embodiment, the annular tire element 1106 has an internal diameter 1108 of approximately 37 mm and is sized to fit appropriately over the outer diameter 1104. The tire may be bonded, taped or otherwise interference fit to the outer diameter 1104 to prevent slipping between the tire inside diameter 1108 and the outside diameter 1104. The tire radial thickness 1110 is approximately 3 mm. The tire material is a chloroprene homopolymer stabilized with thiuram disulfide black with a density of 14-16 pounds per cubic foot, or approximately 15 pounds per cubic foot foamed to a cell size of 0.1 mm plus or minus 0.02 mm. The tire has a post-foamed hardness of about 69 to 75 Shore 00. The tire material is sold by Monmouth Rubber and Plastics Corporation under the trade name DURAFOAM DK5151HD.

Other tire materials are contemplated, depending on the particular application, including, for example, those made of neoprene and chloroprene, and other closed cell rubber sponge materials. Tires made of polyvinyl chloride (PVC) and acrylonitrile-butadiene (ABS) (with or without other extractables, hydrocarbons, carbon black, and ash) may also be used. Additionally, tires of shredded foam construction may provide some squeegee-like functionality, as the tires drive over the wet surface being cleaned. Tires made from materials marketed under the trade names RUBATEX R411, R421, R428, R451, and R4261 (manufactured and sold by Rubatex International, LLC); ENSOLITE (manufactured and sold by Armacell LLC); and products manufactured and sold by American Converters/VAS, Inc.; are also functional substitutions for the DURAFOAM DK5151HD identified above.

In certain embodiments, the tire material may contain natural rubber(s) and/or synthetic rubber(s), for example, nitrile rubber (acrylonitrile), styrene-butadiene rubber (SBR), ethylene-propylene rubber (EPDM), silicone rubber, fluorocarbon rubber, latex rubber, silicone rubber, butyl rubber, styrene rubber, polybutadiene rubber, hydrogenated nitrile rubber (HNBR), neoprene (polychloroprene), and mixtures thereof.

In certain embodiments, the tire material may contain one or more elastomers, for example, polyacrilics (i.e. polyacrylonitrile and polymethylmethacrylate (PMMA)), polychlorocarbons (i.e. PVC), polyfluorocarbons (i.e. polytetrafluoromethylene), polyolefins (i.e. polyethylene, polypropylene, and polybutylene), polyesters (i.e. polyethylene terephthalate and polybutylene terephthalate), polycarbonates, polyamides, polyimides, polysulfones, and mixtures and/or copolymers thereof. The elastomers may include homopolymers, copolymers, polymer blends, interpenetrating networks, chemically modified polymers, grafted polymers, surface-coated polymers, and/or surface-treated polymers.

In certain embodiments, the tire material may contain one or more fillers, for example, reinforcing agents such as carbon black and silica, non-reinforcing fillers, sulfur, cross linking agents, coupling agents, clays, silicates, calcium carbonate, waxes, oils, antioxidants (i.e. para-phenylene diamine antiozonant (PPDA), octylated diphenylamine, and polymeric 1,2-dihydro-2,2,4-trimethylquinoline), and other additives.

In certain embodiments, the tire material may be formulated to have advantageous properties, for example, desired traction, stiffness, modulus, hardness, tensile strength, impact strength, density, tear strength, rupture energy, cracking resistance, resilience, dynamic properties, flex life, abrasion resistance, wear resistance, color retention, and/or chemical resistance (i.e. resistance to substances present in the cleaning solution and the surface being cleaned, for example, dilute acids, dilute alkalis, oils and greases, aliphatic hydrocarbons, aromatic hydrocarbons, halogenated hydrocarbons, and/or alcohols).

It is noted that cell size of the closed cell foam tires may impact functionality, in terms of traction, resistance to contaminants, durability, and other factors. Cell sizes ranging from approximately 20 µm to approximately 400 µm may provide acceptable performance, depending on the weight of the robot and the condition of the surface being cleaned. Particular ranges include approximately 20 µm to approximately 120 µm, with a mean cell size of 60 µm, and more particularly approximately 20 µm to approximately 40 µm, for acceptable traction across a variety of surface and contaminant conditions.

In certain embodiments, the tires are approximately 13 mm wide, although wider tires may provide additional traction. As indicated above, tires may be approximately 3 mm thick, although tires of 4 mm-5 mm in thickness or more may be utilized for increased traction. Thinner tires of approximately 1½ mm and thicker tires of approximately 4½ mm may be beneficial, depending on the weight of the robot, operating speed, movement patterns, and surface textures. Thicker tires may be subject to compression set. If the cleaning robot is heavier, larger tires may be desirable nonetheless. Tires with outer rounded or square edges may also be employed.

To increase traction, the outside diameter of the tire can be siped. Siping generally provides traction by (a) reducing the transport distance for fluid removal from the contact patch by providing a void for the fluid to move into, (b) allowing more of the tire to conform to the floor, thereby increasing tread mobility, and (c) providing a wiping mechanism that aids in fluid removal. In at least one instance, the term "siped" refers to slicing the tire material to provide a pattern of thin grooves 1110 in the tire outside diameter. In one embodiment, each groove has a depth of approximately 1.5 mm and a width or approximately 20 to 300 microns. The siping may leave as little as ½ mm or less of tire base, for example, 3½ mm deep siping on a 4 mm thick tire. The groove pattern can provide grooves that are substantially evenly spaced apart, with approximately 2 to 200 mm spaces between adjacent grooves. "Evenly spaced" may mean, in one instance, spaced apart and with a repeating pattern, not necessarily that every siped cut is the same distance from the next. The groove cut axis makes an angle G with the tire longitudinal axis. The angle G ranges from about 10-50 degrees, in certain embodiments.

In other embodiments, the siping pattern is a diamond-shaped cross hatch at 3.5 mm intervals, which may be cut at alternating 45 degree angles (+/−10 degrees) from the rotational axis. Substantially circumferential siping, siping that forces away liquid via channels, and other siping patterns are also contemplated. Depth and angle of siping may be modified, depending on particular applications. Moreover, while increased depth or width of siping may increase traction, this benefit should be balanced against effecting the structural integrity of the tire foam. In certain embodiments, for example, it has been determined that 3 mm-4 mm thick tires with diamond crossed siping at 7 mm intervals provides good tire traction. Larger tires may accommodate a finer pattern, deeper siping, and/or wider siping. Additionally, particularly wide tires or tires made from certain materials may not require any siping for effective traction. While certain siping patterns may be more useful on wet or dry surfaces, or on different types of surfaces, siping that provides consistent traction across a variety of applications may be the most desirable for a general purpose robot cleaner.

The various tire materials, sizes, configurations, siping, etc., impact the traction of the robot during use. In certain embodiments, the robot's wheels roll directly through the spray of cleaning solution, which effects the traction, as do the contaminants encountered during cleaning. A loss of traction of the wheels may cause operating inefficiencies in the form of wheel slippage, which can lead to the robot deviating from its projected path. This deviation can increase cleaning time and reduce battery life. Accordingly, the robot's wheels should be of a configuration that provides good to excellent traction on all surfaces, with the smallest corresponding motor size.

Typical contaminants encountered during cleaning include chemicals, either discharged by the robot or otherwise. Whether in a liquid state (e.g., pine oil, hand soap, ammonium chloride, etc.) or a dry state (e.g., laundry powder, talcum powder, etc.), these chemicals may break down the tire material. Additionally, the robot tires may encounter moist or wet food-type contaminants (e.g., soda, milk, honey, mustard, egg, etc.), dry contaminants (e.g., crumbs, rice, flour, sugar, etc.), and oils (e.g., corn oil, butter, mayonnaise, etc.). All of these contaminants may be encountered as residues, pools or slicks, or dried patches. The tire materials described above have proven effective in resisting the material breakdown caused by these various chemicals and oils. Additionally, the cell size and tire siping described has proven beneficial in maintaining traction while encountering both wet and dry contaminants, chemical or otherwise. Dry contaminants at certain concentrations, however, may become lodged within the siping. The chemical cleaner used in the device, described below, also helps emulsify certain of the contaminants, which may reduce the possible damage caused by other chemical contaminants by diluting those chemicals.

In addition to contaminants that may be encountered during use, the various cleaning accessories (e.g., brushes, squeegees, etc.) of the device effect the traction of the device. The drag created by these devices, the character of contact (i.e., round, sharp, smooth, flexible, rough, etc.) of the devices, as well as the possibility of slippage caused by contaminants, varies depending on the surface being cleaned. Limiting the areas of contact between the robot and the surface being cleaned reduces attendant friction, which improves tracking and motion. One and one-half pounds of drag force versus three to five pounds of thrust has proven effective in robots weighing approximately 5-15 pounds. Depending on the weight of the robot cleaner, these numbers may vary, but it is noted that acceptable performance occurs at less than about 50% drag, and is improved with less than about 30% drag.

The tire materials (and corresponding cell size, density, hardness, etc.), siping, robot weight, contaminants encountered, degree of robot autonomy, floor material, and so forth, all impact the total traction coefficients of the robot tires. For certain robot cleaners, the coefficient of traction (COT) for the minimum mobility threshold has been established by dividing a two lb. drag (as measured during squeegee testing) by six lbs. of normal force, as applied to the tires. Thus, this minimum mobility threshold is approximately 0.33. A target threshold of 0.50 was determined by measuring the performance of shredded black foam tires. Traction coefficients of many of the materials described above fell within a COT range of 0.25 to 0.47, thus within the acceptable range between the mobility threshold and the target threshold. Additionally, tires that exhibit little variability in traction coefficients between wet and dry surfaces are desirable, given the variety of working conditions to which a cleaning robot is exposed.

The robot cleaning device may also benefit by utilizing sheaths or booties that at least partially or fully surround the tires. Absorbent materials, such as cotton, linen, paper, silk, porous leather, chamois, etc., may be used in conjunction with the tires to increase traction. Alternatively, these sheaths may replace rubberized wheels entirely, by simply mounting them to the outer diameter 1104 of the cup shaped wheel element 1102. Whether used as sheaths for rubber tires or as complete replacements for the rubber tires, the materials may be interchangeable by the user or may be removed and replaced via automation at a base or charging station. Additionally, the robot may be provided to the end user with sets of tires of different material, with instructions to use particular tires on particular floor surfaces.

The cleaning solution utilized in the robot cleaner should be able to readily emulsify contaminants and debond dried waste from surfaces, without damaging the robot or surface itself. Given the adverse effects described above with regard to robot tires and certain chemicals, the aggressiveness of the cleaning solution should be balanced against the short and long-term negative impacts on the tires and other robot components. In view of these issues, virtually any cleaning material that meets the particular cleaning requirements may be utilized with the cleaning robot. In general, for example, a solution that includes both a surfactant and a chelating agent may be utilized. Additionally, a pH balancing agent such as citric acid may be added. Adding a scent agent, such as eucalyptus, lavender, and/or lime, for example, may improve the marketability of such a cleaner, contributing to the perception on the part of the consumer that the device is cleaning effectively. A blue, green, or other noticeable color may also help distinguish the cleaner for safety or other reasons. The solution may also be diluted and still effectively clean when used in conjunction with the robot cleaner. During operation, there is a high likelihood that the robot cleaner may pass over a particular floor area several times, thus reducing the need to use a full strength cleaner. Also, diluted cleaner reduces the wear issues on the tires and other components, as described above. One such cleaner that has proven effective in cleaning, without causing damage to the robot components, includes alkyl polyglucoside (for example, at 1-3% concentration) and tetrapotassium ethylenediamine-tetraacetate (tetrapotassium EDTA) (for example, at 0.5-1.5% concentration). During use, this cleaning solution is diluted with water to produce a cleaning solution having, for example, approximately 3-6% cleaner and approximately 94-97% water. Accordingly, in this case, the cleaning solution actually applied to the floor may be as little as 0.03% to 0.18% surfactant and 0.01 to 0.1% chelating agent. Of course, other cleaners and concentrations thereof may be used with the disclosed robot cleaner.

For example, the families of surfactants and chelating agents disclosed in U.S. Pat. No. 6,774,098, the disclosure of which is hereby incorporated by reference in its entirety, are also suitable for application in the robot having the tire materials and configurations disclosed. To balance the aggressiveness of the cleaners disclosed in the '098 patent with the wear caused on the machine components, however, it is preferred that the cleaning agents should (i) include no solvent, or include solvent at a percentage lower than that of the chelating agent of an alcohol solvent, or have the disclosed solvents in ½ to 1/100 the concentrations, and/or (ii) be further diluted for deterministic single pass, deterministic repeat passes, or random multipass use in a robot by 20%+/−15% (single pass), 10%+/−8% (repeat pass), and from 5% to 0.1% (random multipass) respectively, of the concentrations disclosed; and/or (iii) be further combined with an anti-foaming agent known to be compatible with the selected surfactant and chelating agent in percentages the same as or lower than commercial carpet cleaners, e.g., less than 5% of silicone emulsion, and/or (iv) replaced with or compatibly mixed with an odor remover of viable bacterial cultures.

In certain embodiments, the cleaning solution utilized in the robot cleaner includes (or is) one or more embodiments of the "hard surface cleaner" described in U.S. Pat. No. 6,774,098, preferably subject to (i), (ii), (iii), and/or (iv) above. Certain embodiments of the "hard surface cleaner" in U.S. Pat. No. 6,774,098, are described in the following paragraphs.

In one embodiment, the hard surface cleaner comprises: (a) a surfactant system consisting of amine oxides within the general formula (I):

or quaternary amine salts within the general formula (II):

or combinations of the foregoing amine oxides and quaternary amine salts; and (b) a very slightly water-soluble polar organic compound having a water solubility ranging from about 0.1 to 1.0 weight percent, a weight ratio of the very slightly water-soluble polar organic compound to the surfactant system ranging from about 0.1:1 to about 1:1, wherein $R^1$ and $R^2$ are the same or different and are selected from the group consisting of methyl, ethyl, propyl, isopropyl, hydroxyethyl and hydroxypropyl, $R^3$ is selected from the group consisting of straight chain alkyls, branched chain alkyls, straight chain heretroalkyls, branched chain heteroalkyls and alkyl ethers, each having from about 10 to 20 carbon atoms, $R^4$ is selected from the group consisting of alkyl groups having from 1 to about 5 carbon atoms, and X is a halogen atom.

In another embodiment, the hard surface cleaner comprises: (a) either (i) a combination of a nonionic surfactant and a quaternary ammonium surfactant or (ii) an amphoteric surfactant, the total amount of the surfactant being present from about 0.001-10%, wherein the nonionic surfactant is selected from the group consisting of an alkoxylated alkylphenol ether, an alkoxylated alcohol, or a semi-polar nonionic surfactant which itself is selected from the group consisting of mono-long-chain alkyl, di-short-chain trialkyl amine oxides, alkylamidodialkyl amine oxides, phosphine oxides and sulfoxides; (b) no more than 50% of at least one water-soluble or dispersible organic solvent having a vapor pressure of at least 0.001 mm Hg at 25° C.; (c) 0.01-25% of tetraammonium ethylenediamine-tetraacetate (tetraammonium EDTA) as a chelating agent; and (d) water.

In yet another embodiment, the hard surface cleaner comprises (a) a surfactant selected from the group consisting of anionic, nonionic surfactants, and mixtures thereof, with optionally, a quaternary ammonium surfactant, the total amount of surfactant being present from about 0.001-10% by weight; (b) at least one water-soluble or dispersible organic solvent having a vapor pressure of at least 0.001 mm Hg at 25° C., the at least one organic solvent being selected from the group consisting of alkanols, diols, glycol ethers, and mixtures thereof present in an amount from about 1% to 50% by weight of the cleaner; (c) tetrapotassium ethylenediamine-tetraacetate (potassium EDTA) as a chelating agent, the potassium EDTA present from about 0.01-25% weight-of the cleaner; and (d) water.

In still another embodiment, the hard surface cleaner comprises (a) a nonionic surfactant with optionally, a quaternary ammonium surfactant, the total amount of the surfactant being present from about 0.001-10%, wherein the nonionic surfactant is selected from the group consisting of an alkoxylated alkylphenol ether, an alkoxylated alcohol, or a semi-polar nonionic surfactant which itself is selected from the group consisting of mono-long-chain alkyl, di-short-chain trialkyl amine oxides, alkylamidodialkyl amine oxides, phosphine oxides and sulfoxides; (b) no more than 50% of at least one water-soluble or dispersible organic solvent having a vapor pressure of at least 0.001 mm Hg at 25° C.; (c) 0.01-25% of tetraammonium ethylenediamine-tetraacetate (tetraammonium EDTA) as a chelating agent; and (d) water.

In certain embodiments, the hard surface cleaner has a viscosity of less than about 100 cps and comprises: (a) at least about 85% water, in which is dissolved (b) at least about 0.45 equivalent per kilogram of an inorganic anion which, when combined with calcium ion, forms a salt which has a solubility of not more than 0.2 g/100 g water at 25° C., wherein the anion is carbonate, fluoride, or metasilicate ion, or a mixture of such anions, (c) at least 0.3% by weight, based on the weight of the composition, of a detersive surfactant including an amine oxide of the form $RR^1R^2N \rightarrow O$ wherein R is $C_6$-$C_{12}$ alkyl and $R^1$ and $R^2$ are independently $C_{1-4}$ alkyl or $C_{1-4}$ hydroxyalkyl, and (d) at least about 0.5 weight percent of a bleach, based upon the weight of the composition, wherein the cleaning composition is alkaline and essentially free of chelating agents, phosphorous-containing salt, and abrasive.

In certain embodiments, the cleaning solution utilized in the robot cleaner includes (or is) one or more embodiments of the hard surface cleaners described in U.S. Pat. Nos. 5,573,710, 5,814,591, 5,972,876, 6,004,916, 6,200,941, and 6,214,784, all of which are incorporated herein by reference.

U.S. Pat. No. 5,573,710 discloses an aqueous multiple-surface cleaning composition which can be used for the removal of grease and stains from hard surfaces or hard fibrous substrates such as carpet and upholstery. The composition contains (a) a surfactant system consisting of amine oxides within the general formula (I):

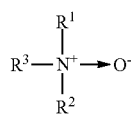

(I)

or quaternary amine salts within the general formula (II):

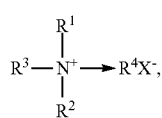

(II)

or combinations of the foregoing amine oxides and quaternary amine salts; and (b) a very slightly water-soluble polar organic compound. The very slightly water-soluble polar organic compound may have a water solubility ranging from about 0.1 to 1.0 weight percent, and the weight ratio of the very slightly water-soluble polar organic compound to the surfactant system may range from about 0.1:1 to about 1:1. $R^1$ and $R^2$ may be selected from the group consisting of methyl, ethyl, propyl, isopropyl, hydroxyethyl and hydroxypropyl. $R^1$ and $R^2$ may be the same or different. $R^3$ may be selected from the group consisting of straight chain alkyls, branched chain alkyls, straight chain heretroalkyls, branched chain heteroalkyls and alkyl ethers, each having from about 10 to 20 carbon atoms. $R^4$ may be selected from the group consisting of alkyl groups having from 1 to about 5 carbon atoms. X is a halogen atom.

In certain cases, the composition further includes a water soluble organic compound in an amount effective to reduce streaking. The water soluble organic compound may be selected from water soluble glycol ethers and water soluble alkyl alcohols. The water soluble organic compound may have a water solubility of at least 14.5 weight percent. The weight ratio of the surfactant system to the water soluble organic compound may range from about 0.033:1 to about 0.2:1.

U.S. Pat. No. 5,814,591 describes an aqueous hard surface cleaner with improved soil removal. The cleaner includes (a) either (i) a nonionic, an amphoteric surfactant, or a combination thereof, or (ii) a quaternary ammonium surfactant, the surfactants being present in a cleaning-effective amount; (b) at least one water-soluble or dispersible organic solvent having a vapor pressure of at least 0.001 mm Hg at 25° C., the at least one organic solvent present in a solubilizing- or dispersion-effective amount; (c) ammonium ethylenediamine-tetraacetate (ammonium EDTA) as a chelating agent, the ammonium EDTA present in an amount effective to enhance soil removal in the cleaner; and (d) water. The total surfactant maybe present in an amount from about 0.001-10%. In a concentrated product, the surfactant may be present up to 20% by weight. The nonionic surfactant may be selected from the group consisting of an alkoxylated alkylphenol ether, an alkoxylated alcohol, or a semi-polar nonionic surfactant which itself is selected from the group consisting of mono-long-chain alkyl, di-short-chain trialkyl amine oxides, alkylamidodialkyl amine oxides, phosphine oxides and sulfoxides. The at least one water-soluble or dispersible organic solvent may be present in an amount of no more than 50% by weight of the cleaner. The ammonium EDTA may be a tetraammonium EDTA and present in an amount of about 0.01-25% by weight of the total cleaner.

U.S. Pat. No. 5,972,876 discloses an aqueous hard surface cleaner comprising (a) a surfactant selected from the group consisting of anionic, nonionic surfactants, and mixtures thereof, with optionally, a quaternary ammonium surfactant, the total amount of surfactant being present in a cleaning-effective amount; (b) at least one water-soluble or dispersible organic solvent having a vapor pressure of at least 0.001 mm Hg at 25° C., the organic solvent being present in a solubilizing- or dispersion-effective amount; (c) tetrapotassium ethylenediamine-tetraacetate (potassium EDTA) as a chelating agent, the potassium EDTA present in an amount effective to enhance soil removal in the cleaner; and (d) water. The total amount of surfactant may be present from about 0.001-10% by weight. The at least one organic solvent may be selected from the group consisting of alkanols, diols, glycol ethers, and mixtures thereof, and is present in an amount from about 1% to 50% by weight of the cleaner. The potassium EDTA may be present from about 0.01-25% weight-of the cleaner.

U.S. Pat. No. 6,004,916 discloses an aqueous, hard surface cleaner which contains (a) either a nonionic or amphoteric surfactant with optionally, a quaternary ammonium surfactant, the surfactants being present in a cleaning-effective amount; (b) at least one water-soluble or dispersible organic solvent having a vapor pressure of at least 0.001 mm Hg at 25° C., the at least one organic solvent present in a solubilizing- or dispersion-effective amount; (c) ammonium ethylenediamine-tetraacetate (ammonium EDTA) as a chelating agent, the ammonium EDTA present in an amount effective to enhance soil removal in the cleaner; and (d) water. The surfactant may be a nonionic surfactant with optionally, a quaternary ammonium surfactant. The nonionic surfactant may be selected from the group consisting of an alkoxylated alkylphenol ether, an alkoxylated alcohol, or a semi-polar nonionic surfactant which itself is selected from the group consisting of mono-long-chain alkyl, di-short-chain trialkyl amine oxides, alkylamidodialkyl amine oxides, phosphine oxides and sulfoxides. The total amount of the surfactant may be present from about 0.001-10%. The at least one water-soluble or dispersible organic solvent may be present in an amount of no more than 50% by weight of the cleaner. The ammonium EDTA may be a tetraammonium EDTA which is present in an amount from 0.01-25% by weight of the total cleaner.

U.S. Pat. No. 6,200,941 discloses a diluted hard surface cleaning composition. The cleaning composition contains (a) at least about 85% water, in which is dissolved (b) at least about 0.45 equivalent per kilogram of an inorganic anion which, when combined with calcium ion, forms a salt which has a solubility of not more than 0.2 g/100 g water at 25° C.; (c) at least 0.3% by weight, based on the weight of the composition, of a detersive surfactant. The composition preferably has a viscosity of less than about 100 cps. The anion may be carbonate, fluoride, or metasilicate ion, or a mixture of such anions. The detersive surfactant may include an amine oxide of the form $RR^1R^2N\rightarrow O$ wherein R is $C_6$-$C_{12}$ alkyl and $R^1$ and $R^2$ are independently $C_{1-4}$ alkyl or $C_{1-4}$ hydroxyalkyl. The composition may further contain at least about 0.5 weight percent of a bleach, based upon the weight of the composition. In one case, the cleaning composition is alkaline and essentially free of chelating agents, phosphorous-containing salt, and abrasive.

U.S. Pat. No. 6,214,784 describes a composition similar to that disclosed in U.S. Pat. No. 5,972,876. The composition may include dipotassium carbonate as a buffers.

Optionally, the cleaning fluid may be used to cool the motor or the motor may be used to heat the cleaning fluid. The motor used to turn the main cleaning brush dissipates considerable energy in the form of heat. This heat reduces motor and electronics life. It is possible to duct the cleaning fluid around this motor so that the heat is transferred from the motor to the heat. This may improve cleaning performance and reduce stress on the motor. A structure would include ducting, heat transfer compounds, and heat conductive materials for the ducting and/or motor parts in contact with the ducting. In addition, the use of a wet rotor motor for the fluid pump or brush drive would allow the motor to be submersed in the clean tank which could simplify connections as well as deposit waste heat into the cleaning fluid.

Figure 18:
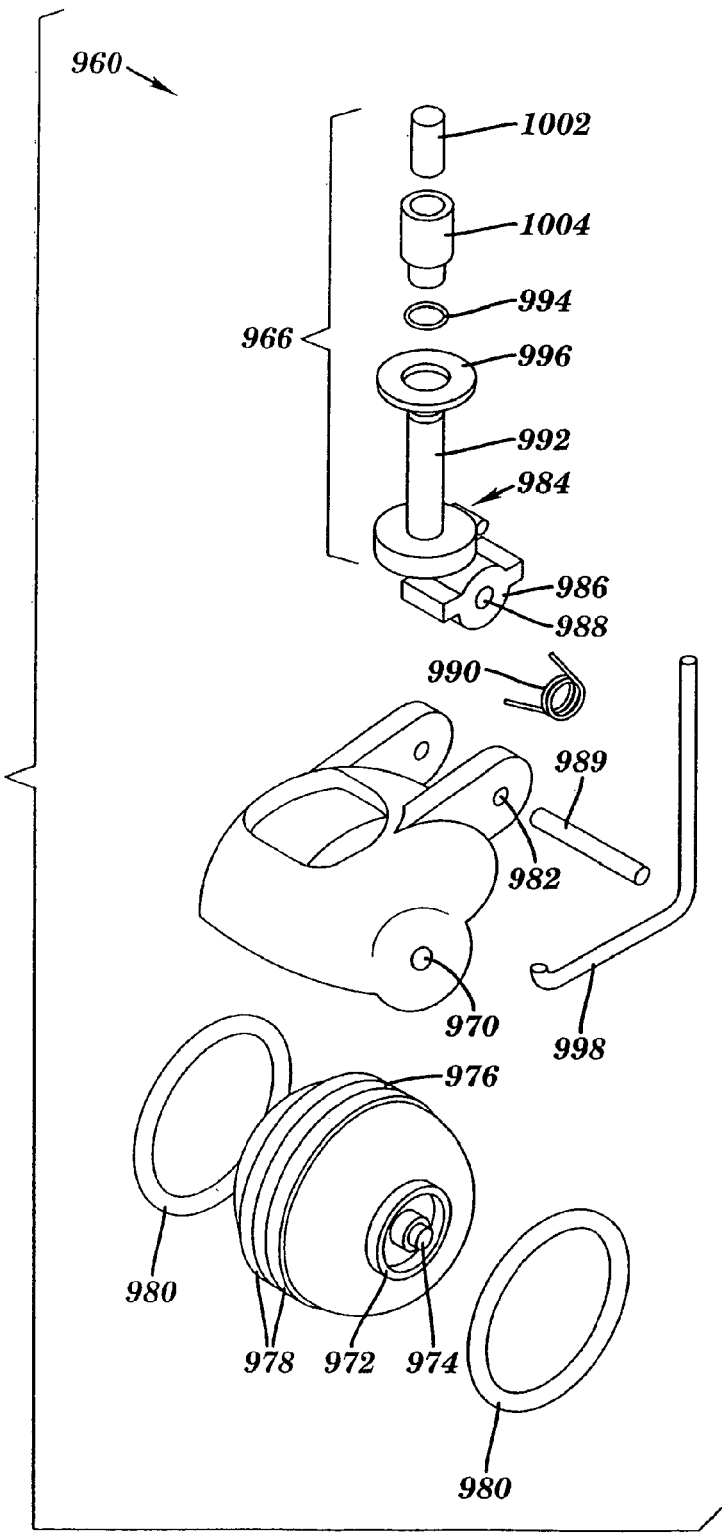
FIG. 18 depicts a schematic exploded view of a nose wheel module according to the present invention.
Figure 19:
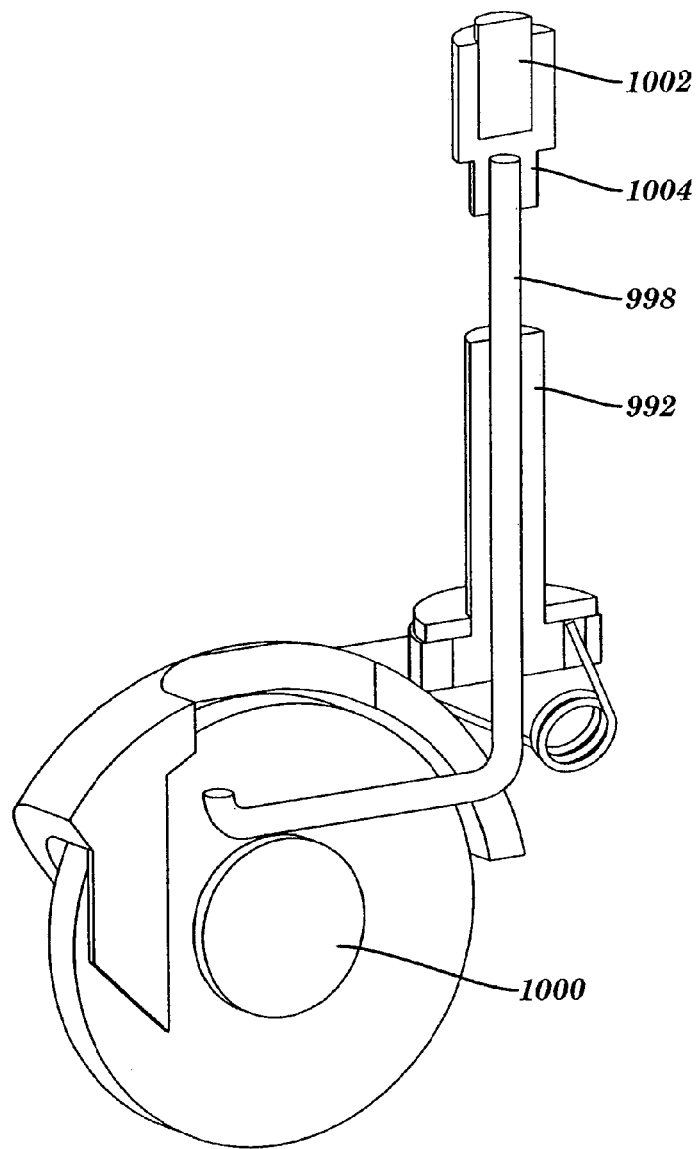
FIG. 19 depicts a schematic section view taken through a nose wheel assembly according to the present invention.

The nose wheel module 960, shown in exploded view in FIG. 18 and in section view in FIG. 19, includes a nose wheel 962 housed in a caster housing 964 and attached to a vertical support assembly 966. The nose wheel module 960 attaches to the chassis 200 forward of the cleaning modules and provide a third support element for supporting the chassis 200 with respect to the cleaning surface. The vertical support assembly 966 is pivotally attached to the caster housing 964 at a lower end thereof and allows the caster housing to pivot away from the chassis 200 when the chassis is lifted from the cleaning surface or when the nose wheel goes over a cliff. A top end of the vertical support assembly 966 passes through the chassis 200 and is rotatably with respect thereto to allow the entire nose wheel module 960 to rotate freely about a substantially vertical axis as the robot 100 is being transported over the cleaning surface by the rear transport drive wheels 902 and 904. Accordingly, the nose wheel module is self-aligning with respect to the direction of robot transport.

The chassis 200 is equipped with a nose wheel mounting well 968 for receiving the nose wheel module 960 therein. The well 968 is formed on the bottom side of the chassis 200 at a forward circumferential edge thereof. The top end of the vertical support assembly 966 passes through a hole through the chassis 200 and is captured in the hole to attach the nose wheel to the chassis. The top end of the vertical support assembly 966 also interfaces with sensor elements attached to the chassis 200 on its top side.

The nose wheel assembly 962 is configured with a molded plastic wheel 972 having axle protrusions 974 extending therefrom and is supported for rotation with respect to the caster housing 964 by opposed co-aligned axle holes 970 forming a drive wheel rotation axis. The plastic wheel 972 includes with three circumferential grooves in its outer diameter. A center groove 976 is providing to receive a cam follower 998 therein. The plastic wheel further includes a pair of symmetrically opposed circumferential tire grooves 978 for receiving an elastomeric o-ring 980 therein. The elastomeric o-rings 980 contacts the cleaning surface during operation and the o-ring material properties are selected to provide a desired friction coefficient between the nose wheel and the cleaning surface. The nose wheel assembly 962 is a passive element that is in rolling contact with the cleaning surface via the o-rings 980 and rotates about its rotation axis formed by the axle protrusion 974 when the robot 100 is transported over the cleaning surface.

The caster housing 964 is formed with a pair of opposed clevis surfaces with coaligned opposed pivot holes 982 formed therethrough for receiving the vertical support assembly 966 therein. A vertical attaching member 984 includes a pivot element 986 at its bottom end for installing between the clevis surfaces. The pivot element 986 includes a pivot axis bore 988 formed therein for alignment with the co-aligned pivot hole 982. A pivot rod 989 extends through the co-aligned pivot holes 982 and is press fit within the pivot axis bore 988 and captured therein. A torsion spring 990 installs over the pivot rod 988 and provides a spring force that biases the caster housing 964 and nose wheel assembly 962 to a downwardly extended position forcing the nose wheel 962 to rotate to an orientation that places the nose wheel 962 more distally below the bottom surface of the chassis 200. The downwardly extended position is a non-operating position. The spring constant of the torsion spring 990 is small enough that the weight of the robot 100 overcomes its biasing force when the robot 100 robot is placed onto the cleaning surface for cleaning. Alternately, when the nose wheel assembly goes over a cliff, or is lifted off the cleaning surface, the torsion spring biasing force pivots the nose wheel to the downwardly extended non-operating position. This condition is sensed by a wheel down sensor, described below, and a signal is sent to the master controller 300 to stop transport or to initiate some other action.

The vertical attaching member 984 includes a hollow vertical shaft portion 992 extending upward from the pivot element 986. The hollow shaft portion 992 passes through the hole in the chassis 200 and is captured therein by an e-ring retainer 994 and thrust washer 996. This attaches the nose wheel assembly 960 to the chassis and allows it to rotate freely about a vertical axis when the robot is being transported.

The nose wheel module 960 is equipped with sensing elements that generate sensor signals used by the master control module 300 to count wheel revolutions, to determine wheel rotational velocity, and to sense a wheel down condition, i.e. when the caster 964 is pivoted downward by the force of the torsion spring 990. The sensors generate a wheel rotation signal using a cam following plunger 998 that include a sensor element that moves in response to wheel rotation. The cam follower 998 comprises an "L" shaped rod with the a vertical portion being movably supported inside the hollow shaft 992 thus passing through the hole in the chassis 200 to extend above the top surface thereof. The lower end of the rod 992 forms a cam follower that fits within the wheel center circumferential groove 976 and is movable with respect thereto. The cam follower 998 is supported in contact with an offset hub 1000 shown in FIG. 18. The offset hub 1000 comprises an eccentric feature formed non-symmetrically about the nose wheel rotation axis inside the circumferential groove 976. With each rotation of the wheel 962, the offset hub 1000 forces and oscillation of the cam follower 998 which moves reciprocally along a substantially vertical axis.

Figure 33:
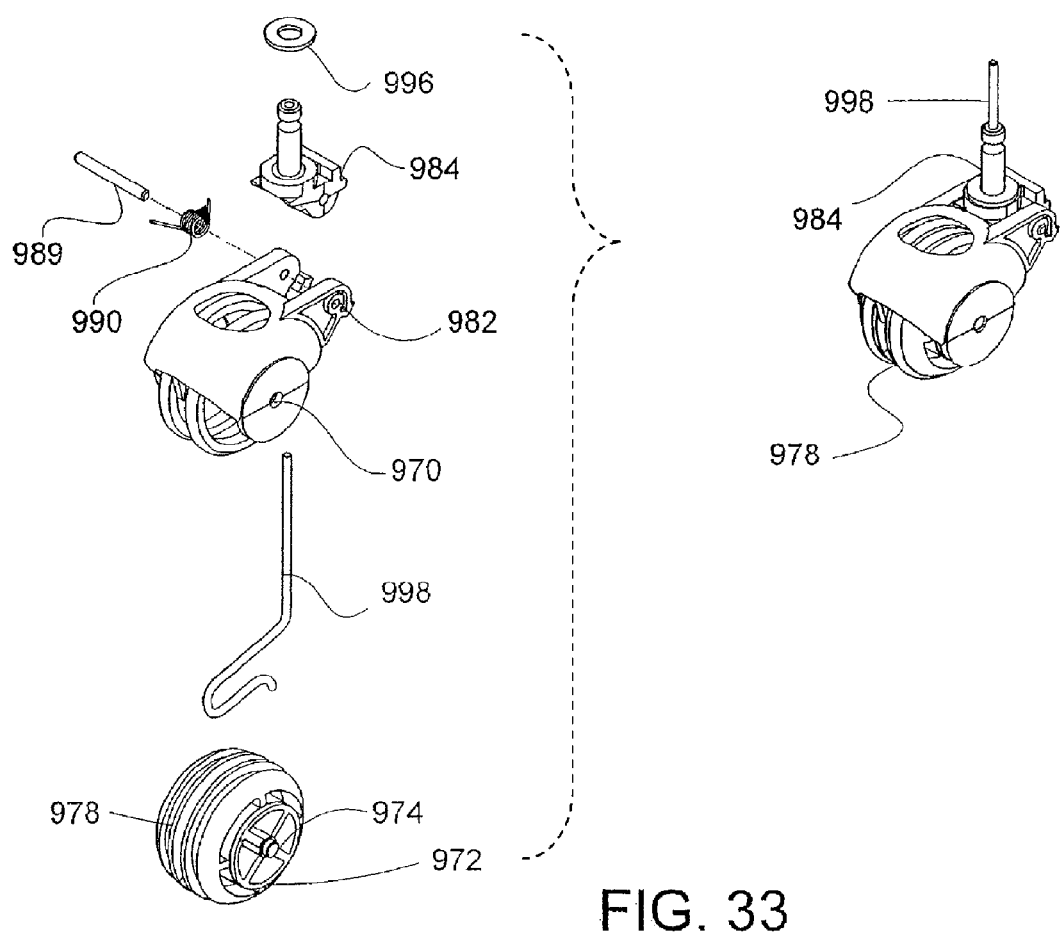
FIG. 33 depicts a schematic exploded view of a nose wheel module in accordance with one embodiment of the present invention.
Figure 34:
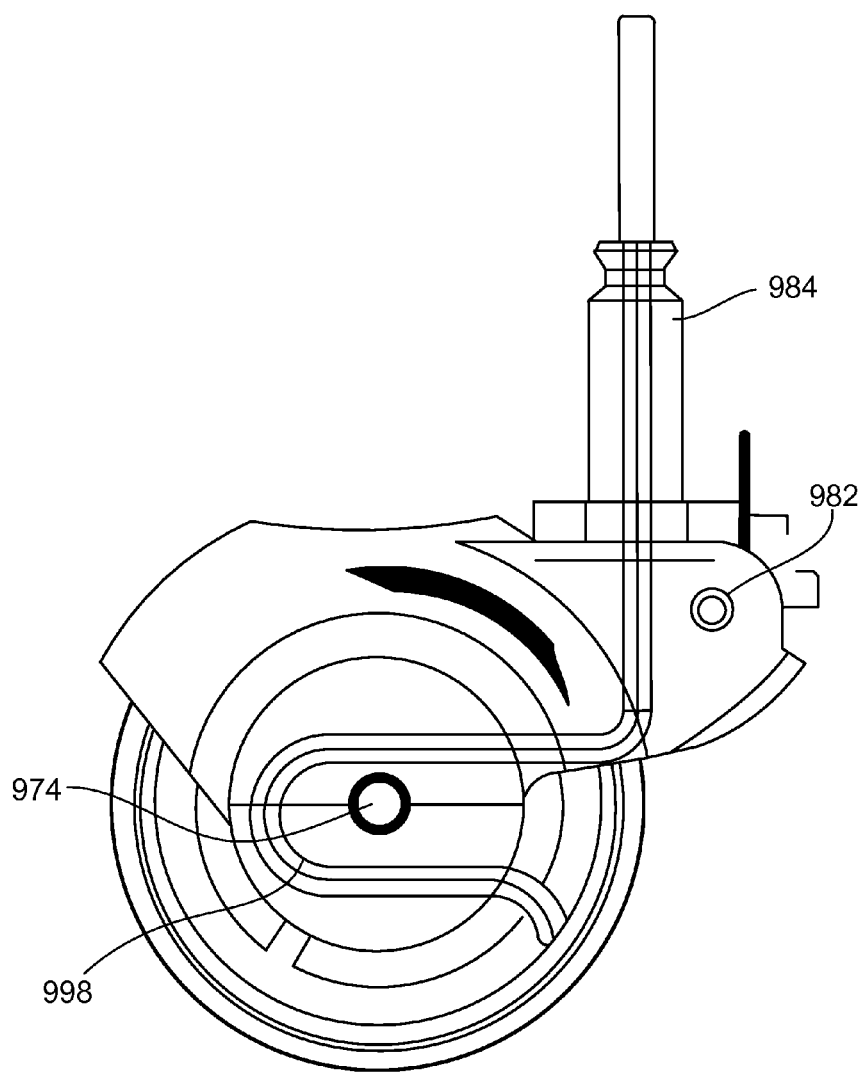
FIG. 34 depicts a side view of the nose wheel module of FIG. 33.
Figure 35:
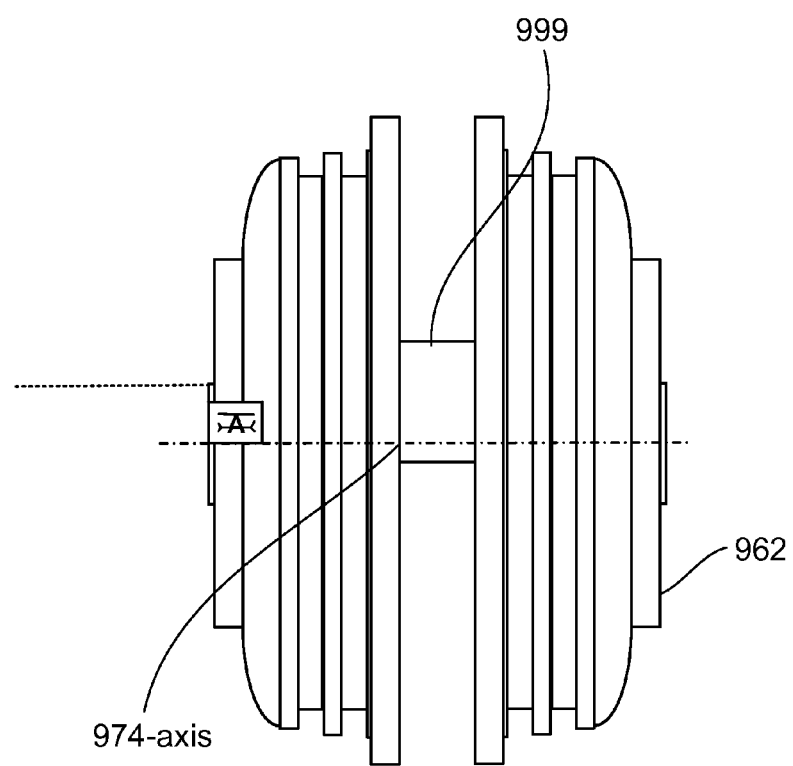
FIG. 35 depicts a front view of the nose wheel module of FIG. 33.
Figure 36:
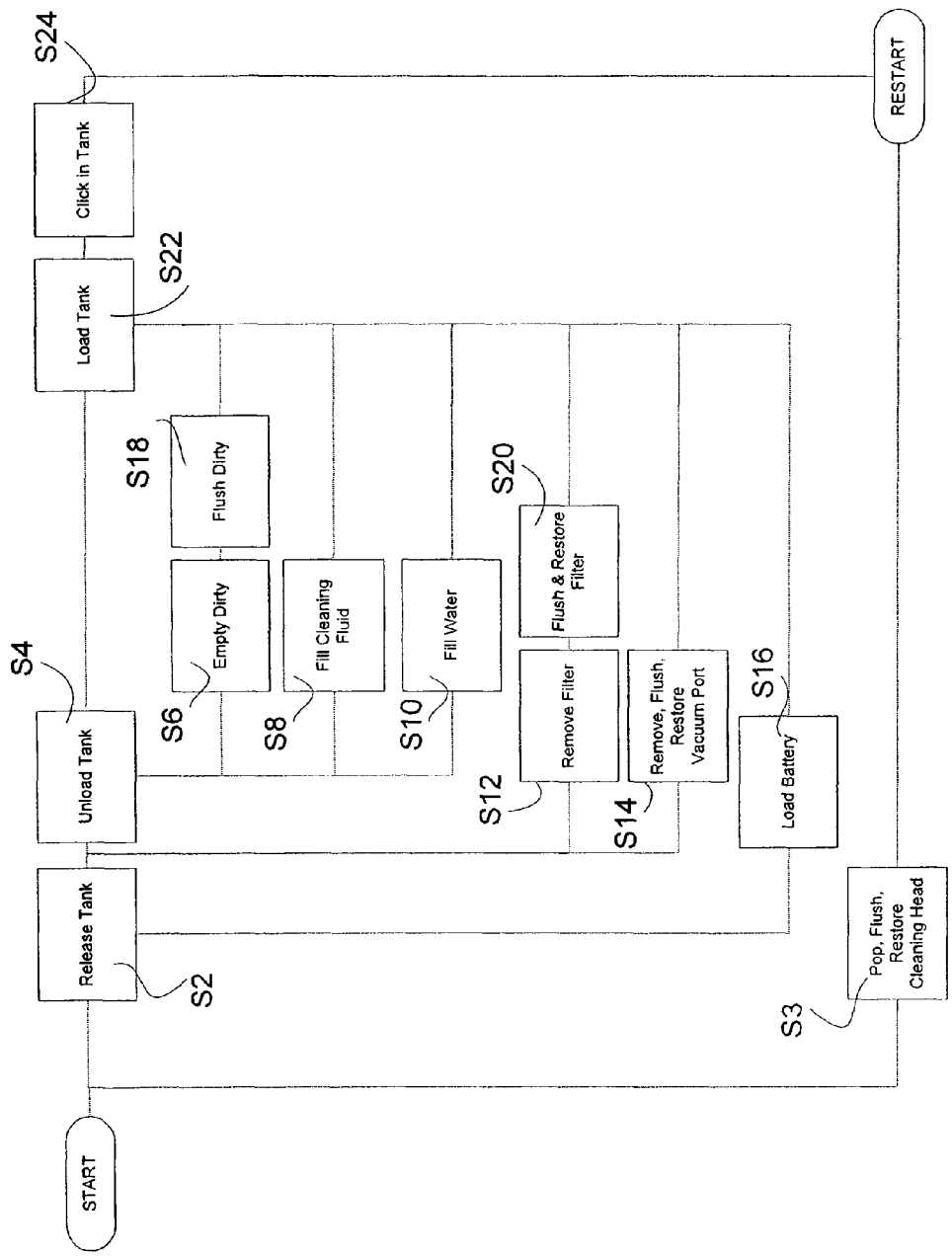
FIG. 36 depicts a series of maintenance steps for maintaining and servicing a embodiment of the robot of the present invention.
Figure 37:
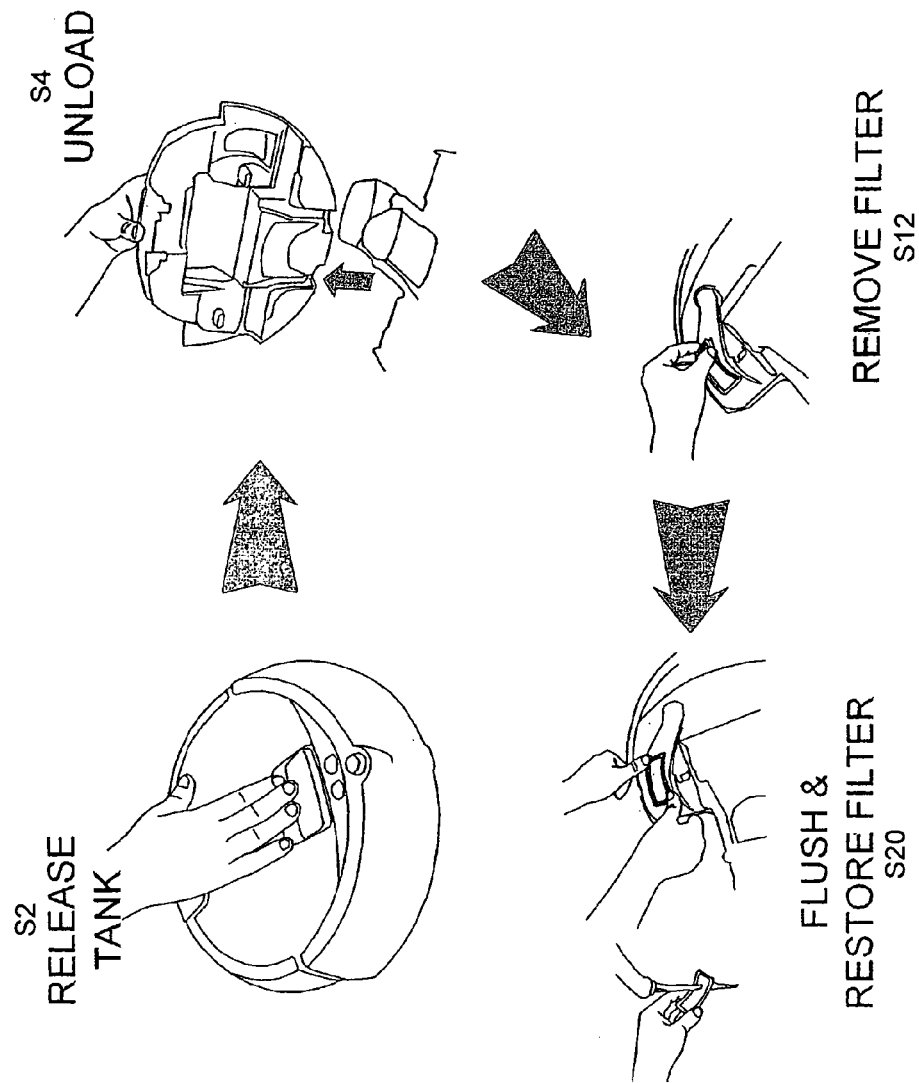
FIGS. 37-41 depict a steps of robot maintenance as identified in FIG. 36.
Figure 38:
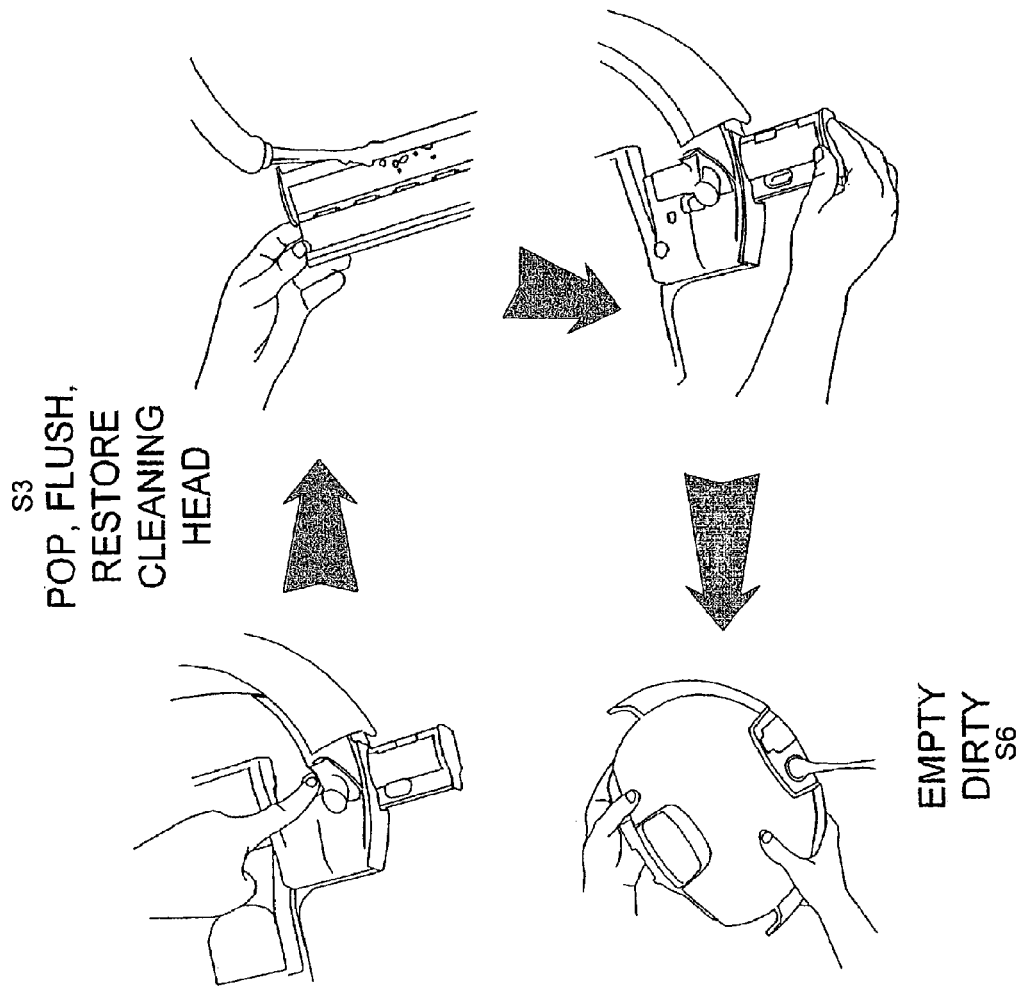
Figure 39:
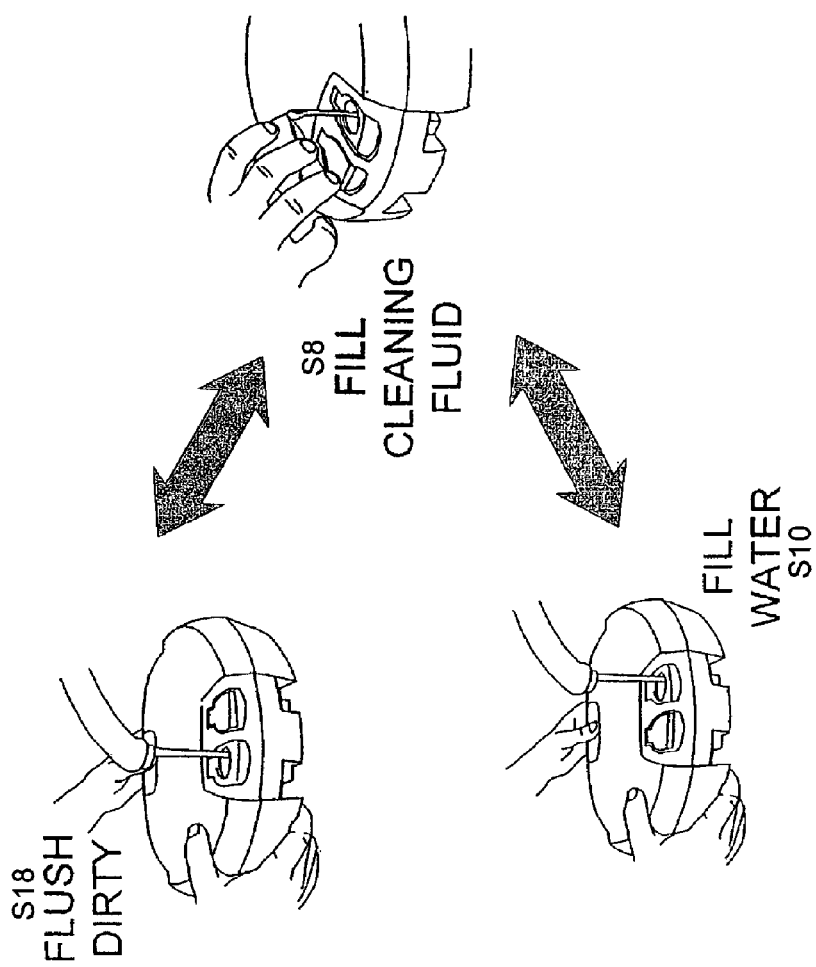
Figure 40:
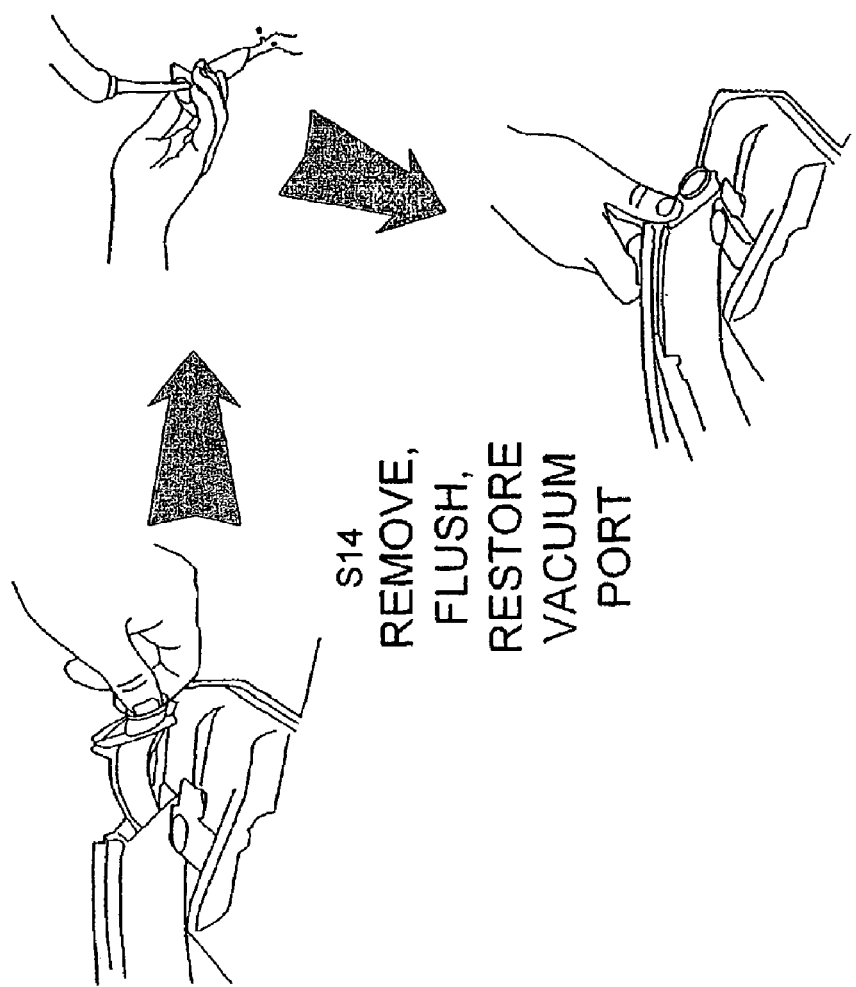
Figure 41:
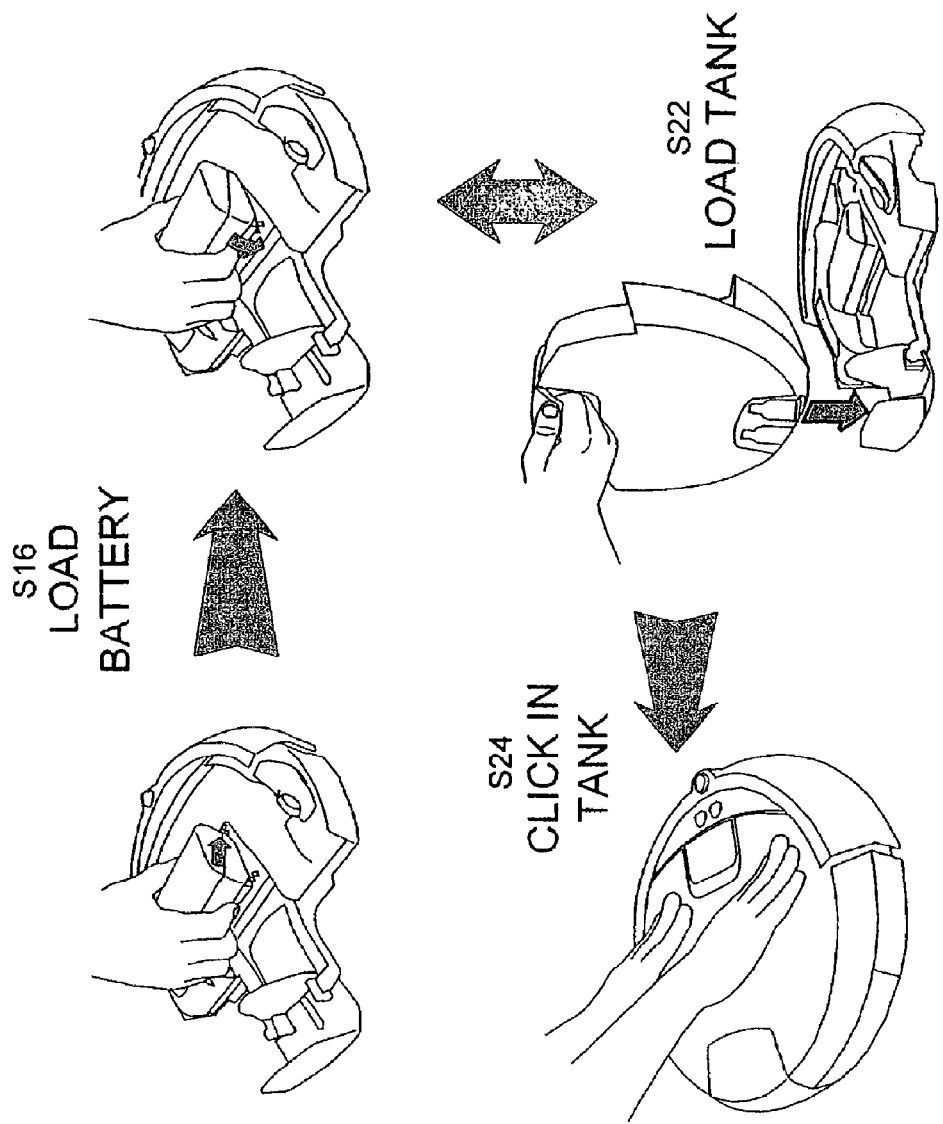

FIGS. 33-35 show an alternative structure for the front caster. As shown in FIGS. 33-34, the front caster may be generally structured as previously described, and with a design that integrates the functions of a stasis sensor (to determine that the undriven front caster is turning) and a wheel drop switch (to determine that it is no longer in contact with the ground). A fishhook shaped member 998 having a vertical shaft and a horizontal hook is looped around an eccentric boss 999 formed in the middle of the caster wheel. While the caster wheel rotates about its rotational axis for forward motion and about the support 984 to turn, the fishhook member sensor member 998 may turn within the support 984 freely (without impeding turning of the caster) but may also slide vertically within the support 984. As the actuator moves up and down sinusoidally, one sensor (as described herein, generally an optical or magnetic "stasis" sensor near the top of the member 998) may be used to track whether the robot moves forward. Alternatively, two sensors are used, one near each vertical end of the possible travel of the member 998, i.e., separated by substantially twice the offset of the boss 999. Two sensors improve resolution. Alternatively, the two sensors may be modeled as, or replaced with a linear sensor to provide an analog profile over time of the wheel rotation (e.g., even with only two sensors, if placed carefully, the analog output strength of the optical, magnetic, or electrical detection of the opposite ends of the member 998 can provide opposite ends of a substantially sinusoidal signal upon rotation, giving speed and limited odometry information). These are placed according to the position of the front caster on its suspension during normal use of the robot. Additionally, a wheel-drop sensor (again, optical, magnetic, or the like) is placed below the stasis sensors. As noted, the wheel is biased on its support housings 984, 970 to pivot to move within a swinging vertical range and provide a springed suspension. Should the robot's front wheel drop over a cliff or upon picking up the robot, as the member 998 moves into or below the range of the wheel-drop sensor, this may be detected. Accordingly, the assembly with member 998 and sensors works as a stasis sensor and a wheel-drop sensor, and may also act as a speed sensor. As noted herein, siping of the tire material is a cross-hatch of diagonal cuts. These cuts may be at angles from 20-70 degrees from the forward motion line of the robot.

A once per revolution wheel sensor includes a permanent magnet 1002 attached to the top end of the "L" shaped rod by an attaching element 1004. The magnet 1002 oscillates through a periodic vertical motion with each full revolution of the nose wheel. The magnet 1002 generates a magnetic field which is used to interact with a reed switch, not shown, mounted to the chassis 200 in a fixed location with respect to moving magnet 1002. The reed switch is activated by the magnetic field each time the magnet 1002 is in the full up position in its travel. This generates a once per revolution signal which is sensed by the master controller 300. A second reed switch may also be positioned proximate to the magnet 1002 and calibrated to generate a wheel down signal. The second reed switch is positioned in a location that will be influenced by the magnetic field when the magnet 1002 drops to the non-operating wheel down position.

Basic Form Factor

In one embodiment of robot of the present invention, the diameter of the robot circular cross-section 102 is 370 mm or 14.57 inches, i.e., approximately 35-40 cm or 12-15 in., and the height of the robot 100 above the cleaning surface is 85 mm or 3.3 inches, i.e., approximately 70-100 mm or 3-4½ inches. This size will navigate household doorways, under toe kicks, and clean under many typical chairs, tables, portable islands, and stools, and behind and beside some toilets, sink stands, and other porcelain fixtures. However, the autonomous cleaning robot 100 of the present invention may be built with other cross-sectional diameter and height dimensions, as well as with other cross-sectional shapes, e.g. square, rectangular and triangular, and volumetric shapes, e.g. cube, bar, and pyramidal. The height of the robot is less than that of a 10" cabinet toe kick (approximately the height of a wheelchair-accessible toe kick or European toe kicks), and preferably less than that of a 4" cabinet toe kick (the lowest American standard). Alternatively, the height of that portion of the robot that cleans into the toe kick may be so limited, with the remainder of the robot being higher.

One embodiment of a robot according to the invention uses a highly integrated physical structure and is manufacturable as a mass-produced commercial product. As shown in FIG. 1B, such an embodiment includes several parts: the robot body, the wet fluid tank, the battery, and a cleaning head. The tank may be a structural element (for example, the robot is carried by the tank handle with the fluid full), or the robot can be a chassis-body structure or set of self-supporting monocoque structures. Defined in certain circumstances, monocoque may mean "substantially monocoque" or "at least partially monocoque," and other alternative definitions are not excluded (e.g., robots having supporting ribs or frames, or including a load bearing body that could also have chassis-like elements such as cantilever support for other elements). Robots having a variety of components fall within the scope of this invention. On such cleaning robot includes a motor-driven brush or wiper, a first housing that accommodates a fluid tank, and a second housing that accommodates a steerable drive mechanism. A coupling mechanism couples the first housing to the second housing to form a substantially cylindrical outer surface of the cleaning robot. The cleaning robot dispenses fluid from the fluid tank and brushes or wipes a surface made wet by the fluid.

In another embodiment, the cleaning robot includes a motor-driven brush or wiper, a tank formed as a upper cylinder section that stores fluid, and a platform, formed as a lower cylinder section. The platform accommodates a steerable drive mechanism. A coupling mechanism couples the tank to the platform, the upper cylinder section of the tank matching the lower cylinder section of the platform to form a substantially cylindrical outer surface of the cleaning robot.

The integration of a fluid tank as part of a cylindrical body enables wet cleaning to be carried out by an autonomous robot with the maximum possible cleaning time. If the body as a whole is not cylindrical, i.e., does not have a circular perimeter, autonomy is effected, as escape from corners and corridors slightly larger than the robot becomes more difficult. By integrating the fluid tank into the robot body, tank volume may be maximized. Other shapes of constant width (reuleaux triangle or constant width polygon) are also possible as a perimeter shape, and are considered to fall within the meaning of the term "cylindrical" for the purposes of this specification, but the circular perimeter has the maximum internal area of constant width shapes and therefore the maximum potential fluid capacity.

Still another embodiment of the cleaning robot described herein includes a waste fluid compartment, a dispensed fluid compartment, a partially monocoque tank that accommodates at least one of the waste fluid compartment or dispensed fluid compartment, and a partially monocoque platform that accommodates a steerable drive mechanism. A coupling mechanism couples the partially monocoque tank to the partially monocoque platform to form a substantially cylindrical outer surface of the cleaning robot. The cleaning robot brushes a surface made wet at least in part by fluid dispensed by the cleaning robot.

Another embodiment includes a motor-driven brush or wiper, a tank that accommodates a fluid compartment for storing fluid, a platform including a mount that receives the tank, a fluid connection between the tank and the platform, and a vacuum connection between the tank and the platform. A coupling mechanically engages the tank to the platform. The engagement of the coupling seals the fluid connection and the vacuum connection and forms a substantially cylindrical outer surface of the cleaning robot. The cleaning robot brushes a surface made wet at least in part by fluid from the fluid compartment. The fluid from the fluid compartment may be, but is not necessarily, picked up by the vacuum (which could pick up just dry particulates before the brush or wiper).

Still another embodiment includes a motor-driven brush or wiper, a monocoque tank that accommodates a fluid compartment, and a platform including a pivoting mount that receives one end of the tank and that is rotatable to match the monocoque tank to the platform. A coupling mechanically engages the monocoque tank to the platform, so that the engagement of the coupling forms a substantially cylindrical outer surface of the cleaning robot. The cleaning robot brushes a surface made wet at least in part by fluid from the fluid compartment. The pivoting mount can optionally be arranged to receive the tank at the same angle as a user would carry it. If the tank hangs from a user's hand at an angle due to a handle configuration, then the tank could Yet another embodiment of the robot cleaner includes a motor-driven brush or wiper, a tank that accommodates a fluid compartment for storing fluid, a platform including a mount that receives the tank, a fluid connection between the tank and the platform, and a vacuum connection between the tank and the platform. A coupling mechanically engages the tank to the platform, such that the engagement of the coupling seals the fluid connection and the vacuum connection and forms a substantially cylindrical outer surface of the cleaning robot. The cleaning robot brushes a surface made wet at least in part by fluid from the fluid compartment.

In still another embodiment, the cleaning robot includes a tank that accommodates a fluid compartment for storing fluid, a cleaning head that includes a motor-driven brush and a vacuum, and a platform. The platform includes a first receptacle that receives a battery. A mount receives the tank so that the tank covers the battery. The battery need not be below the tank, it may be directly attached to the body on top or side. Additionally, the cleaning head, in one embodiment, is not removable or replaceable unless the tank is pivoted up, since the tanks and related components may create an interlock with the cleaning head when the tank is latched in place.

The cleaning head may be considered part of the platform, or optionally a second receptacle may receive the cleaning head from one side of the platform. The robot may include a fluid connection between the tank and the platform (as one example, so that the platform can dispense fluid) and a vacuum connection between the tank and the platform and/or cleaning head (as one example, so that material vacuumed by the platform can be deposited in the tank). Either or both of the vacuum connection and the fluid connection can be made directly between the tank and the cleaning head, e.g., by matching seals on the tank and the cleaning head. A coupling may mechanically engage the tank to the platform, and may seal the fluid connection and the vacuum connection.

Although all of the above combinations may use a brush or wiper, use of a brush causes less friction than wipers; moreover, the many bristles of a rotating brush still provide continuous and continuously repeating contact with a surface. The word "brush" includes pads, brushes, sponges, cloths, etc., that could be rotated, reciprocated, orbital, belt-driven, move with the robot, etc.

Although different ratios are possible, it is advantageous to maximize fluid tank volume if the fluid tank is more than 50% of the top surface, up to 50% of the side wall, and less than 50% of the bottom surface of the robot. However, it is more advantageous if the fluid tank is less than 25% of the bottom surface, and more than 75% of the top surface, as this balances the need to support the tank with the most volume.

As noted herein, the motor-driven brush is accommodated in a cleaning head which is removably inserted in the side of the first housing, and has a locking, click-lock, click-in/click-out or detent mechanism to hold it in place and maintain seals and connections. This construction, allows the cleaning head to be removed without removing the tank. If the battery is below the tank but above the body, the cleaning head can also be removed without removing the battery. A battery can be similarly arranged, using a similar structure, to be removably inserted from the side of the robot, with an optional locking, click-lock, click-in/click-out or detent mechanism to maintain electrical connections. The battery may also be integrated in either the tank or the body, and may include one or more replaceable, rechargeable, or replenishable batteries, fuel cells, or fuel tanks, or any combination thereof.

The coupling mechanism for securing the tank to the body can include a handle of the fluid tank, the entire substantially cylindrical robot, or the tank alone being rendered portable via the fluid tank handle. The handle may also include a locking, click-lock, click-in/click-out or detent mechanism. The handle as depicted herein includes a mechanism that accommodates a push to click-lock the tank to the body, another push to release the tank from the body, yet pulls up to use as a handle. The coupling mechanism may include a pivot and a lock, the pivot receiving one end of the tank and rotating the tank to engage the lock Many of the above embodiments utilize a tank structure that functions as both a fluid compartment and a support or structural element of the robot. Additionally, the tank may accommodate both clean and dirty fluid compartments, as in the depicted embodiment. Alternatively, an additional tank may provided to separate clean and dirty fluids, and/or for a concentrate to be mixed with water in one of the tanks. More compartments could be provided (e.g., a compartment for a defoamer, a compartment for fuel, etc.). The embodiment demonstrates the manner in which a tank or combined tank may self-support or act as a structural member; one of skill in the art would recognize that the same types of couplings and supports could be readily modified for more than one tank.

As noted herein the two compartments of the tank are arranged such that as fluid moves from one compartment to the ground and then is picked up, the center of gravity remains substantially in place, and/or remains substantially over the driving wheels. The present structure uses compartments that are stacked or partially stacked on top of one another with their compartment-full center of gravity within 10 cm of one another. Alternatively, the compartments may be concentric (concentric such that one is inside the other in the lateral direction); may be interleaved (e.g., interleaved L shapes or fingers in the lateral direction); or all of or a portion of the clean compartment may be a flexible bladder within the dirty compartment and surrounded by the dirty compartment, such that the flexible bladder compresses as clean fluid leaves it but dirty fluid filling the dirty compartment takes the place of the clean fluid. The flexible bladder may be a portion of the bottom of the clean tank that accordions, flexes, or expands into the dirty tank. For example, in FIG. 27, the circle sector flat portions of the second plastic element (tank middle) 812 to the left and/or right of the aperture 562*a* (as depicted in FIG. 27) may be formed as a flexing, expanding, or accordion part that expands into the waste tank. For this purpose, the plenum 562 may be arranged with straight sides in those directions.

Within a tank, various types of constructions of the compartments are possible: they may be separate, be joined by a wall (as depicted), be separate deformable compartments, or be nested compartments. Certain compartments may be nested and deformable or may include a collapsible wall which separates compartments. Walls separating compartments may be hinged, accordion, etc., and compartments may be separated by one or more semi permeable, osmotic or reverse osmotic membranes or other filters. Either of "compartment" or "tank" can be rigid, deformable, or collapsible, except where specified otherwise. The same compartment can be used for two different fluids in different circumstances (water and premixed cleaner compartment; treatment or polish compartment, and the like). Compartments within a tank may be used for water or solvent, mixed cleaning solution, concentrate, dirty fluid, dry particulate, fuel, scent, defoamer, marker, polish, treatment, wax, etc., as appropriate.

While most of the above examples have a removable tank, in an alternative embodiment, the tank may be permanent. The term "coupling" means the family of mechanisms for readily mounting one thing to another, including reversible types of couplings such as snaps, catches, latches, hooks, click-lock, detent-lock, screw-in, bayonet, Velcro, and the like. It also includes the use of gravity and guides to hold an upper part on a lower part, or tightly-fitting compatible elastomer parts. The modifier "readily detached" generally distinguish such semi-permanent coupling (permanent other than for repair, e.g., screws or bolt) from permanent couplings such as glue/welds. Semi-permanent or permanent couplings could be more practical in the case of a larger robot that is emptied by a dock or floor station (the above embodiments may include a compatible dock or floor station).

As noted above, the platform may also accommodate a spray, spreader, nozzle, capillary action, wipe-on cloth or other fluid dispensing mechanism for dispensing a fluid, and/or a brush, vacuum, squeegee, wipe-off or other cloth fluid collecting mechanism for collecting waste fluid. As used above, "made wet by the fluid" can occur before or after the fluid is stored by a tank (e.g., the fluid can be manually applied by a person and picked up by the robot, or fluid can be left on the surface by the robot to dry or evaporate, depending on the type of fluid, e.g., for polishes or floor treatments). Either or both housings may be substantially monocoque or may include a chassis portion or lock to an added chassis portion.

In cases where a pivot holder is used, the pivot holder is metal, and has durability and stiffness. The use of a heavy metal pivot can increase the weight of the robot (thus pressure and mopping force) and more significantly shift the center of gravity of the main housing to the front or rear (as necessary, depending where the metal pivot is positioned). If a metal handle is used at an opposite end of the robot, then the two metal parts can facilitate balancing and positioning of the center of gravity as desired. However, balancing and positioning can be instead facilitated by the use of a metal supportive frame that shifts the center of gravity of the robot toward the wheel/belt drive contact line, or simply by a heavy weight (e.g., cast iron) placed appropriately to shift the center of gravity of the fluid-full robot to the wheel/belt drive contact line.

For robots designed for coverage (including cleaning robots), it is best to place differential drive wheels on the diameter to permit the robot to turn in place. However, it is advantageous to place the working width or cleaning head on the diameter of a circular robot, as this will give the widest working swath. For certain vacuuming robots manufactured by iRobot Corporation under the trademark ROOMBA, because a side brush can be used when following walls to bring particulates within the working width, the wheels are placed on the diameter of the circular perimeter for this purpose. If the robot follows walls on the same side every time, only one side brush is needed.

However, for a mopping robot that applies liquid, the side brush is not as effective. While the present invention contemplates the use of a dry or wet side brush substantially physically similar to that of a thy-type vacuum to assist dry cleaning or wet cleaning or both, it is not believed to be necessary. Additionally, placing the cleaning head on the diameter of the circular perimeter so that the width of the cleaning head can come nearest the wall helps provide effective cleaning. In the case of another curve of constant width, the cleaning head could be placed on the widest span, and differential drive wheels arranged close to the diameter of a circumcircle enclosing the robot perimeter (alternatively, such a robot could use a holonomic drive with equiangularly arranged omnidirectional wheels).

When the cleaning head is on the diameter of the circular perimeter, it may abut the edge of the robot, thus improving edge cleaning performance. Additionally, if the robot is controlled and configured to always follow walls and obstacles on one dominant side, then the cleaning head need only abut one edge of the robot. Such an arrangement allows space on the non-dominant side to be used for other purposes. In the case of one embodiment of the robot, this on-diameter edge space is used for a gear train and engagement structure to enable the cleaning head to be slip-engaged in cartridge fashion from one lateral side of the robot (from the edge cleaning/dominant side), see FIGS. 3, 3B.

The cleaning system of one specific embodiment is dry pick up, followed by fluid (wet) application, followed by fluid pick up. The reason for the dry pick up to precede fluid application, as described herein, is primarily so that the wet pick-up is primarily of grey water/waste fluid, and not of particulates and large loose debris, which have various negative effects on wet pick-up and can usually be more easily picked up when dry.

Additional cleaning steps may be incorporated into a wet cleaning robot in accordance with the present invention. For example, a dry material application step may be included after the dry pick up step, e.g., a step in which an abrasive powder, catalyst, reactant, etc., or other dry material is deposited and mixes with fluid (or the wet spray is turned off and the dry material is collected or is left for later pickup).

It would also be possible to remove the dry pick up step in the case where another countermeasure is adopted to deal with the possibility of wet particulates or debris, e.g., where a wet pick up mechanism accommodates such debris. One embodiment of the device may use a scrubbing brush that precedes a lateral-strip wet vacuum/squeegee along the cleaning path. As one example, in an alternative embodiment where a scrubbing brush is placed to rotate within the mouth of a vacuum and directs debris to the mouth of the vacuum, the dry pick up step may be less important. It would also be possible to change the cleaning system such that the fluid application process does not immediately precede the fluid pick up process. As one example, in an alternative embodiment a first robot would apply fluid and a second robot would pick up the fluid, or a single robot could be configured to apply fluid in one pass and remove fluid in a second pass along the same path.

It would also be possible to change the cleaning system such that the fluid pick up process is not carried out, for example in the case of a wax or polish. In another embodiment, the robot could apply one kind of fluid (e.g., a cleaning fluid), pick it up, and apply a second kind of fluid (e.g., a wax or polish) that is not picked up.

It would also be possible to change the cleaning system such that the fluid application process applies fluid to a brush, roller, belt, web, pad, or other scrubbing medium rather than directly to the floor, and the fluid first contacts the floor primarily as it is carried there by the scrubbing medium.

As described herein, certain new cleaning systems are particularly well suited to the robotic cleaner of the invention. However, no part of the process or system is critical, notwithstanding that there are certain combinations of cleaning processes that form cleaning systems that has distinct advantages as set forth herein. Many of the robotic, form, and configuration structures set forth herein are new and advantageous for any wet cleaning system (as only one example, the structures associated with a wet cleaning head that extends to one side edge only, where the robot always cleans on that side).

As discussed herein, the robot is preferably from about 3-5 kg when completely filled with fluid. For household use, the robot may be as much as about 10 kg. Exemplary ranges for physical dimensions of the robot are a full mass of about 2-10 kg; a cleaning width of about 10 cm-40 cm within a diameter of about 20-50 cm; a wheel diameter about 3 cm-20 cm; drive wheel contact line about 2 cm-10 cm for all drive wheels (two, three, four drive wheels); drive wheel contact patch for all wheels about 2 cm$^2$ or higher. An exemplary robot is less than approximately 4 kg empty, and less than approximately 5 kg full, and carries approximately 1 kg (or 800-1200 ml) of clean or dirty fluid (in the case where the robot applies fluid as well as picking it up). The waste tank is sized according to the efficiency of the pick-up process. For example, with a comparatively inefficient squeegee designed to or arranged to leave a predetermined amount of wet fluid on each pass (e.g., so that the cleaning fluid can dwell and progressively work on stains or dried food patches), the waste tank may be designed to be equal in size or smaller than the clean tank. A portion of the deposited fluid may never be picked up, and another portion may evaporate before it can be picked up. In the case where a dry pick up precedes the wet pick up, and an efficient squeegee is used (e.g., silicone), then it may be necessary to size the waste tank to be equal to or bigger than the clean fluid tank. A proportion of the tank volume, e.g., about 5% or higher, may also be devoted to foam accommodation or control, which can increase the size of the waste tank.

A viable autonomous hard surface cleaning robot is under about 10 kg mass, and has at least one scrubbing or wiping member. In order to effectively brush, wipe, or scrub the surface, the scrubbing or wiping member creates drag, and for a robot under 10 kg, should create an average drag of up to about 40% of weight, but preferably less than about 25%. Drag forces (total drag associated with any blades, squeegees, dragging components) should not exceed about 25% of robot weight to ensure good mobility in the absence of active suspensions/constant weight systems, as any lifting obstacle will otherwise remove weight from the tires and effect motive force. Maximum available traction typically is no more than about 40% of robot weight on slick surfaces with a surfactant based (low surface tension) cleaning fluid, perhaps as high as about 50% in best case situations, and traction/thrust must exceed drag/parasitic forces. However, in order to successfully navigate autonomously, to have sufficient thrust to overcome minor hazards and obstacles, to climb thresholds which may encounter the scrubbing or brushing member differently from the wheels, and to escape from jams and other panic circumstances, the robot should have a thrust/traction, provided mostly by the driven wheels, of about 150% or more of average drag/parasitic force. A rotating brush, depending on the direction of rotation, can create drag or thrust, the invention contemplates both. One example of a robot disclosed herein in detail, having a weight of about 8½ lbs, with less than 2 to 3½ lb drag caused by brushes, wipers, squeegees, and idle wheel friction, but more than 3 to 5½ lb thrust contributed either by drive wheels alone or by drive wheels in combination with a forwardly rotating brush, would be an example of a robot that may successfully clean and navigate autonomously. Sometimes weight must be added to improve traction by putting more weight on the wheels (e.g., metal handle, clevis-like pivot mount, larger motor than needed, and/or ballast in one embodiment of the present device). With or without added weight, one embodiment of the present device derives a functional percentage of thrust from a forwardly rotating brush (which is turned off generally in reverse), which is not a feature needed in a large industrial cleaner.

The width of the cleaning head for the mass of the household cleaning robot, under 10 kg (or even under 20 kg), is remarkably different from industrial self-propelled cleaners. According to the embodiments of the invention, this is from 1 cm of (wet) cleaning width for every 1 kg of robot mass, ideally about 5 or 6 cm of cleaning width for every kg of robot mass, and up to 10 cm of cleaning width for every kg of robot mass (the higher ratios generally apply to lower masses). It is difficult to apply sufficient wiping or scrubbing force with more than 10 cm of cleaning width for every kg of robot mass; and less than 1 cm for every 1 kg of robot mass leads to either an ineffective cleaning width or a very heavy robot unsuitable for consumer use, i.e., that cannot be carried easily by an ordinary (or frail) person. Self-propelled industrial cleaning machines typically will be have 1-3 cm of cleaning width or less per kg machine mass.

The ratios of these dimensions or properties may implicate whether a robot under 10 kg, and in some cases under 20 kg, will be effective for general household use. Although some such ratios are described explicitly above, certain ratios (e.g., cm squared area of wheel contact per lb of robot weight, cm of wheel contact line per lb of drag, and the like) are expressly considered to be inherently disclosed herein, albeit limited to the set of different robot configurations discussed herein.

Although the present disclosure discusses in detail the best material configuration and geometry for tires or tracks for a robot useful on wet household surfaces, certain combinations of other cleaner elements with these materials and tire geometry are particularly effective. As for the tires themselves, as discussed, one advantageous configuration would be a 3 mm foam tire thickness with 2 mm deep sipes. This configuration adequately performs when supporting no more than 3 to 4 kg per tire. The ideal combination of sipes, cell structure and absorbency for a tire is affected by robot weight.

At least one passive wiper or squeegee is advantageous on the wet cleaning robot. For example, a wet vacuum portion should be closely followed by a squeegee to build up the thickness of a deposited water film for pick-up. A trailing (wet) squeegee should have sufficient flexibility and range of motion to clear any obstacle taller than 2 mm, but ideally to clear the ground clearance of the robot (in the case of the embodiment detailed herein, the 4½ mm minimum height or ground clearance of the robot).

Any reactionary force exhibited by the squeegee that is directionally opposite to gravity, subtracts from available traction and should not to exceed about 20% of robot weight, ideally no more than about 10% of robot weight. A certain amount of edge pressure, which has an equal reactionary force, is necessary for the squeegee to wipe and collect fluid. In order to obtain an effective combination of fluid collection, reactionary force, wear, and flexible response to obstacles, the physical parameters of the squeegee should be well controlled and balanced. It is noted that a working edge radius of about 3/10 mm for a squeegee less than about 300 mm is particularly effective, and squeegees of from about 1/10 to 5/10 mm working edge can be expected to be viable depending upon other accommodations made. Wear, squeegee performance, and drag force are improved with a squeegee of substantially rectangular cross section (optionally trapezoidal) and/or about 1 mm (optionally about ½ mm to 1½ mm) thickness, about 90 degree corners (optionally about 60 to 120 degrees), parallel to the floor within about ½ mm over its working length (optionally within up to about ¾ mm), and straight to within about 1/500 mm per unit length (optionally within up to about 1/100), with a working edge equal to or less than about 3/10 mm as noted above. Deviations from the above parameters require greater edge pressure (force opposite to gravity) to compensate, thus decreasing available traction.

Three exemplary wet vacuum/squeegee assemblies are disclosed herein, one of which uses a "split squeegee," where wet pickup is primarily provided by a vacuum channel between a forward wet squeegee and a rear wet squeegee, and the two squeegees are separated members that can slide relative to one another as the squeegee is deformed during use. As depicted in FIG. 12 herein, the rear wet squeegee to the left of the drawing would separate from the front wet squeegee adjacent the brush when the cartridge is opened for cleaning. The forward wet squeegee is crenellated on an inside surface to provide a series of vacuum channels, and the primary task of the forward wet squeegee is to appropriately deform to maintain the vacuum within the channels and to deliver the forward ends of the channels to the floor. The forward wet squeegee (of a split squeegee design), maintains a constant open cross-sectional area to define the aerodynamic parameters relative to the trailing wet squeegee. However, in order to accomplish this, the forward wet squeegee need only contact the floor at designated locations and does not require edge pressure to be functional. The forward wet squeegee must be able to clear any obstacles at the ground clearance of the robot, e.g., to clear any obstacle over about 4½ mm minimum height of robot for a 4½ mm rear or wet ground clearance. The forward wet should maintains aerodynamic cross sectional areas at about 80-120%, ideally at about 90-110%, of design point (e.g., the projected cross sectional area in a static design) at any location along its length. Deviation of the cross sectional area results in inconsistent vacuum assist for the squeegee and reduces cleaning performance.

When a squeegee is used with or behind a dry vacuum, the dry-vac squeegee must have sufficient flexibility and range of motion to clear any obstacle taller than the forward ground clearance, i.e., for example to clear any obstacle taller than a about 6½ mm height of a forward (dry) half of the robot (in this example, the forward height may be higher or lower). Because the primary purpose of the "dry squeegee" or "doctor blade" is as an air flow guide, and not as a true doctor blade or squeegee, despite the use of the terminology "dry squeegee" or "doctor blade" herein, the end of the dry squeegee can be optionally designed to be separate from the floor by, for example, 0 to about 1 mm, ideally ½ mm. Edge pressure is not necessarily required for the dry vacuum squeegee, i.e., air flow guide blade, to function properly for optimum performance. An ideal air flow guide blade can pivot fore and aft by about 10-30 degrees, ideally 20 degrees.

When brushes or wipers are used, both static and rotational brushes or wipers must contact the floor over a broad range of surface variations (e.g., in wet cleaning scenarios, including tiled, flat, wood, deep grout floors). This contact is accomplished according to the invention generally one or both of two ways: the brush or wiper is mounted using a floating mount (e.g., on springs, elastomers, guides, or the like); and/ or adequate flexibility for the designed amount of interference or engagement of the scrubbing brush or wiper to the surface. As noted above, any reactionary force exhibited by the brushes/scrubbing apparatus that is opposite to gravity subtracts from available traction and should not exceed about 10% of robot weight. Helix designs of spinning brushes help to minimize forces opposite to gravity and reduce energy requirements for rotation.

Most of the embodiments described herein, where using a rotational brush, use a single brush. More than one brush may be provided, e.g., two counter-rotating brushes with one brush on either fore-aft side of the center line of a robot, or more. A differential rotation brush may also be employed. In such a case, two brushes, each substantially half the width of the robot at the diameter of rotation, are placed on either lateral side of the spin/rotation center line, each extending along half of the diameter. Each brush is connected to a separate drive and motor, and may rotate in opposite directions or in the same direction or in the same direction, at different speeds in either direction, which would provide rotational and translational impetus for the robot.

A cleaning robot according to one embodiment of the invention is also provided with a suspension system, primarily including a pivoted wheel assembly including resilience and/or damping, having a ride height designed considering up and down force. The ideal suspension is capable of delivering ideally within about 2% (optionally 1-5%) of the minimum downward force of the robot (i.e., robot mass ore weight minus upward forces from the resilient or compliant contacting members such as brushes/squeegees, etc). That is, the suspension is resting against "hard stops" with only about 2% of the available downward force applied (spring stops having the other 98%, optionally 95%-99%), such that any almost any obstacle or perturbation capable of generating an upward force will result in the suspension lifting or floating the robot over the obstacle while maintaining maximum available force on the tire contact patch. This spring force (and in corollary, robot traction) can be maximized by having an active system that varies its force relative to the changing robot payload (relative clean and dirty tank level). Active suspension would be provided by electrical actuators or solenoids, fluid power, or the like, with appropriate damping and spring resistance, as understood by those of ordinary skill in the art.

The center of gravity of the robot will tend to move during recovery of fluids unless the cleaner and waste tanks are balanced to continually maintain the same center of gravity location. If a fluid recovery system that is capable of recovering nearly all of the fluid put down regardless of the surface, or modeling predicts how much fluid will be recovered into the waste tank, maintaining the same center of gravity location (by tank compartment design) can allow a passive suspension system to deliver the maximum available traction. The present invention contemplates a tank design that includes a first compartment having a profile that substantially maintains the position of the compartment center of gravity as it empties, and a second compartment having a profile that substantially maintains the position of the compartment center of gravity as it fills, wherein the center of gravity of the combined tanks is maintained substantially within the wheel diameter and over the wheels. This is more readily achieved with tanks that are at least partially stacked in the vertical direction.

While the cleaning tanks as configured are integral, the invention contemplates the use of cleaning fluid cartridges. The user would insert a sealed plastic cartridge into a depression or cavity on the robot housing, the cartridge smoothly or substantially smoothly (perhaps slightly raised) completing the top and/or side outer profile of the robot, and preferably being configured to contain a pre-measured amount of cleaning fluid. Securing the cartridge into the robot would pierce or crack the cartridge housing, allowing the cleaning fluid to mix with the water in the correct amount.

As noted above, absent perfect fluid recovery or active suspension, superior mobility can be achieved either by modeling or assuming a minimum percentage of fluid recovered across all surfaces (70% of fluid put down, for example) and designing the profile of the compartments and center of gravity positions according to this assumption/model. In the alternative, or in addition, setting spring force equal to the maximum unladen (empty tank) condition can contribute to superior traction and mobility. As a rule, suspension travel should at least equal the maximum obstacle allowed by the bumper (and other edge barriers) to travel under the robot.

Maximizing the diameter of wheel decreases the energy and traction requirements for a given obstacle or depression. Maximum designed obstacle climbing capability should be about 10% of wheel diameter or less. A 4.5 mm obstacle or depression should be overcome by a 45 mm diameter wheel. In most embodiments described herein, the robot is short and squat for several reasons. The bumper is set low to distinguish between carpet, thresholds and hard floors, such that a bumper about 3 mm from the ground will prevent the robot from mounting most carpets (about 2-5 mm bumper ground clearance). The remainder of the robot working surface, e.g., the dry vacuum and wet cleaning head under the robot, also have members extending toward the floor (air guides, squeegees, brushes) that are made more effective by a lower ground clearance. Because the ground clearance of one embodiment is between 3-6 mm, the wheels need only be 30 mm-60 mm. However, larger is typically better, even when lower obstacles are addressed.

As shown in the various FIGS., at the bottom of the front bumper 220 are crenellations, in this case thin lateral tabs set at intervals along the length of the front bumper. These tabs act as a mechanical carpet detector subsidiary to the main collision or obstacle detection of bumper 220, being members protruding toward a height at which carpet would pass under the robot before the front wheel climbs the carpet, set at about 3 mm from the floor about the lower periphery of the front bumper, and capable of actuating the front bumper. The tabs extend below the front edge of the front bumper. In addition, inner cover 200a of the robot, necessary to shield the interior of the robot when the tank assembly is removed, provides additional stiffness, reducing the requirements on the chassis 200 (lower part 200b).

Robot Controller (Circuit) and Control

In accordance with at least one embodiment, the robot may include a generally circular or round chassis 200 (see FIG. 3, for one example), to which at least first and second drive wheels 1100 may be rotatably connected. The drive wheels 1100 may be positioned on a bottom portion of the chassis 200, so as to bear the robot across the cleaning surface when the drive wheels 1100 are driven. Further, the drive wheels 1100 may be positioned such that the respective centers of each drive wheel 1100 lie along a virtual line that is generally parallel to the plane of the cleaning surface, for example. Various control sequences for the robot of the present invention and its components are described herein. Additionally, the robot may navigate through a working environment using various control and navigational systems known in the art, including, but not limited to those disclosed in U.S. application Ser. Nos. 11/176,048, 10/453,202, and 11/166,986; U.S. Provisional Application Ser. No. 60/741,442, filed on Dec. 2, 2005, entitled "Robot Networking, Theming, and Communication System," by Campbell et al.; and U.S. Pat. No. 6,594,844; the entire disclosures of which are herein incorporated by reference in their entireties In one embodiment, the virtual line may extend through a center point of the circular chassis 200 of the robot, and the drive wheels 1100—which include a left drive wheel and a right drive wheel—may each be positioned at a mutually opposite outer edge of the chassis 200. The drive wheels 1100 may then be driven simultaneously in a forward-spinning direction so as to propel the robot over the cleaning surface; also, the drive wheels may be driven differentially, with one of the drive wheels 1100 being driven to spin more rapidly than the other, such that the yaw of the chassis 200 rotates about its center point. As a result, the robot can maneuver even where there is no headroom, because the differentially driven drive wheels 1100 can rotate the chassis 200 of the robot without having to simultaneously propel the robot forward or backward with respect to the cleaning surface (this may be accomplished by driving each drive wheel 1100 at the same rate of spin, but in mutually opposite directions, for example).

In accordance with another embodiment, the robot chassis 200 may include a scrubbing module 600 (see FIG. 12A, for example), which has a generally linear shape and which may extend from a first point along an outer circumferential edge of the circular chassis 200, through the center point, and to a second point along the outer circumferential edge of the circular chassis 200 (thereby generally defining a central bisecting line through the center of the circular chassis 200, for example). In such an embodiment, both drive wheels 1100 are positioned on the bottom portion of the chassis 200 on either the fore or the aft side of the scrubbing module 600, and in certain embodiments, to the aft of the scrubbing module 600 so as to contribute to the navigational stability of the robot, for example. Other drive wheel locations are possible. As one example, a robot having 4 drive wheels, one forward and aft of the cleaning head on either side of the robot, and with 3 drive wheels—on the right side one forward and one aft of the cleaning head, and on the left the wheel positioned on the diameter to the left of the cleaning head. Such configurations could give the robot movement more similar to a robot having differential drive on the center line, and facilitate software optimizations for controlling movement of the robot, among other things.

In accordance with one embodiment, the mobile robot 100 may clean a floor or other cleaning surface using a generally spiral path, for example. By choosing a spiral path in accordance with an effective width of the liquid applicator 700, for example, the robot can effectively deposit cleaning fluid over a maximal area of the cleaning surface. In such a case, a robot with a dominant side turns away from the dominant side, in order to have the dominant side (i.e. a side upon which the cleaning head extends to the edge, and upon which the robot follows obstacles) form the outside of the spiral. For a simple spiral, this can leave a spot that is uncleaned, e.g., where the cleaning head is offset to the right and the robot spirals to the left, the robot-bottom portion with no cleaning head coverage creates a small uncleaned circle in the center of the spiral (although this circle is temporary given that the robot will probably return randomly to the same spot before the end of the cleaning cycle). This can be addressed by following the spiral with a center pass based on dead reckoning, or by following the spiral with one or two figure-eights based on dead reckoning. However, in the case where the robot encounters a wall or obstacle before the spiraling method is to initiate the center pass, there remains some probability that this interruption will leave the uncleaned circle (reversing the direction of the spiral from the obstacle or arbitrarily may be used to reach the circle spot as well).

Figure 46:
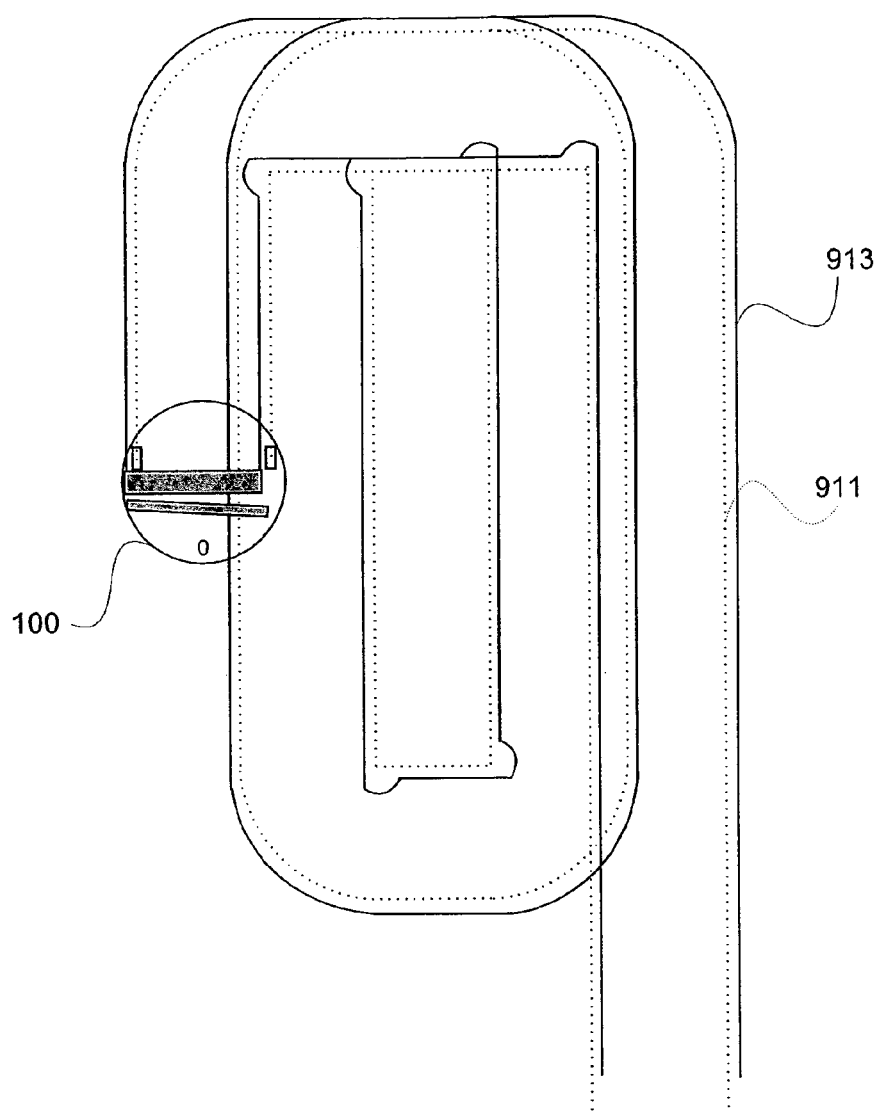
FIG. 46 depicts a cleaning path for a mobile robot in accordance with one embodiment of the present invention.

As an alternative coverage pattern which does not necessarily create such spot is shown in FIG. 46. In such a pattern the mobile robot 100 may follow an overlapping pattern similar to that used by ice resurfacing machines used on skating rinks, in order to ensure that all the areas within the path are properly covered. FIG. 46 shows the general wheel path in dotted lines 911, and the general coverage path in solid lines 913. The pattern is most simply a series of circles or ovals that overlap one another, with the diameter of the path followed being larger than the width of the coverage track. It may be implemented as a series of overlapping rounded-corner squares or rectangles, rectangles shown in FIG. 46. As shown in FIG. 46, an exemplary pattern uses essentially right-angle differentially steered turns. The robot travels a distance away from a first track, turns parallel to it, travels parallel to it, then turns back to the first track, eventually turning before the first track to overlap it and drive parallel along the first track. The overlap is sufficient to cover any "blank spots" caused by the offset cleaning head or offset differential wheels. The robot then turns at essentially a similar position to the first turn, and repeats this process treating the track just made as the first track. Successively, although the robot leaves a blank, uncleaned area in the middle at the initiation of the coverage pattern, the robot will shift the overlapping oval, circle, square, or rectangle such that the blank area is eventually covered. As can be seen in FIG. 46, the diameter of or distance across the first loop and subsequent loops of the pattern can be any size, as the robot will overlap the coverage eventually. Larger loops also have greater cleaning efficiency if they incorporate many straight lines. However, if the loops are too large, drift error accumulates, obstacles may be encountered disrupting the pattern, etc. If the loops are too small, then too much time is spent in differential turns, during which cleaning is not as satisfactory as straight cruising, and which is slower than straight cruising as well. In the present case, the coverage pattern described above is of a size that will completely cover the center of the loop on the third to fifth parallel pass (parallel whether the loop shape is irregular, circular, oval, square, or rectangular), and overlaps by no more than half of the cleaning width on each pass. One exemplary tight coverage pattern overlaps by about 120%-200% of the straight line distance from the wheel center to the cleaning head edge (or in the alternative has loops offset by the cleaning width minus about 120%-200% of this distance, or alternatively simply overlaps by about ⅕-⅓ of cleaning head width, or alternatively has loops offset by about ⅔-⅘ of cleaning head width), and has loops that are less than about three or four times the working diameter. These loops are substantially symmetrical, either circles, polygons, squares (the latter two with curved corners as the robot turns).

Figure 47:
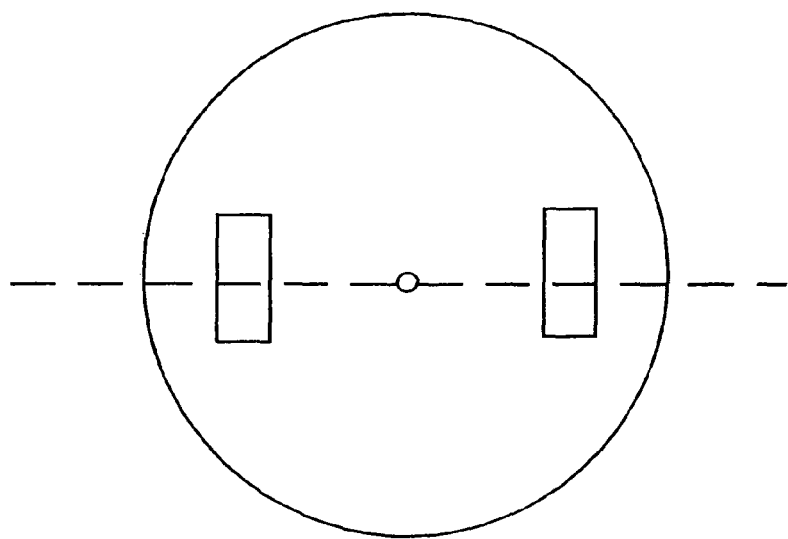
FIG. 47 depicts a mobile robot having left and right drive wheels positioned along a central diameter of the chassis, in accordance with one embodiment of the invention.
Figure 48:
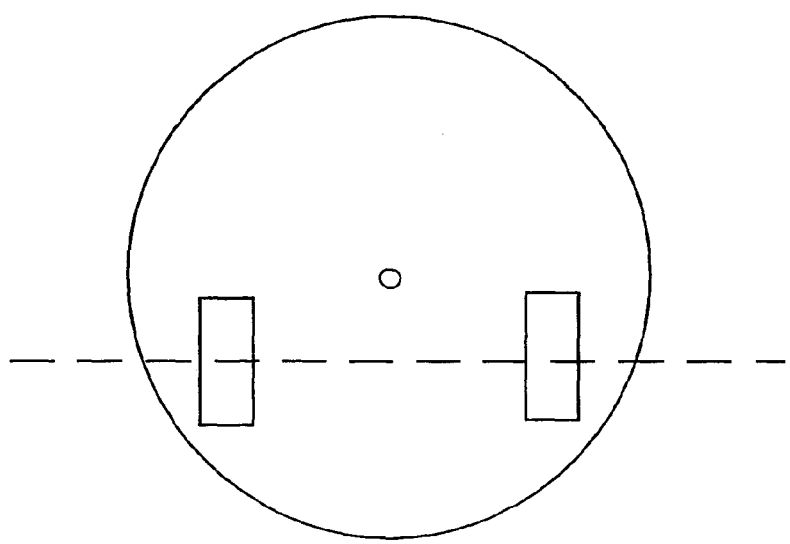
FIG. 48 depicts a mobile robot having left and right drive wheels positioned on the aft bottom portion of the chassis, in accordance with another embodiment of the invention.

FIG. 48 illustrates a mobile robot having left and right drive wheels 1100 positioned on the aft bottom portion of the chassis 200, in which a dotted line indicates the virtual line extending through the centers of both drive wheels 1100. Because the virtual line of the "diameter-offset" robot does not pass through the center point of the chassis 200 (which is different from the on-diameter robot shown in FIG. 47, for example), however, the differential yaw control effected by differentially driving the left and right drive wheels 1100 is different from the embodiments in which the virtual line passes through the center point of the chassis 200. For example, in contrast to the center point-intersecting example, the robot illustrated in FIG. 49 necessarily undergoes simultaneous forward or backward motion by the robot with respect to the cleaning surface, when the yaw of the robot is altered by differentially driving the drive wheels 1100. Accordingly, the control of the diameter-offset robot (herein "offset robot") for various tasks such as sharp turning, proceeding along curved paths, cliff-following, bump-follow behaviors or other such behaviors is altered from the non-diameter-offset robot, taking into account the differences caused by the offset of the drive wheels 1100 from the diameter (i.e., the centrally bisecting virtual line) of the chassis 200. Several exemplary offset robot behaviors, which the robot's controller can implement to control the robot accordingly, are discussed below.

The robot may include a bump follow behavior. The bump follow behavior facilitates the escape of the offset robot from a narrow or partially enclosed area (such as an alcove or narrow end of a hallway, for example). The bump follow behavior may include at least two phases: (1) Turning in place (i.e., adjusting the yaw of the robot) when a bumper (or other suitable contact or pressure sensor for detecting contact of the robot with an obstacle, such as a leaf-spring switch, magnetic proximity switch, or the like) is compressed, and (2) moving in a generally arc-shaped path in the opposite direction of the turn with a decreasing radius until the bumper is compressed again.

Figure 49:
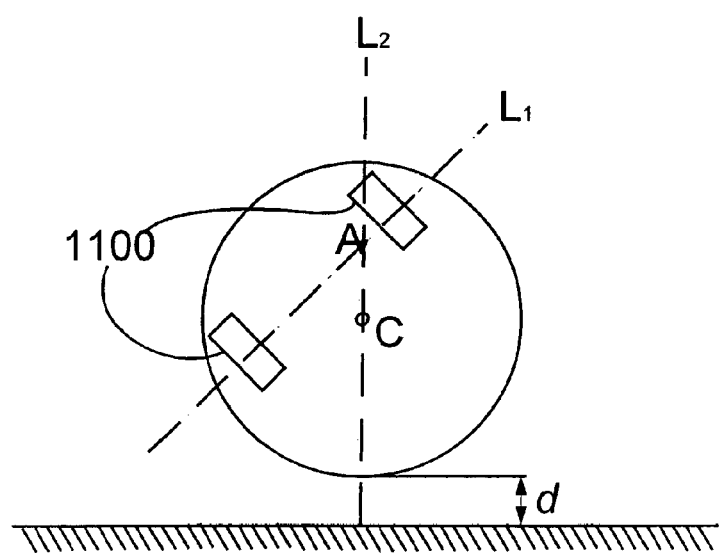
FIG. 49 depicts an offset diameter robot positioned a distance d from a wall.

In accordance with at least one exemplary implementation, phase 1 of the algorithm modifies the radius of turn to keep the bumper against the wall while turning (see FIG. 49). L1 is a virtual line that extends through the centers of the drive wheels 1100, and the robot can rotate about any point on this line. L2 is a virtual line that is perpendicular to the wall and passes through the center of the robot (point C). Point A is the intersection of L1 and L2. In accordance with this algorithm, for example, the robot may maintain a constant distance 'd' between the robot and the wall.

To turn the robot while keeping 'd' constant, the robot adjusts the respective wheel velocities for the first and second drive wheels 1100 such that the robot rotates about point A. This can be a continuous process such that point A moves with respect to the cleaning surface, as the robot rotates.

Figure 50:
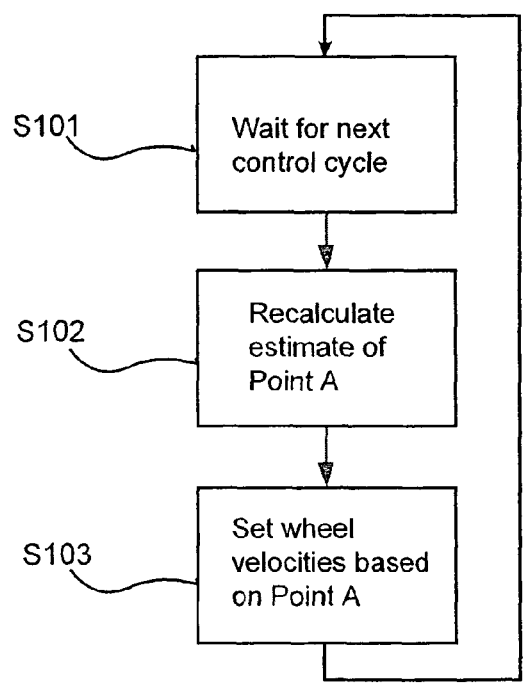
FIG. 50 depicts a control sequence for turning a robot with respect to a wall.

Referring to FIG. 50, for example, the controller implements an algorithm based on control cycles in order to effect the proper behavior. At an initial step S101, the robot waits for a control cycle, after which the robot recalculates the estimated position of point A at step S102. Subsequently, the robot sets the respective spinning speed for each drive wheel 1100 at step S103, in accordance with the recalculated position of A; then, the process repeats at the first step S101.

In accordance with embodiments in which the robot may not have a sensor that indicates what angle the wall is relative to the robot, the control algorithm may estimate the position of point A based on which bumper switch is closed (left, right, or both) and may update its estimate as the bumper switch closure state changes. Accordingly, this estimation may allow the bump follow escape behavior to work well most of the time.

Figure 51:
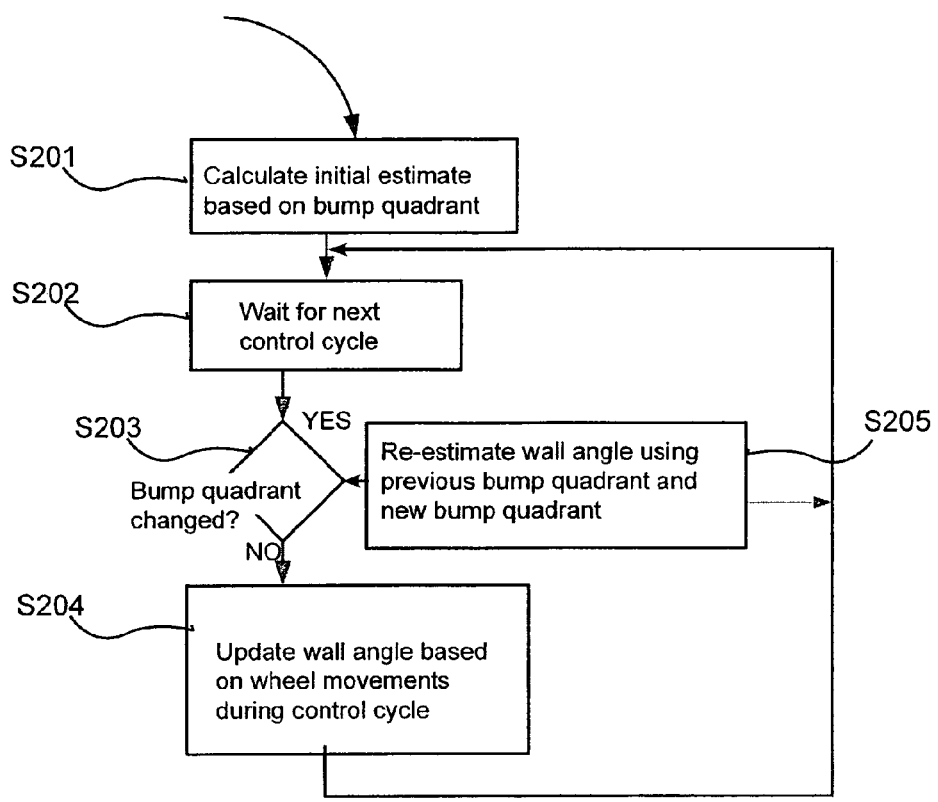
FIG. 51 depicts a first phase of a sequence for estimating a wall angle, in accordance with one embodiment of the invention.
Figure 52:
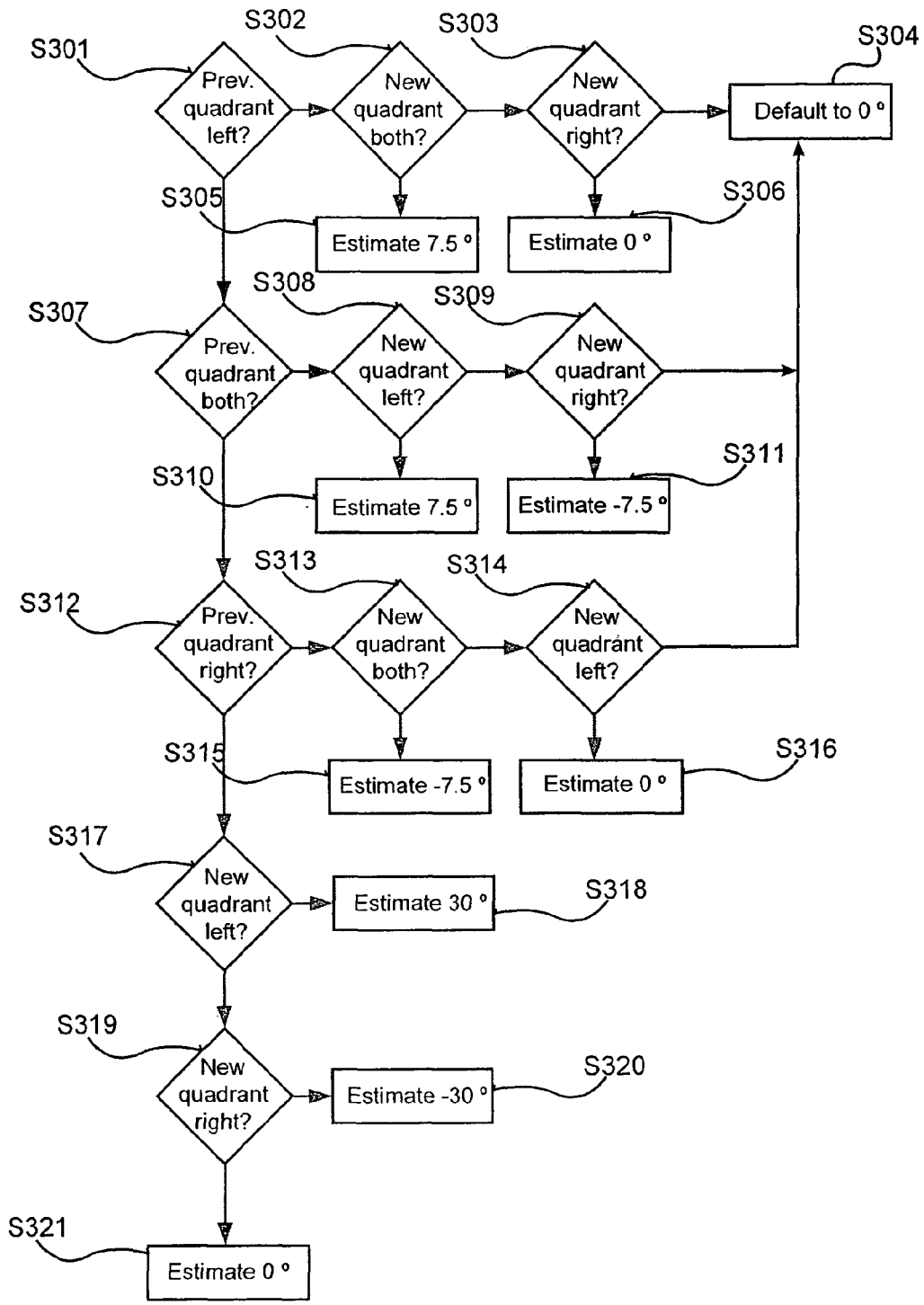
FIG. 52 depicts a second phase of a sequence for estimating a wall angle, in accordance with one embodiment of the invention.

With reference to FIGS. 51 and 52, an exemplary estimation process is illustrated, in which the term 'bump quadrant' refers to which bump switches are closed—'left' means only the left switch is closed, 'right' means only the right switch, and 'both' means that both the left and right switches are closed. FIG. 51 illustrates an example of a continuous algorithm that updates the wall angle every control cycle, and FIG. 52 illustrates how the estimate is updated when the wall quadrant changes.

For example, as illustrated in FIG. 51, at an initial step S201, the robot forms an initial estimate of the wall angle based on the bump quadrant, then waits for a subsequent control cycle at S202. Once the control cycle begins, the robot determines at S203 whether the currently-detected bump quadrant is different from the previous bump quadrant, and if so, reestimates the wall angle based on the previous bump quadrant and the current bump quadrant at S205, and returns to S202 to wait for a subsequent control cycle (thereby forming a process loop). If, however, the current and previous bump quadrants are the same, the robot estimates at S204 the wall angle based on wheel movements during the control cycle instead of differences in bump quadrants, and then returns to the control cycle waiting step S202, as well.

As shown in FIG. 52, the process proceeds along a first series of linked test steps (S301, S307, S312, S317 and S319), including determining whether the previous bump quadrant was left, both, or right; or, whether the current quadrant is left or right. If none of the determinations in this initial series of linked test steps are 'yes,' then the robot reaches a default estimation for the wall angle of 0 degrees at S321. However, if on the other hand the robot determines that the previous bump quadrant was left, then the robot next determines at S302 whether the current bump quadrant is both (in which case, the robot estimates the wall angle as 7.5 degrees at S305), at S303 whether the current bump quadrant is right (in which case, the robot estimates the wall angle as 0 degrees at S306), or otherwise, defaults the estimate to 0 degrees at S304. If, on the other hand, the previous bump quadrant was instead both as determined at S307, then the process estimates the wall angle as 7.5 degrees at S310 if the current bump quadrant is determined as left at S308, or −7.5 degrees at S311 if the current bump quadrant is right as determined at S309; otherwise, the wall angle estimate defaults to 0 degrees at S304. Furthermore, if the previous bump quadrant was right as determined at S312, then the robot estimates the wall angle as −7.5 degrees at S315 only if the current bump quadrant is both as determined at S313; otherwise, the estimate defaults to 0 degrees (via S316, if S314 determines the bump quadrant as left, or via S304 otherwise).

On the other hand, if the previous bump quadrant was not left, right, or both—such as may occur on an initial control cycle when no previous bump quadrant has yet been detected—then the robot determines at S317 whether the current bump quadrant is left (in which case the estimate becomes 30 degrees at S318) or right, as determined at S319 (in which case the estimate becomes −30 degrees at S320); otherwise, the estimate for the wall angle defaults to 0 degrees at S321.

The robot may also have cliff avoidance and panic spin behaviors. In addition, the robot may use a direction lock algorithm in order to get out of corners and distribute itself throughout a room or other area containing the cleaning surface. This may occasionally result in the robot turning into an obstacle or cliff it just detected. Thus, in order to avoid dropping off a cliff in a situation in which the offset robot turns toward an obstacle or cliff it has just detected in accordance with the direction lock algorithm (which might occur because the offset robot does not rotate about its center without accompanying forward or reverse translational movement with respect to the cleaning surface), the offset robot may back up a further distance (for example, about 10 mm, although distances from about 5 mm up to about twice the diameter offset may alternatively be used). Backing up too far could lead to falling off a different cliff which might lie behind the robot, because the robot might not have cliff sensors on the rear of the robot in some embodiments. Further, the robot may also turn a further amount (for a non-limiting example, 20 degrees; or, any angle within 0 through 90 degrees also being suitable, alternatively) when turning towards a detected cliff, compared to a non-offset robot.

Figure 53:
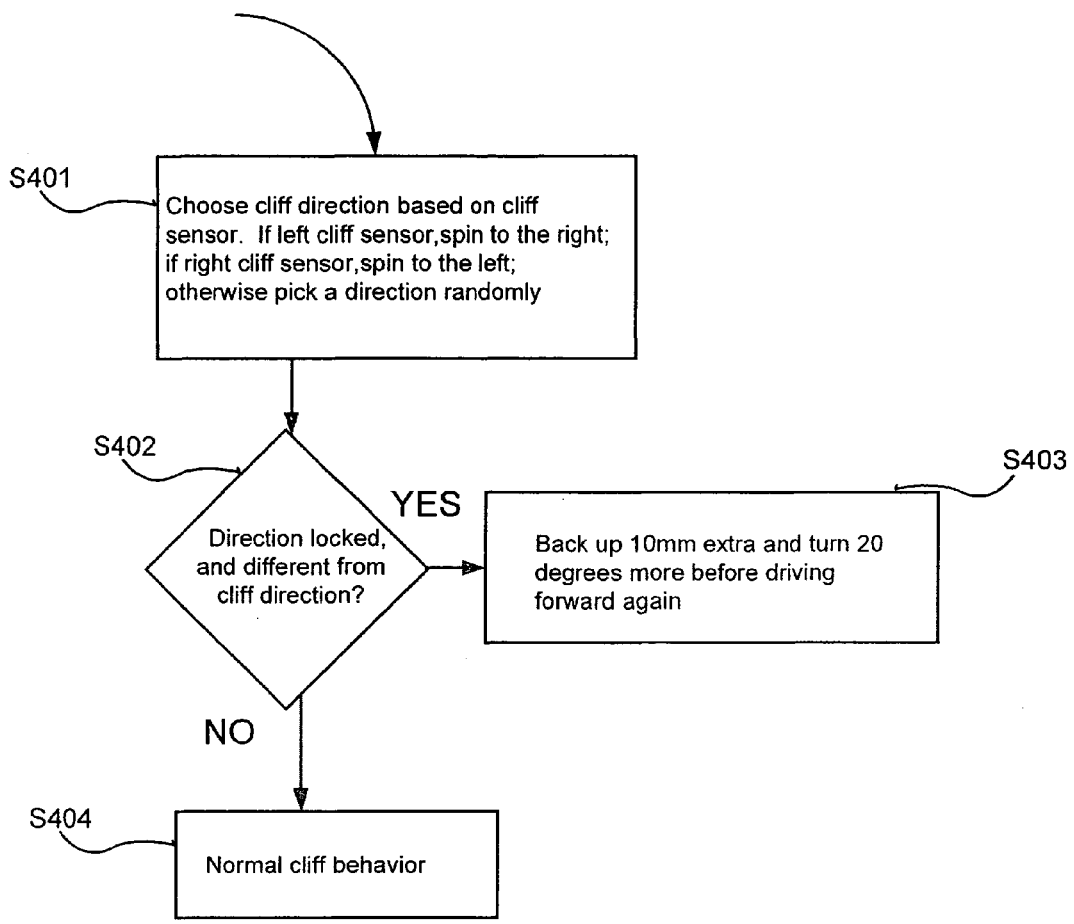
FIG. 53 depicts an obstacle avoidance sequence, in accordance with one embodiment of the invention, for backing a robot away from an obstacle.

FIG. 53 illustrates an exemplary algorithm that an offset robot may employ. At an initial step S401, the robot determines a direction of a detected cliff, based on which cliff sensor among at least a right cliff sensor and a left cliff sensor (as non-limiting examples) are triggered—if only the right cliff sensor is triggered, the robot determines the cliff is to the right; if only the left cliff sensor is triggered, then the robot determines that the cliff is to the left; otherwise, the robot instead determines a direction at random. Next, the robot determines at S402 whether the direction is locked, and whether it is different from the direction of the cliff. If yes, at S403 the robot backs up (for example, by a particular distance, such as 10 mm; alternatively, the distance may be dynamically set in response to other environmental or behavioral factors known to the robot, or by any suitable predetermined amount) and turns (for example, by a particular amount such as 20 degrees; alternatively, the turning amount may be dynamically set, or may be any suitable amount) before again proceeding forward. Otherwise, at S404 the robot then proceeds according to the usual cliff avoidance behavior.

The panic spin behavior is used to escape when robot determines that it may be stuck on an obstruction. In embodiments in which the robot is an offset robot, and is unable to rotate in place about its center without necessarily simultaneously moving forward or backward, and thus place the offset robot in danger of going over a cliff, the offset robot may reverse its panic spin direction if it encounters a cliff during the behavior.

Figure 54:
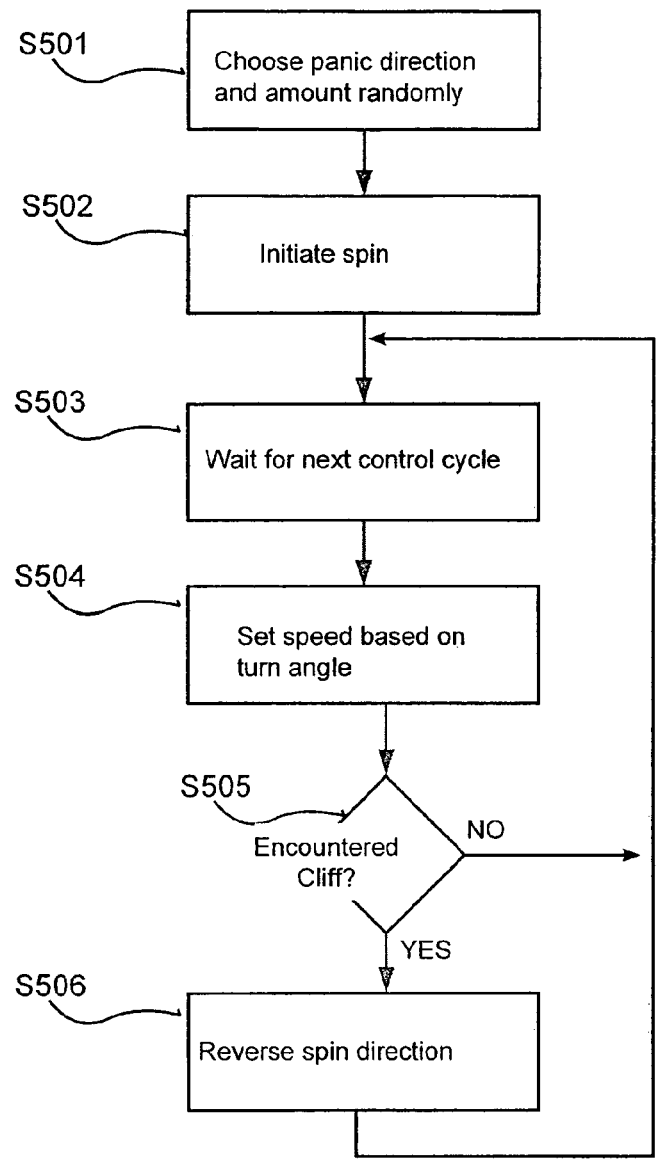
FIG. 54 depicts a panic spin sequence for a mobile robot, in accordance with one embodiment of the invention.

As shown in FIG. 54, for example, in accordance with one example of a panic spin behavior for an offset robot, the robot may randomly choose a rotational direction and magnitude in which to turn about its center, at a first step S501. The robot then may begin its spin at S502, and then wait for the next control cycle at S503. Subsequently, the robot may set its speed based on the chosen turn angle at S504, and then test whether or not a cliff has been detected at S505. If so, the robot then reverses its spin direction at S506, and the control process then loops back to S503 to wait for a subsequent control cycle; otherwise, the control process simply loops back to S503 to wait for the subsequent control cycle, without reversing the spin direction.

The robot may have a bounce behavior for handling low traction. The robot may operate in environments in which the floor or other cleaning surface is wet, and there may be other elements or protrusions on the bottom of the robot chassis that may contact the floor and reduce wheel contact force. To handle this, when the bumper is triggered, the bounce behavior for the robot may generally back up at least about 10 mm (or any other suitable distance), and then stop backing up when it has either backed up a further 20 mm (or other suitable distance) or the bumper has released. In contrast to conventional robots, a robot in accordance with this embodiment may back up a minimum amount before scanning to determine whether the bumper is released. The total distance may also be kept to a minimum to avoid inadvertently backing off a cliff, but enough that the robot can turn.

The robot may also include a wheel drop behavior for detecting floor transitions and drops, as well as gradually sloping obstacles or objects which might not otherwise be detected by bumpers or other obstacle detection sensors. For example, if the front of the robot rides up on a shallow transition in the floor, or when the front of the robot is lifted by a gradual rise or object on the cleaning surface that does not alert the robot to its presence by triggering a bumper or other sensor, the front wheels 1100 of the robot may drop down and thus lose contact with the surface. Accordingly, the robot may include a sensor which triggers when the wheel of the robot drops to its lowest position (or any other lower-than-normal point suitable to indicate a likely loss of contact). Thus, when the front wheel drops, the robot may then react to a triggering of the wheel drop sensor in a manner similar to a bumper hit. As a non-limiting example, if, after backing a short distance, the wheel does not return (for example, the wheel drop sensor fails to cease to trigger), the robot may then stop (and, for example, alert the user with a wheel drop error code, alarm, or other indication) for safety reasons. By reacting to a wheel drop condition as a bump, for example, the robot may avoid going up onto carpets or other undesired floor surfaces or obstacles.

Figure 55:
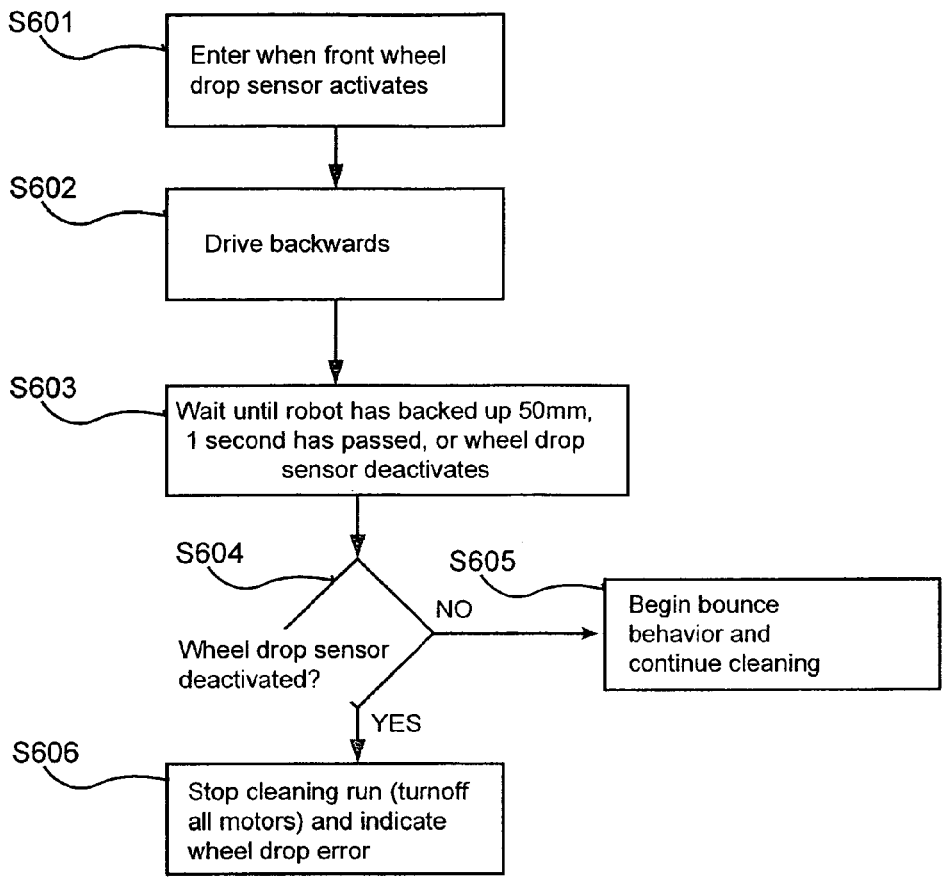
FIG. 55 depicts a wheel drop response sequence for a mobile robot, in accordance with one embodiment of the invention.

FIG. 55 shows that upon entering the wheel drop behavior, as a first step S601, the robot moves in reverse at S602 until at S603 the robot has reached a particular distance (for example, 50 mm), or a particular amount of time has passed (for example, 1 second, or any other suitable amount of time), and/or the wheel drop sensor no longer is triggered (for example, if the wheel drop sensor is a continuous-type sensor rather than a pulse-type or momentary-type sensor). Subsequently, the robot determines at S604 whether the wheel drop sensor no longer is triggered, and if so, the robot may then enter the bounce behavior mode and/or continue to clean the cleaning surface (alternatively, for example, the robot may simply revert to its normal mode, or any other suitable behavioral mode) at S605. If, on the other hand, the wheel drop sensor has not ceased to trigger, the robot may then cease its cleaning behavior (or traveling behavior, as may be the case), and may also issue an alarm, error code, or other "distress" indicator in order to alert the user that the robot is no longer cleaning and has entered a stationary "fail safe" mode at S606, as a non-limiting example.

Certain embodiments of the wet cleaning behaviors are described below. In accordance with some embodiments, in which the robot includes components for wet cleaning of the cleaning surface (by including the liquid applicator module 700 and associated elements), the vacuum fan motor may be operating the entire time the robot is cleaning. As a result, any liquid previously deposited on the cleaning surface—for example, cleaning liquid left over from a previous cleaning cycle, or liquid from a beverage spilled on the floor by a person, or any other liquid—may be removed from the cleaning surface; in addition, any liquid or moisture which remains within the robot or on robot components (for example, as a result of wet cleaning operations performed by the robot) may more quickly dry out as a result of air flow drawn over the residual liquid or moisture. Thus the robot may become properly dry more quickly, and the likelihood of undesirable leaking or spilling of liquid from the robot, such as may occur when a still-wet robot is prematurely handled by a user, may be reduced. Further, the brush and pump may be controlled in accordance with the cleaning and mobility characteristics of the robot. Additional robot behaviors related to wet cleaning robots are described below.

The robot drying process may be triggered, for example, by one or more conditions such as, for example, a timer that causes the robot to initiate the drying process at a particular time of day, or after an elapsed period of time during a wet cleaning cycle; or, as in the alternative, in response to a sharp drop off in battery voltage supplied to the robot, which may indicate that the battery will soon not provide sufficient power. As an advantage, for example, the robot may be configured to ensure that it is dry before the power supply from the battery is completely drained.

Embodiments of the main brush control are described below. When the robot is in motion, the main brush may spin in a clockwise direction when viewed from the right hand side of the robot, as illustrated in FIG. 3, for example. As a result, forward force is contributed to the robot as the clockwise-spinning main brush contacts the cleaning surface or floor, for example, facilitating forward propulsion of the robot with respect to the cleaning surface. Likewise, when backing up, the robot may turn the brush off; and the robot may also leave the brush turned off until it has traveled forward at least, for example, about 25 mm (an alternative suitable distance or time delay may be used, for example, about 0-50 mm) upon resuming forward movement. Alternatively, when the brush can be caused to rotate in a reverse direction (e.g., in a counterclockwise direction, when viewed from the right hand side of the robot) when the robot backs up, in order to provide additional reverse propulsive force, as a non-limiting example.

Figure 56:
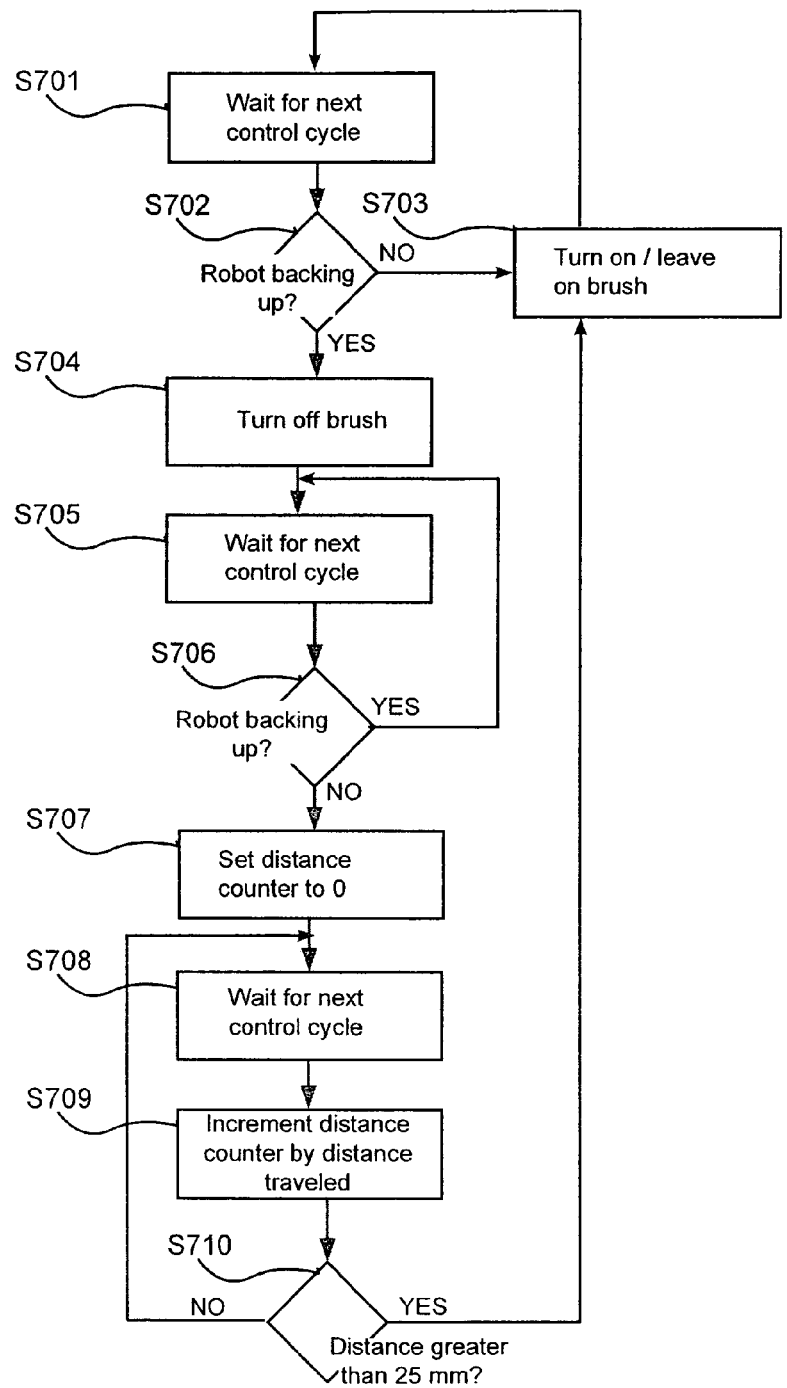
FIG. 56 depicts one embodiment of a brush control sequence in accordance with a wet cleaning mobile robot.

FIG. 56 illustrates an exemplary brush control process in accordance with such an embodiment. The robot may wait for a next control cycle at S701 (herein referred to as the "first step," although the behavioral control process may alternatively begin at any suitable point, for example, and is not limited to beginning at this step), and then determines whether or not the robot is backing up at S702. If not, then the robot turns on the brush (or leaves the brush on) at S703, then returns to the first step S701.

On the other hand, if the robot is determined to be backing up, the robot may then turn off its brush at S704, then wait for a next control cycle at S705; upon the next control cycle, the robot may again determine whether the robot is backing up at S706, and if so, the process may sub-loop by returning to the immediately preceding waiting step S705 and wait again for a next control cycle. However, if the robot determines that the robot is not backing up at this sub-loop, it may then proceed out of the sub-loop and set a distance counter to an initial state (such as setting an integer value stored in electronic memory to zero, or a count register, or mechanical counter, or other suitable counter, as examples) at S707, and then enter another sub-loop by waiting again for a next control cycle at S708. Upon the next control cycle, the robot may then increment (or decrement) the distance counter at S709, and then determine whether the distance counter has reached or exceeded a threshold value (e.g., 25 mm, or 1 second, or any other suitable threshold) at S710.

If the robot determines that the distance counter has not reached or exceeded the threshold value, the robot may reiterate this sub-loop by returning the process to the immediately preceding next-control-cycle waiting step at S708, for example. Otherwise, the robot may instead then turn on (or leave on) the brush at S703, and return to the first step S701 in the brush control process.

For embodiments of robots which include wet cleaning capability, a pump may be included which can be controlled to dispense cleaning fluid onto the cleaning surface, for example. In order to effectively distribute cleaning fluid on the floor, the robot may control the output shaft of the pump to a specific rotational speed, including embodiments in which no mechanical speed sensor is included. Also, the robot may turn the pump off under various circumstances while cleaning to avoid putting too much fluid down in one spot, such as, for example, when the robot is not traversing the cleaning surface at an appropriate rate to appropriately disperse the cleaning fluid. In addition, the robot may perform a specific sequence at startup to prime the pump quickly. Further, the pump may be turned off for 5 minutes after cleaning is complete, to properly dry the inside of the robot, although this may be from about 15 seconds-15 minutes depending on the air flow and fluid properties. Other examples of pump control and pump-related behaviors are described below.

In one embodiment, the robot may ascertain the floor area of a room to be cleaned, either by initially traversing and recording the boundaries of the room, or by receiving information from a user or computer. Thereafter, the robot may control the pump in proportion to the ascertained size of the room, in order to ensure that the entire floor (or at least a maximal or optimal area thereof) receives an effective amount of cleaning fluid, for example. As an advantage, cleaning fluid can be conserved and the risk of leaving the floor only partially cleaned may be reduced.

Figure 57:
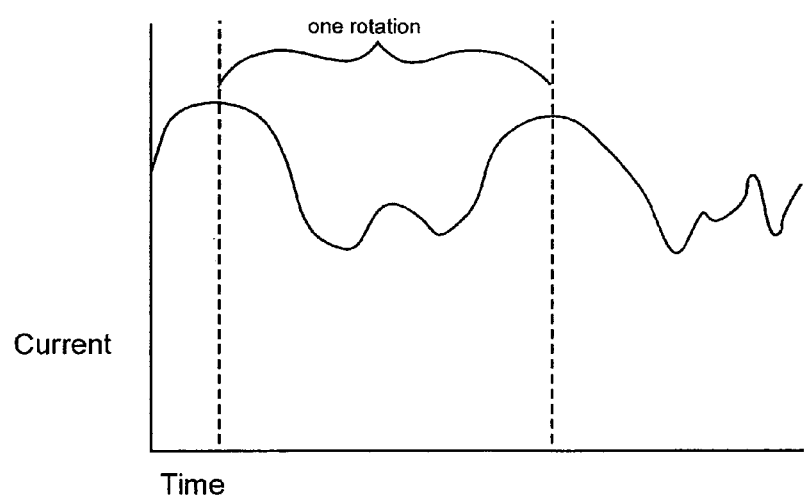
FIG. 57 depicts a graph of current drawn by a robot motor versus time over at least one rotation cycle.

In at least one embodiment, a robot may include a pump which is a reciprocating diaphragm pump having two chambers. The pump is driven by a small DC motor, and the output shaft has an eccentric cam that drives the pump mechanism. The output speed of the pump may be controlled to a particular rotational speed to distribute the correct amount of cleaning fluid. To avoid the cost and potential unreliability of a mechanical sensor, an electrical sensor may be included, as well. When driven with a substantially constant voltage, for example, the current drawn by the pump may be represented by a signal having a period that varies with the output speed of the pump, as illustrated in a non-limiting example in FIG. 57. By measuring the current of the pump over time and analyzing the resulting data, the speed at which the pump is turning can be determined.

As noted herein, the diaphragm pump distributes water in front of the cleaning head. A single membrane sandwiched between two housing pieces acts as both inlet and outlet check valves and pumping chamber. The pump has two independent circuits which supply two outlet nozzles. The pump is actuated by a cam such that the nozzle output is constant per unit distance squirted. In other words, the cam drives the pump so each nozzle leaves a uniform puddle across the full width of the cleaning brush. The output of each pump channel is directed to nozzles which are positioned directly opposite each other in line with each end of the cleaning brush and in front of the cleaning head. The nozzles squirt water parallel to and in front of the cleaning head. They squirt directly out of phase at the same frequency in an effort to minimize the linear travel distance between output puddles. The reason for two nozzles is to reduce or eliminate any unevenness or inaccuracy apparent in a single nozzle. By having two opposing nozzles, the outputs are averaged, and the cleaning fluid is applied uniformly.

In accordance with at least one embodiment, the robot may analyze data pertaining to the pump speed using a pseudo-autocorrelation algorithm or other suitable algorithm. The current that the pump is drawing may be sampled every control cycle (generally about 67 times per second, or other suitable rate, e.g., from 10-200 times per second) and put into a buffer. The buffer analyzes every control cycle (or other suitable periodic rate) to estimate the period of the signal. The pseudo-autocorrelation algorithm outputs a correlation value for a range of sample periods, from about 194 ms (corresponding to 79 RPM), for example, to about 761 ms (309 RPM) at 15 ms intervals, in accordance with one example (noting that the particular values of time, interval, and rate are simply non-limiting examples, which may be substituted with any other suitable values). A correlation value is calculated by summing the absolute value of the difference of a number of samples in the buffer separated by the sample period. A lower correlation value generally indicates a better match.

The pseudo autocorrelation algorithm may sometimes falsely indicate a match even for incorrect frequencies, because it can match on frequencies whose period is a multiple of the correct period, and if the two lobes of the signal are similar in size it may also falsely indicate a match on half the period. To help avoid this problem, an estimate of pump speed may be calculated from the voltage being supplied to the pump and the current being drawn. In accordance with an exemplary embodiment, this may be based on data measured from several sensors to measure the appropriate constants. In accordance with this process, examples of formulas for determining an estimated pump RPM based on voltage and current readings may include, among others:

Period_from_voltage=61−2.5*V;

Nominal_current=8.4+3.95*V;

Slope=1.3302−0.07502*V;

Period=Period_from_voltage+(*I*−Nominal_current)* Slope; and

RPM=4020/Period.

Although all of which should be considered to be alternatively +/−5 percent, or up to +/−20 percent, the values have been determined empirically to take into account tolerance variation among pumps and motors.

Figure 58:
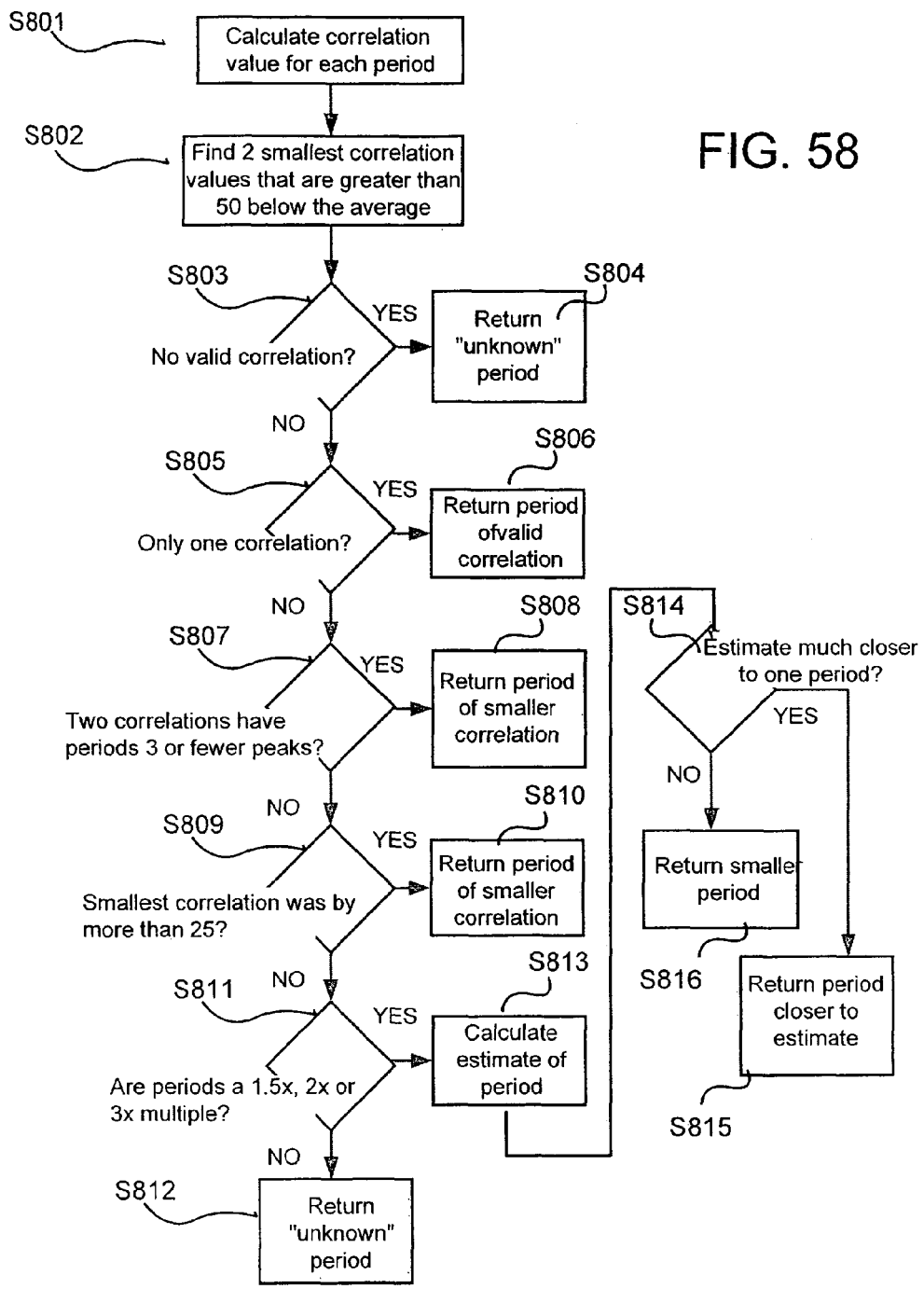
FIG. 58 depicts one embodiment of a sequence for pseudo-autocorrelation for a pump control process for a wet cleaning mobile robot.

FIG. 58 illustrates one example of an algorithm used to determine the pump speed. At an initial step S801, the robot calculates a correlation value for each period, then at S802 find the two smallest correlation values which are greater than 50 below the average value. This is an empirically determined constant and is a non-limiting example. Reasonable values will vary widely depending on actual pump current values, how pump current values are converted to digital values, and the sampling rate. Then, the robot determines whether or not there are no valid correlations at S803—if there are none, the process determines that the period is unknown at S804; on the other hand, if the determination is not that there are no valid correlations, the process then determines whether or not there is only one correlation at S805. If so, the process returns the period of the one valid correlation at S806. Otherwise, the process the determines at S807 whether or not two correlations have periods of three or fewer peaks and if so, then the process returns the period of the smaller correlation at S808.

If not, the process determines at S809 whether the smallest correlation has a value that is smaller by more than 25, in which case the process returns the period of the smaller correlation at S810. Just as above, this is an empirically determined constant and is intended only as an example. Otherwise, the process then determines whether the periods are 1.5×, 2×, or 3× multiples at S811. If not, the process determines the period as unknown at S812; otherwise, the process proceeds to calculate an estimate of the period (the estimate is calculated as described above) at S813, and then determines at S814 whether or not the estimate thus produced is substantially closer to one of the periods—and, if so, the process returns the period closer to the estimate at S815; if not, the process returns the smaller period at S816.

The robot may include pump disable control as well. In some embodiments, the pump may be stopped in various circumstances to avoid putting water on the floor where the robot will not (or is unable to) pick it up. For example, if the pump were to run (and thus cause cleaning fluid to be deposited) while the robot was backing up, the water that was put down might not get picked up because the part of the robot that picks up fluid is behind the fluid outputs (unless the robot were to re-traverse the area it backed away from).

Conditions in which the pump may be stopped may include, inter alia: (1) when the robot is moving backwards; (2) when the robot is turning in place (for non-offset robot embodiments, or, alternatively, when the robot is turning in a very small area, such as for either offset or non-offset robot embodiments); (3) when the robot is turning about a point closer to the center of rotation than half the wheel spacing; and/or (4) when the robot detects circumstances that are interpreted as a stuck condition.

Figure 59:
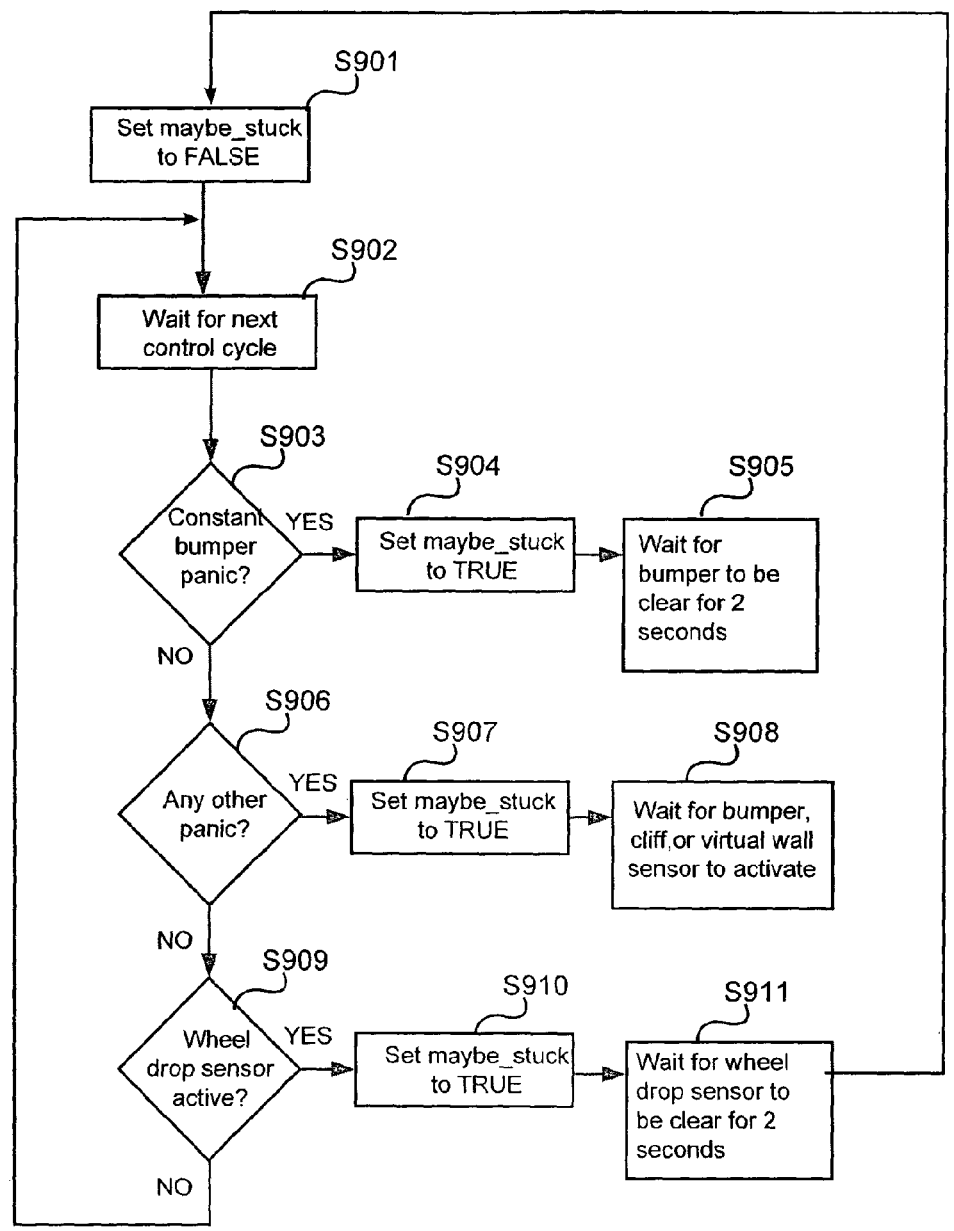
FIG. 59 depicts one embodiment of a sequence for implementing a stuck behavior for a wet cleaning robot.

FIG. 59 depicts an example of a sequence for implementing a stuck behavior for a wet cleaning robot. At a first step S901 (noting that although this is referred to as the "first step" for explanatory convenience, the process may alternatively begin at any other suitable step in the process) the process sets a "may be stuck" variable or flag (which may be a location in an electronic memory, or a flip-flop, or mechanical switch, or any other suitable structure; herein referred to as "maybe stuck") to a state representing "not stuck" (herein referred to as "false"; the opposite state referred to as "true"). The process then waits for a next control cycle at S902, and then determines whether the robot is in a constant bumper panic state (for example, a state in which the bumper triggers continuously) at S903, and, if so, the process sets maybe stuck to true at S904, waits for the bumper to be cleared for two seconds (e.g., 0.2 to 10 seconds) at S905, and then reiterates the stuck behavior process by returning to the first step S901. Otherwise, the process determines at S906 whether any other panic states exist; if so, the process sets maybe stuck to true at S907, waits for the bumper, cliff sensor, and/or virtual wall sensor to activate at S908, and then returns to the first step S901. If not, the process determines at S909 whether the wheel drop sensor is triggered; if so, the process sets maybe_stuck to true at S910, waits for the wheel drop sensor to be clear for two seconds (e.g., 0.2 to 10 seconds) at S911, and then returns to the first step. Otherwise, the process sub-loops by returning to S902 to wait for the next control cycle.

The robot's pump may also require a priming sequence. In embodiments of robots which include a pump, the pump may be run at full voltage for (as a non-limiting example) 2 seconds (or any other suitable interval) at startup, to facilitate priming of the pump.

A drying cycle may also be included in certain embodiments of the cleaning robot. For example, wet cleaning robots may generally continuously vacuum up dirty cleaning fluid (and/or other liquid) from the floor or cleaning surface. The fluid may form a residue along vacuum channels inside the robot. To avoid leakage of the fluid or residue from the robot (which leakage may form a puddle or streak on the cleaning surface) following a cleaning cycle, the robot may run for a period of time (herein referred to as "the drying period") after cleaning is stopped, with the pump turned off and the vacuum running. During the drying period, the vacuum may be maintained on and/or the brush may be kept spinning, to dry the brush and its enclosure. The robot may also move within its environment (for example, in its normal cleaning pattern), to allow the robot to pick up any liquid remaining under the robot that may continue to be pushed around with the robot's squeegee, as well as to avoid potential damage to the floor or cleaning surface that may be caused by spinning the brush in one place.

Figure 60:
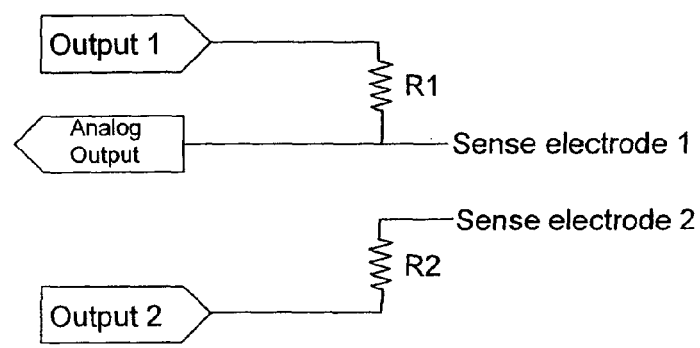
FIG. 60 depicts one embodiment of a fluid sensing circuit diagram for a wet cleaning mobile robot.
Figure 61A:
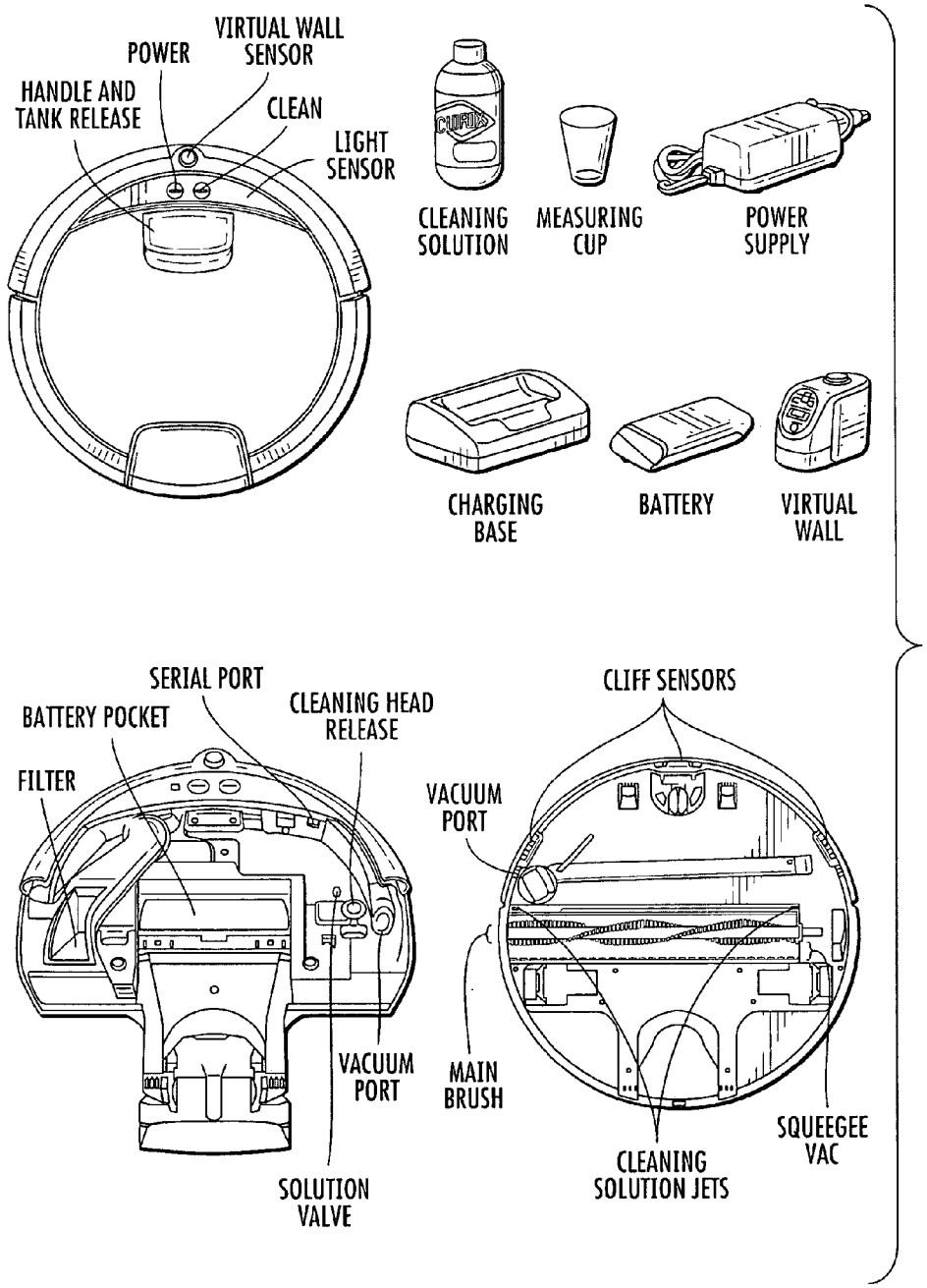
FIG. 61A depicts one commercial embodiment of the robot of the present invention, including accessories.
Figure 61B:
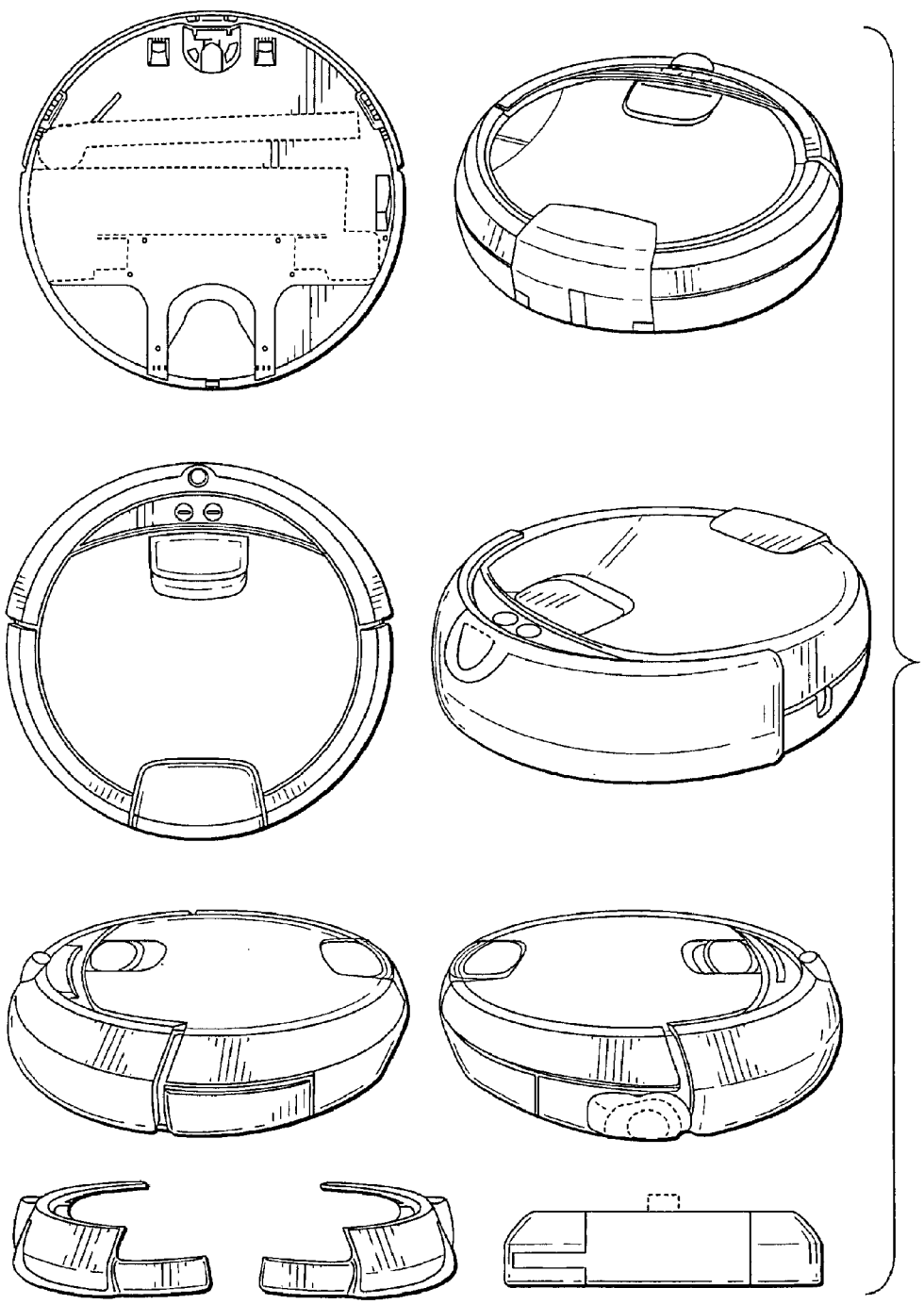
FIG. 61B depicts various views of one commercial embodiment of the robot of the present invention.

The robot has additional sensors. In accordance with at least one embodiment, a wet cleaning robot may include one or more sensors such as, for example, a fluid level sensor, a Filter, Cleaning Head, and/or Tank Present Sensor, inter alia. A robot may include, as a non-limiting example, two fluid level sensors—one to sense if there is any clean fluid remaining, and another to sense if the waste fluid tank is full. Each sensor may use the same electronics and driving processes. FIG. 60 illustrates an example electronic circuit, in which R1 and R2 are current limiting resistors (which may have the same value, or, alternatively, differing values).

To get a reading from the sensor, the control process may set Output 1 to +5V, Output 2 to 0V, and read the analog input (Reading 1). It may then reverse the outputs, setting Output 1 to 0V and Output 2 to +5V (other voltage values +3.3, 12, 24 would be suitable for other system voltages). Then, the process may read the analog input again (Reading 2), and subtract the two readings (i.e., subtracting Reading 2 from Reading 1) to obtain, as a result, the voltage across the sense electrodes, herein called the "Sense Voltage." Accordingly, a set of formulas may be used to calculate the resistance across the sense electrodes, such as, for example:

Voltage across $R1$ (or $R2$)=(5V[from the voltage applied to the pin above]−Sense Voltage)/2;

Current across $R1$ (or $R2$)=(Voltage across $R1$)/$R1$; and/or

Sense Resistance=(Sense Voltage)/(Current Across $R1$).

Generally, these formulas are effective if R1 and R2 are the same, and different formulas would be required if R1 and R2 are different. When the Sense Resistance is below a threshold, the sensor indicates fluid is bridging the electrodes. As an example, R1 and R2 may be 2K ohms (optionally 300 to 5000 ohms), and the threshold may be 30K ohms (or, alternatively, any other suitable values, e.g., 5K to 80K ohms).

The robot may also include filter, cleaning head, and tank sensors. Each of these components (Filter, Cleaning Head Assembly, and Tank Assembly) may include a magnet. In a corresponding position in the robot, there may be a reed switch that closes in the presence of a sufficiently strong magnetic field (alternatively, a relay-type switch, pressure sensor, optical sensor, or any other appropriate system for detecting the presence of the above-noted components may be used). This allows the control system to check if these components are properly installed. As the filter may be of critical importance, because the vacuum fan would be very easily damaged by foreign material, and because without the cleaning head assembly or the tank, the robot would not clean the floor, the control system may not allow the robot to run if any of these components are missing or go missing during the run, in accordance with at least one embodiment.

To avoid falsely preventing the robot from running when the tank is actually present but the sensor has failed, the control system may allow the robot to clean if the tank present sensor is not working. In accordance with one example, if the tank present sensor was working at the start of the run, and the tank present sensor indicates the tank is removed during the run, the robot may stop.

The user interface for the robot may consist of simply a power button. However, additionally, a cleaning button may be provided. In one example, each of the power button is provided with a light.

Figure 62:
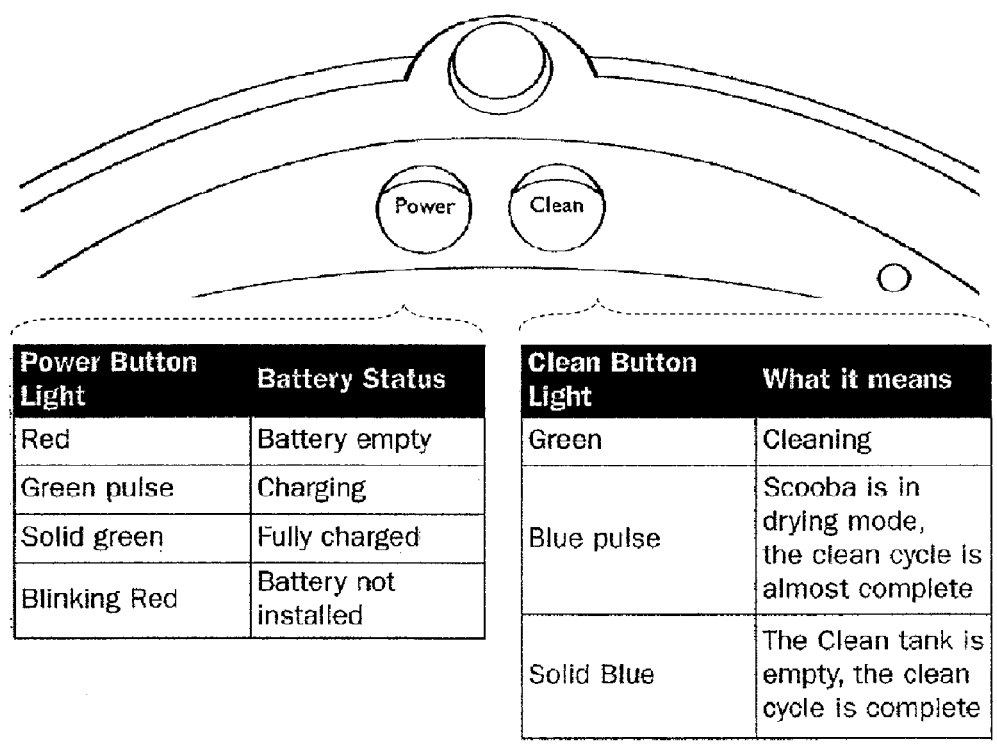
FIG. 62 depicts one embodiment of a control panel and user interface used with one embodiment of the robot.

As shown in FIG. 62, in order to provide the user with information regarding the robot's operation, the power button may be used to signify battery charging status, e.g., red for empty, pulsing green for charging (fast or slow for different charging cycles or battery refresh cycle), solid green for fully charged, blinking red for not installed. The clean button may be used to signify cleaning tank status or cleaning operation status, e.g., green for cleaning, blue pulse for drying (clean nearly completed), solid blue tank is empty clean cycles is complete.

Accordingly, in this user interface example, the robot has a battery and a replenishable material tank, and a panel is provided with two illuminable buttons, one of the buttons controlling an on/off or power operation of the robot and being illuminated, optionally in patterns and/or colors, according to the on/off or power status; and the other button initiating a cleaning operation by the robot using the replenishable material tank and being illuminated, optionally in patterns and/or colors, according to the status of the replenishable material in the tank and/or the status of a cleaning cycle and/or drying cycle using the replenishable material in the tank. "Illuminate" essentially means activate, and forms of rendering a warning more visible (change color, turn from light to dark, pop up, and the like) without actual illumination are included. An alternative would use one button and patterns and/or colors to signify power and/or replenishable material status as discussed above. Pressing one or two buttons in combinations (tap, long press, double tap, press both, press one and tap the other) can be used to initiate operations directly, such as starting drying immediately, overriding a sensor failure, or providing access to testing or diagnosis modes.

Figure 63:
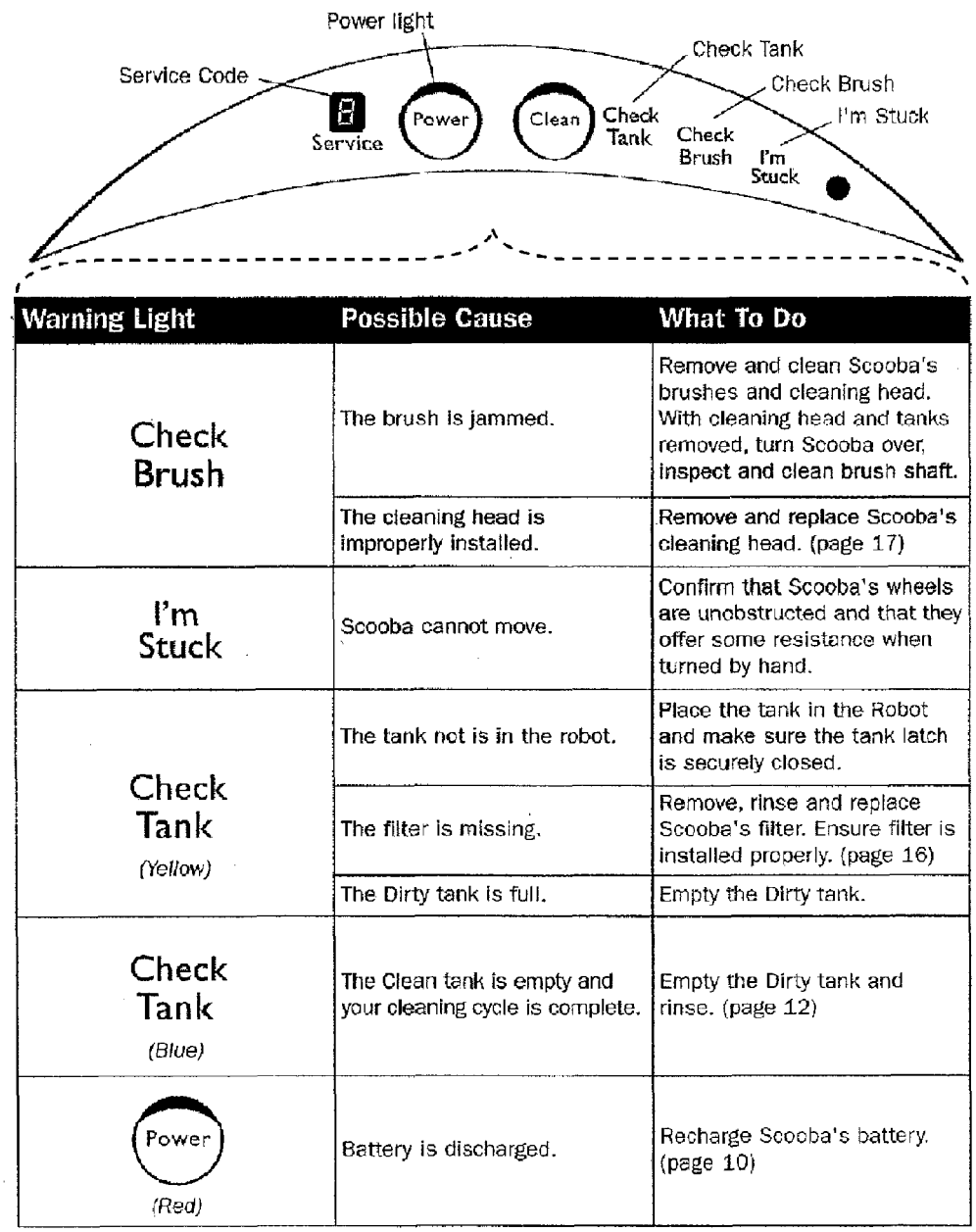
FIG. 63 depicts another embodiment of a control panel and user interface used with one embodiment of the robot.

As shown in FIG. 63, additional information can be provided with status lights that are important for monitoring autonomous operation. In such a case, the status lights may be illuminable text that directly indicate a problem, along with a color recognized as a warning by most people. If the lights are illuminable text messages, there is no need for the user to refer to a manual to interpret the problem on the robot, yet the robot does not include unnecessary complexity by inclusion of a display panel and associated control elements. In the present case, a warning light that indicates the user should "check tank" should actually use the words "Check Tank", and may illuminate in a "warning" color (e.g., yellow, red, orange) color for a service warning (E.g., the tank is missing) or in a "non-warning" color (e.g., green, blue, purple, white) for a simple status message (e.g., cleaning cycle is complete). In addition or in the alternative, a "Check Brush" and "I'm Stuck" light are useful in the present context. The check brush message may appear when the brush is jammed or improperly installed, e.g., by detecting motor load. The "I'm Stuck" message should appear as a result of the robot's recognition of a stuck or stasis condition, following appropriate panic, anti-canyoning, escape and other anti-stasis (sometimes "ballistic" behaviors) have been cycled or exhausted. One detection would depend upon stasis of the front wheel while either drive wheel turns. A service code 7-segment display element can provide information enabling problems to be diagnosed by the user or by technicians.

Accordingly, in this user interface example, the robot has a powered drive and/or a powered brush and/or and a replenishable material tank, and a panel is provided with warning indicia, capable being illuminated, optionally in patterns and/or colors, according to the status of the robot drive and/or brush and/or replenishable material tank. In certain embodiments, the indicia are actual text messages. Further preferably, the illumination is in warning and non-warning colors according to the circumstances. The replenishable material tank should be able to convey both tank malfunction and tank empty messages. Again, these lights are illuminated optionally in patterns.

Operation and Maintenance

FIGS. 36-41 depict a method for operating and maintaining a cleaning robot physically configured for such operation and maintenance, and also includes information regarding the stacking/assembly order of the parts of the robot and/or the physical configuration dependency of the robot. FIGS. 37-41 depict readily recognized hand positions, motions, and other physical actions, as well as readily recognized orientations, positions, and configurations of a cleaning robot, and the present disclosure includes all that is readily recognized from these drawings.

According to FIGS. 36-41, an embodiment of the robot is structurally configured to permit a tank to be physically positioned to provide access to an internal area (S2), or to permit a cleaning head to be physically removed from the robot body (S3). As shown in FIGS. 36-41, neither depends upon the other, and the cleaning head and tank release may be handled independently. Once the tank is put into a released position (S2), the tank may be unloaded (S4). However, even without unloading the tank (S4), the internal area becomes available, and the user may then access a filter that is made visible and accessible (S12), a vacuum port (grommet) that is made visible and accessible (S14), and a battery that is made visible and accessible (S16). Each of these is more convenient if the tank is unloaded (S4), but as the tank does not impede general access to the internal area in the released position, each of S12, S14, and S16 may be carried out without unloading the tank. The filter may be flushed and restored (S20) after being removed. The battery may be placed and handled differently, e.g., to be inserted in or to the robot body or tank without tank release, the outer surface of the battery substantially conforming to the outer profile of the robot when the battery is in place.

Once the tank is unloaded (S4), the dirty tank, if full, may be emptied (S6) and flushed (S18). However, whether the dirty tank is full or empty, the clean tank may nonetheless be filled with cleaning fluid (S8) or water (S10), none of these dependent upon the other. The tank, loaded with mixed cleaning fluid and water (or as noted herein, premixed and/or cartridge cleaning fluid and/or water alone), the tank is loaded (S22) and then "clicked" in to lock the tank in place (S24). The robot may then operate autonomously. These operations may be in whole or in part carried out by a dock or cleaning station of the robot. In such a case, it may be advantageous not to release the tank or unload the tank; rather the fluid areas of the robot, as well as the areas including cleanable parts such as the filter or vacuum port, may be accessed through alternate ports in the compartments of the tank provided for the purpose of automated evacuation of the tank. The present invention contemplates the automated docking and/or evacuation of the tank and/or robot, and incorporates by reference specific description thereof from the documents incorporated by reference herein. In such a case, some or all of the steps of FIG. 36 would be process steps carried out by the processor, manipulators, and mechanisms of the dock or evacuation station in communication with the processor of the robot.

In certain embodiments, the cleaning head release and tank release are made dependent. In such cases, the release for the cleaning head is inside the robot body, and the tank must be in the released position to access the cleaning head, as depicted in the FIGS. When in the down or latched position, the tank locks the cleaning head in place and prevents access to the cleaning head release button. In this configuration, the cleaning head engages the tanks via the vacuum channels that extend from the tank through the robot body into the cleaning head (as depicted in the FIGS.). In such a case, the vertical overlap is beneficial for sealing contact, and pulling the cleaning head sideways against the channels causes wear; thus, the cleaning head may be designed for release only when the tank is released to avoid this wear.

It will also be recognized by those skilled in the art that, while the invention has been described above in terms of preferred embodiments, it is not limited thereto. Various features and aspects of the above described invention may be used individually or jointly. Further, although the invention has been described in the context of its implementation in a particular environment, and for particular applications, e.g. residential floor cleaning, those skilled in the art will recognize that its usefulness is not limited thereto and that the present invention can be beneficially utilized in any number of environments and implementations including but not limited to cleaning any substantially horizontal surface. Accordingly, the claims set forth below should be construed in view of the full breadth and spirit of the invention as disclosed herein.

What is claimed is:

1. A surface treatment robot comprising:
   a robot body having a forward and a rear end, and a fore-aft axis defined therebetween;
   right and left drive modules, each drive module comprising
      a cup-shaped wheel having a substantially circular outer diameter,
      an annular tire having a substantially circular tire outer diameter and an inner diameter, the inner diameter fitting over the outer diameter of the cup-shaped wheel, and a tire thickness corresponding to the difference between the tire outer diameter and the outer diameter of the cup-shaped wheel; and
   a scrubbing element disposed along a cleaning width;
   wherein the right and left drive modules are disposed aft of the scrubbing element as the robot travels along the cleaning surface in a forward direction and the cleaning robot has a mass of less than about 10 kg, and
   the ratio of the tire thickness and the outer diameter of the cup-shaped wheel is in a range of 0.04 to 0.14.

2. The surface treatment robot of claim 1, wherein the each tire has a coefficient of traction between 0.25 to 0.47.

3. The surface treatment robot of claim 1, wherein the tire thickness is about 1.5 mm to about 4.5 mm.

4. A surface treatment robot comprising:
   a robot body having a forward and a rear end, and a fore-aft axis defined therebetween;
   right and left drive modules, each drive module comprising
      a wheel having a substantially circular outer diameter in the range of 3 cm-20 cm,
      an annular tire having a substantially circular outer diameter and an inner diameter, the inner diameter fitting over the outer diameter of the wheel, and a tire thickness corresponding to the difference between the tire outer diameter and the outer diameter of the wheel, the tire thickness being in the range of 1½ mm to 5 mm; and
   a scrubbing element disposed along a cleaning width;
   wherein the right and left drive modules are disposed aft of the scrubbing element as the robot travels along the cleaning surface in a forward direction and the cleaning robot has a mass of less than about 10 kg and
   the ratio of the tire thickness and the outer diameter of the wheel is in a range of 0.04 to 0.14.

5. The surface treatment robot of claim 4, wherein the scrubbing element is configured to support a wipe cloth in contact with the cleaning surface as the robot moves across the cleaning surface.

6. The surface treatment robot of claim 4, wherein the scrubbing element is in contact with the cleaning surface.

7. The surface treatment robot of claim 6, wherein the scrubbing element creates an average drag force along the cleaning surface of up to about 40% of the weight of the robot.

8. The surface treatment robot of claim 7, wherein each tire supports no more than 4 kg.

9. The surface treatment robot of claim 7, wherein the drive modules provide a thrust of about 150% or more of the average drag force on the robot.

10. The surface treatment robot of claim 4, wherein at least a portion of the cleaning width is proximate to a circumferential edge of the robot body.

11. The surface treatment robot of claim 10, wherein each wheel is proximate to a circumferential edge of the robot body.

12. The surface treatment robot of claim 10, wherein the cleaning width extends substantially parallel to an axis transverse to the fore-aft axis, the right and left wheels supported to rotate about a common drive axis substantially parallel to the transverse axis.

13. The surface treatment robot of claim 4, wherein each tire is bonded to the outer diameter of each respective wheel.

14. The surface treatment robot of claim 4, wherein each tire is a closed cell foam tire having cell sizes of about 20 microns to about 400 microns.

15. The surface treatment robot of claim 4, wherein the outer diameter of each tire defines a pattern of thin grooves.

16. The surface treatment robot of claim 4, wherein the each tire has a coefficient of traction between 0.25 to 0.47.

17. The surface treatment robot of claim 4, wherein each wheel is biased to move toward the cleaning surface when the wheel is lifted from the cleaning surface.

18. A surface treatment robot comprising:
   a robot body having a forward and a rear end, and a fore-aft axis defined therebetween;
   right and left drive modules, each drive module comprising
      a wheel having a substantially circular outer diameter, an annular tire having a substantially circular tire outer diameter and an inner diameter, the inner diameter fitting over the outer diameter of the wheel, and the annular tire having a Shore hardness less than the wheel and a tire thickness corresponding to the difference between the tire outer diameter and the outer diameter of the wheel; and a scrubbing element disposed along a cleaning width;

wherein the right and left drive modules are disposed aft of the scrubbing element as the robot travels along the cleaning surface in a forward direction and the cleaning robot has a mass of less than about 10 kg, and the ratio of the tire thickness and the outer diameter of the wheel is in a range of 0.04 to 0.14.

19. The surface treatment robot of claim 18, wherein the wheel is plastic and the tire has a post-foamed hardness of about 69 to 75 Shore 00.

20. The surface treatment robot of claim 4, wherein the wheel has a substantially circular outer diameter in the range of 30 mm-60 mm.

* * * * *